Dec. 26, 1961  R. L. DITMER ET AL  3,014,647
SYSTEM FOR COMPUTING AND SEQUENTIAL RECORDING OF DATA
Filed Nov. 16, 1956  36 Sheets-Sheet 1
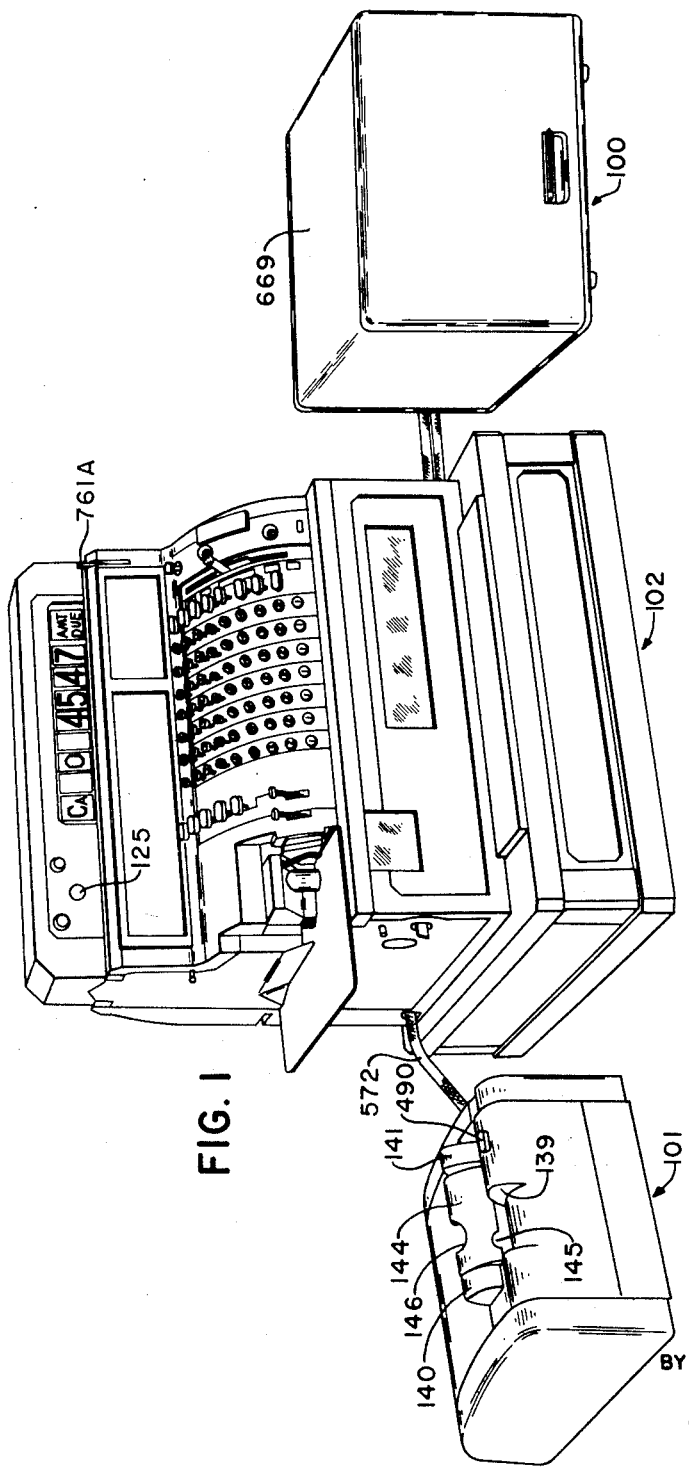
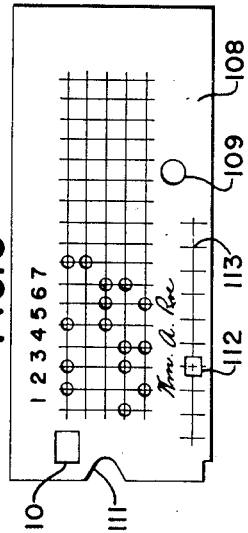
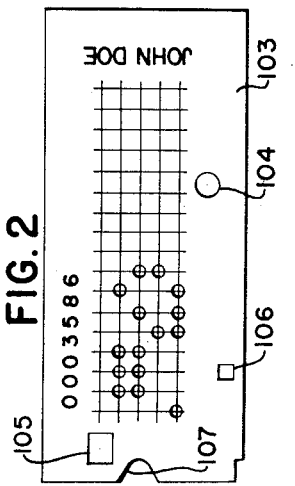
INVENTORS
RICHARD L. DITMER
ERVIN C. DOBBERSTEIN
LOUIS K. SANDOR
BY *Earl Beust*
*Albert L. Sessler, Jr.*
THEIR ATTORNEYS Dec. 26, 1961  R. L. DITMER ET AL  3,014,647
SYSTEM FOR COMPUTING AND SEQUENTIAL RECORDING OF DATA
Filed Nov. 16, 1956  36 Sheets-Sheet 2

INVENTORS
RICHARD L. DITMER
ERVIN C. DOBBERSTEIN
LOUIS K. SANDOR

BY Karl Beust
Albert L. Sassler, Jr.

THEIR ATTORNEYS

Dec. 26, 1961   R. L. DITMER ET AL   3,014,647
SYSTEM FOR COMPUTING AND SEQUENTIAL RECORDING OF DATA
Filed Nov. 16, 1956   36 Sheets-Sheet 3

FIG. 6

INVENTORS
RICHARD L. DITMER
ERVIN C. DOBBERSTEIN
LOUIS K. SANDOR

BY Earl Beust
Albert L. Sessler Jr.
THEIR ATTORNEYS

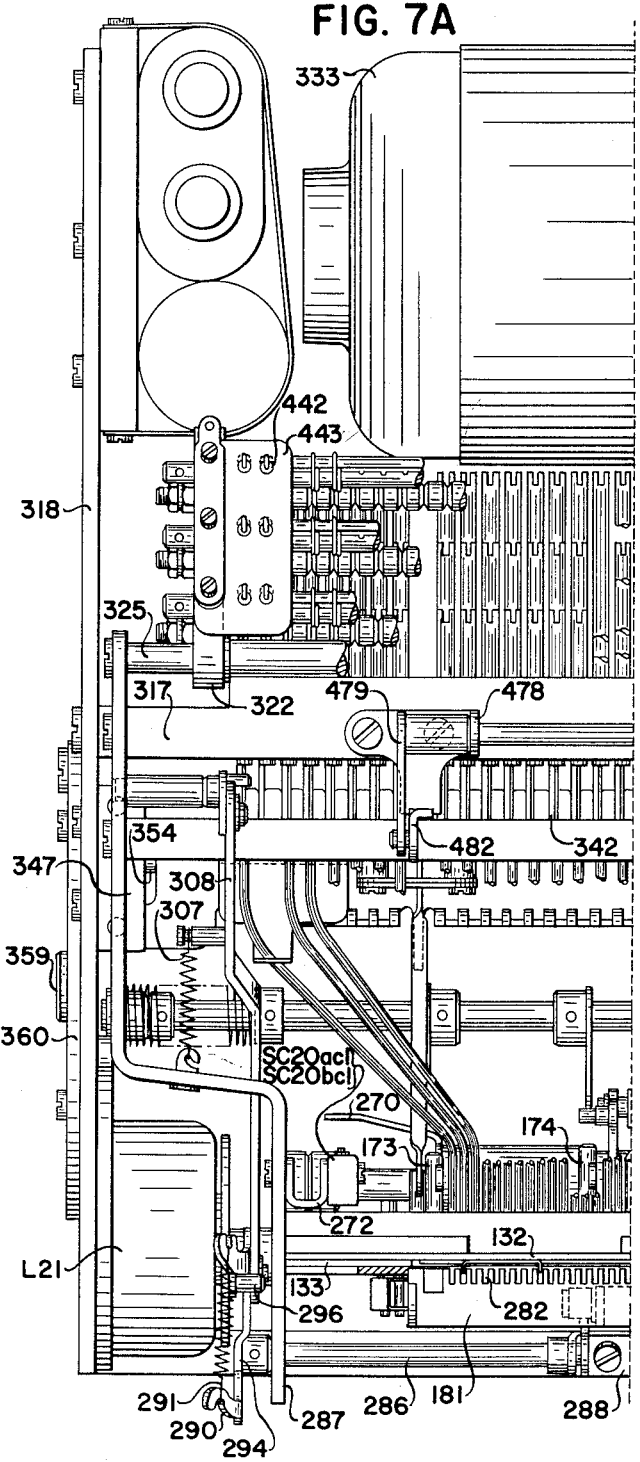

Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 5

INVENTORS
RICHARD L. DITMER
ERVIN C. DOBBERSTEIN
LOUIS K. SANDOR

BY

THEIR ATTORNEYS

Dec. 26, 1961  R. L. DITMER ET AL  3,014,647
SYSTEM FOR COMPUTING AND SEQUENTIAL RECORDING OF DATA
Filed Nov. 16, 1956  36 Sheets-Sheet 6
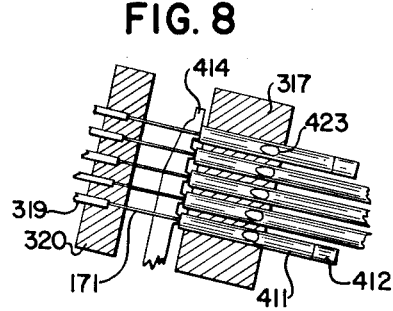
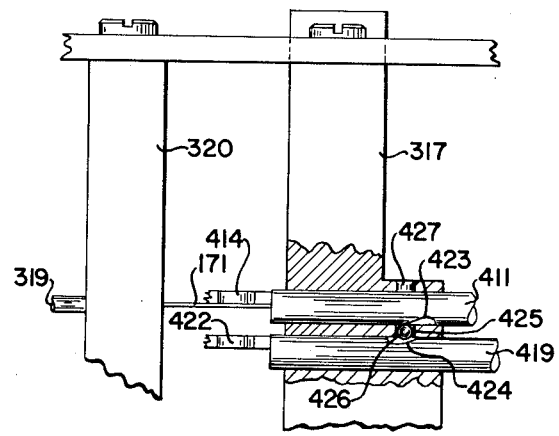
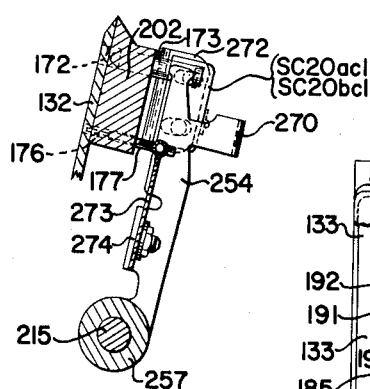
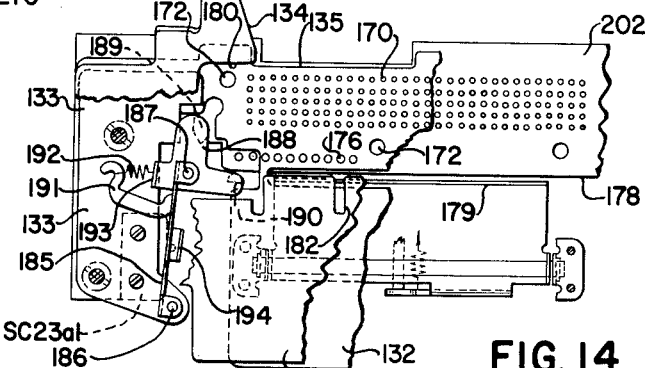
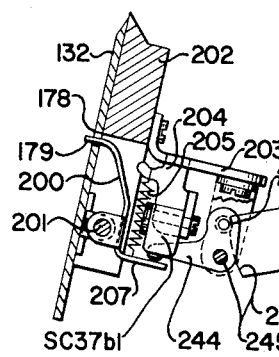
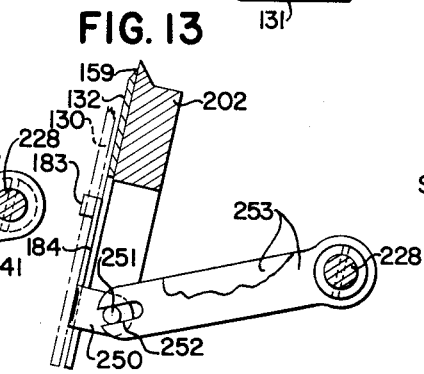
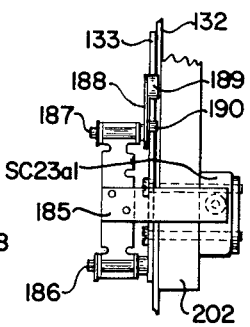
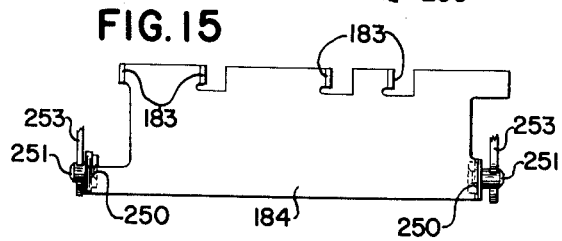
INVENTORS
RICHARD L. DITMER
ERVIN C. DOBBERSTEIN
LOUIS K. SANDOR
BY
THEIR ATTORNEYS Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 7
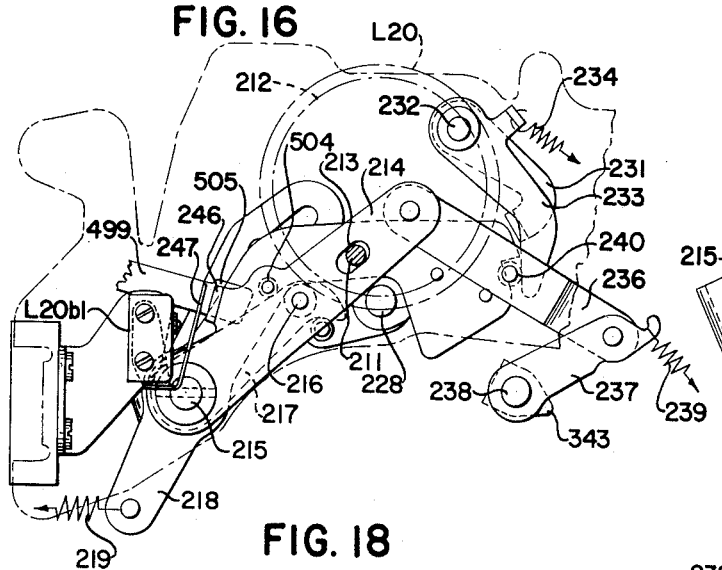
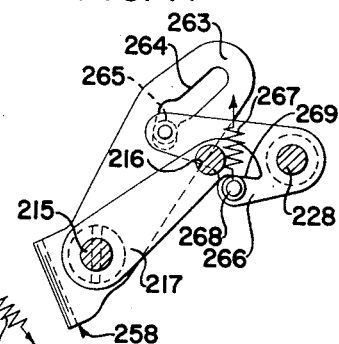
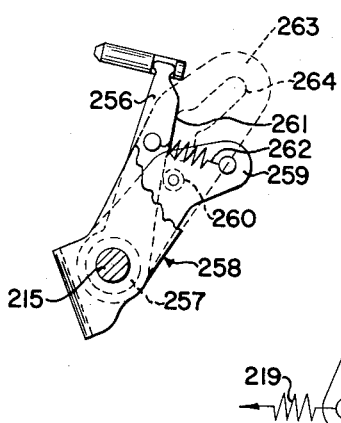
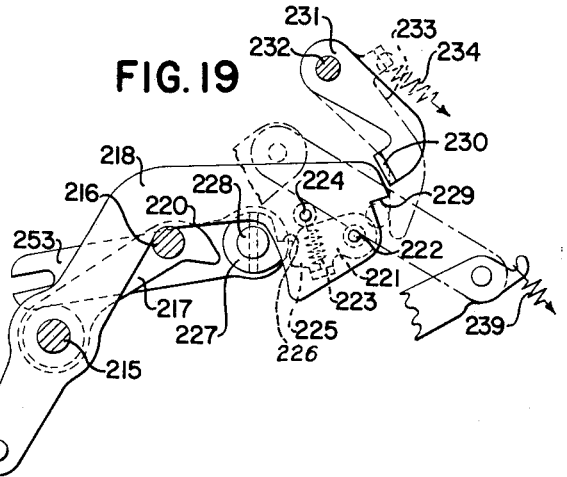
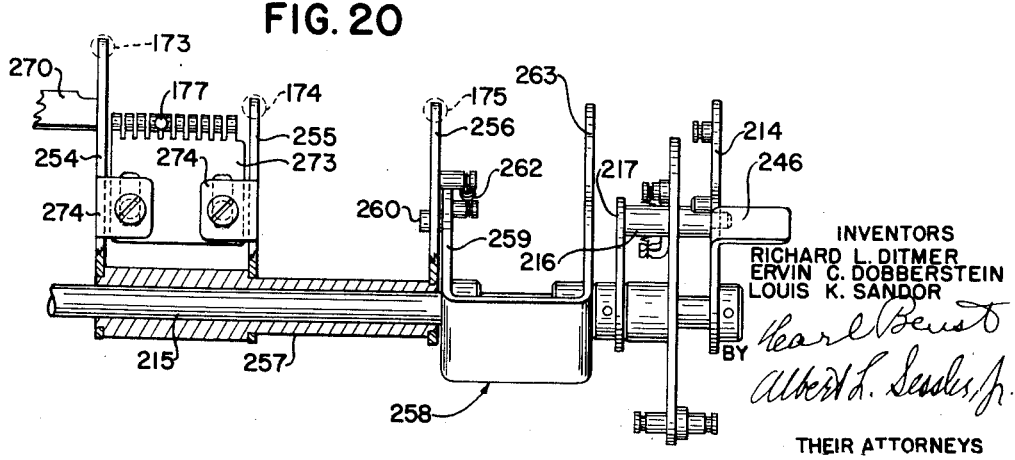
INVENTORS
RICHARD L. DITMER
ERVIN C. DOBBERSTEIN
LOUIS K. SANDOR
THEIR ATTORNEYS

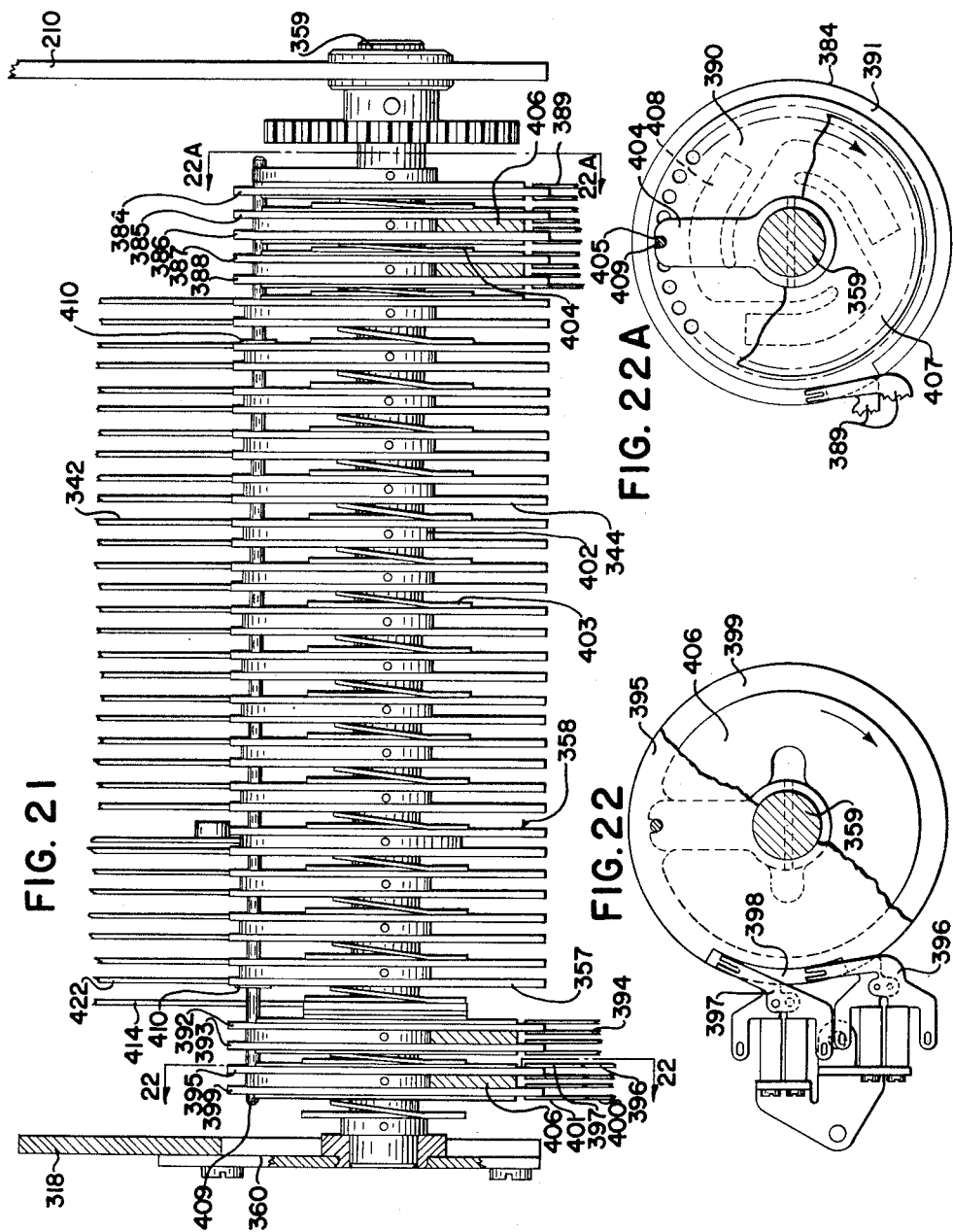

Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 9
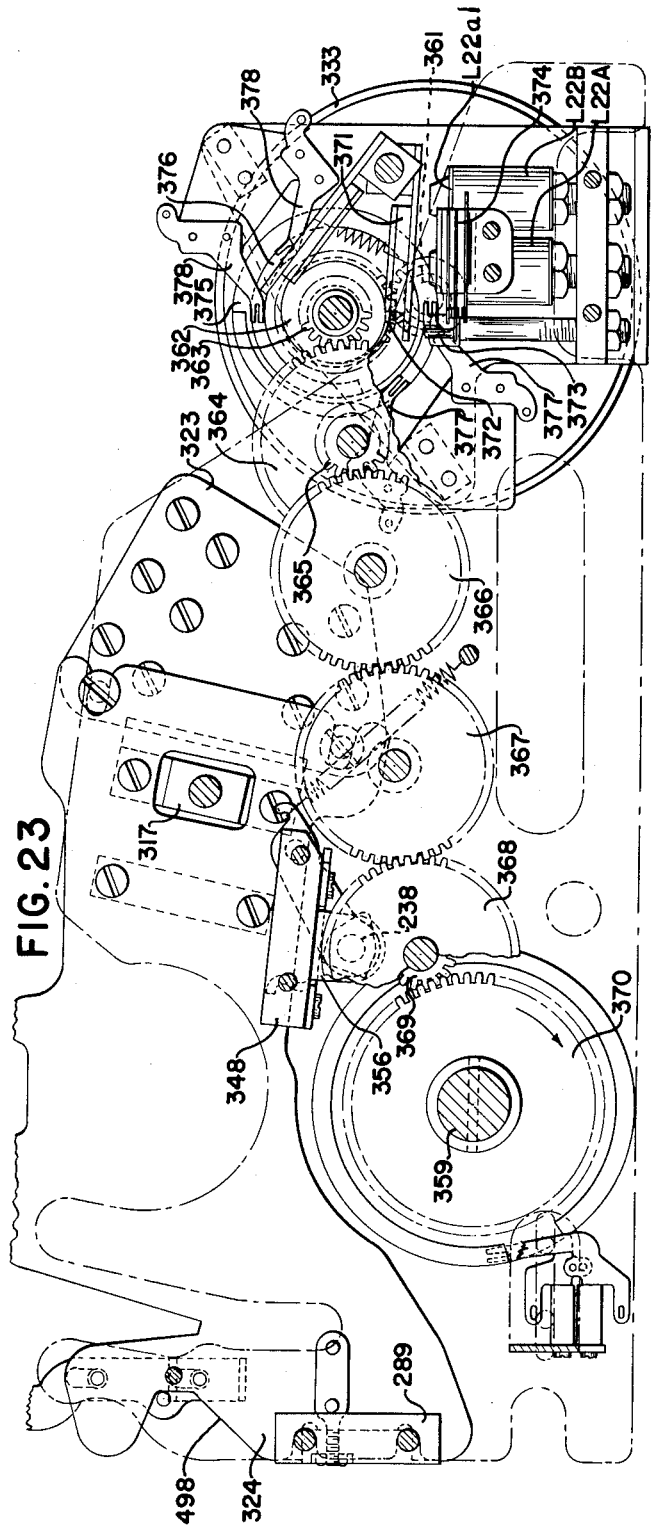
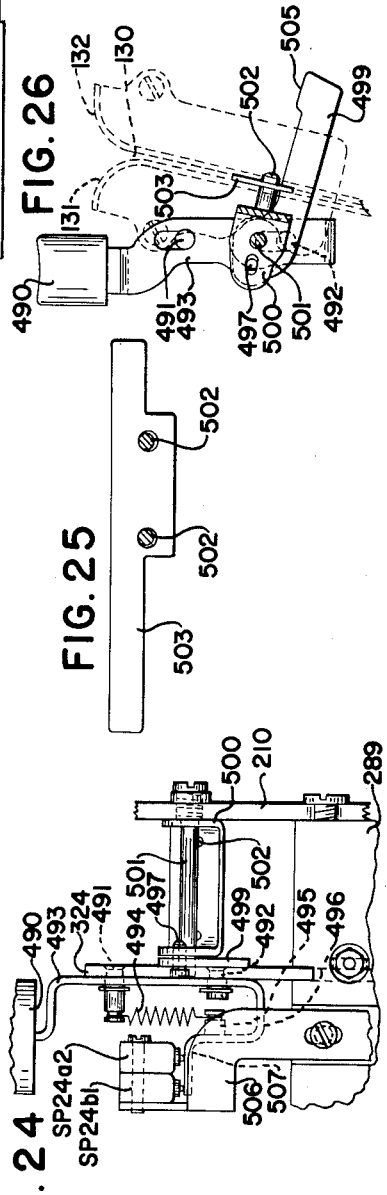
INVENTORS
RICHARD L. DITMER
ERVIN C. DOBBERSTEIN
LOUIS K. SANDOR
BY Earl Beust
Albert L. Sessler, Jr.
THEIR ATTORNEYS Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 10

INVENTORS
RICHARD L. DITMER
ERVIN C. DOBBERSTEIN
LOUIS K. SANDOR

BY

THEIR ATTORNEYS

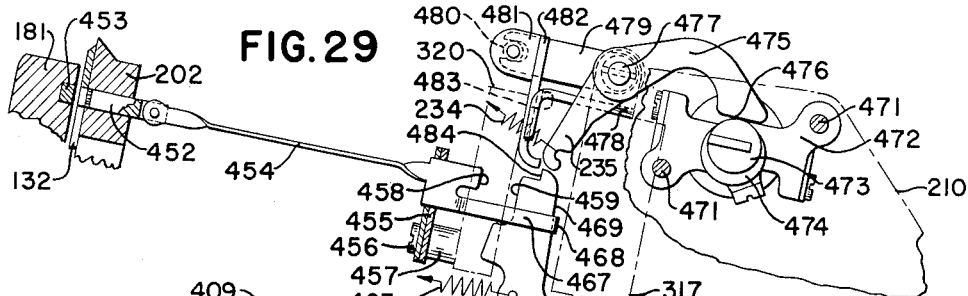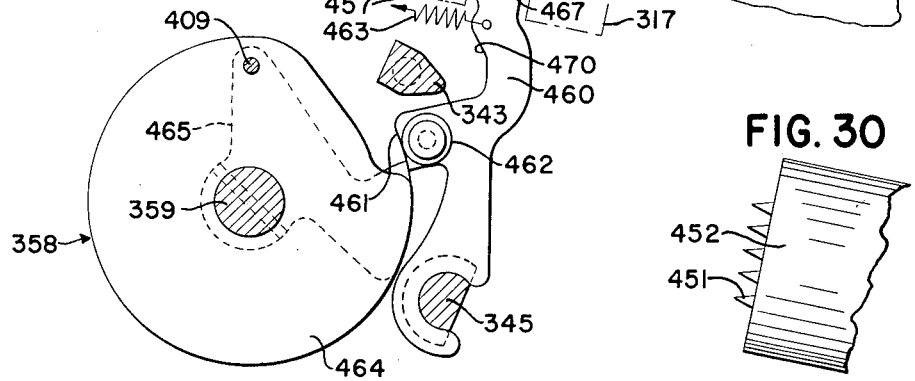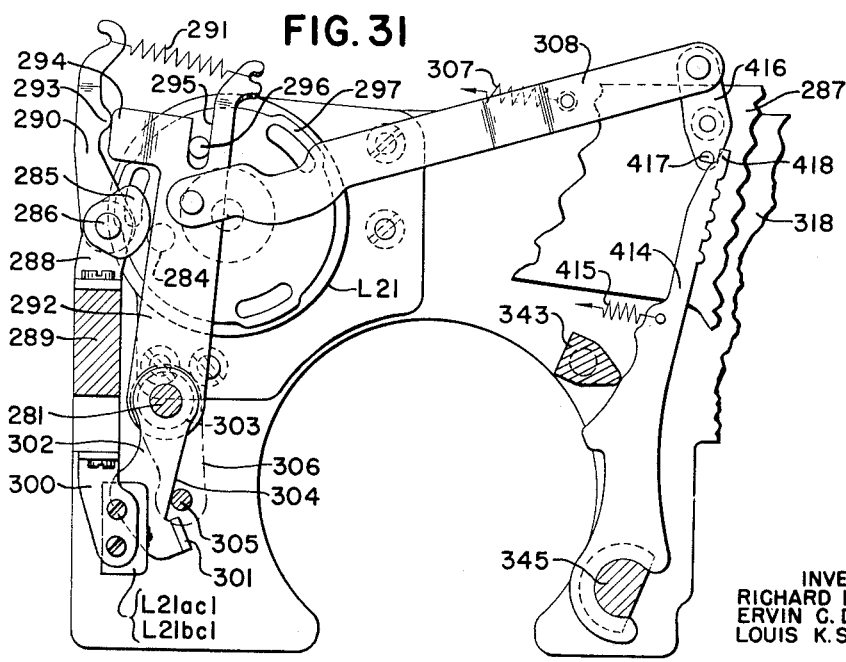

Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 12
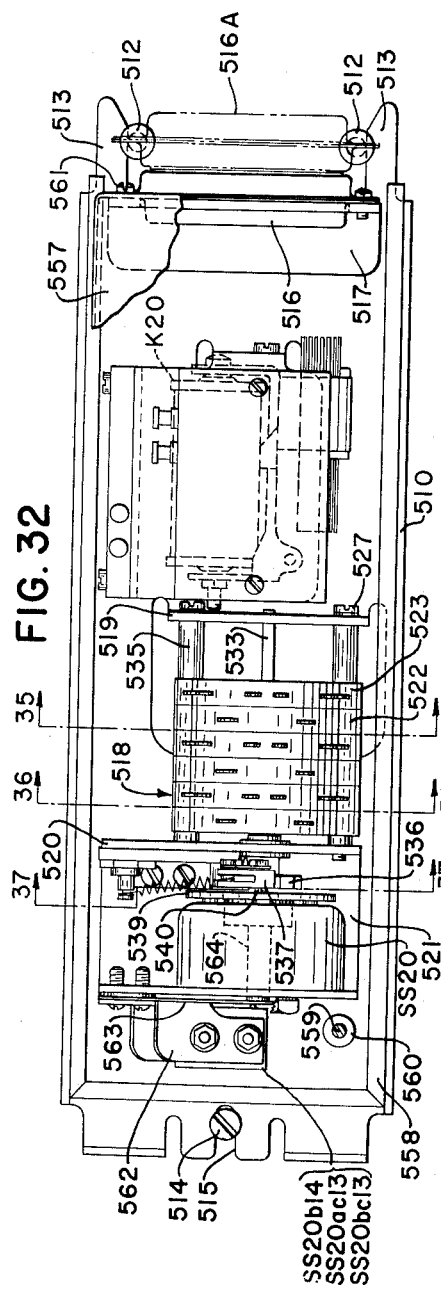
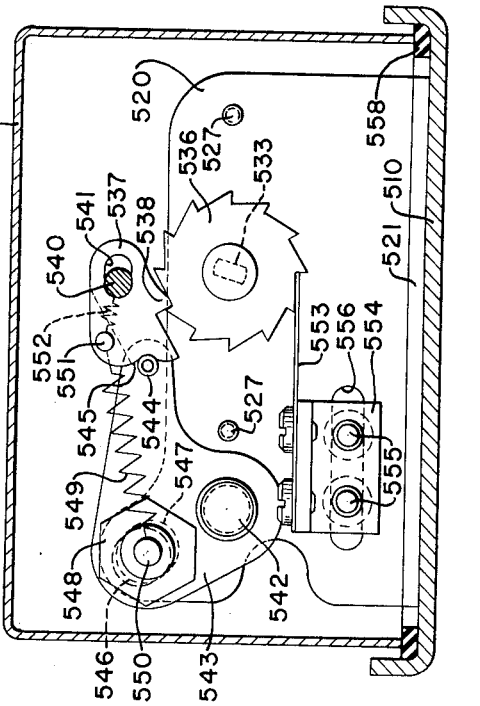
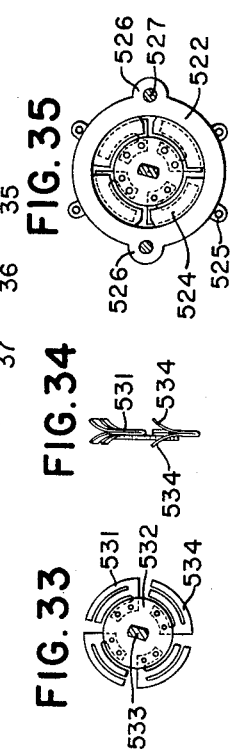
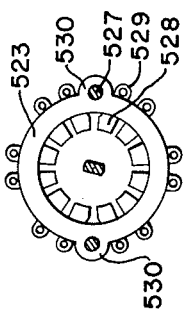
INVENTORS
RICHARD L. DITMER
ERVIN C. DOBBERSTEIN
LOUIS K. SANDOR
BY
THEIR ATTORNEY Dec. 26, 1961  R. L. DITMER ET AL  3,014,647
SYSTEM FOR COMPUTING AND SEQUENTIAL RECORDING OF DATA
Filed Nov. 16, 1956  36 Sheets-Sheet 13
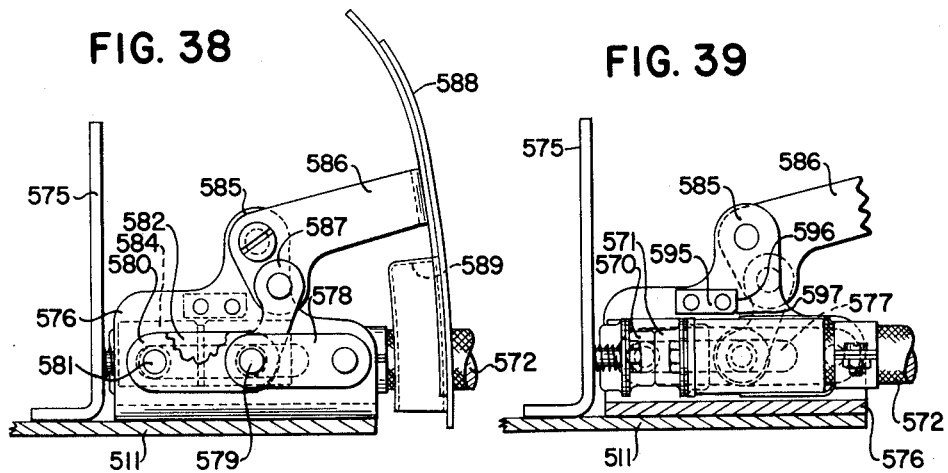
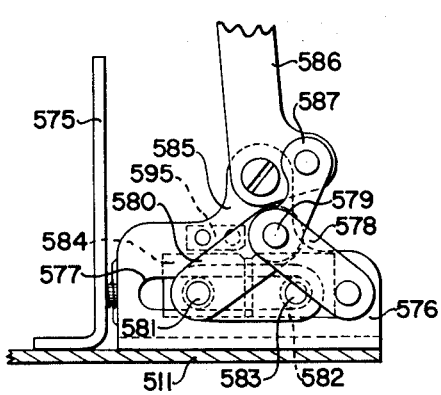
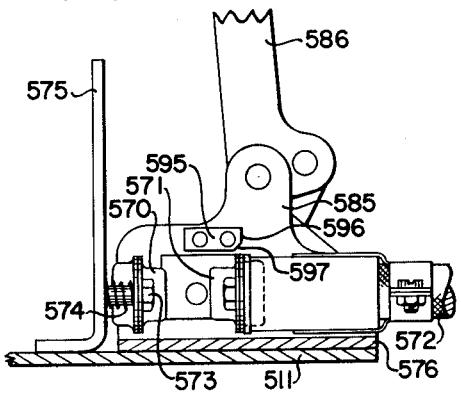
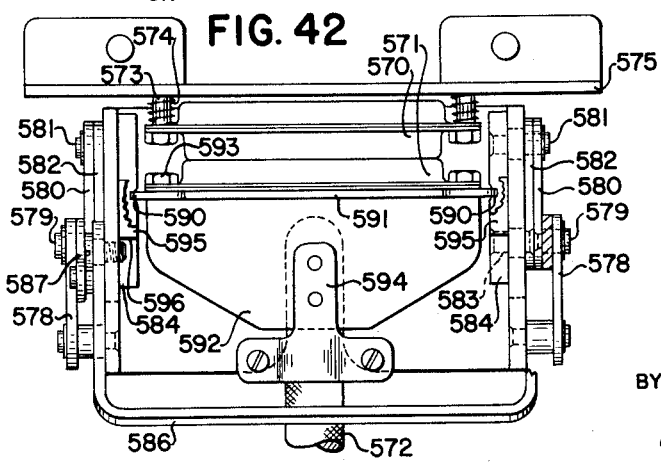
INVENTORS
RICHARD L. DITMER
ERVIN C. DOBBERSTEIN
LOUIS K. SANDOR
THEIR ATTORNEYS

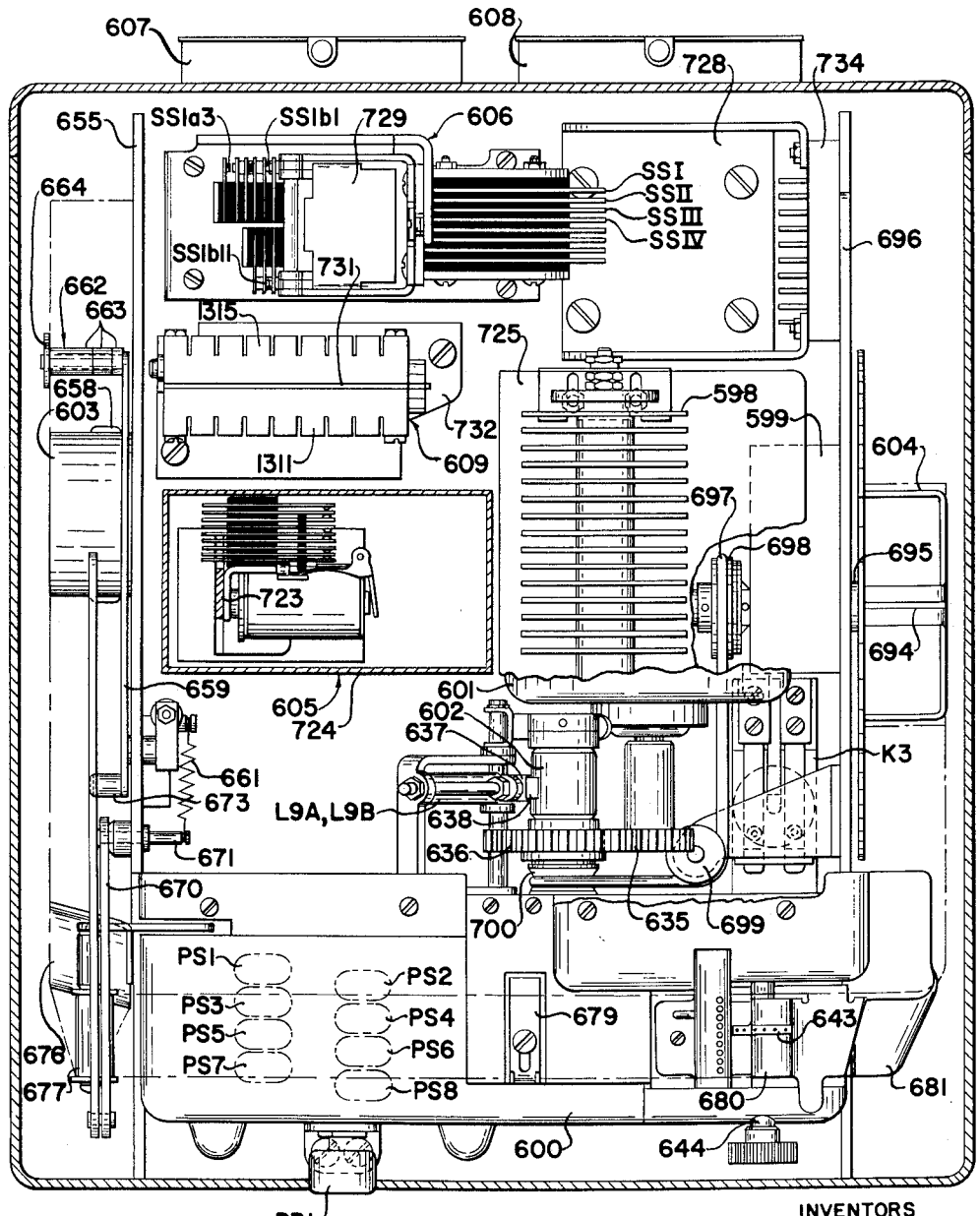

Dec. 26, 1961  R. L. DITMER ET AL  3,014,647
SYSTEM FOR COMPUTING AND SEQUENTIAL RECORDING OF DATA
Filed Nov. 16, 1956  36 Sheets-Sheet 15

INVENTORS
RICHARD L. DITMER
ERVIN C. DOBBERSTEIN
LOUIS K. SANDOR

BY

THEIR ATTORNEYS

INVENTORS
RICHARD L. DITMER
ERVIN C. DOBBERSTEIN
LOUIS K. SANDOR

BY Carl Benst
Albert L. Sessler

THEIR ATTORNEYS

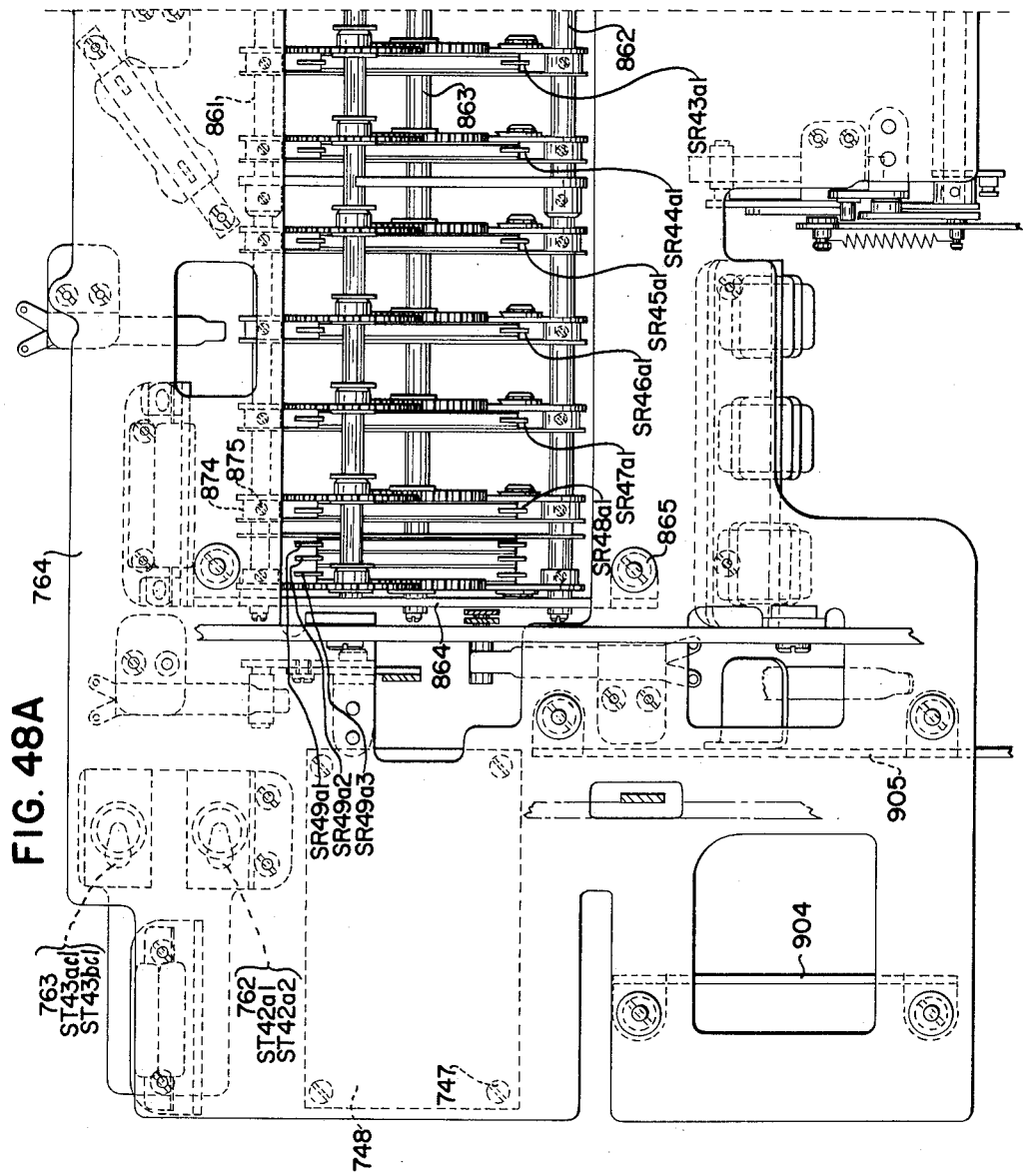

Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 19
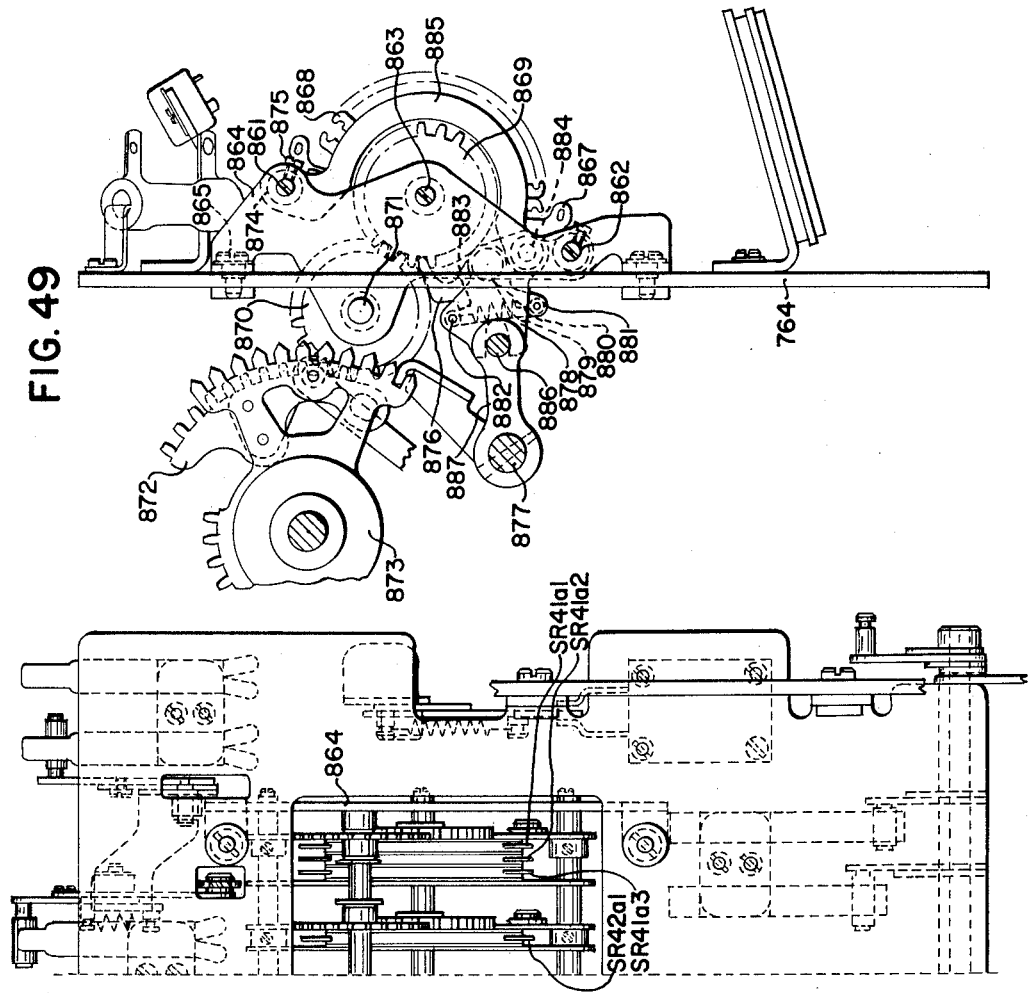
INVENTORS
RICHARD L. DITMER
ERVIN C. DOBBERSTEIN
LOUIS K. SANDOR
BY
THEIR ATTORNEYS

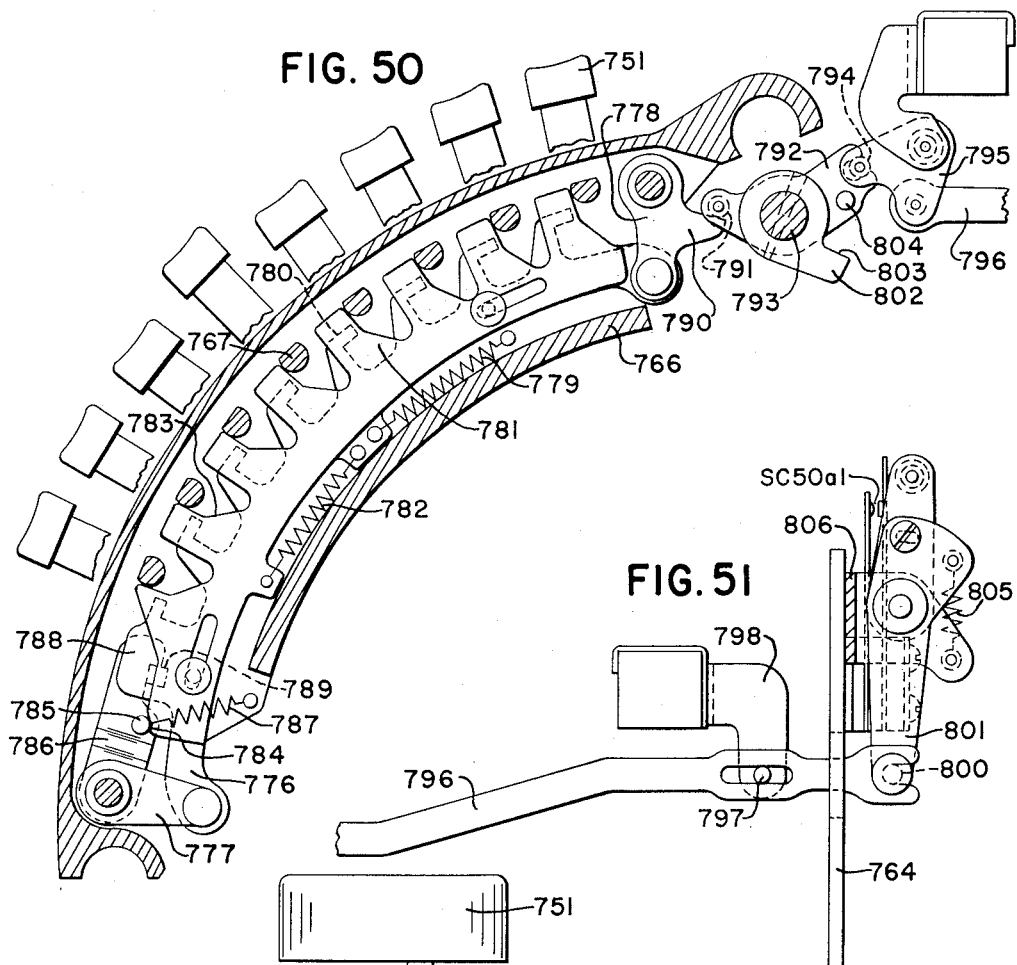

Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 21
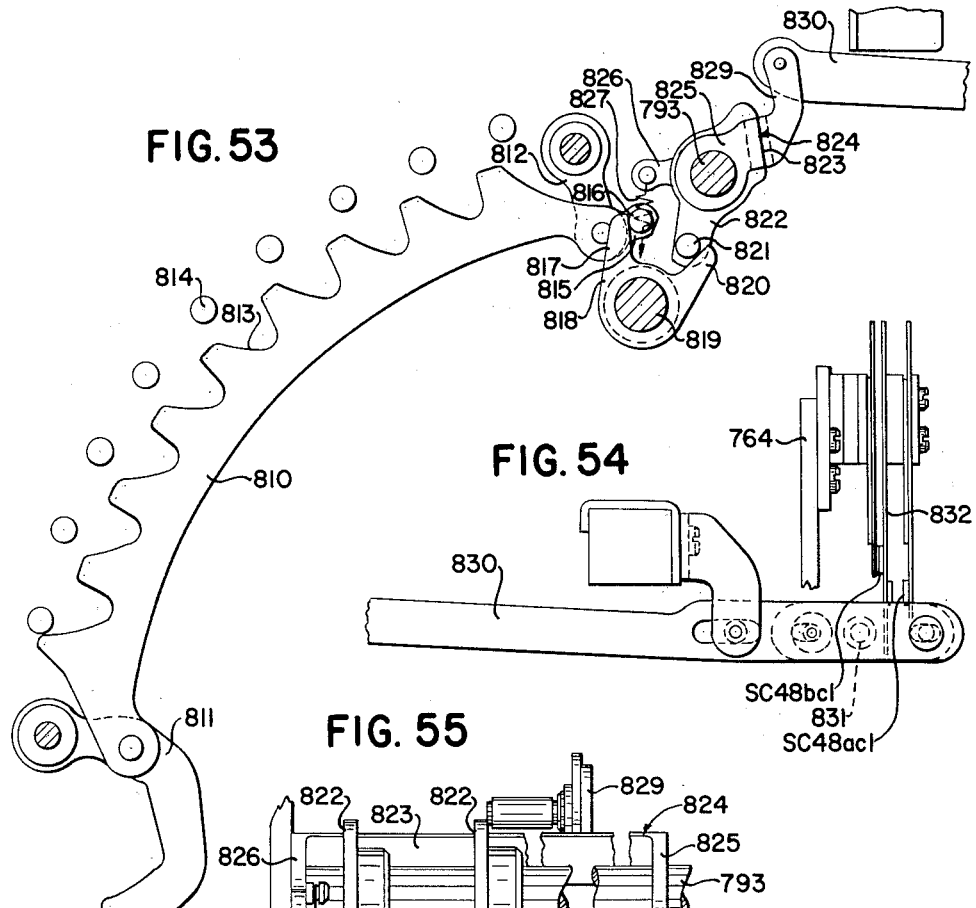
INVENTORS
RICHARD L. DITMER
ERVIN C. DOBBERSTEIN
LOUIS K. SANDOR
BY
THEIR ATTORNEYS

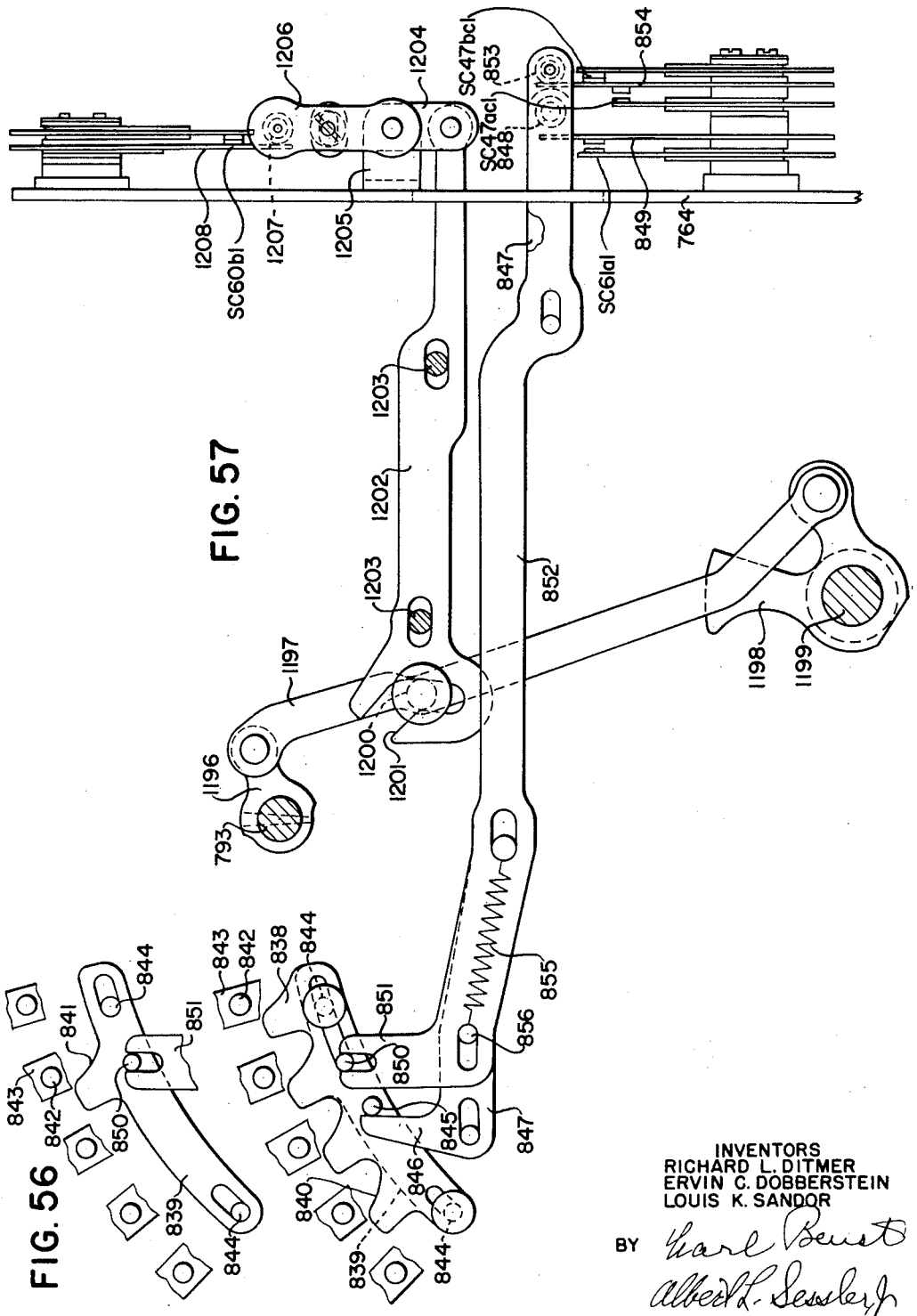

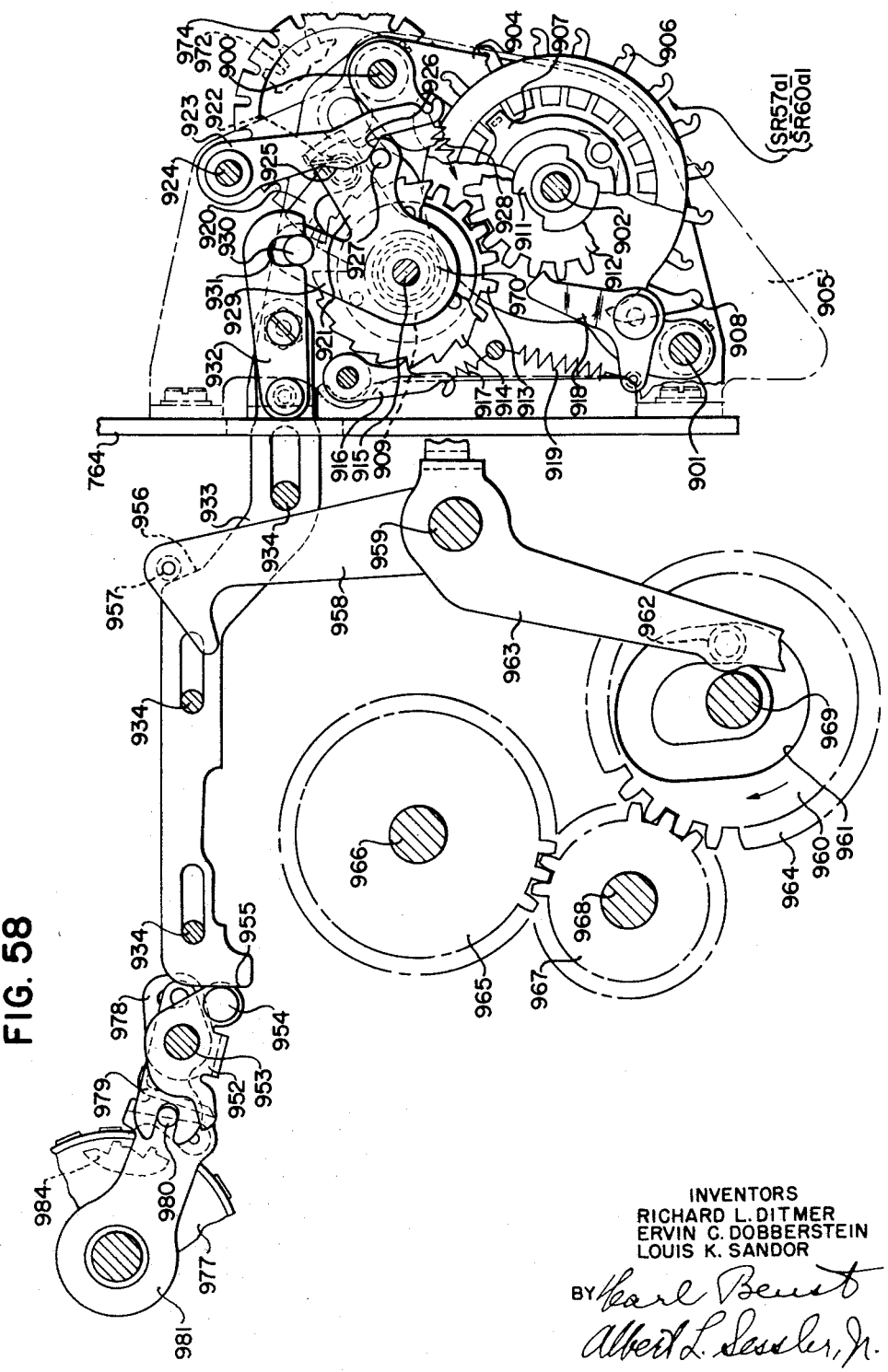

Dec. 26, 1961  R. L. DITMER ET AL  3,014,647
SYSTEM FOR COMPUTING AND SEQUENTIAL RECORDING OF DATA
Filed Nov. 16, 1956  36 Sheets-Sheet 24
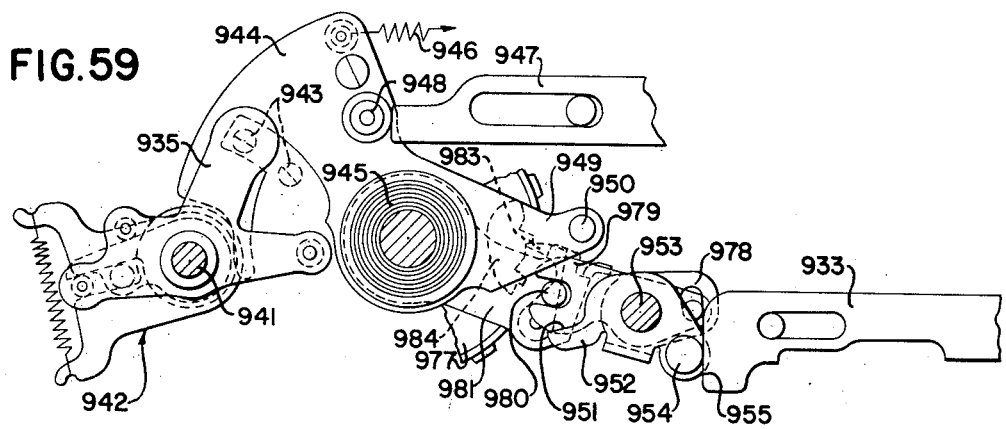
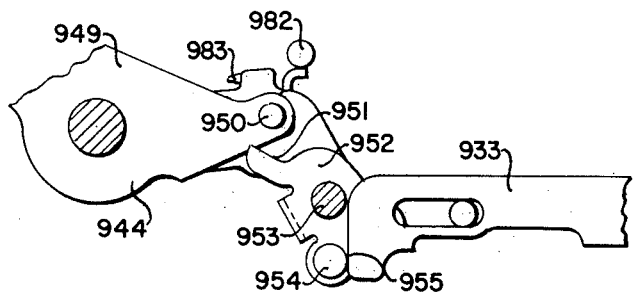
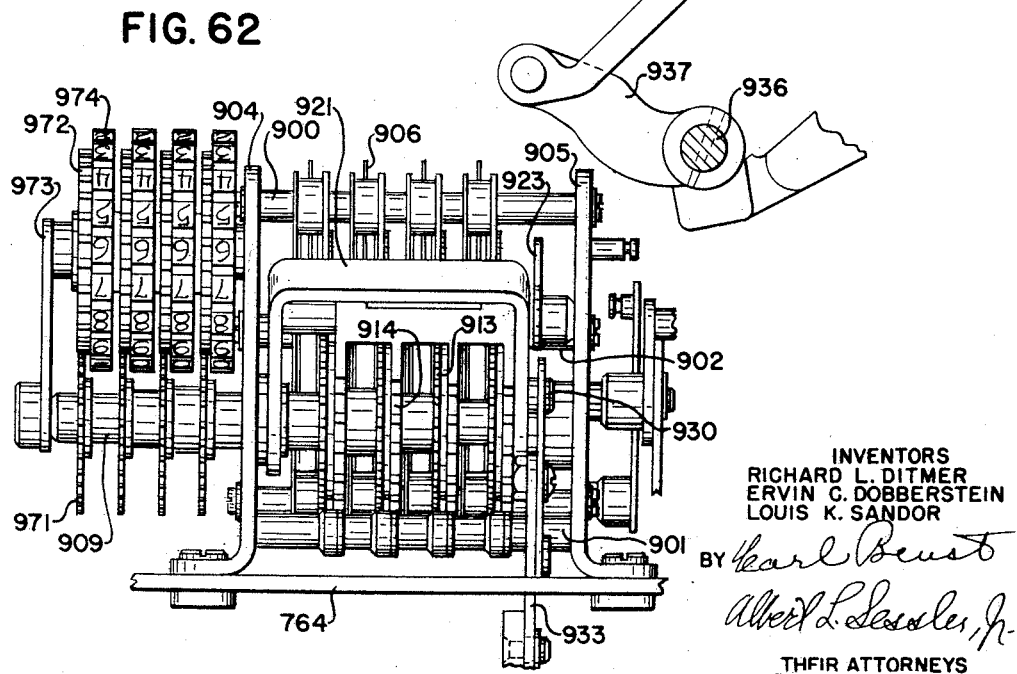
INVENTORS
RICHARD L. DITMER
ERVIN C. DOBBERSTEIN
LOUIS K. SANDOR
THEIR ATTORNEYS

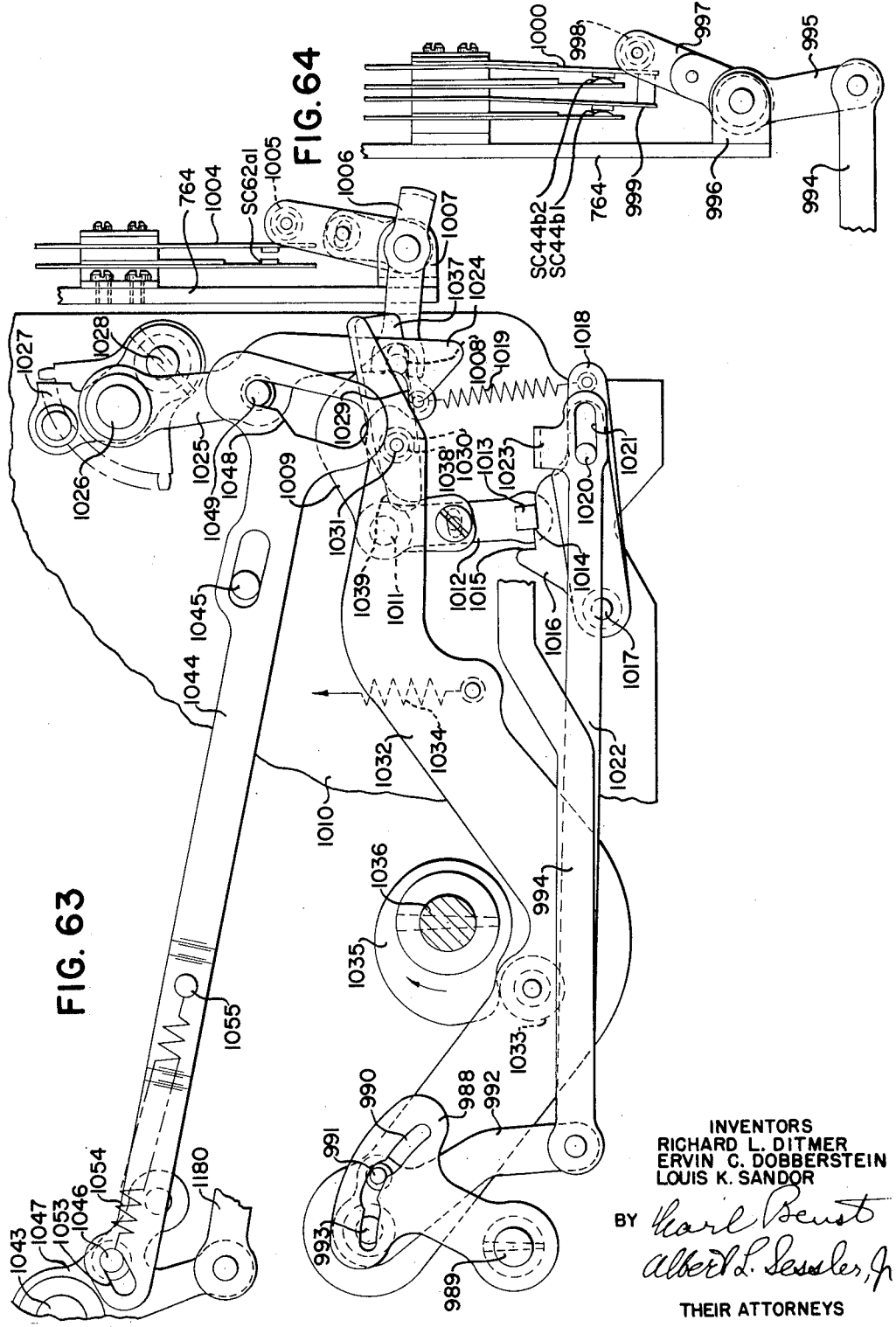

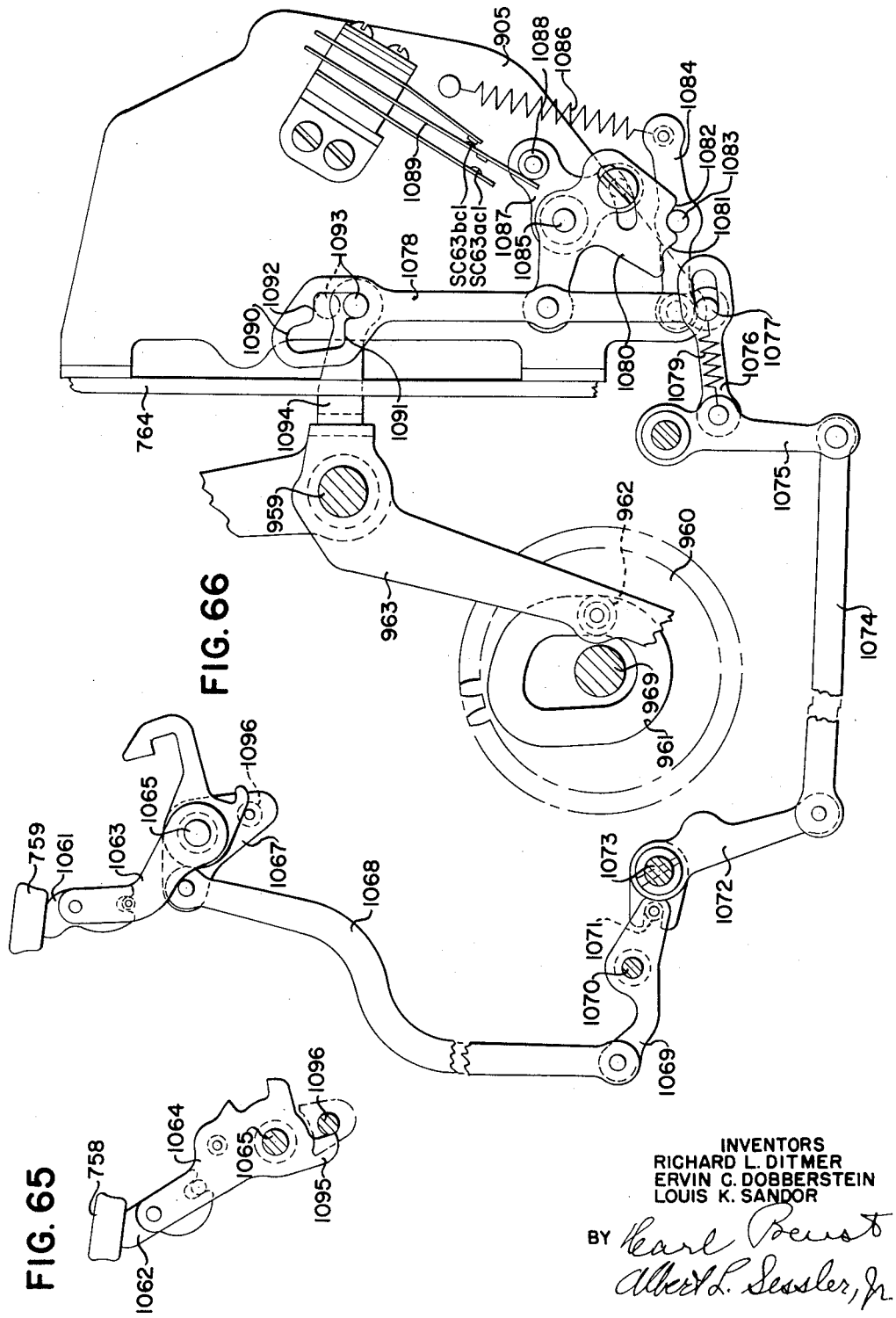

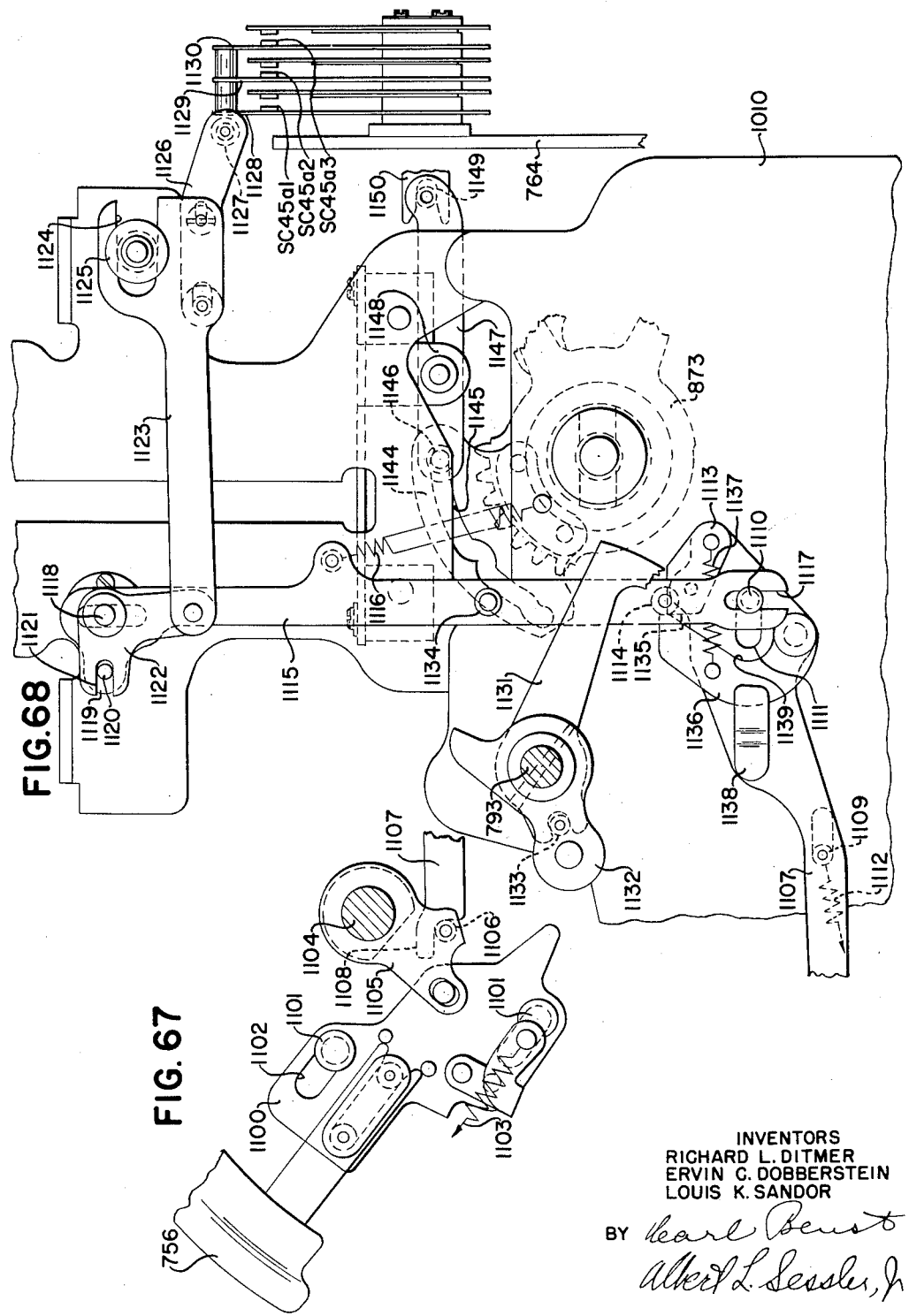

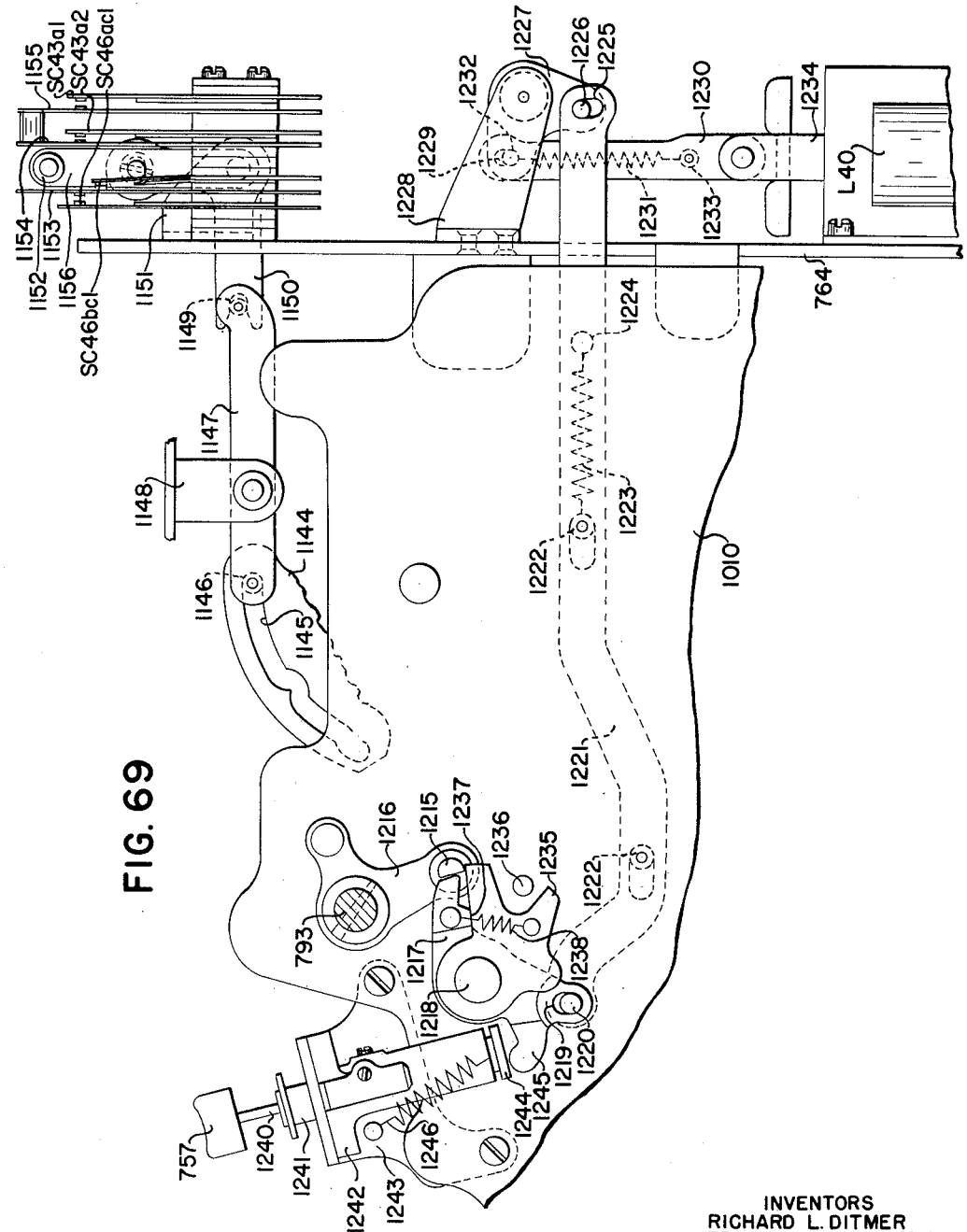

Dec. 26, 1961 R. L. DITMER ET AL 3,014,647
SYSTEM FOR COMPUTING AND SEQUENTIAL RECORDING OF DATA
Filed Nov. 16, 1956 36 Sheets-Sheet 29

INVENTORS
RICHARD L. DITMER
ERVIN C. DOBBERSTEIN
LOUIS K. SANDOR

BY Carl Prust
Albert L. Sessler, Jr.

THEIR ATTORNEYS

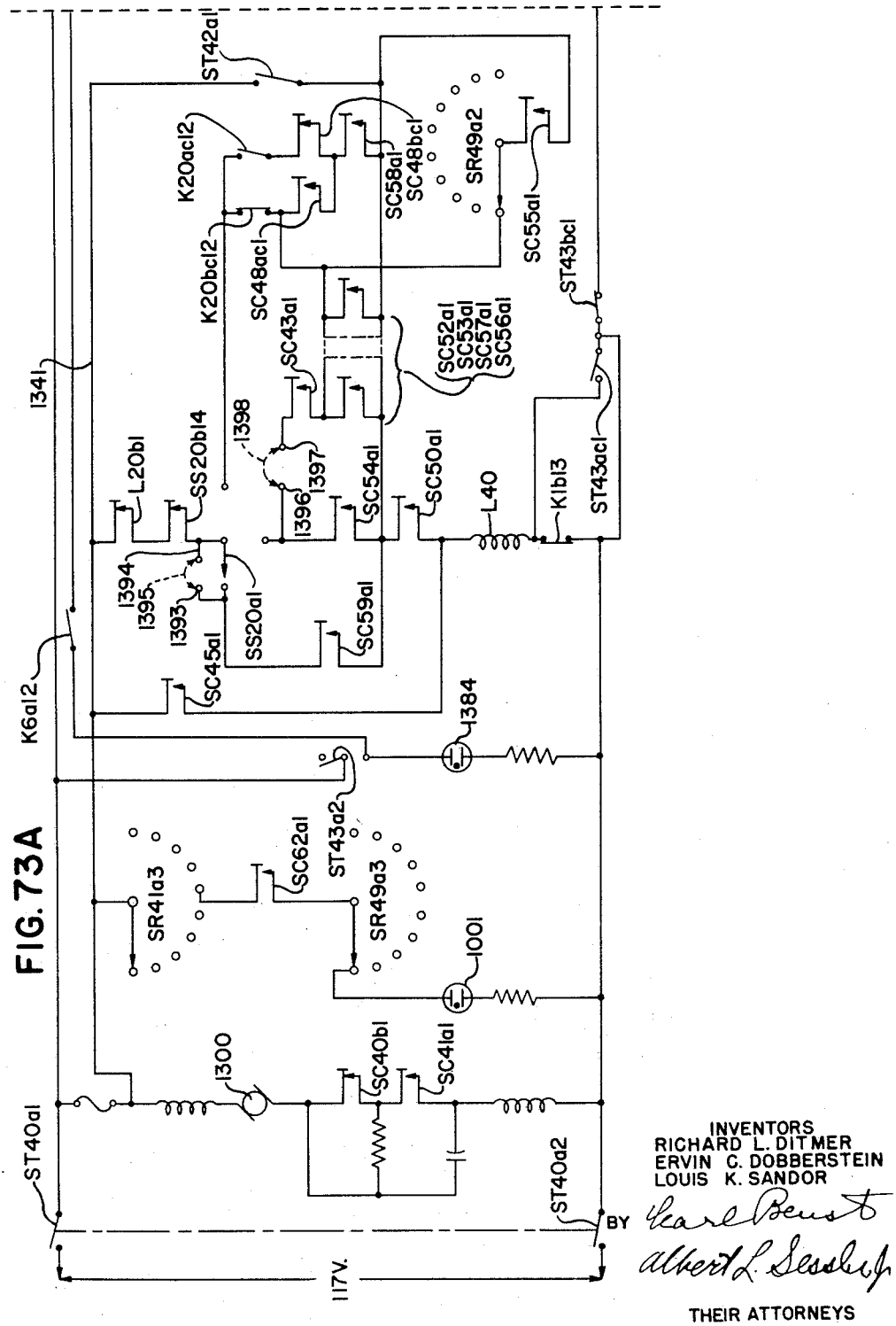

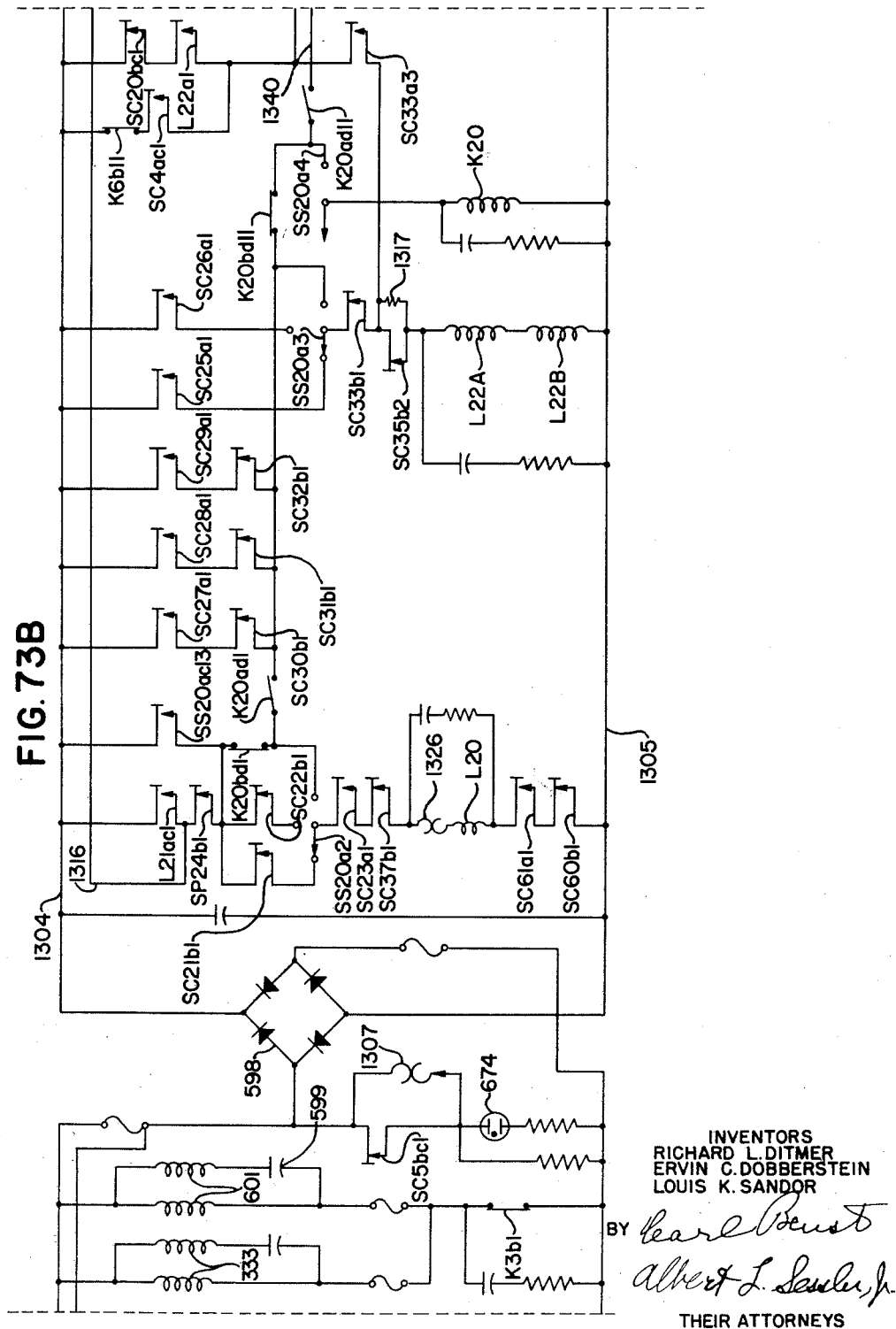

INVENTORS
RICHARD L. DITMER
ERVIN C. DOBBERSTEIN
LOUIS K. SANDOR

THEIR ATTORNEYS

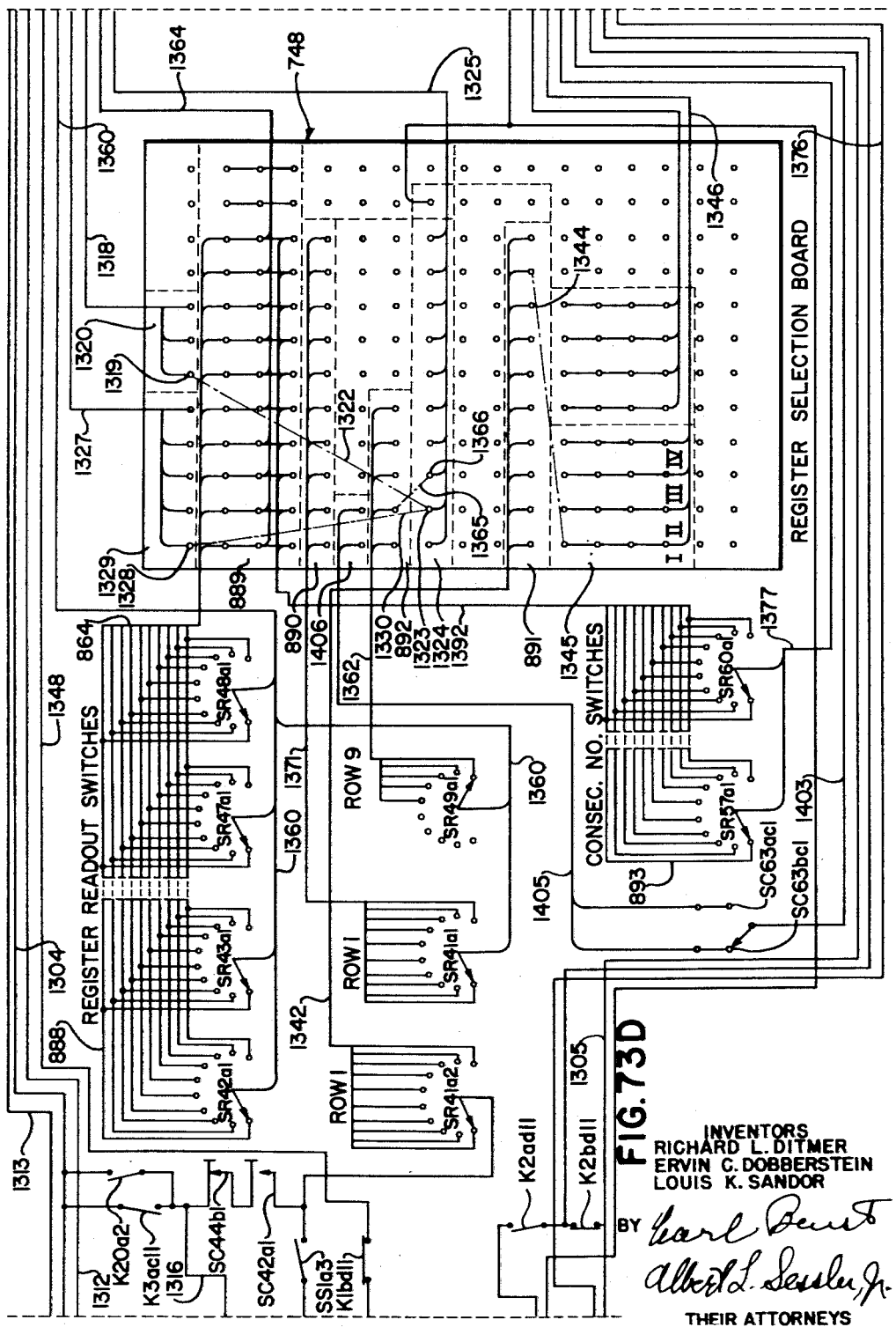

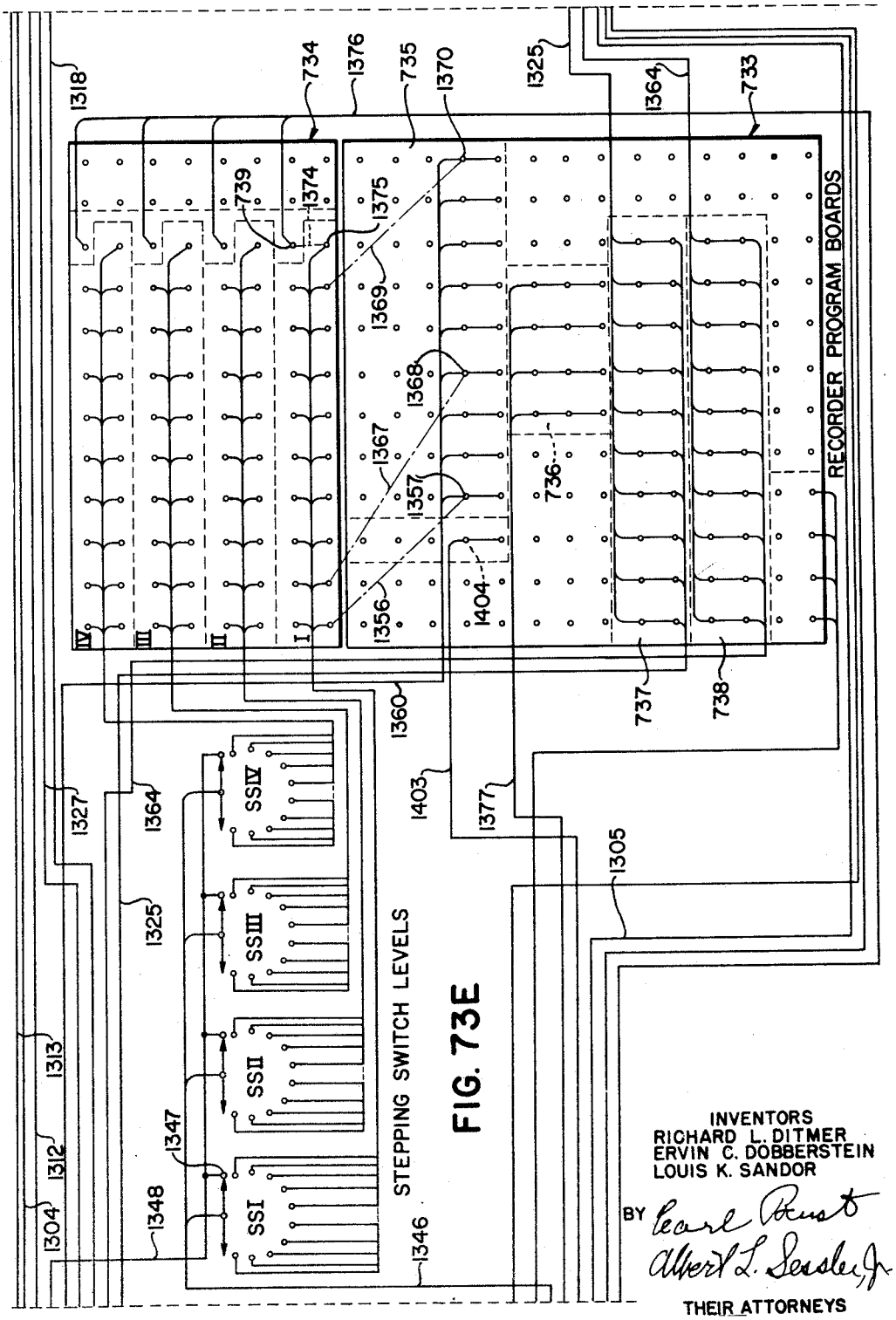

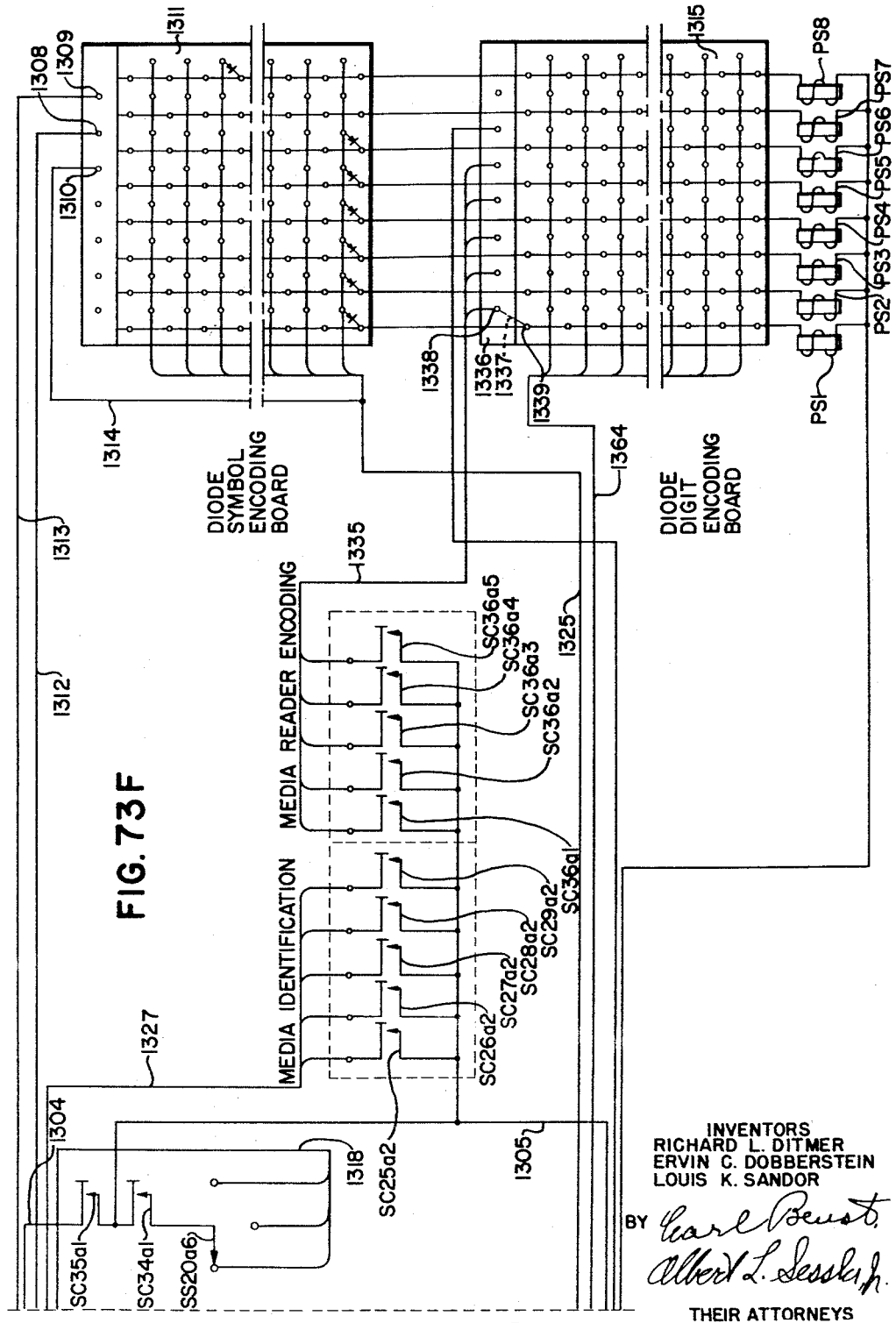

United States Patent Office

3,014,647
Patented Dec. 26, 1961

3,014,647
SYSTEM FOR COMPUTING AND SEQUENTIAL RECORDING OF DATA
Richard L. Ditmer and Ervin C. Dobberstein, Dayton, and Louis K. Sandor, Knollwood, Ohio, assignors to The National Cash Register Company, Dayton, Ohio, a corporation of Maryland
Filed Nov. 16, 1956, Ser. No. 622,591
10 Claims. (Cl. 235—61.1)

This invention relates to a system for recording data by means of perforation of paper tape according to various codes, and more particularly relates to a recording system capable of recording related data taken from a media reader and/or a keyboard-controlled machine, such as a cash register, an accounting machine, or an adding machine, in proper sequence on the tape.

In order to explain the invention, it will be shown in the present application as embodied in an apparatus used at the point of merchandise sale for recording data pertaining to each sale, such as an identification of the clerk, an identification of the customer or of the account, and a description of the merchandise and its sale price. The tape on which this data is recorded can be analyzed later by a computer or other means to provide sales volume data, stock control data, or other statistical data which may be desired. It will be clear that the discussed embodiment illustrates merely one of the uses to which the novel apparatus of the invention may be put.

The recording system disclosed herein has been designed to use tags or tokens for reading fixed information wherever possible. This fixed information is encoded on the tags or tokens in the form of a plurality of columns of perforations which can be read by the media reader and recorded on the recording tape. Use of the perforated tags or tokens greatly lessens the actual number of operations performed by the operator of the system, since all that is necessary to effect the recording of this information is to insert the tag or the token into the media reader. This simplifies the work of the operator, effects a considerable saving of time, and greatly lessens the chance of error in the recording of a transaction.

In addition, means are provided in the recording system disclosed herein to enforce a certain sequence of operation of the system in each of the many applications in which it may be used. In this connection, means are provided to differentiate between different tags and tokens used for different purposes, and to reject a tag or a token which the operator attempts to use out of the correct sequence. This feature is important, since information relating to each sale or transaction must be recorded on the recording tape in a certain sequence, due to the fact that a computer or other device subsequently using the tape may classify the information according to its relative location on the tape.

The recording system described herein is designed for great flexibility in a number of different uses to which it can be adapted. The construction is such as to enable programming which includes a great variety of sequences and operations. In addition, the sequence-enforcing means built into the media reader may be removed as a unit and replaced by another unit having different sequence requirements suited to different uses.

The instant invention thus provides a recording system which enables data from a merchandise sale or other transaction to be recorded at the time of the transaction directly, rapidly, efficiently, correctly, and in the proper sequence according to a predetermined arrangement.

It is, therefore, an object of the invention to provide a recording system for recording data according to a predetermined sequence under joint control of a media reader for reading a part of the data to be recorded from a tag, token, or other member, and a data input mechanism which can be controlled by the operator of the system for the input of variable data to the system.

Another object of the invention is to provide a recording system having sequence control means including a readily replaceable unit which may be changed when it is desired to change the sequence of operation to be enforced.

A further object is to provide a recording system having interlock means to prevent improper operation of the system.

An additional object is to provide a recording system having means to differentiate between various types of tags or tokens for different operations, and to accept for reading only those tags or tokens introduced for reading at the proper point in a recording sequence.

Still another object is to provide means in a recording system for checking the punching operation and for locking up the system in the event of an incorrect punching operation.

Still a further object is to provide means in a recording system including a media reader for causing a distinct identifying symbol to be recorded for each different type of tag or token read.

An additional object is to provide means, in a recording system having a media reader, for releasing a tag or token which has been inserted into the media reader but which is not the correct tag or token for the particular point in the recording sequence.

Another object is to provide means, in a recording system having a media reader, for resetting the media reader to its normal home position when the reading of a tag or token has been interrupted by a power failure or for some other reason.

With these and incidental objects in view, the invention includes certain novel features of construction and combinations of parts, a preferred form or embodiment of which will hereinafter be described with reference to the drawings which accompany and form a part of this specification.

In the drawings:
FIG. 1 is a front elevational view of the novel apparatus, showing the cash register, the media reader, and the recorder components of the apparatus, together with the cables for connecting the three components of the apparatus together for joint operation.

FIG. 2 is an enlarged facsimile of a typical clerk number token to be read by the media reader.

FIG. 3 is an enlarged facsimile of a typical customer number token to be read by the media reader.

FIG. 6 is a vertical section through the media reader.

Figure 7B:
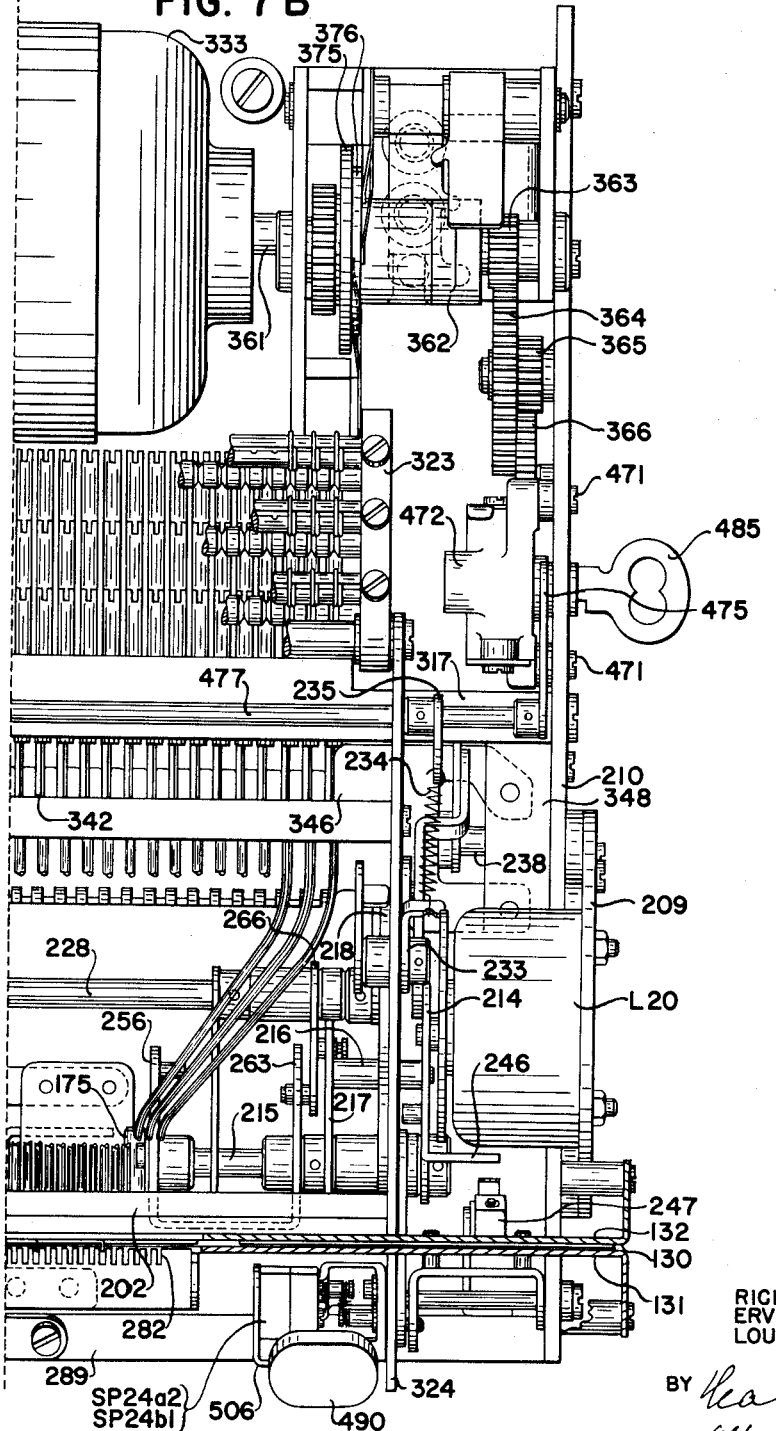

FIGS. 7A and 7B together constitute a top plan view of the reader, with certain parts broken away to show other parts more clearly.

FIG. 8 is a side detail view of a portion of the sensing means employed in the reading of the identification column of a tag or token inserted into the media reader.

FIG. 9 is a top detail view of a portion of the identification column sensing means of the media reader.

FIG. 10 is a detail view of a portion of the tag alining means and the store identification means.

FIG. 11 is a detail view of the tag chute and associated mechanism, with portions broken away to show the various parts more clearly.

FIG. 12 is a detail view of the tag stop means.

FIG. 13 is a detail view of the tag ejecting means.

FIG. 14 is a detail view of the starting switch mechanism.

FIG. 15 is an elevation view of the tag ejecting plate.

FIGS. 16 to 20 inclusive are detail views of solenoid-operated mechanism for controlling certain functions of the media reader.

FIG. 21 shows the media reader cam line.

FIG. 22 is a sectional view taken along the line 22—22 of FIG. 21.

FIG. 22A is a sectional view taken along the line 22A—22A of FIG. 21.

FIG. 23 is a side elevational view showing the motor, the clutch, and the gear train for driving the media reader cam line.

FIG. 24 is a detail view showing the manual tag ejecting means.

FIG. 25 is a detail view showing the ejecting plate used in the mechanism of FIG. 24.

FIG. 26 is another detail view of the manual tag ejecting means.

Figure 27:
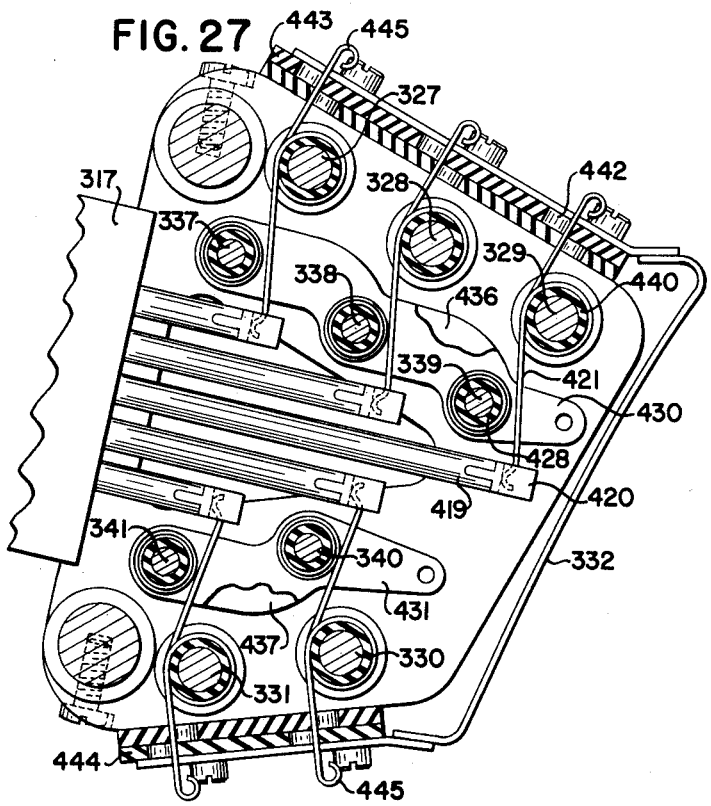
Figure 28:
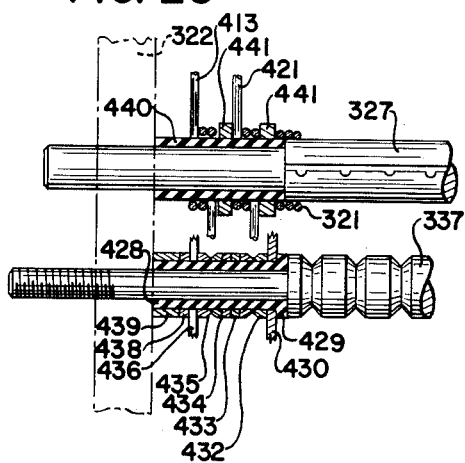

FIGS. 27 and 28 are detail views of the electrical contact means for the identification column sensing mechanism.

FIG. 29 is a detail view of the tag-validating means.

FIG. 30 is an enlarged detail view of the validating hammer.

FIG. 31 is a detail view of the solenoid-operated mechanism for controlling the functioning of the identification column sensing means and the tag-clamping means.

FIG. 32 is a top plan view of the media reader selector switch unit.

FIGS. 33 and 34 are detail views of one of the wipers used in the selector switch.

FIGS. 35 and 36 are sectional views taken on lines 35—35 and 36—36, respectively, of FIG. 32.

FIG. 37 is a sectional view taken on line 37—37 of FIG. 32, showing the switch-advancing means for the selector switch.

FIGS. 38 to 42 inclusive are detail views showing the media reader plug connecting means.

FIG. 43 is a top plan view of the recorder, with the cabinet removed and with the wiring and certain parts of the recorder omitted in order that other parts may be seen more clearly.

Figure 44:
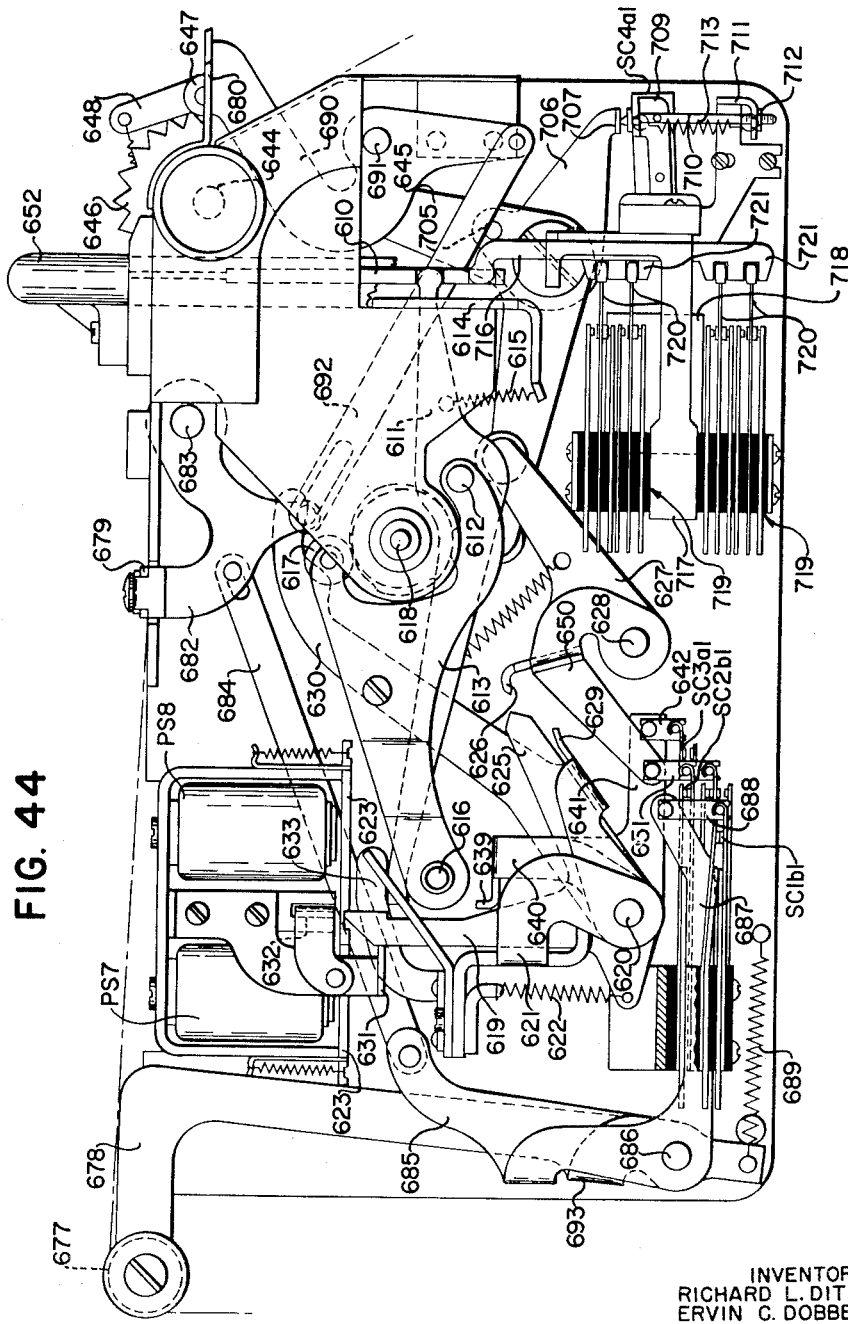

FIG. 44 is a side elevation of the punching mechanism used in the recorder, and also shows the parity check mechanism.

Figure 45:
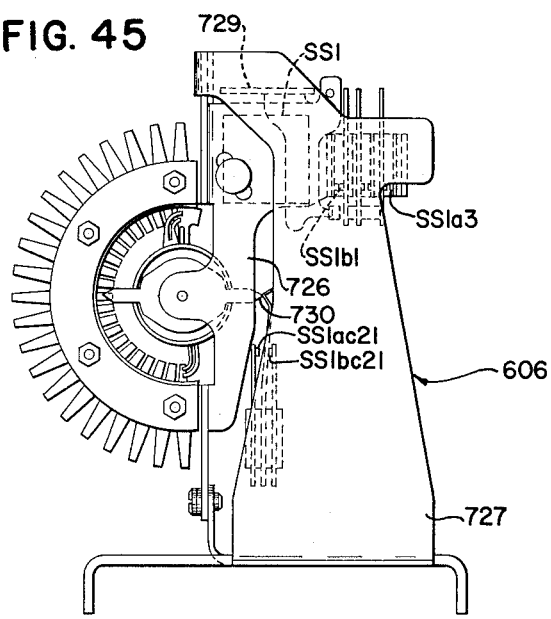

FIG. 45 is a side elevation of the stepping switch used to provide the controls in the various punching programs which it is possible to carry out with the recorder.

Figure 46:
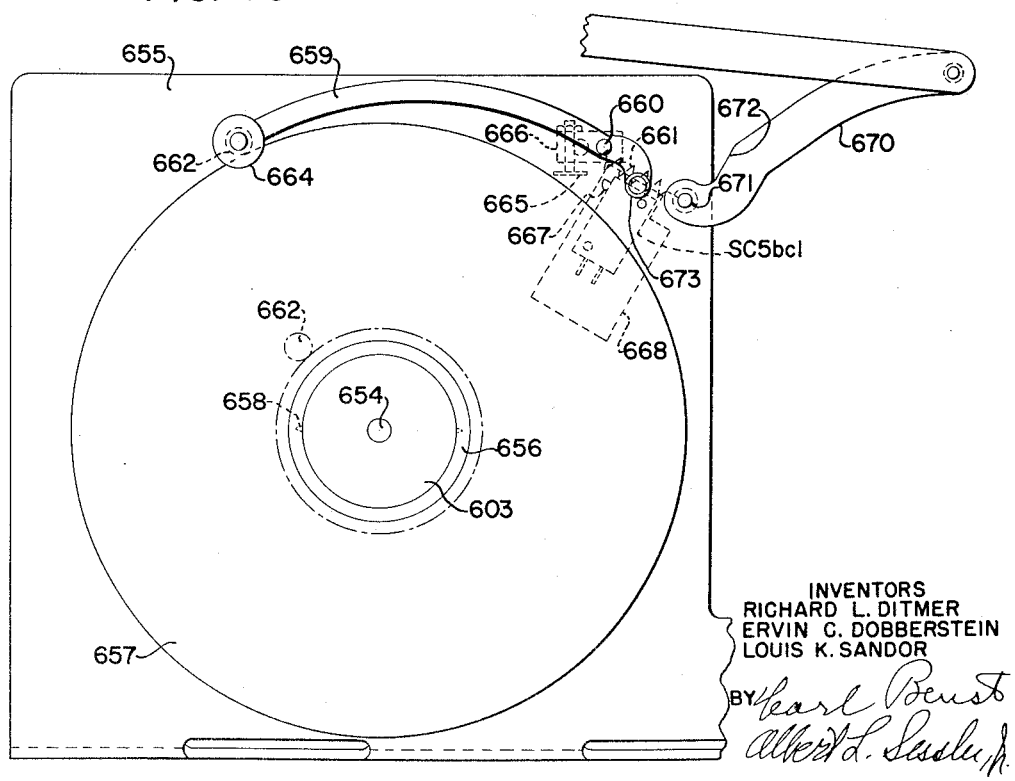

FIG. 46 is a side elevation of the tape supply means and the warning means for causing a signal to indicate when the tape supply is low.

Figure 47:
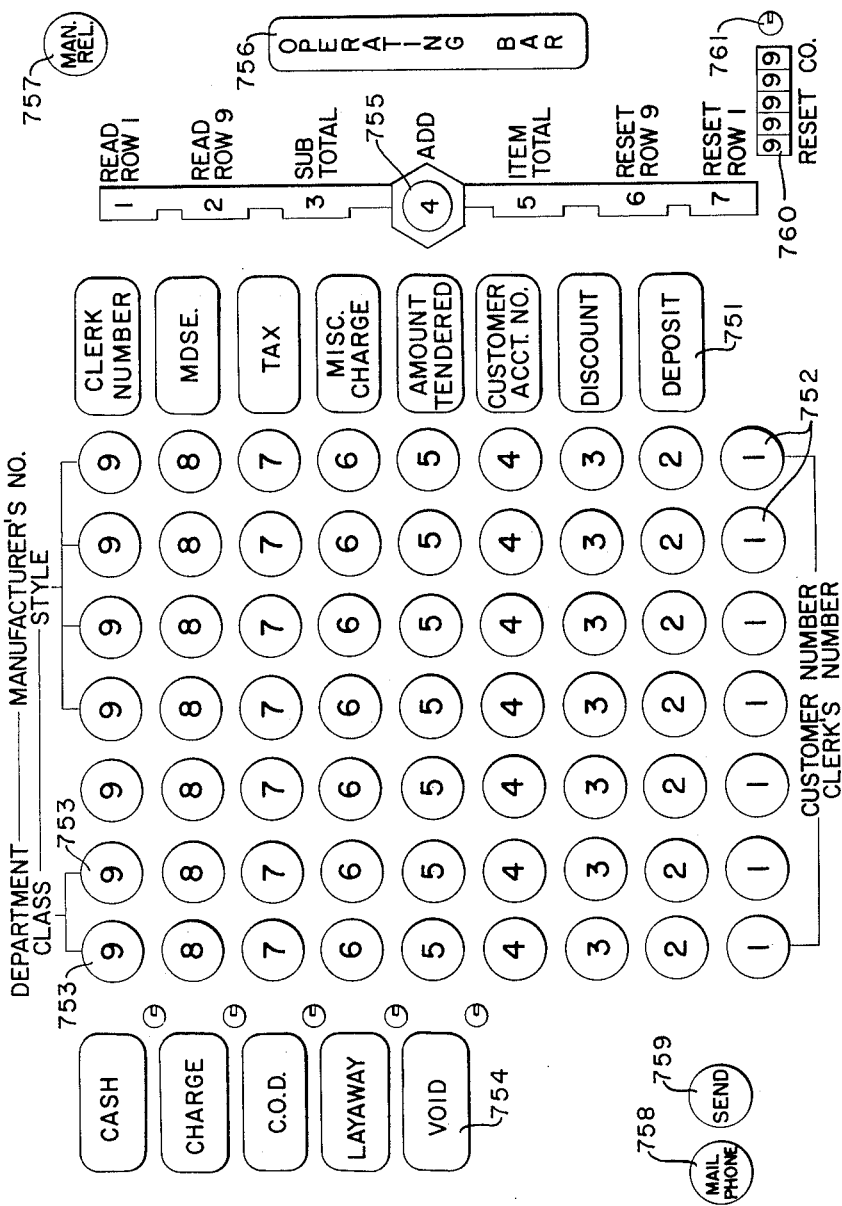

FIG. 47 is a diagrammatic view of typical keyboard arrangement for use on the cash register.

FIGS. 48A and 48B taken together constitute a front elevational view of the register back plate, showing the various switches which are mounted thereon, as well as the register program board.

FIG. 49 is a side elevational view of one of the selector switches and shows the connection by which the selector switches are set by the indicator-setting mechanisms of the cash register differential mechanism.

FIG. 50 is a cross-sectional view of the row 1 transaction bank in the cash register.

FIG. 51 is a detail view of switch means operated by depression of a key in row 1.

FIG. 52 is a cross-sectional view showing one of the transaction keys of row 1 and its associated switch means.

FIG. 53 is a detail view of mechanism operated by the keys of row 7 and row 8.

FIG. 54 is a detail view of switch means operated by the mechanism of FIG. 53.

FIG. 55 is a side-spacing view of the mechanism of FIG. 53.

FIG. 56 is a detail view of a control detent in row 9.

FIG. 57 is a detail view of mechanism controlled by the row 9 keys to operate switch means and also shows mechanism operated by the key lock line to control other switch means.

FIG. 58 is a detail view showing the reference number switching means and the operating mechanism for said means.

FIG. 59 is a detail view showing the cocking means for the reference number switch operating mechanism.

FIG. 60 is a detail view showing a portion of the mechanism of FIGS. 58 and 59 in a shifted position.

FIG. 61 is a detail view of mechanism for operating the cocking means of FIG. 59.

FIG. 62 is a side-spacing view of the reference number switch mechanism.

FIG. 63 is a detail view of mechanism for controlling the "no change" lamp switch and the total lever switch.

FIG. 64 is a detail view of the total lever switch and its actuating means.

FIG. 65 is a detail view of the "Mail-Phone" key stem and associated mechanism.

FIG. 66 is a detail view of the "Send" key and of the operating means controlled by said key and by the "Mail-Phone" key to operate a switching means in accordance with the positions of one or both of said keys.

FIG. 67 is a detail view of the operating bar.

FIG. 68 is a detail view of mechanism operated by the operating bar to control the condition of certain switches.

FIG. 69 is a detail view of the machine release means, including the solenoid-operated release means and the manually-operated release means, and also shows the indicator segment line switches and the operating means for said switches.

Figure 70:
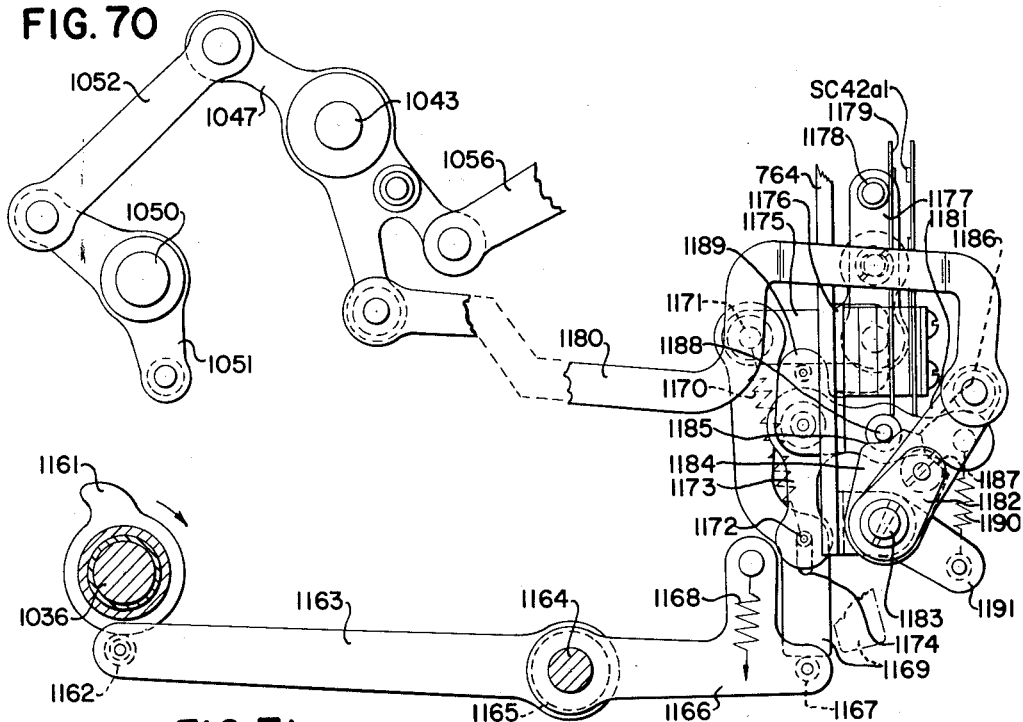

FIG. 70 is a detail view of the start-record switch mechanism.

Figure 71:
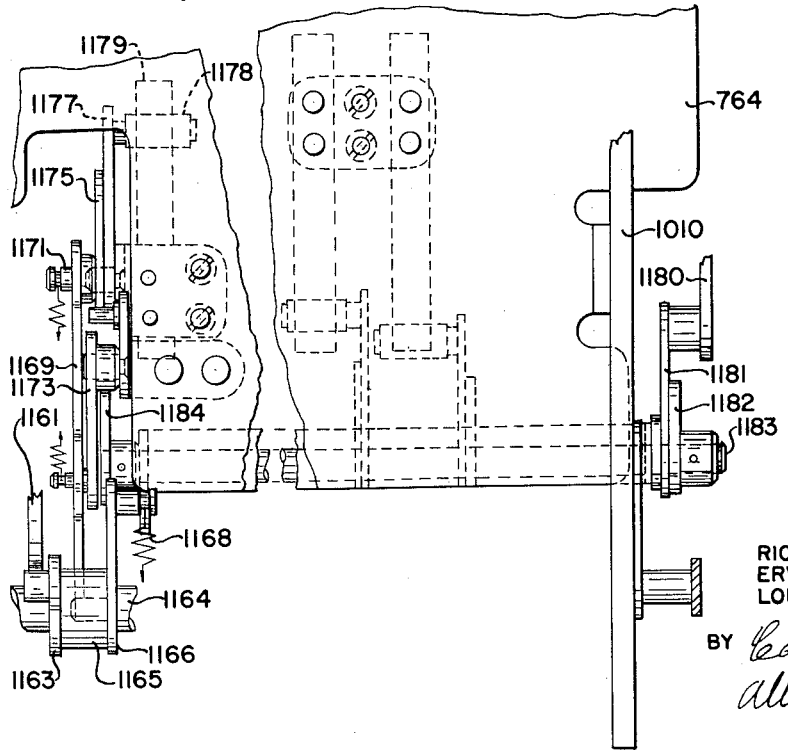

FIG. 71 is another view of the start-record switch control mechanism.

Figure 72:
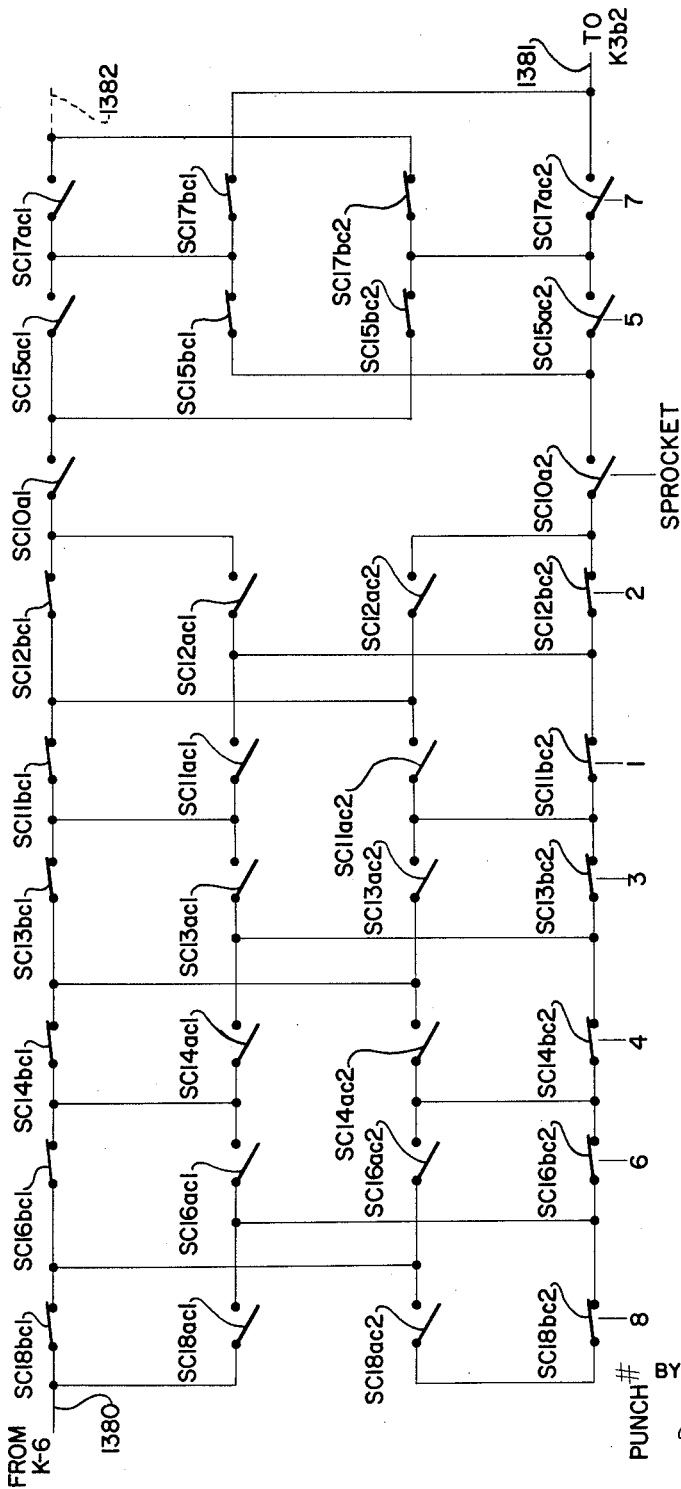

FIG. 72 is a circuit diagram of the parity check means employed in the recorder.

FIGS. 73A, 73B, 73C, 73D, 73E, and 73F together constitute a circuit diagram of the novel recording system.

Inasmuch as the following description of a physical embodiment of the present invention is of considerable length and is divided into a large number of separate sections, the various section headings are listed below in order to facilitate ready reference to the various portions of the specification.

HEADING

| | Column |
|---|---|
| General description | 5 |
| Media reader | 10 |
|    Tag chute and guide means | 10 |
|    Tag stop means | 13 |
|    Tag-ejecting means | 15 |
|    Tag-aligning means and store identification means | 15 |
|    Tag-clamping means | 17 |
|    Sensory section | 18 |
|    Validation means | 26 |
|    Manual tag ejecting and switching means | 28 |
|    Selector switch unit | 29 |
|    Plug connecting means | 31 |
| Recorder | 33 |
|    Punching mechanism | 34 |
|    Tape-handling means | 36 |
|    Parity check | 38 |
|    Control relay section | 38 |
|    Diode encoding unit | 40 |

|  | Column |
|---|---|
| Cash register | 40 |
| Power control switches and register selection board | 41 |
| Control keys row 1 | 41 |
| Rows 7 and 8 control means | 43 |
| Row 9 control means | 44 |
| Selector switches | 44 |
| Reference number switches | 46 |
| Total lever switch | 48 |
| "No Change" lamp control means | 49 |
| "Mail Phone" and "Send" key switch control means | 51 |
| Operating bar switch control means | 53 |
| Indicator segment switch control means | 55 |
| "Start Record" switch control means | 56 |
| Media reader disabling switch control means | 57 |
| Machine release mechanism | 57 |
| Circuit diagram | 59 |
| Charge transaction | 63 |
| Cash transaction | 81 |
| "Send" and "Mail Phone" key control | 83 |
| Tag release and homing means | 84 |
| Selector switch homing by total-taking | 85 |
| Parity check | 85 |
| Interchangeable sequence selector unit | 87 |

GENERAL DESCRIPTION

The invention illustrated herein provides a means for recording in sequential form, on a tape, data derived from a record tag, token, or card and/or from a key-controlled data input machine such as a cash register, an accounting machine, or an adding machine.

The embodiment chosen to illustrate the invention is one by which data related to sales of merchandise can be recorded quickly and accurately on a tape at the time the sale is made. With the data for each sale being thus recorded on the tape as the sale is made, the data for consecutive sales will appear sequentially along the tape and in such manner that the tape can be readily used to control computers, or other data-processing equipment, to quickly produce stock control data, sales data, and statistical information or other reports which might be desired.

In order to have all the information about the sale which would be needed to produce these various control data, statistics, or reports, it is necessary to record clerk, customer or account, and merchandise identification data as well as sales data for each sale. Accordingly, for each article sold, the tape will be punched with clerk number data, followed by customer or account number data, followed by merchandise identification data, followed in turn by a related set of data giving details pertaining to the nature and the amount of the sale. The punched segment of tape pertaining to each complete transaction, including clerk identification, customer identification, merchandise data, tax or other operation, and total, is considered as a "frame" of information on the tape and will be separated from other adjacent frames of information by End of Frame symbols.

The novel apparatus, as seen in FIG. 1, includes a recorder 100, which can produce punched tape; a media reader 101, which can control the recorder to cause clerk identification, customer or account identification, and merchandise description data to be punched on the tape; and a cash register 102, on which sales data can be set to control the recorder to cause sales data to be punched, on which tax, total, and other operations can also be set for registering and recording, and which on occasion can also control the recorder for the punching of clerk and customer identification and merchandise description data when cards, tags, or tokens adapted to be read by the media reader are not provided. The recorder, the media reader, and the cash register are connected by cables for joint operation, and, while they are shown as separate units in FIG. 1, it will be clear from the following description that all three units form a unitary apparatus, which could, if desired, be contained in a single cabinet.

The media reader is provided to control the recorder to supply the clerk number identification, customer or account number identification, and merchandise description data. This data is read from a tag or token which has been previously perforated according to a predetermined code to represent the information which it is desired to read and record.

Shown in FIG. 2 is a clerk number token 103, on which a clerk-identifying number is punched. This token is retained in the possession of the clerk and is inserted into the media reader, as will be disclosed subsequently, whenever the clerk utilizes the recording system in the completion of a transaction, in order to cause a number identifying the clerk to be recorded.

The token, as shown in FIG. 2, has provision for an identification column and sixteen columns of punched data, and a longer tag, capable of providing additional columns, may be used if desired. Customarily, however, only seven columns will be used for punched data, since this will provide sufficient capacity for most applications. Also in some instances, as will be described subsequently, it may be desired or necessary to use rows 2 to 8 inclusive of the cash register keyboard to enter the clerk number into the recording system in the event that a clerk number token is not used, and this limits the clerk number to seven digits unless two or more consecutive operations of the register are used for this purpose. As an example of the data which may be punched in the token of FIG. 2, the first column is punched with an identification symbol in channel 1 of the first column to identify this is a clerk number token, and the next seven columns are punched with a four-digit code identifying the clerk, 0003586. The digits punched in these columns are also printed on the token for direct inspection.

In addition to the clerk-identifying data which is punched and printed thereon, the token may also have printed thereon the clerk's name, "John Doe," and, if desired, additional information (not shown), such as the department of the store in which the clerk is employed, etc.

In addition to the identification columns and the columns of punched data, the clerk number token as shown in FIG. 2 has two alining holes, 104 and 105, a further hole, 106, and a cutout portion, 107. It will be noted that the alining hole 104 is round, while the alining hole 105 is square. Both of the media reader alining pins are round in cross section, but the hole 105 is of square configuration to permit variations in tag length due to temperature and humidity conditions. The hole 106 is provided to register with a store identification pin on the alining mechanism of the media reader, which pin is used for checking the customer number token, as will be described subsequently.

The cutout portion 107 on the clerk number token registers with a validation stamp on the alining mechanism of the media reader, which stamp is used in connection with the merchandise tags, as will be described subsequently. Since it is not desired to use the validation stamp on the clerk number token, the portion of the token 103 which would otherwise be stamped is cut away.

Shown in FIG. 3 is a customer number token 108, on which an identification symbol and a customer or account identification number is punched. This token is customarily retained in the possession of a customer and is given to the clerk for insertion into the media reader, as will be described subsequently, whenever the customer makes a non-cash purchase, in order to cause a number identifying the customer or the customer's account to be recorded.

As was the case with the clerk number token 103, the customer number token 108 has provisions for sixteen columns of punched data, of which only an identification column and seven columns will customarily be used. In the example shown in FIG. 3, the first column is punched with an identification symbol in channel 2 of this first column to identify this as a customer number token, and the next seven columns are punched with a four-digit code identifying the customer, 1234567. The digits punched in the various columns are also printed on the token for direct observation, and the customer's name, "Wm. A. Roe," is written thereon. Other information may be printed on the customer number token if desired.

The alining holes 109 and 110, the cutout portion 111, and the store identification hole 112 of the customer number token 108 are similar to their counterparts on the clerk number token 103. In the customer number token, the cutout portion 111 has the additional function of cooperating with a raised portion on a token receptacle of a well-known type for releasably retaining the token in the receptacle. The store identification hole 112 of the customer number token may be positioned at any one of the locations 113 indicated in FIG. 3. In practice, each of the different locations 113 will be reserved to a different store in a city or other business area, and only a customer number token which has a hole 112 in the location reserved to a particular store can be read by a media reader of that store, since, unless there is a store identification hole in the correct position on a token, the checking stud will prevent the alining mechanism of the media reader from completing its movement, and the media reader will therefore not operate. It will be seen that the clerk number tokens and the merchandise tags of a store must also have a store identification hole in the correct position in order for them to be read by the media reader, since the alining mechanism will not otherwise be able to complete its movement, and operation of the media reader will therefore not be initiated.

Figure 4:
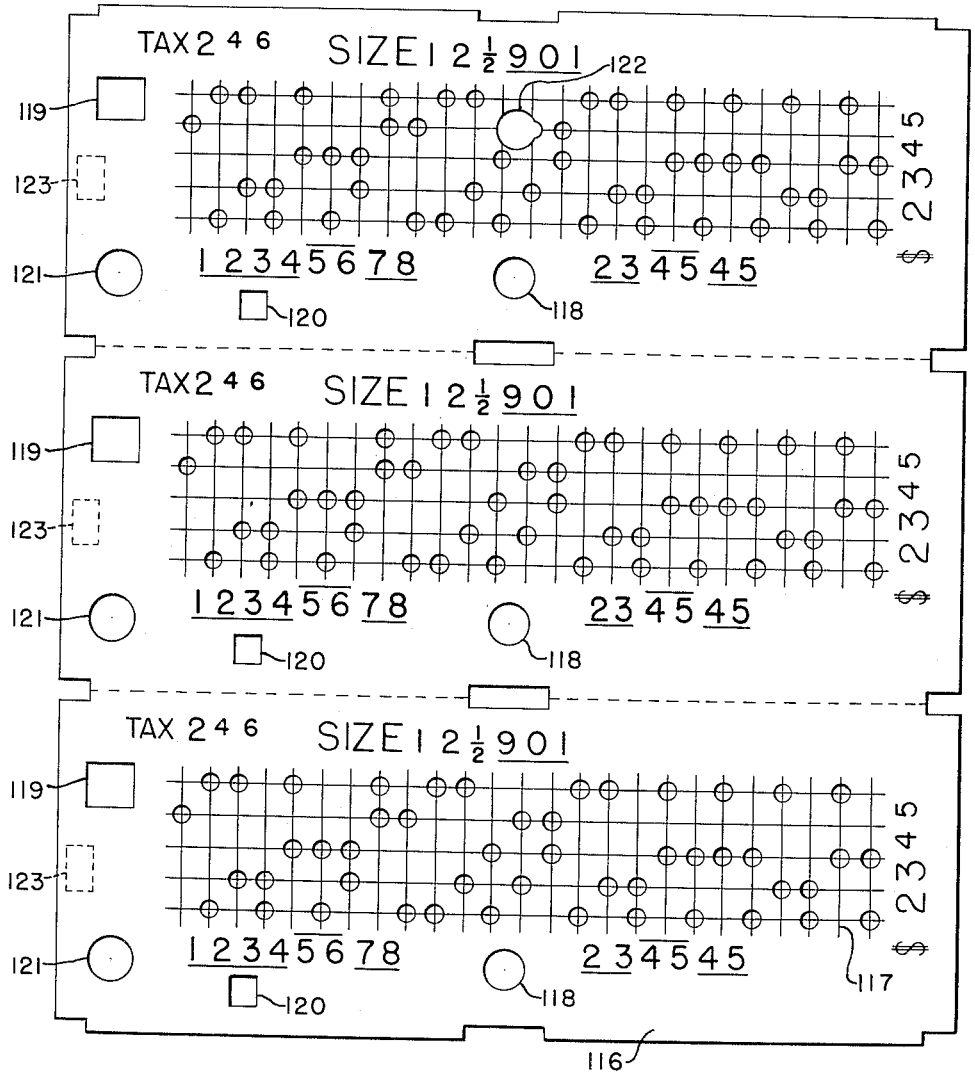
FIG. 4 is an enlarged facsimile of a typical multiple-part merchandise tag to be read by the media reader.

Shown in FIG. 4 is a three-part merchandise tag 116, on which the pertinent merchandise-identifying data pertaining to an article is customarily punched at the Receiving Department of the store when the article is received. The tag is suitably attached to the article and remains with the article until the time of the sale, at which time either it may be read and validated while retained on the article, or a portion of it may be detached and placed in the media reader for reading and recording information relating to the merchandise.

Each portion of the tag, as shown in FIG. 4, has provision for twenty-five columns 117 of punched data. In each portion, the first column is punched with an identification symbol, shown here in channel 3 but which may be in any one of channels 3, 4, or 5, depending upon the type or length of the merchandise tag. The symbol, punched in channels 3, 4, or 5 of column 1, identifies the tag as a merchandise tag and also more specifically identifies the type or length of the merchandise tag. As an example of the data which may be punched in the remaining columns on the tag, the next four columns may be punched with the four-digit code identifying the manufacturer, 1234; the sixth and seventh columns may be punched with digits identifying the color of the article, 56; the eighth and ninth columns may be punched with a code identifying the date of purchase of the article, 78; the tenth, eleventh, and twelfth columns may be punched to indicate the size, 12½; the thirteenth, fourteenth, and fifteenth columns may be punched with data to indicate the style of the article, 901; the sixteenth and seventeenth columns may be punched to identify the fabric of which the article was made, 23; the eighteenth and nineteenth columns may be punched to identify the season for which the article is suited, 45; the twentieth and twenty-first columns may be punched to identify the store department in which the merchandise is sold, 45; and columns twenty-two through twenty-five may be punched with the amount which is the price of the article, $23.45.

The digits which are punched in the various columns are also printed on each part of the tag 116 and are grouped by underlining for ready separation of the component parts of the number to assist in the visual reading of the data. The amount on the tag is used merely to provide a comparison between the original price of the article and the price at which the article was actually sold, as indicated by the amount which is set up on the cash register as a part of the recording of the sales data.

In addition to the identifying data which is punched and printed thereon, the tag may also have printed thereon any other desired additional data, such as tax data, which may be of assistance to the clerk in making the sale.

The alining holes 118 and 119 and the store identification hole 120, found in each section of the merchandise tag 116, are similar to their counterparts in the clerk number and customer number tokens. In addition, a third alining hole, 121, is provided in each part of the merchandise tag. This third alining hole has no function when the merchandise tag is used in the media reader of the present invention, but it may be used in the event that the merchandise tag is used in a media reader of a different type, and is therefore provided in the manufacture of the tag.

A string hole 122 is provided in the topmost portion of the three-part tag 116 for use in attaching the tag to the article with which it is associated. This portion of the three-part tag cannot be read by the media reader, since the string hole 122 is positioned in the area in which the encoded data is punched and would cause an erroneous reading and recording to take place.

It will be noted that a validating area 123 is provided in a section of each part of the multiple-part merchandise tag 116 which corresponds to the cut-away portion of the clerk number and customer number tokens. During the reading of each tag, a validating mechanism in the media reader causes an impression to be made in the validating area of the tag being read, in a manner which will be described subsequently. The merchandise tag will customarily be read without detaching the portion actually being read from the remainder of the tag, and this portion, which is marked during reading with a validating mark, will be retained as an integral part of the multiple-part merchandise tag 116.

Then, in the event that the customer purchasing the article wishes for any reason to return said article, an examination of the merchandise tag 116 by the clerk when the return is being made will disclose the validating mark on the lowermost portion of the multiple-part tag and will give notice that the article has previously in fact been purchased at the store. The article, together with its attached merchandise tag 116, may then be returned for sale to its rack or counter after simply detaching the lowermost portion of the multiple-part merchandise tag to remove that part of the tag which bears the validating mark.

The cash register is provided to control the recorder to cause punching of sales data set up on the cash register. The data may include such information as the amount of the sale, a consecutive reference number, which is different for each succeeding transaction and serves to identify each transaction, etc.

Figure 5:
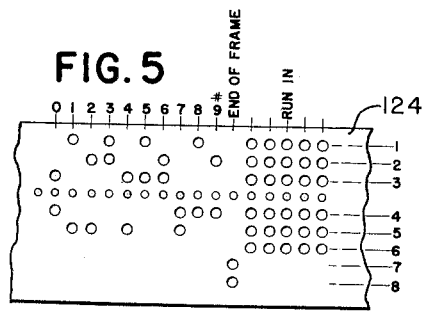
FIG. 5 represents a portion of the tape produced in the recorder and shows the code used to represent the data and the symbols.

The recorder 100, which is controlled by the media reader 101 and the cash register 102, is operable to produce a punched paper tape 124, of the type shown in FIG. 5. The tape 124, shown in FIG. 5, illustrates the code which will be used to represent data and symbols in the embodiment being described. It will be clear that the particular code shown in FIG. 5 is merely illustrative and that other codes may be used to represent the data.

The control of the recorder by the media reader 101 and the cash register 102 is coordinated by programming means which can be set up to provide several punching sequences which may cause the recorder to be controlled by the media reader and the cash register jointly or by the cash register alone, as required to record the necessary data on the tape. Control of the recorder by the reader and the cash register is also coordinated by a replaceable sequence control means which determines the sequence of recording of different classes of data, such as clerk number data, customer number data, and merchandise data. The sequence control means may be replaced by another similar means to vary the sequence of recording of different classes of data as required. In the use of the system, a main power switch 125 (FIG. 1), located on the indicator cover of the cash register 102, is closed to supply operating power to the three components of the recording system. This is done at the beginning of a day's business.

In completing each transaction during the business day, the clerk will customarily first depress an appropriate key in row 9 of the cash register descriptive of the type of transaction and will then insert his clerk number token into the media reader for recording. Insertion of the token causes initiation of a reading operation by the media reader, and recording of the information read, and also causes the token to be gripped and held in the reader until all information on the token has been read, after which it is released. Means which will be described subsequently are provided to prevent reading of the wrong tag or token through inadvertence or mistake.

After the clerk number token has been read, the clerk will, unless the transaction is a cash sale, insert the customer number token, which will be supplied by the customer, into the media reader for reading and recording. In the event of a cash sale, customer number information is not necessary and may be omitted. The customer number token is read and the information recorded in the same manner as has been described for the clerk number token.

Following the reading of a customer number token, or following the reading of a clerk number token in the event of a cash sale, a merchandise tag is inserted into the media reader for reading and recording. The merchandise tag may be read while it is still attached to the article to which it pertains, or it may be detached therefrom for reading and recording, if desired. The merchandise tag is read and the information is recorded in the same manner as has been described for the clerk number and the customer number tokens.

During the time the data is being read and recorded from the merchandise tag, the clerk can operate the keys on the keyboard of the cash register to set up the amount of the sale and other pertinent sales information related to the data being read from the tag, but the cash register is not operated until all data has been read from the tag in the media reader and recorded by the recorder onto the tape, after which the cash register is automatically released and operated. During this operation of the cash register, the data set up on the cash register keyboard is transmitted to the recorder and punched on the tape immediately following the data which has been read from the merchandise tag by the media reader and transmitted to the recorder.

Interlocking devices are provided in the cash register, the media reader, and the recorder to enforce proper operating sequences, all of which interlocks will be described when the several portions of the apparatus are described and when the electrical circuits are explained.

Provision is made for entering clerk number, customer number, and merchandise data into the recording system by use of the cash register keyboard in the event that tokens and tags are not used in a particular application. In the event that a customer number token or a clerk number token is lost or mutilated beyond use, the operator reads the data from the mutilated token, or, if there is no token, the information may be available from memory, from an information sheet, or from some other source. Since the keyboard has a limited capacity, it may be necessary to make a plurality of indexing operations on the keyboard and a plurality of cash register operations to enter the desired data, the number of operations being determined by the number of digits to be entered divided by the number of key banks of the machine which are to be used for setting up this data. The same key banks must be used for each operation, as will be explained more fully when the circuit diagram is described. In the manual entry of merchandise data, classification rows 7 and 8 only are employed, as will be described subsequently. When these various entries are made, transaction keys, provided in row 1 of the cash register keyboard, are used to control the machine operations. A Clerk Number key is used to control the entry of clerk number data, a Customer Number key is used to control the entry of customer number data, and a Merchandise key is used to control the entry of merchandise data. Depression of the appropriate key in the data-entering operations conditions the electrical circuits so that the cash register can be operated without operation of the media reader.

Interlocks and interconnections are provided which, upon depression of the Clerk Number key or the Customer Number key, disable the media reader. These controls also lock the row 1 keys against operation when a tag or token has been positioned in the media reader. On interlock is also provided which disables the media reader when merchandise description is entered through the cash register keyboard and vice versa.

The operation of the cash register, the media reader, and the recorder, and the programming and the interconnection of these mechanisms to produce a tape with the required information, will be clear from the following detailed description.

MEDIA READER

The media reader 101 is shown in FIGS. 1 and 6 to 42 inclusive and is operable to read data from the tokens, tags, or other data-bearing members inserted therein and to control the recorder to reproduce this data on the tape. The media reader can also control the cash register for proper coordination in operation of these two components of the recording system.

The media reader of the instant embodiment has the capacity for reading an identification column and thirty data columns on a token, tag, or other data-bearing member, each column of which may have perforations in any of five positions. It will be obvious from the following description that the capacity of the media reader, as to the number of columns, and as to the number of positions per column which may be read, is merely exemplary and that the capacity can be varied without departing from the invention.

Tag chute and guide means

As best shown in FIGS. 6, 7A, 7B, 11, and 13, the media reader is provided with a chute 130 for receiving tokens, tags, or other record members to be read. This chute is formed by a front plate 131 and a rear plate 132, spaced apart by a spacing plate 133 (FIG. 11), and extends from a vertical slot in the right side of the machine, as viewed in FIG. 7B, leftward to an auxiliary frame member 287. The extension of the chute to the right as viewed in FIGS. 7A and 7B through the vertical slot in the right side of the machine enables record members of any desired size to be read by the media reader, so long as the encoded perforations thereon are properly placed in one corner of said record member. The upper edges of the front and rear plates 131 and 132 are cut away at 134 and 135 (FIG. 11) in the central portion to enable the tags to be pushed down far enough in the chute to insure that they will be in position to be sensed. The upper end of the front plate 131 is flared outwardly to form a throat, which facilitates the placing of tags in the chute and guides the tags into proper position relative to the sensing means.

Provided on the housing of the media reader for cooperation with the tag chute 130 are means for guiding the insertion of tags, tokens, or other record members into the media reader, and for temporarily holding such tags, etc., after they have been read and ejected from the media reader.

The upper front surface of the media reader housing is shaped to provide an entrance 139 (FIGS. 1 and 6) to the tag chute 130. The width of the entrance 139 is less than that of the tags which will normally be read by the media reader, but is sufficient to accommodate part of the hand of a person putting a tag into the reader, and thus facilitates placement of a tag in the tag chute 130. The cut-away portion 134 of the front plate 131 of the chute 130 conforms to the shape of the entrance 139.

Two end members, 140 and 141 (FIGS. 1 and 6), are mounted by bolts 142 to a frame member 143, which forms a part of the top surface of the media reader. Extending between said end members is a transparent guide plate 144, having semi-circular cut-out portions 145 and 146 to facilitate the grasping of tags and tokens. Said guide plate is pivotally mounted at either end by a stud 147 on an arm 148, both of which arms 148 in turn are fixed by a pin 149 to a shaft 150 rotatably mounted near its ends in brackets 151 secured to the frame member 143. The arms 148 and the shaft 150 are normally urged counter-clockwise, as viewed in FIG. 6, by a spring 152, secured at one end to the pin 149 and bearing at its other end against one of the brackets 151. Counter-clockwise movement of the arms 148 and the shaft 150 is limited by contact of a surface 153 on one of the arms 148 with a stop surface 154 on the end member 140.

A spring 155 urges the guide plate 144 clockwise with respect to the arms 148, so that a sector-shaped stud 156 on said plate is normally positioned against a bent-over ear 157 on the arm 148. The spring 155 bears at one end on the stud 156, curves around the pivot stud 147, and bears at its other end against a stud 158 on the arm 148.

When it is desired to insert a tag, token, or other record member into the media reader to be read, the tag is grasped by the operator and inserted into the tag chute 130. The entrance 139 provides a space for the operator's hand, as does the guide plate 144, which shifts to the rear to provide access to the tag chute 130. The guide plate 144 first rocks counter-clockwise (FIG. 6) with respect to the arms 148 under the influence of inward movement of the operator's hand until the two end portions of the spring 155 contact each other, after which the arms 148, carrying the plate 144, pivot clockwise about the axis of the shaft 150 against the force of the spring 152. Clockwise movement of the arm 148 is limited by contact of a surface 163 on each of the arms with a cooperating surface 164 on the frame member 143. The outwardly-curved upper part of the front plate 131 adjacent each side of the entrance 139 guides the tag or token into the chute 130, as does a beveled top edge 159 of the rear plate 132.

Once a single-part tag or token has been properly positioned for reading, as will be described subsequently, the operator's hand is withdrawn, and the guide plate 144 is returned by the springs 152 and 155 to the position in which it is shown in FIG. 6.

Upon completion of the reading of the single-part tag or token, means to be subsequently described eject the tag or token upwardly out of the tag chute 130. Since the guide plate has been returned to the position shown in FIG. 6, the ejected tag will fly upward to the right, as viewed in FIG. 6, of the plate 144 and will strike a stop surface 160 integral with the plate 144. The cross bar 202 and the frame member 143 are, respectively, formed with a pair of cooperating surfaces 161 and 162 to the rear of the tag chute 130. After striking the stop surface 160, an ejected tag or token will fall into the cavtiy defined by the surfaces 161 and 162 for storage. A plurality of tags or tokens may be stored in this cavity until it is convenient for the operator to remove them.

When a multiple-part tag or token, or some other record member which is larger in size than a single-part tag or token, is inserted into the media reader for reading, the guide plate 144 will be blocked, by contact with the upper portion of said tag, token, or record member, from returning to the position in which it is shown in FIG. 6. Therefore, when the reading operation has been completed, the tag or other member will be ejected directly outward to the left of the guide plate 144, rather than passing to the right of the said guide plate for movement into the storage cavity defined by the surfaces 161 and 162. It will be seen that any tag, token, or record member which is being read may be ejected directly outwardly of the machine into the left of the guide plate 144 if desired, rather than into the storage cavity, if the operator manually retains the guide plate 144 in a position to the right of that shown in FIG. 6.

The rear plate 132 of the chute is provided with thirty-one columns of holes 170 (FIGS. 6 and 11), which columns are spaced across the plate just below its upper edge. Each of said columns contains five holes, equally spaced vertically of the plate, which holes allow the ends of sensing pins 171 to move into engagement with the tag or token when in reading position. The upper portion of the rear plate 132 is also provided with three larger holes 172, through which pass alining pins 173, 174, and 175 (FIGS. 7A and 7B), which serve to aline the tag or token properly in reading position. The pins 173, 174, and 175 also pass through alining holes in the tag or token to lock it against removal from reading position until the operation of the media reader has been completed. The upper portion of the rear plate 132 is also provided with a plurality of holes 176 (FIG. 11), through a preselected one of which passes a store identification pin 177, which serves to check all customer number tokens, as has been previously described, to insure that such tokens have been either issued or approved by the store using the recording system. The rear plate 132 is also provided with a slot 178 for passage therethrough of the stop surface 179 of a tag stop means which will be described subsequently.

The front plate 131 is cut out to provide an opening 180 (FIG. 11), through which may pass a clamping block 181 (FIGS. 6 and 7A) for clamping the tag to be read against the rear plate 132 to retain it in reading position and prevent any shifting during a reading operation. Along the lower edge of the cut-out portion, the front plate 131 is also provided with notches 182 to provide room for ears 183 (FIGS. 13 and 15) of a tag-ejecting plate 184.

Positioned between the front and rear plates 131 and 132 and serving to space these two plates the desired distance apart to permit positioning of a tag or token to be read therebetween is the spacing plate 133 (FIGS. 7A and 11). Mounted on the spacing plate 133 is a starting switch mechanism which is adapted to be actuated by the tag or token to initiate operation of the media reader when the tag or token is properly inserted into the chute. An arm 185 (FIGS. 11 and 14) is mounted on the spacing plate 133 by means of a stud 186, the arm having pivotally mounted at its upper end an L-shaped member 188, having thereon two built-up portions 189 and 190, said L-shaped member being pivotally mounted on the arm 185 by means of a stud 187. An integral portion 191 of the arm 185 is bent backwardly to provide anchoring means for a spring 192, which is secured at its other end to a bent-over ear 193 of the L-shaped member 188 and which tends to retain the member 188 in the position in which it is shown in FIG. 11. Secured to the arm 185, approximately midway thereof, is an extension 194, which is adapted to coact with the actuating means of a snap-action switch comprising contacts SC23a1 and mounted on the bar 202.

When a tag or token is inserted downwardly into the tag chute 130 and then is shifted to the left as viewed in FIG. 11, the lower portion of the tag will contact the built-up surface 190, and the left edge of the tag will contact the built-up surface 189. This will cause the member 188 and the arm 185, on which it is mounted, to move to the left, or counter-clockwise, as viewed in FIG. 11, about the pivot 186. The extension 194 on the arm 185 will, in such a movement, contact the actuating means for the contacts SC23a1 and thereby cause said contacts to close. This completes a circuit to initiate operation of the media reader, as will be fully described in the description of the circuit diagram.

It will be seen from an examination of FIG. 11 that, in order for the arm 185 to be rocked counter-clockwise to actuate the snap-action switch to close the contacts SC23a1, it is necessary that the inserted tag contact both of the built-up surfaces 189 and 190 on the member 188. If the tag is merely inserted downwardly to the full extent of its movement without also being shifted to the left as viewed in FIG. 11, it will contact only the built-up surface 190 on the member 188 and will not contact the surface 189 on said member. This will result in the member 188 rocking clockwise about its pivot 187 without causing the necessary rocking movement to be imparted to the arm 185 and its extension 194 to effect actuation of the switch. Similarly, if the inserted tag is not inserted far enough downwardly to contact the surface 190 before being shifted over to contact the surface 189 on the member 188, the member 188 will merely rock counter-clockwise about its pivot 187 without imparting a rocking movement to the arm 185 and its extension 194 for actuation of the switch 195. The above-described switching mechanism, therefore, insures that the tag or token to be read must be properly positioned in the chute of the media reader before the media reader starting switch can be actuated by said tag or token.

*Tag Stop means*

Means are provided for limiting the downward movement of a tag which is inserted into the tag chute of the media reader for a reading operation. The tag stop means is best shown in FIG. 12 and comprises a plate 200 pivoted at 201 to the rear plate 132 of the tag chute 130. The upper portion of the plate 200 is bent to pass through the slot 178 in the rear plate 132 and forms the tag stop surface 179. Secured to the cross bar 202 extending between the side frames of the media reader is a bracket 203 having an arm 204 extending downwardly therefrom. A spring 205 is connected between a projection on said arm and the lower portion of the stop plate 200 and urges the stop plate 200 to a position in which the stop surface 179 extends through the slot 178 in the plate 132 to limit downward movement of any tags, tokens, or other members which may be inserted into the tag chute for reading. Also attached to the arm 204 of the bracket 203 is a snap-action switch comprising contacts SC37b1 and having its actuating button positioned in contact with a flat portion 207 on the lower portion of the stop plate 200. The spring 205 urges the flat surface 207 of the stop plate 200 against the actuating button of the switch to normally hold the contacts SC36b1 in said switch in a closed condition.

Means are provided to shift the stop surface 179 of the tag stop plate 200 out of its operative tag-stopping position when a reading operation has been completed and it is desired to eject the tag from the media reader. Said means include a bell crank 244, adapted to coact with the plate 200, the bell crank being shiftable by a cam surface 242 on an arm 241, which is fixed to a shaft 228 for unitary movement therewith. The operating means for rocking the shaft 228 is best shown in FIGS. 7B, 16, and 19. This means includes a rotary-type solenoid L20, which is mounted on an auxiliary side frame 209, secured to the media reader side frame 210. A stud 211 on an armature 212 extends into a slot 213 in a lever 214 (FIG. 16), which is pinned to a shaft 215, mounted in the media reader framework. Also pinned to the shaft 215 and connected to the lever 214 by a stud 216 for movement with said lever is an arm 217. A member 218 (FIG. 19), mounted free on the shaft 215 and urged clockwise, as viewed in FIG. 19, by a spring 219 secured to said member and to the reader framework, includes a surface 220, positioned to coact with the stud 216. A by-pass pawl 221 is pivoted on a stud 222, fixed in the member 218, and is urged by a spring 223 against a stop 224, also fixed in the member 218. A surface 225 on the pawl is arranged to coact with a corresponding shoulder 226 of a sleeve member 227, which is pinned to the shaft 228, mounted in the media reader framework.

The member 218 has thereon a shoulder 229, which cooperates with an ear 230 on a retaining pawl 231, pivoted on a stud 232 in the media reader framework. The pawl 231 is integral with an arm 233 and is urged clockwise about its pivot 232 by a spring 234, which is connected between the arm 233 and an arm 235 (FIG. 29) of the validation mechanism.

A link 236 is pivotally connected to the lever 214 at one end, said link being pivotally connected at its other end to an arm 237 on a trunnion 238. The arm 237 and the trunnion 238 are urged clockwise, as viewed in FIG. 16, by a spring 239, connected to said arm and to the media reader framework. A stud 240 is fixed on the link 236 about midway of its ends for engagement with a surface on the arm 233.

When a properly-inserted tag or token causes the arm 185 (FIG. 11) to rock counter-clockwise, thereby causing the contacts SC23a1 to close, the solenoid L20 (FIG. 16) will be energized to rotate its armature 212 clockwise, as viewed in FIG. 16, and the lever 214, its associated arm 217, and the shaft 215, to which they are secured, will be carried counter-clockwise by the stud 211 about the axis of said shaft. The stud 216 will contact the surface 220 of the member 218 and rock said member counter-clockwise, as viewed in FIG. 19, about the shaft 215. This will cause the by-pass pawl 221 on the member 218 to move to a position in which the surface 225 of said pawl is positioned above the shoulder 226 on the sleeve member 227. At the same time, the lever 214 will shift the link 236 and its stud 240 upwardly and to the left, as viewed in FIGS. 16 and 19, thereby permitting the pawl 231 and its associated arm 233 to rock clockwise about the pivot 232 under the influence of the spring 234. The combined movements of the member 218 and the pawl 231 will operate to place the ear 230 of the pawl 231 in blocking relation to the shoulder 229 on said member, to retain said member against clockwise movement about the shaft 215.

Counter-clockwise movement of the lever 214, when the solenoid L20 is energized, is also effective to cause an ear 246 on said lever to coact with a blade 247 to depress an actuating member of a snap-action switch mounted in the machine framework and comprising contacts L20b1 to open said contacts. The manner in which the contacts L20b1 function in the operation of the recording system will be disclosed in the description of the circuit diagram.

As the link 236 moves downwardly and to the right, as viewed in FIGS. 16 and 19, under the influence of the spring 239, the stud 240 on said link will contact the arm 233 and will cause said arm and its associated pawl 231 to be shifted counter-clockwise against the force of the spring. This movement causes the ear 230 of said pawl to be moved out of contact with the shoulder 229 on the member 218, thereby permitting the spring 219 to impart a rapid clockwise rotational movement to the member 218, and causing the right end of said member to snap smartly downward. The surface 225 of the pawl 221 contacts the shoulder 226 of the sleeve member 227 during this movement and imparts a sudden clockwise rocking movement to the member 227 and the shaft 228, to which said sleeve is secured.

It will be recalled that the arm 241 (FIG. 12) is also secured to the shaft 228, and the clockwise rocking movement of said shaft will be imparted to said arm. This will cause the cam surface 242 on said arm to coact with the roller 243 on the bell crank 244, to rock said bell crank counter-clockwise about its pivot 245, thereby rocking the tag stop plate 200 clockwise about its pivot 201. This movement of the plate 200 is effective to retract the tag stop surface 179 out of the tag chute 130 to its inoperative position, and also shifts the surface 207 to cause the contacts SC37b1 to open.

Tag-ejecting means

Means are provided for ejecting a tag or token from the media reader upon completion of the reading operation. This means includes the tag ejection plate 184 (FIGS. 13 and 15), which is positioned between the front and rear plates of the tag chute 130, in its lower portion. Bent-over ears 183 are formed on the plate 184 to insure that an effective contact will be had between the plate 184 and the tag. The ears 183 are free to move up and down in the notches 182 (FIG. 11) in the tag chute front plate 131. Additional bent-over portions 250 are provided on the plate 184 for the mounting of two trunnions 251, each of which rides in the slot 252 of an arm 253 (FIGS. 13 and 15) pinned to the shaft 228.

It will be recalled from the description of the tag stop means that, when the solenoid L20 (FIG. 16) is deenergized after the completion of the reading of a tag or token, the shaft 228 is given a sudden clockwise movement. Since the arms 253 are pinned to said shaft, they will partake of this movement and thereby cause the ejection plate 184 to be shifted abruptly upward. The upper edge of the plate 184, and the bent-over ears 183, will contact the lower edge of the tag which has been read and cause said tag to be ejected upwardly from the tag chute 130. Arrangement of the parts operated by the shaft 228 is such that the tag stop surface 179 of the tag stop means will be retracted out of the tag chute before the tag-ejecting plate 184 is carried upwardly past the position occupied by the tag stop surface in its operative position, so that no jamming of these two parts will take place.

Tag-alining means and store identification means

Means are provided to aline and retain the tag or token to be read in proper position to be read by the media reader. The three alining pins 173, 174, and 175 (FIGS. 7A, 7B, 10, 18, and 20) are slidably mounted in corresponding holes 172, extending through the cross bar 202 and the rear plate 132 of the tag chute 130, said pins being arranged to engage corresponding holes in the tag or token to be read, to retain said tag or token in proper reading position. It may be noted that tags or tokens may be employed which are of such a length that they contain only two alining holes. In such an event, the third alining pin moves with the other two pins in its normal manner but performs no alining function.

The alining pins 173, 174, and 175 are mounted on arms 254, 255, and 256, all of said arms being secured to a sleeve 257, free on the shaft 215, for unitary movement about said shaft, to shift the alining pins into and out of operative tag-alining position.

Engaging and disengaging movement is imparted to the alining pin arms by a yoke 258 (FIGS. 17, 18, and 20) free on the shaft 215. One arm 259 of said yoke is provided with a stud 260, which cooperates with a flat surface 261 on the alining pin arm 256. A spring 262 flexibly connects the arms 256 and 259 together. The other arm 263 of the yoke 258 has a cam slot 264, which receives a roller 265, said roller being mounted on an arm 266, which is free on the shaft 228 and is urged clockwise about said shaft by a spring 267, connected to said arm and to the machine framework. A stud 268 is mounted on the arm 266 and is urged by the spring 267 into cooperative relationship with a surface 269 on the arm 217, which, it will be recalled, is pinned to the lever 214 for unitary movement therewith.

As has been previously described, energization of the solenoid L20 (FIG. 16), by proper insertion of a tag or token into the media reader, causes the lever 214 and its associated arm 217 to be carried by the solenoid stud 211 counter-clockwise, as viewed in FIG. 16, about the axis of the shaft 215. The spring 267 (FIG. 17) will cause the stud 268 and the arm 266, on which it is mounted, to follow the arm 217, thereby rocking the arm 266 clockwise about the shaft 228. The cooperation of the roller 265 on the arm 266 with the cam slot 264 in the arm 263 of the yoke 258 will cause said yoke to be rocked counter-clockwise about the shaft 215 (FIGS. 17 and 18), thereby causing the stud 260 on the arm 259 of said yoke to coact with the surface 261 of the alining pin arm 256 to shift said arm and the two other alining pin arms 254 and 255, to which it is fixed by the sleeve 257, counter-clockwise about the shaft 215. The alining pin arms 254, 255, and 256 are thus moved through the holes 172 and the corresponding holes in the tag which has been inserted into the reader, to aline the tag properly for reading.

It may be noted that, in the event the tag holes should for any reason not be in registry with the arms 254, 255, and 256, the alining pin mechanism will be prevented from completing its movement forward to final position, and the alining pins will not mutilate the tag or token being read by punching holes therein. It will be recalled that movement is imparted to the alining pin arms by the yoke 258 (FIGS. 17 and 18) and that the yoke in turn is shifted by the arm 266, said arm being caused to rotate by the spring 267 when the surface 269 of the arm 217 is moved out of blocking relationship to the stud 268 on the arm 266. The spring 267 is designed to be of such strength that it will shift the linkage operating the alining pins when no interference is placed in the path of said pins, but is not of sufficient strength to force the alining pins through the material of a tag or token when openings therein are not positioned in registry with the pins. The tag-alining mechanism will, therefore, operate only when a tag or token having alining holes properly positioned therein is inserted in the correct manner into the media reader for reading.

An extension 270 (FIGS. 7A and 10) on the alining pin arm 254 is formed to cooperate with the actuating member of a snap-action switch for controlling the contacts SC20ac1 and SC20bc1. The switch is mounted on a bracket 272, which is secured to the plate 287. Counter-clockwise movement of the arm 254 in response to energization of the solenoid L20 (FIG. 16) causes the extension 270 of said arm to contact the actuating member of the switch to close the contacts SC20ac1 and open the contacts SC20bc1. The function performed by these contacts in operation of the recording system will be explained subsequently in the description of the circuit diagram of FIGS. 73A to 73F inclusive.

Store identification means are provided to work in conjunction with the alining pins and to prevent initiation of a reading operation on a customer token unless it has been perforated in such a manner as to identify it as having been issued or approved by the store in which the recording system is utilized. The identification means includes the pin 177 (FIGS. 10 and 20), which may be mounted in any one of a plurality of positions on a comb 273 to register with a corresponding one of a plurality of holes 176 (FIGS. 10 and 11) through the cross bar 202 and the rear plate 132 of the tag chute 130. A predetermined position on the comb will normally be selected for the store identification pin 177, and all of the customer tokens and other tokens and tags relating to the store's recording system will be perforated in a corresponding location to permit the pin 177 to pass through the tag or token. The comb 273 is secured to ears 274, extending from adjacent alining pin arms 254 and 255, for movement with said arms.

It will be seen that, in the event a tag which is not perforated in the position selected by the store for identification is inserted into the media reader, the identification pin 177 will strike the tag (though not with enough force to penetrate said tag) and will be prevented from completing its normal movement to the left, as viewed in FIG. 10. Since the alining pin arms 254, 255, and 256 are rigidly connected to the pin 177, none of these arms can complete their leftward movement. As a result, the extension 270 of the arm 254 will not contact the actuating member of the snap-action switch, and the contacts SC20ac1 and SC20bc1 will not be operated to initiate reading of the inserted tag or token. The improper tag or token which has thus blocked the operation of the media reader must then be manually ejected from the tag chute by means to be described subsequently. Upon completion of the reading of a tag or token by the media reader, the solenoid L20 (FIG. 16) is deenergized, as has been previously described, thereby permitting the spring 239 to return the lever 214 and the arm 217 to their original positions. The surface 269 (FIG. 17) of the arm 217 coacts with the stud 268 on the arm 266 during this movement, rocking the arm 266 counter-clockwise about the shaft 228 and causing the roller 265 on said arm 266, in cooperation with the cam slot 264 in the arm 263 of the yoke 258, to rock said yoke clockwise about the shaft 215. Clockwise movement of the arm 259 (FIG. 18) of said yoke is imparted to the alining pin arm 256 by the spring 262, thereby causing the interconnected alining pin arms 254, 255, and 256, and the alining pins and store identification pin mounted thereon, to be shifted back to their retracted positions, where they remain until another tag or token is inserted into the media reader for reading.

*Tag-clamping means*

Means are provided to clamp a tag or token which has been inserted into the media reader in reading position to retain said tag or token against shifting out of its proper reading position. A clamping block 181 (FIG. 6) is secured between two legs 280, which are pinned to a shaft 281, mounted in the media reader framework. The clamping block is grooved as at 282 (FIGS. 6, 7A, and 7B) to provide clearance for the sensing wires of the sensory mechanism of the media reader and is positioned to move through the cut-out portion 180 (FIG. 11) of the front plate 131 of the tag chute 130 to clamp a tag or token securely in the proper position during a reading operation.

Mounted in a bracket 283, secured to the under side of the clamping block 181, is a roller 284, which is arranged to cooperate with a cam 285 (FIGS. 6 and 31), secured to a shaft 286, mounted in the media reader auxiliary side frame 287 (FIG. 7A), and in a bracket 288, secured to a cross bar 289 in the media reader framework. Also secured to the shaft 286 is an arm 290 (FIG. 31), which is connected by a spring 291 to a lever 292, free on the shaft 281. A rounded surface 293 on the arm 290 is positioned to coact with an extension 294 on the lever 292, which is notched at 295 to receive a pin 296, fixed to the armature 297 of a rotary type solenoid L21, mounted in the media reader framework.

A snap-action switch, comprising contacts L21ac1 and L21bc1, is secured by means of a bracket 300 to the under side of the cross bar 289. An actuating member on the switch for operating said contacts is arranged for cooperation with an ear 301 on an arm 302, mounted free on the shaft 281 and secured by means of a hub 303 to the lever 292 for unitary movement therewith. A surface 304 on said arm is normally in contact with a stud 305, fixed in an arm 306, pinned to the shaft 281.

As will be described subsequently, the solenoid L21 is energized at the time the alining pins 173, 174, and 175 move through corresponding alining holes in a tag or token to their operative position. Energization of the solenoid L21 causes the armature 297 and the pin 296 to be rotated clockwise, as viewed in FIG. 31. Through the cooperation of the pin 296 and the arm 295, this imparts a clockwise movement to the lever 292 and the arm 302, which is fixed thereto. The ear 301 on the arm 302 is shifted into engagement with the actuating member of the switch to operate the contacts L21ac1 and L21bc1. During this time, the surface 304 of the arm 302 is shifted to the left, as viewed in FIG. 31, out of blocking relation to the stud 305, to permit clockwise rotation of the arm 306, the shaft 281, and the clamping block, with its legs 280. It will be recalled that the arm 306 and the legs 280 are pinned to the shaft 281.

At the same time, through the spring 291, the arm 290 is urged to follow the movement of the lever 292, thereby rocking the shaft 286 and the cam 285 clockwise. The cam 285 cooperates with the roller 284 to urge the clamping block 181 clockwise about the axis of the shaft 281 into operative clamping position to engage the tag being read and to clamp it firmly against the rear plate 132 of the tag chute. This movement of the block 181 to clamping position is also aided by the force of gravity, since the center of gravity of the clamping block assembly is located above and to the right of the axis of the shaft 281, as viewed in FIG. 6.

Upon completion of the reading of the tag or token, the solenoid L21 is deenergized, and the armature 297, the pin 296, the lever 292, and the arm 302 are rotated counter-clockwise, as viewed in FIG. 31, under the influence of a spring 307, connected to the media reader framework and to a link 308, which in turn is pivotally connected to the lever 292. Counter-clockwise movement of the lever 292 causes the extension 294 of said lever to coact with the rounded surface 293 on the arm 290 to rock said arm, the shaft 286, and the cam 285 counter-clockwise, as viewed in FIG. 31. The arm 302, being fixed to the lever 292, also rocks counter-clockwise, thereby shifting the ear 301 out of contact with the actuating member of the switch to cause the contacts L21ac1 to reopen and the contacts L21bc1 to reclose. The counter-clockwise movement of the arm 302 also shifts the surface 304 of the arm 302 to the right to coact with the stud 305 of the arm 306 to rock said arm, the shaft 281, and the clamping block assembly counter-clockwise to the non-clamping position, in which they are shown in FIG. 6.

*Sensory Section*

The sensing means operates to read the data from the tag or token, column by column, while the tag is held stationary in reading position in the media reader by the clamping and alining means previously described. The sensing means in the instant embodiment is capable of sensing up to five different types of tags or tokens.

As stated earlier, sensing means are provided for sensing up to thirty-one columns on the tag, of which the first column to be sensed will customarily be an identification column for identifying the type of tag being read, and the other thirty columns will represent data which it is desired to record. Each of these columns may contain perforations in any of five positions.

The sensing means employed in the reading of the thirty data-representing columns will now be described. These sensing means differ in some particulars from the sensing means used in connection with the identification column, which will be described subsequently. The five sensing pins 171, shown in FIG. 6, for sensing one of the data-representing columns of the tag, are arranged one above the other and are of a similar construction. Each sensing pin 171 is in the form of a Bowden wire which has its forward end operating in its respective hole 170

(FIGS. 6 and 11) in the rear guide plate 132 of the tag chute 130, and has its rear end connected to an enlarged contact control rod 315 having a tip 316 of non-conducting material, which rod 315 is supported, and guided for longitudinal movement in a cross bar 317, which is mounted between the right side frame 210 (FIG. 7B) and the left side frame 318 (FIG. 7A).

Intermediate its ends, each of the sensing pins 171 (FIG. 6) is mounted for longitudinal movement through the front supporting cross bar 202, mounted between the side frames, a sheath 319, and a further supporting cross bar 320, mounted between the side frames, the sheath 319 having its forward end extending into the cross bar 202 and its rear end extending into the cross bar 320.

Each sensing pin 171 is urged to the left (FIG. 6) by its individual spring, such as spring 321, which forms a part of the contact means for converting the sensed data into electrical signals by which the recorder can be controlled to duplicate the data on the tag.

The contact means is common to the sensing pins for all of the data-representing columns on the tag and is shown most clearly in FIGS. 6, 7A, and 7B. The contact means is mounted between end frames 322 and 323, which are supported in auxiliary side frames 237 and 324 by means of two cross rods 325 and 326.

Supported between the end frames 322 and 323 are five input buses, 327, 328, 329, 330, and 331, one for each possible data-representing perforation in a column, which buses are electrically connected together by a strap 332.

As is clear from FIG. 6, one end of each of the springs 321 is connected to its related input bus. One spring is secured to each bus for each data-representing column on the tag; that is, there is a row of thirty springs secured to the bus 327, each one of which will urge its related sensing pin to the left, to enable the top row of pins to sense the top row of perforations in the tag. Similarly, thirty springs will be mounted on each of the four other buses to urge their related sensing pins to the left.

Mounted to the left, as viewed in FIG. 6, of each row of springs relating to the data-representing columns, and common thereto, is an output bus, the output buses 337, 338, 339, 340, and 341 being related to the top-to-bottom hole positions, respectively.

The springs 321 are positioned to engage their related output buses to selectively complete circuits from the common input buses to various ones of the output buses. Hence, the springs serve two functions; that is, to supply the force to move the sensing pins to the left, and also to serve as contacts in the circuits controlled by the sensing means.

The five output buses 337, 338, 339, 340, and 341 are connected to five terminals 1338 in a section 1336 in the diode digit encoding board 1315 (FIG. 73F), which is mounted in the recorder 100. The terminals 1338 can be connected by plug-board connectors, such as 1337, to terminals such as 1339 in the diode digit encoding board 1315 to select the punches to be operated according to the data which is read. In order to simplify the circuit diagram, the thirty contacts which connect an input bus to an output bus will be shown as a single contact, contacts SC36a1 representing the thirty contacts which connect the buses 327 and 337, contacts SC36a2 representing the thirty contacts which connect the buses 328 and 338, contacts SC36a3 representing the thirty contacts which connect the buses 329 and 339, contacts SC36a4 representing the thirty contacts which connect the buses 330 and 340, and contacts SC36a5 representing the thirty contacts which connect the buses 331 and 341. Hence, contacts SC36a1, SC36a2, SC36a3, SC36a4, and SC36a5 in FIG. 73F represent the various contacts which can be controlled in the sensing of any data-representing column of the tag.

In the normal, retracted, position of the sensing pins, their front ends will be flush with the rear plate 132 of the tag chute 130, and the tips 316 of the enlarged rods 315, which tips are notched to receive the springs 321, will hold the springs out of engagement with their related output buses.

As each column of sensing pins is released to sense the tag, those sensing pins which are in positions where there are holes in the tag will be allowed to move to the left to allow their related springs to engage the output buses and complete circuits from the input buses to the output buses, while those sensing pins which are in positions where there are no perforations will be prevented from moving to the left and will keep their related springs from engaging the output buses.

The movement of the sensing pins from their retracted position to their sensing position is controlled by a series of arms 342 (FIGS. 6, 7A, 7B, and 21), one for each of the thirty data-representing columns. The movement of the arms is controlled by a disabling bar 343, which is common to all of the arms, and by individual cams 344 of a cam line. The arms are pivotally mounted on a cross rod 345 and are guided laterally by a comb plate 346, secured to two blocks 347 and 348, said blocks being mounted on the side frames 318 and 210, respectively. The arms 342 are urged counter-clockwise, as viewed in FIG. 6, by individual springs 349, which are connected to the arms 342 and to upwardly-extending ears 350 on the comb plate 346.

Each arm 342 is formed with a cam-engaging projection 351 and with an upwardly-extending finger 352, which engages the enlarged rods 315 of the five sensing pins for its related data-representing column. The finger 352 of the arm 342 extends along one side of the sensing pins of the column, as seen most clearly in FIGS. 6, 7A, and 7B. Each of the arms 342 is also provided with a surface 353 for engagement by the disabling bar 343 to maintain the sensing pins 171 in their right-hand position, except during the reading of a tag or token.

The disabling bar 343 extends the length of the cam line and is provided with trunnions 354 and 238 at opposite ends thereof, which trunnions bear in extensions 355 and 356 of the blocks 347 and 348 (FIGS. 6 and 23), respectively, secured to the frames 318 and 210. Secured on the trunnion 238 adjacent the right-hand end of the disabling bar 343 is the arm 237 (FIG. 16), which is urged clockwise by the spring 239 and which is pivotally connected to the link 236.

It will be recalled that energization of the solenoid L20 at the beginning of a reading operation causes counter-clockwise rotation of the lever 214, as viewed in FIG. 16. This movement is transmitted by the link 236 and the arm 237 to the disabling bar 343, to rock said bar counter-clockwise against the force of the spring 239, thereby freeing the arms 342 (FIG. 6) to the control of the cams 344 on the cam line.

At the completion of a reading operation, the solenoid L20 is deenergized, and the disabling bar is then rocked clockwise by the spring 239 (FIG. 16) to the position in which it is shown in the figures of the drawing, in which it is effective to block movement to the left of any of the cam arms. This blocking function is essential, since, as will be described subsequently, a resetting operation of the cam line normally follows completion of the reading of a tag or token. As the cam line moves through the completion of its revolution back to "home" position, in preparation for the next reading operation, certain of the arms would be permitted by their corresponding cams to move to the left, if not otherwise blocked against such movement, and this could cause erroneous reading and recording to take place. However, this is prevented by the disabling bar 343, which retains the arms 342 against leftward movement, as has been previously described.

The disabling bar 343 also prevents operation of the tag-ejecting means in the event that one of the sensing pins 171 fails for any reason to move back from its extended sensing position. This prevents damage to any of the sensing pins, which could otherwise very easily be damaged by operation of the ejecting means when any of said sensing pins were in their extended sensing position in the tag chute. In the event that one of the sensing pins becomes caught in a tag or is otherwise held in its extended position, the enlarged contact rod 315 (FIG. 6), to which it is attached, will prevent full movement to the right of the corresponding arm 342. With any of the arms 342 held against completion of their normal movement to the right, as viewed in FIG. 6, the disabling bar 343 will be unable to complete its normal clockwise movement upon deenergization of the solenoid L20. In such an event, the arm 237 and the link 236 will not complete their normal movements under the influence of the spring 239 upon deenergization of the solenoid L20, and the stud 240 on said link will therefore not shift the arm 233 sufficiently in a counter-clockwise direction to cause the pawl 231 to release the member 218 for operation of the ejecting means in the manner described previously. The disabling bar 343 thus cooperates with the various arms of the cam line to prevent an ejecting operation from taking place when any of the sensing pins 171 are in their extended sensing position.

The cam line (FIGS. 6, 21, 22, 22A, 23 and 29) contains thirty-two cams, including thirty cams for controlling the operation of the sensing means for the data-representing columns, one cam 357 (FIG. 21) for controlling the operation of the sensing means for the media identification section, and one cam 358 (FIGS. 21 and 29) for controlling the operation of the validation means. Mounted on the same shaft 359 as the cams described above, for rotation therewith, are nine rotary switches, which cooperate with corresponding wipers for providing additional controls for the media reader. The shaft 359 is mounted in the right side frame 210 (FIGS. 7B and 21) and in a plate 360 (FIGS. 7A and 21) removably secured to the left side frame 318. The removable plate 360 is provided to permit ready removal of the cam line for inspection or adjustment.

A driving motor 333 (FIGS. 6, 7A, 7B, and 23) operates whenever the media reader is operable, and, through a shaft 361 (FIGS. 6, 7B, and 23), a clutch 362, and gears 363, 364, 365, 366, 367, 368, 369, and 370, drives the cam line through one thirty-sixth of a clockwise revolution (FIG. 23) each time the clutch 362, which is a single revolution clutch, is tripped. Hence the clutch 362 will be tripped thirty-six times for each complete operation of the media reader, including a reset operation. Said clutch is tripped by a pair of clutch solenoids L22A and L22B, which, when energized, remove a blocking member 371 from in front of a tooth 372 on the clutch to allow the clutch to make a single revolution. Movement of the blocking member 371 by energization of the solenoids L22A and L22B also causes the end of said member to coact with a pin 373 fixed in the end of a switch blade 374 to close contacts L22a1 for a purpose which will be disclosed in the description of the circuit diagram. The circuits for energizing the solenoids L22A and L22B will also be fully explained when the circuit diagram is described.

Secured to the clutch 362 for rotation therewith are two plates 375 and 376 (FIGS. 7B and 23) of laminated plastic, each plate having a strip of conducting material extending part of the way around the periphery of said plate on one side. Wipers 377, mounted on the media reader framework, cooperate with the conducting strip on the plate 375 to form the contacts SC35a1, which are closed from five degrees to one hundred and thirty degrees of revolution of the clutch, and wipers 378, mounted on the media reader framework, cooperate with the conducting strip on the plate 376 to form the contacts SC35b2. The manner in which these contacts function in the operation of the recording system will be explained fully when the circuit diagram is described.

The cams on the cam line are formed with a notch 379 (FIG. 6), of such a length as to be opposite the projection 351 on the related arm 342 only in one of the positions of the cam line, and are so proportioned that, while the projection 351 is riding on the periphery of the cam, the arm will be in position to maintain the sensing pins ineffective, but, when the notch 379 is opposite the projection 351, the arm can rock counter-clockwise to move the finger 352 to the left to free the sensing pins for movement to the left to sense the perforations of its related column and close the required ones of the contacts SC36a1 to SC36a5 inclusive.

The notches 379 on the cams 344 are arranged spirally about the shaft 359, so that, in different positions of the cam line, different ones of the arms 342 will be allowed to free the corresponding sensing pins. In the instant embodiment, when the clutch 362 is tripped for the first time in the tag-reading operation, no reading of the tags takes place, since this is simply a preparatory operation of the media reader to provide time for the various components of the media reader to assume their correct positions for the reading of the tag. When the clutch is tripped a second time, the first column at the left of the tag will be sensed. This is the identification column, and the sensing means for this column will be described subsequently. When the clutch is tripped a third time, the second column at the left of the tag will be sensed. This is the first data-representing column, and, as the clutch is tripped further in the reading operation, the subsequent data-representing columns will be read one after another from left to right.

While in the instant embodiment the notches 379 are so arranged about the shaft 359 that the tag is read column by column from left to right, it is obvious that, by proper location of the notches on the various cams, the columns on the tag can be read in any sequence which may be desired.

The media reader can be controlled to read all thirty-one columns on the tag, or any desired number of columns. This control is effected by the "end of tag" contacts. In the present embodiment, it is contemplated that there will be five different sets of "end of tag" contacts, one each for the clerk and customer number tokens, and one each for the three different lengths of merchandise tags. The "end of tag" contacts SC21b1, SC22b1, SC30b1, SC31b1, and SC32b1, respectively, are formed by the five rotary switch plates 384, 385, 386, 387, and 388 (FIGS. 21 and 22A), mounted on the shaft 359, in cooperation with corresponding sets of wipers 389. Each of the "end of tag" switch plates comprises a laminated plastic plate 390, having inlaid on both sides thereof a strip 391 of conducting material. The strips of conducting material on each side are connected by a bridge, also of conducting material, inlaid on the periphery of the plastic plate. One of the two wipers 389 cooperating with each of the plates serves as input, while the other serves as output. It will be seen that, so long as the conducting strip on the plate is in contacting relation with the wipers, current will pass from the input wiper to the output wiper. However, when the plate is rotated to a point where the non-conducting plastic material contacts the one or both of the two wipers, the electrical connection therebetween will be broken.

Four additional rotary switch plates are fixed on the shaft 359 to the left of the cam line (FIG. 21). Two of these plates, 392 and 393, cooperate with wipers 394 to provide contacts SC33a3 and SC33a4, which contacts are open in home position of the media reader cam line, but which are closed in all other positions of said cam line. The construction of these "open in home" contacts is identical with the construction of the "end of tag" contacts, previously described, with the exception that the plates 392 and 393 are designed to remain fixed in relation to the media reader cam line, while the five "end of tag" plates are designed to be adjustable to different positions about the media reader cam line.

A third plate, 395 (FIGS. 21 and 22), is fixed in relation to the media reader cam line and is designed to cooperate with two sets of wipers 396 and 397 to provide a set of "closed in home" contacts SC33b1. The construction of this plate is similar to that of the plates previously described, in that the plate comprises a plastic laminated member having inlaid thereon two metal strips 398 on opposite sides of the plate. However, in this instance, the two metal conducting strips are not connected across the periphery of the plate but are electrically separated. One of the wipers 396 on one side of the plate acts as an input, while the other wiper 397 on the same side of the plate acts as an output in this case. It will therefore be seen that the contacts SC33b1 will be closed only when both of the wipers 396 and 397 are in contact with the metal strip 398 of the plate 395 during a certain portion of the rotation of said plate.

A fourth plate, 399, on the left side of the media reader cam line, is similar in construction to the plate 395 and is designed to provide special symbol contacts SC34a1 in cooperation with the wipers 400 and 401. The plate 399, unlike the plate 395, which is fixed with respect to the media reader cam line, is adjustable about the cam line, so that its relative positioning with respect to the position of the media reader cam line may be adjusted as desired.

All of the rotary switch plates and cams of the cam line are mounted on the shaft 359 (FIGS. 6 and 21) in a novel manner which provides accuracy and simplicity of assembly and easy adjustability of those cams and switch plates which it is desired to be adjustable around the shaft. Pinned to the shaft 359 between each pair of cams 344 is an arm 402 (FIGS. 6 and 21), having a hole at one end thereof. One of the cams 344 rests against each side of the arm 402, each of the cams 344 being identical in shape, having a single notch 379 therein and thirty-six holes equally spaced along a circumference near the periphery of the cam. Three-armed spring members 403 (FIGS. 6 and 21) are positioned on the shaft 359 between adjacent arms 402 and bear against adjacent cams 344 to hold said cams against the arms 402 for accurate spacing of said cams on the shaft 359.

A similar construction is followed in the case of the various rotary switch plates which are mounted on the shaft 359. However, since the switch plates have electrical contact surfaces extending along the peripheries, it is necessary to make the arms 404, which are pinned to the shaft 359, somewhat shorter than the corresponding arms 402, utilized with the cams 344, and therefore to provide a notch 405 in the top of the arms 404 rather than a hole, as in the corresponding arms 402. Also, since the plastic plates 390 do not have the rigidity of the cams 344, a spacing member 406 (FIGS. 21 and 22) is provided to occupy the space around the arms 404, and between adjacent plates 390, and washers 407 are provided adjacent the plates 390 to form bearing surfaces for the three-armed springs 408 (FIGS. 21 and 22A), which are similar to the corresponding spring members 403, used for spacing the cams 344.

A rod 409 (FIGS. 6, 21, 22, and 22A) cooperates with the holes in the cams 344 and the switch plates, with the holes in the arms 402, and with the notches 405 in the arms 404, to retain all of said members against rotational movement relative to each other and to the shaft 359. The rod 409 is retained against shifting movement lengthwise of its axis by two clips 410 (FIG. 21), which cooperate with grooved portions in said rod to retain the rod against axial movement. This type of construction enables the use of identical cams 344, since the relative position of notches 379 in adjacent cams can be set about the shaft 359 merely by positioning the cams 344 in the desired relationship to each other, and then passing the rod 409 through the particular hole on each cam 344 which has been alined with said rod by the relative positioning of the cam. The position of the rod 409 with respect to the shaft 359 is fixed, since said rod passes through holes and notches of the arms 402 and 404, which, it will be recalled, are pinned to the shaft 359. Since it is desired to retain the switch plates 392, 393, and 395 in fixed relation to the shaft 359 to establish a "home" position, these plates are provided with only one hole for reception of the rod 409 and cannot be rotatably adjusted with respect to the shaft 359. However, the remainder of the switch plates, and the cams for the cam line, are each provided with thirty-six holes in a circumference near their periphery and can thus be adjusted in any desired position simply by removal of the rod 409, rotation of the cam or plate about the shaft 359 to its desired position, and then replacement of the rod 409 to secure all of the cams and switch plates against movement relative to each other.

The sensing means employed in the reading of the identification column, which is normally the first column to the left of the tag or token, is positioned at the left side of the sensory section, as viewed in FIG. 7A. Each of five vertically-arranged sensing pins 171, composing the identification column sensing means, is mounted for longitudinal movement in a sheath 319 extending between the supporting bars 202 and 320 in the same manner as the sensing pins for reading the data-representing columns on the tag or token. The rear end of each sensing pin 171 is connected to an enlarged control rod 411 (FIGS. 8, 9, and 27), having a tip 412 of non-conducting material, each of the rods 411 being supported and guided for longitudinal movement in the cross bar 317. Each sensing pin 171 of the identification section is urged to the left by a spring 413 (FIG. 28), which presses against the tip 412 at the end of the rod 411 connected to the pin 171. The spring 413 also forms part of the contact means for converting the sensed data into electrical signals for controlling the recording system, according to the type of tag or token inserted into the media reader.

After the disabling bar 343 has been moved to its non-blocking position by energization of the solenoid L20, the movement of the sensing pins 171 of the identification section from their retracted position to their sensing position is controlled by an arm 414 (FIGS. 9 and 31), identical in shape with the cam arms 342, pivotally mounted on the cross rod 345 and urged counter-clockwise by a spring 415, connected between said arm and the comb plate 346. The arm 414 is controlled by the solenoid L21, through the link 308, which is pivotally connected to said solenoid and to a lever 416, pivotally mounted on the frame member 287, said link being urged to the left, as viewed in FIG. 31, by the spring 307. At the lower end of the lever 416 is fixed a stud 417, which cooperates with a surface 418 on the arm 414 to control the movement of said arm.

When the solenoid L21 is in its deenergized position, as shown in FIG. 31, the lever 416 is positioned by the link 308, under the influence of the spring 307, so that the stud 417 coacts with the surface 418 to block movement of the arm 414 under the influence of the spring 415. The sensing pins 171 (FIG. 8) of the identification section are, therefore, prevented from moving to their sensing position.

Energization of the solenoid L21 at the beginning of a reading operation causes the link 308 to be shifted to the right against the force of the spring 307, thus rocking the lever 416 clockwise about its pivot and moving the stud 417 out of blocking relation to the surface 418. The arm 414 is thereby permitted to rock counter-clockwise about the rod under the influence of the spring 415, releasing the pins for sensing movement to sense the identification column of the tag or token being read. At the end of a tag-reading operation, the solenoid L21 is deenergized, which permits the link 308 to be shifted to the left by the force of the spring 307. This rocks the lever 416 counter-clockwise and causes the stud 417 to coact with the surface 418 to return the arm 414 to the position in which it is shown in FIG. 31, thereby moving the sensing pins controlled by it to their retracted position.

Supported and guided for longitudinal movement in the cross bar 317 adjacent each of the dods 411 is a companion rod 419 (FIGS. 9 and 27), having a tip 420, of non-conducting material. Each of the rods 419 is urged to the left, as viewed in FIG. 27, by the cooperation of a spring 421 with the tip 420 at the end of the rod 419. The spring 421 also forms a part of the contact means which may be used for recording an identification symbol or for various other purposes, as will be described subsequently.

Each of the rods 419 is jointly controlled by its companion rod 411 and by a cam arm 422 (FIGS. 9 and 21), identical in shape with the cam arms 342 and co-operating with the cam 357 on the cam shaft 359 (FIG. 21). A cut-out portion 423 (FIGS. 8 and 9) is provided on each of the rods 411 and cooperates with a cut-out portion 424 on the corresponding one of the rods 419. The rids 411 and 419 are so positioned in the cross bar 317 that comunication between the cut-out portions 423 and 424 is furnished by a bore 425, in which rides a ball 426 of a diameter larger than the length of the bore. An extension 427 of the bore 425 facilitates placement of the ball 426 in the bore 425 during assembly.

It will be seen that, so long as the rod 411 remains in the retracted position, in which it is shown in FIG. 9, its cut-out portion 423 is not directly opposite the bore 425, and the ball 426 will, therefore, protrude from said bore into the cut-out portion 424 of the rod 419 and retain said rod against movement to the left, as viewed in FIG. 9.

Full sensing movement to the left, as viewed in FIG. 9, of any of the rods 411 whose sensing pin 171 passes through a perforation in the identification section of the tag or token being read positions the cut-out portion 423 of said rod 411 directly opposite the bore 425 in the bar 317. Then, at a predetermined time in the tag-reading operation, when the arm 422 is permitted to move to the left, as viewed in FIG. 9, by its cam 357 on the cam shaft 359, the rod 419 will be shifted to the left by its spring 421 (FIG. 28). With the cut-out portion 423 directly opposite the bore 425, the ball 426 does not retain the rod 419 against movement, since said ball may be cammed by a surface on the cut-out portion 424 out of its blocking position and into the space provided by the cut-out portion 423. The rod 419 is thus permitted to move to the left, as viewed in FIG. 9, under the influence of its spring 413. The arm 422 and the rod 419 are subsequently caused to return to the position in which they are shown in FIG. 9 by continued rotation of the cam 357, which controls the arm 422.

The contact means for the identification section of the sensing means is shown in FIGS. 7A, 27, and 28 and is mounted in the same framework as the contact means for the data-representing section but is electrically isolated therefrom. Those portions of the input buses 327 to 331 inclusive and the output buses 337 to 341 inclusive which lie opposite the rods 411 and 419 are reduced in cross-sectional area, as shown in FIGS. 27 and 28. Positioned on the reduced portion of each of the output buses 337 to 341 inclusive is a sleeve 428 of insulating material, having a lip 429 at its end adjacent the shoulder on each of the input buses between the reduced and the non-reduced portions. A first common plate 430 is mounted on the sleeves 428 of the three buses 337, 338, and 339 adjacent the lip, and a second common plate 431 is mounted on the sleeves 428 of the two buses 340 and 341 adjacent the lip 429. A grooved collar 432 is mounted on each of said sleeves 428 next to and in electrical contact with the plates 430 and 431. Adjacent the collar 432 are placed two insulating washers 433 and 434 to electrically isolate the collar 432 from a second grooved collar 435, mounted on each of the sleeves 428. On the opposite side of the collars 435 and in electrical contact therewith are another common plate 436, identical in shape with the plate 430, mounted on the sleeves of the buses 337, 338, and 339, and another common plate 437, identical in shape with the plate 431 and mounted on the sleeves of the buses 340 and 341. Spacing members 438 and 439 retain the various elements mounted on each of the sleeves 428 in proper spaced relationship to the end frame 322. The common plates 430 and 431 are electrically connected together to form an input bus for the collars 432, and the common plates 436 and 437 are electrically connected together to form an input bus for the collars 435.

Positioned on the reduced portion of each of the buses 327 to 331 inclusive is a sleeve 440, of insulating material. The springs 413 and 421 for each of the five sensing rods 411 and the five companion rods 419, respectively, are mounted on the sleeves 440 and are spaced apart by the insulating washers 441, one of which is positioned on each sleeve 440 between two of the springs 413 and 421, and the other of which is positioned between the spring 421 and the spring 321 for the endmost data-sensing column.

Each of the springs 413 and 421 is provided at one end with a hook formation for engagement with a corresponding slot in the insulating tips 412 and 420 attached to each of the rods 411 and 419. The central portions of the springs 413 and 421 are coiled about the sleeves 440, and the other ends of said springs extend through apertures 442 (FIGS. 7A and 27) in laminated plates 443 and 444 and are bent to form output terminals 445 for connection to the recording system circuit, as will be completely described in the explanation of the circuit diagram, FIGS. 73A to 73F inclusive.

In the normal, retracted position of the sensing pins of the identification section, the corresponding rods 411 and 419 will hold the springs 413 and 421, respectively, out of engagement with the collars 435 and 432. As the sensing pins of the identification section are released to sense the tag, the sensing pin which is in a position where there is a hole in the tag will be allowed to move to the left, as viewed in FIG. 9, to allow its corresponding spring 413 to engage its collar 435 connected to the input bus 436 and complete a circuit to the output terminal 445 on said spring. The companion rod 419 to the selected rod 411 will move leftward, as viewed in FIG. 9, at a time determined by the setting of the cam which controls the arm 422, which in turn controls the movement of the rod 419. This will allow the corresponding spring 421 (FIG. 28) to engage the collar 432 connected to the input bus 430 and complete a circuit to the output terminal 445 on the spring 421.

The rods 411 and 419 controlled by sensing pins which are in positions where there are no perforations will be prevented from moving to the left and will keep their related springs from engaging their corresponding collars.

*Validation means*

Means are provided in the media reader for embossing each merchandise tag read to denote that the tag and the article to which it is attached have been purchased from the establishment using the recording system.

The embossing is effected by small prongs 451, fixed to the face of a validating hammer 452 (FIGS. 29 and 30), which is supported and guided for longitudinal movement in the cross bar 202. An aperture in the rear guide plate 132 of the tag chute 130 permits movement of the hammer 452 through said plate for the embossing of a tag positioned in the tag chute. A backing plug 453, of nylon or other suitable material, is set into the clamping block 181 opposite the hammer to act as a stop for movement of said hammer.

Movement is imparted to the hammer 452 through an extension 454, to which said hammer is pivotally connected and which is slidably supported in a slot in a two-part member 455, supported on the cross bar 320 by means of bolts 456. Sleeves 457 on the bolts hold the member 455 spaced from the bar 320.

A surface 458 on the extension 454 is positioned for cooperation with a corresponding surface 459 on an arm 460, mounted on the cross rod 345 and having a surface 461 and a roller 462 thereon. The arm 460 is urged counter-clockwise, as viewed in FIG. 29, by a spring 463 connected to said arm and to the comb plate 346 (FIG. 6) to normally maintain the surface 461 (FIG. 29) and the roller 462 in contact with the corresponding surfaces of two members 464 and 465 secured together to form the cam 358 fixed to the shaft 359. The members 464 and 465 are connected for unitary movement by the shaft 359 and by the rod 469, the member 465 being pinned to the shaft 359 and performing the function of one of the arms 402, as well as a camming function.

The arm 460 is cut away opposite the disabling bar 343, so as to provide clearance for said arm in making its normal hammer-actuating movement to the left, as viewed in FIG. 29. However, under certain circumstances, the bar 343 may act as a stop for said arm, as will be described subsequently.

A rearwardly-extending offset finger 467 on the extension 454 has, at its end, a bent-over ear 468 to coact with a surface 469 on the arm 460.

At a predetermined point in a reading operation, the surface of the cam member 465 will move clockwise past the edge of the surface 461 of the arm 460, thereby permitting said arm to move abruptly to the left, as viewed in FIG. 29, under the influence of the spring 463. Such movement causes the surface 459 on the arm 460 to strike the surface 458 on the extension 454 and to carry said extension and the hammer 452, attached thereto, to the left with the arm 460, thus causing the prongs 451 on the hammer 452 to emboss an appropriate mark on the merchandise tag being read. It will be recalled that clerk tokens and customer tokens are cut away opposite the hammer 452 and therefore will not be embossed. In either event, the plug 453 in the clamping block 181 acts as a stop to halt movement of the hammer 452, the extension 454, and the arm 460 to the left, as viewed in FIG. 29. If, for any reason, the validating means should be caused to operate at a time when the clamping block 181 is in its retracted position rather than the position in which it is shown in FIG. 6, as, for example, during a resetting of the cam line, the plug 453 would not be positioned to act as a stop for the hammer 452, the extension 454, and the arm 460. In such a case, a surface 470 of the arm 460 would strike the disabling bar 343 to stop movement of the arm 460 to the left, and the ear 468 of the extension 454 would cooperate with the surface 469 on said arm to limit movement of the extension 454 and the hammer 452 to the left.

Following an embossing operation, the arm 460 is shifted to the position in which it is shown in FIG. 29 by cooperation of the roller 462 on said arm with the periphery of the cam member 464. The surface 469 on the arm 460 coacts with the ear 468 on the extension 454 to shift said extension and the hammer 452 to the right with the arm 460.

Means are provided to lock the validating means against operation. Mounted on the side frame 210 by means of bolts 471 (FIGS. 7B and 29) is a lock housing 472. A lock cylinder 473 is rotatably mounted in said housing and has fixed thereto an eccentric 474. An arm 475 is provided with a surface 476, which is positioned to coact with the eccentric 474. Said arm 475 is pinned to a shaft 477, which extends through a hole in the auxiliary frame member 324 and is mounted in a bracket 478, secured to the upper surface of the cross bar 317. Also fixed to the shaft 477 is the arm 235, having connected thereto at its free end the spring 234, which, it will be recalled, is connected at its other end to the arm 233 (FIG. 16). A further arm, 479, is secured to the shaft 477 near the bracket 478 and is slotted at its free end to receive a stud 480, mounted on an ear 481 of a detent 482, which is mounted for sliding movement in a slotted portion 483 of the bracket 478. The lower end of the detent 482 is curved to coact, in a certain position, with a shoulder 484 on the upper end of the arm 460 to prevent movement of said arm to the left, as viewed in FIG. 29.

A key 485 (FIG. 7B), which will turn the lock cylinder, is provided and will normally be retained by a person supervising the operation of the recording system. By turning the lock cylinder in one direction or the other, it is possible selectively to lock or to unlock the validating means.

It will be seen that, with the lock cylinder 473 in the position in which it is shown in FIG. 29, the lower end of the detent 482 is out of the path of movement of the shoulder 484 of the arm 460, and the validating means is therefore not locked against operation.

To lock the validating means, the key 485 is inserted into the lock cylinder 473, and the two are turned one hundred and eighy degrees in either direction, depending upon the design of the lock cylinder and housing. This causes the eccentric 474, which is fixed to the cylinder 473, to rock the arms 475, 235, and 479 and the shaft 477, to which said arms are fixed, counter-clockwise, as viewed in FIG. 29, against the force of the spring 234. The edge of the slot in the arm 479 coacts with the stud 480 to shift the detent 482 downwardly to position its lower end in the path of movement of the shoulder 484 of the arm 460 to prevent movement of said arm under the influence of the spring 463, which would otherwise take place when the shoulder on the cam member 464 passed out from under the surface 461 on the arm 460.

To unlock the validation means, it is simply necessary to turn the key 485 in a direction opposite to that in which it was turned to lock said means, which causes an operation the reverse of that described above to take place.

*Manual tag ejecting and switching means*

Manually-operable means are provided for ejecting a tag, token, or other record member which has erroneously been inserted into the tag chute to the right of the reading section, as viewed in FIGS. 7A and 7B. Anything thus inserted will slip past the reading section and the tag stop means associated with the reading section, to a position in which it is inaccessible to the operator. The mechanism being described is provided to enable the removal of such a tag, token, or other member from the tag chute. In addition, the manually-operable means control certain electrical contacts, which in turn control tag release and homing functions of the media reader, as will be described subsequently.

A depressible key or push button 490 (FIGS. 1, 24, and 26) is slidably mounted on the auxiliary side frame member 324 by means of studs 491 and 492, fixed in said member 324, which cooperate with vertically-elongated slots in the stem 493 of the key 490. The key 490 is normally urged to an undepressed position by a spring 494, which is connected between the stud 491 and a stud 495, fixed to an extension 496 of the stem 493 of said key. Fixed in the stem 493 is a long stud 497, which is free to move in a cut-out portion 498 (FIG. 23) of the frame member 324. The stud 497 extends through holes in an arm 499 and a bail 500, both of which are pivoted on a shaft 501, fixed in the right side frame 210.

The bail 500 has two studs 502 (FIGS. 24, 25, and 26) fixed thereto, which studs extends into the tag chute 130. Loosely mounted on said studs, by means of holes therein which cooperate with the studs, is an ejecting plate 503 (FIGS. 25 and 26), which is positioned within the tag chute. Depression of the key 490 will cause the stud 497, secured thereto, to rock the bail 500 counter-clockwise, as viewed in FIG. 26, and thereby shift the ejecting plate 503 upwardly in the tag chute 130. Any tag, token, or other record member which has been dropped into the tag chute 130 and which is positioned above the ejecting plate 503 will therefore be shifted upwardly to a position in which it may be readily grasped by the operator and removed from the tag chute.

Means are provided to prevent depression of the key 490 during a reading operation of the media reader, since a tag or other member being held in reading position by the alining and clamping means may extend over above the ejecting plate 503, so that upward movement of said plate during a reading operation might cause damage to the media reader or to the tag or other member, or both.

Fixed on the lever 214 (FIG. 16) is a stud 504, which is positioned for coaction with a surface 505 on the arm 499. It will be recalled that the lever 214 is moved in response to energization and deenergization of the solenoid L20. Energization of the solenoid L20 postitions the stud 504 in the path of movement of the surface 505 on the arm 499 to block upward movement (FIG. 16) of said arm. This prevents depression of the key 490 by blocking the stud 497 on the stem 493 of said key against downward movement (FIGS. 24 and 26). Deenergization of the solenoid L20 permits the spring 239 to shift the lever 214 clockwise about the axis of the shaft 215 and thereby move the stud 504 out of blocking relation to the surface 505 of the arm 499 to permit depression of the key 490.

A bracket 506 (FIGS. 7B and 24) is secured to the bar 289 and has fixed thereto a pair of snap-action switches comprising the contacts SP24a2 and SP24b1, respectively. The actuating members of these switches are held in retracted position by a flat end surface 507 on the key stem 493 when the key 490 is not depressed. Depression of the key 490 shifts the surface 507 downwardly (FIG. 24), thereby permitting the actuating members of said switches to move outwardly to open the contacts SP24b1 and close the contacts SP24a2. The key 490, upon being released by the operator, is urged upwardly to its undepressed position by the spring 494, thereby causing the surface 507 to coact with the actuating members of said switches to close the contacts SP24b1 and open the contacts SP24a2. The functions performed by the contacts SP24a2 and SP24b1 will be fully explained when the circuit diagram of FIGS. 73A to 73F inclusive is described.

*Selector switch unit*

Means for controlling the sequence of operation of the recording system are mounted in a unit which is carried in the media reader and which may readily be removed from the media reader for replacement by another similar means, which will control the recording system for a different sequence of operation.

A base 510 (FIGS. 6, 32, and 37) supports the components of the selector switch unit. In operative position, the base 510 rests upon the base plate 511 (FIG. 6) of the media reader. Positioning studs 512 in the base plate 511 cooperate with fingers 513 on the base 510 to insure correct placement of the base 510 on the base plate 511, and a screw 514, cooperating with a slot 515 in the base 510 and threadedly engaging the base plate 511, secures the base in its proper position. The various leads from the electrical components on the base 510 are fixed to terminals of two plugs 516, mounted on a bracket 517, secured to the base. Said plugs are arranged to engage mating plugs 516A, fixed to the media reader framework, to complete electrical connections between the components of the selector switch unit and the remainder of the recording system.

One of the components of the selector switch unit is a multiple-position, multiple-level selector switch 518. This switch is mounted between a flange 519 (FIG. 32), bent upwardly from the base 510, and a vertical portion 520 of a bracket 521, secured to the base 510. The selector switch comprises a plurality of sets of wafers and a plurality of rotatable wipers, one wiper cooperating with each set of wafers. Each set of wafers comprises a first wafer 522 (FIG. 35) and a second wafer 523 (FIG. 36). The first wafer 522 comprises a ring of non-conducting material, having four common sectors 524 mounted therein, each sector having a terminal 525 extending outwardly of the outer surface of the ring. Two diametrically-opposed ears 526 are formed on the ring, each ear having therein a bore to receive a bolt 527 for securing the switch in assembled relation and mounting it between the flange 519 and the bracket 521.

Each of the wafers 523 comprises a ring of non-conducting material, in which are mounted twelve equally-spaced short sectors 528 of conducting material, each sector having a terminal 529 extending outwardly from the outer surface of the ring. Two diametrically-opposed ears 530, having therein bores for the reception of the bolts 527, are provided on the ring.

The wipers 531 (FIGS. 33 and 34) are positioned between the wafers 522 and 523. Each wiper 531 includes a hub 532 fixed on a shaft 533 for rotation therewith. Attached to the hub 532 and spaced ninety degrees from each other are four sets of wiper blades 534, each set consisting of two wiper blades, the ends of which are curved in opposite directions, so that one of said wiper blades will coact with the conducting sectors 524 of one of the wafers 522, while the other blade 534 of the set will coact with the sectors 528 of the wafer 523. The shaft 533, on which all of the wipers 531 are mounted, is journaled in the vertical portion 520 of the bracket 521 and in the flange 519. The wafers 522 and 523 are mounted in their proper assembled relationship on the flange 519 and the vertical portion 520 of the bracket 521 by means of the bolts 527 and are spaced from the flange 519 by means of sleeves 535 on the bolts 527.

The shaft 533 extends through the vertical portion of the bracket 521, and a ratchet 536 (FIGS. 32 and 37) is mounted on its end. A pawl 537, having a tooth 538 for coaction with the teeth of the ratchet 536, is provided for shifting said ratchet step by step to rotate the shaft 533 and the wipers 531, fixed thereto, relative to the assembled sets of wafers 522 and 523. Secured to the bracket 521 is a solenoid SS20, of the rotary type, having an armature 539, in which is fixed a pin 540, which cooperates with a slot 541 in the pawl 537. The slot 541 is slightly longer than the pin 540 to permit some lost motion between the two.

Mounted adjacent the solenoid SS20 by means of a bracket 562 secured to the base 510 are a pair of snap-action switches comprising the contacts SS20b14, SS20ac13, and SS20bc13. These switches are controlled by a blade 563, operated by the solenoid SS20, through a member 564, which has an in-and-out movement during energization and deenergization of said solenoid.

Pivotally mounted on the vertical portion 520 of the bracket 521 by a stud 542 is an arm 543, having a roller 544 mounted at one end for cooperation with a curved stop surface 545 on the pawl 537. A limited extent of movement may be given to the arm 543 for precise positioning of the roller 544 with respect to the surface 545 on the pawl 537 by adjustment of an eccentric 546 mounted in the vertical portion 520 of the bracket 521 and cooperating with a slot 547 in said arm. A spring 549 is connected at one end to a stud 550, fixed to the eccentric 546, and at the other end to a stud 551, extending between two ears on the pawl 537, and urges the surface 545 of said pawl against the roller 544. Connected between the stud 551 and the armature pin 540 is a second spring 552, which urges the armature pin 540 to bear against the left edge of the slot 541, as viewed in FIG. 37.

A blade 553, fixed to a support 554, cooperates with the teeth of the ratchet 536 to prevent retrograde movement of said ratchet. The support 554 is adjustably mounted on the vertical portion 520 of the bracket 521 by means of bolts 555 on the support, which ride in a horizontal slot 556 in the vertical portion of the bracket 521.

Energization of the solenoid SS20 causes the pin 540 to move to the right, as viewed in FIG. 37. The pin 540, after traversing the slot 541, coacts with the right edge of said slot to shift the pawl 537 to the right against the force of the spring 549, thereby moving the tooth 538 on said pawl past one of the ratchet teeth, said ratchet being held by the blade 553 against clockwise or retrograde movement. When the solenoid SS20 is subsequently de-energized, the pawl 537 is shifted back to the left by the spring 549, and the tooth 538 on said pawl cooperates with a tooth on the ratchet 536 to step said ratchet one step in a counter-clockwise direction of movement, as viewed in FIG. 37. In the same manner, each energization and subsequent de-energization of the solenoid SS20 is effective to step the ratchet 536 one step in a counter-clockwise direction.

It will be seen, from an examination of FIGS. 35 and 36, that each set of wafers 522 and 523, together with the corresponding wiper 531, comprises four levels or sets of contacts on the selector switch. Each of the four sections on the wafer 522 constitutes a common for one of the levels, while each of the twelve short sectors 528 on the wafer 523 constitutes one of three positions of each level. Each of the sets of wiper blades 534 on the wiper, therefore, conducts current from a common sector on a wafer 522 to one of the position sectors on the wafer 523, and, as the selector switch is stepped, the wiper blades 534 advance, so that the wiper blade which is in contact with the position sectors 528 of the wafer 523 advances from one sector to the next. As each set of wiper blades advances, it steps through one level and then onto the first position sector 528 of an adjacent level, while a following set of wiper blades 534 steps to the No. 1 position of said one level. Therefore, the effect is that in each level an electrical circuit is completed successively to position No. 1, then position No. 2, position No. 3, position No. 1, etc. In the illustrated embodiment, the selector switch contains three sets of wafers 522 and 523, with four levels in each set, for a total of twelve levels. It is obvious, however, that a switch of this type might contain a different number of levels or a different number of positions in each level, if desired.

Also mounted on the base 510 is a relay K20, having a plurality of sets of contacts K20bd1, K20a2, K20ad1, K20bd1, K20ac12, K20bc12, and K20ad11, which are arranged to be opened or closed by energization or de-energization of said relay.

The manner in which the various electrical contacts controlled by the mechanism of the selector switch unit function in the operation of the recording system will be fully explained when the circuit diagram of FIGS. 73A to 73F inclusive is described.

A cover 557 is provided for the selector switch unit to protect said unit against possible damage. The cover rests upon a gasket 558, fastened to the base 510, and is secured in place by a first bolt 559, threadedly engaging the upper end of a post 560, secured to the base 510, and by a second bolt 561, threadedly engaging the bracket 517.

*Plug connecting means*

Detachable means are provided for electrically connecting the media reader to the other components of the recording system and are best shown in FIGS. 38 to 42 inclusive.

The various electrical circuits physically located in the media reader have terminal connections in a plug 570, located at one end of the reader. A mating plug 571, at the end of a cable 572 extending to the cash register, is provided for cooperation with the plug 570 to connect the media reader circuits into the circuitry of the recording system.

The plug 570 is resiliently mounted by means of bolts 573 and springs 574 to a bracket 575 fixed to the media reader base 511. Also fixed to the base 511 is a support 576 having a pair of horizontal slots 577, one in each of its upturned sides.

A toggle-type linkage is mounted on each of the two sides, comprising a first link 578, pivotally mounted on the outside surface of each side and pivotally connected by a stud 579 to a second link 580, also mounted on the outside of each side. The other end of each link 580 has mounted therein a stud 581, which rides in the slot 577. The stud 581 also extends through one end of a third link 582, positioned on the outside of the side of the support 576 and having at its other end another stud 583, also riding in the slot 577. The studs 581 and 583 extend through the slot 577 and at the inside of each side of the support 576 are secured to a block 584, whereby the blocks 584 on each side will be shifted horizontally in response to movement of the linkage comprising the links 578, 580, and 582.

Pivoted to an extension 585 of each side of the support 576 is a lever 586. A link 587 is pivotally connected at one end to the lever 586 and at its other end to the stud 579. The lever 586 has fixed to its free end a plate 588, which forms a movable part of the media reader housing to permit access to the mating plugs 570 and 571 for connection and disconnection thereof. A recessed portion 589 of the plate 588 provides a finger hold to facilitate movement of said plate. The cable 572 extends through an aperture in this recessed portion.

The two sliding blocks 584 are provided with oppositely-alined grooves 590 to receive the peripheral flange 591 of a plug holder 592, to which the plug 571, connected to the cable 572, is mounted by means of bolts 593. A clamp 594 is fixed to the upper and lower surfaces of the holder 592 for retaining said holder and the cable 572 in proper relationship. A pair of locating blocks 595 are fixed to the inside surfaces of the sides of the support 576 to facilitate proper insertion of the plug 571 and the holder 592, and to prevent removal of said plug unless it has first been completely disconnected from its mating plug 570.

When it is desired to insert the plug 571 into the media reader for connection with the plug 570 to connect the media reader electrically with the rest of the recording system, the plate 588 is grasped by means of the recessed finger hold 589 and is shifted counter-clockwise, as viewed in FIGS. 38 to 41 inclusive, to the full extent of its movement; the lever 586 is thus shifted from the position in which it is shown in FIGS. 38 and 39 to the position in which it is shown in FIGS. 40 and 41. This movement is transmitted to the stud 579 by means of the link 587 and is effective to break the toggle linkage comprising the links 578 and 580 thereby shifting the stud 581 to the right in the slot 577. The link 582 and the block 584, which are mounted on said stud, consequently are shifted to the right, as is the second stud 583 extending between said link 582 and said block 584. The extent of rightward movement of the stud 581, the link 582, the block 584, and the stud 583 is determined by the stud 583 in coming into contact with the right end of the slot 577. It will be seen that this also determines the permissible extent of movement of the lever 586 and the plate 588. As may be seen in FIGS. 40 and 41, when the plate 588 and the lever 586 have been shifted to the full extent permissible of counter-clockwise movement, the grooves 590 on the blocks 584 are shifted to a point slightly to the right of a vertical line extending along the right edge 596 of the blocks 595, thus permitting insertion of the holder 592 with its attached plug 571. It will be seen that, if the plate 588 is given less than the full extent of its movement, the holder 592 cannot be inserted, since the flange 591 of said holder will be prevented by the blocks 595 from sliding into the grooves 590 of the blocks 584. This prevents damage to the connecting elements of the plugs 571 and 570, which might otherwise take place if the holder 592 were inserted without there being proper clearance between the plugs 570 and 571.

Once the holder 592 has been inserted so that its flange 591 is properly engaged in the grooves 590 of the blocks 584, and has been shifted vertically downward as far as it will go, the plate 588 may be rocked back to the position in which it is shown in FIG. 38 to cause the plug 571 to be shifted from the position in which it is shown in FIG. 41 to the position in which it is shown in FIGS. 39 and 42 and in which it is in effective contact with the plug 570. Movement of the plate 588 and the lever 586 from the position shown in FIGS. 38 and 39 in a clockwise direction is effective through the link 587 to cause the toggle comprising the links 578 and 580 to straighten, thereby causing the stud 581 to move to the left in the slot 577, as viewed in FIG. 40, which causes the plug 571 to be shifted to the left into mating engagement with the plug 570. The vertical surfaces 596 on the locating blocks 595 prevent movement of the holder 592 with its plug 571 to the left unless said holder has been shifted substantially all the way downwardly in the grooves 590 of the blocks 584. In the event that the holder 592 lacks only a short distance of completion of its downward movement in the grooves 590, a camming surface 597 on the lower portions of the vertical edges 596 of the locating blocks 595 will coact with the upper edge of said holder to cam it downwardly into fully-seated position in the grooves 590 for proper alinement of the plugs 570 and 571.

It will be seen that, to remove the plug 571 from its engaged position in the media reader, a procedure which is the reverse of that described above is followed. The plate 588 is first moved counter-clockwise to disengage the plug 571 from the plug 570 and to position it where the holder 592 may be readily lifted out of the grooves 590 in the blocks 584. The plate 588 may then be left in its open position or may be closed to the position shown in FIG. 38 if desired.

RECORDER

The novel recorder is shown in FIGS. 1 and 43 to 46 inclusive and is operable to punch the tape to record data under control of program control means in the recorder, under control of the media reader, and under control of the cash resgister.

The recorder can in turn control the operation of the media reader and the cash register so that they will exert their controls at the proper time. Inter-controls between the recorder, the media reader, and the cash register prevent the sending of further data to the recorder, if the recorder has not recorded data previously sent thereto.

As shown most clearly in FIG. 43, the recorder includes a punching mechanism 600; a motor 601, for driving the punching mechanism; a capacitor 599, cooperating with the motor; a clutch 602, for connecting the motor to the punching mechanism; a tape-supporting arbor 603, on which a supply of tape can be mounted; a take-up reel 604, on which the punched tape can be wound as it is punched; a control relay section 605, which houses control relays used to coordinate the operation of the cash register, the media reader, and the recorder; a diode encoding unit 609; and a programming means 606, including a stepping switch and plugboard for providing the various programs or punching sequences necessary to coordinate the recording of data in proper sequence on the tape under control of the media reader and the cash register.

The recorder is provided with two receptacles 607 and 608, into which plug connectors on cables, which connect the recorder to the cash register and to the media reader, can be inserted.

A Leader Advance push button PB1, which is provided at the front of the recorder, is effective, when operated, to cause the recorder to operate and perforate the tape with the Leader Advance pattern of perforation. The manner in which the Leader Advance push button PB1 controls the operation of the recorder will be fully explained when the circuit diagram of FIGS. 73A to 73F inclusive is described.

Punching mechanism

The punching mechanism, which is shown in FIGS. 43 and 44, is a tape-punching mechanism of the type shown in the United States patent to Francis E. Hamilton et al., No. 2,540,029, issued January 30, 1951.

The punching mechanism includes nine punches 610, for punching the rows of perforations across the tape, one for each of the eight channels on the tape, which are used in combinations to encode data, and one for punching the feed holes.

FIG. 5 shows a fragment of the tape in which an End-of-Frame symbol and the digits "0" to "9" have been perforated, and in which a Leader Advance portion has been punched.

The End-of-Frame symbol is used to indicate the end of the information pertaining to a particular sale of an article or articles of merchandise in order to separate the various bits of information carried by the tape. The symbols and numbers above the tape in FIG. 5 correspond to the data punched on the tape, and the numbers at the side of the tape identify the channels across the tape.

Each operation of the punching apparatus, whether punching data or a Leader Advance pattern on the tape, causes a feed hole to be perforated in the tape. These feed holes assist in the feeding of the tape through the punching apparatus and also through the sensing means, which analyzes the tape.

The manner in which the punches are selected and operated will now be explained with reference to FIG. 44. Each punch 610 is pivotally connected to the right end of an actuating lever 611, which is pivoted intermediate its ends on a rod 612 in an actuating frame 613. The right ends of the levers 611 are guided in a comb plate 614 and are urged downwardly by springs 615.

The actuating frame 613 is pivoted at 616 and has rollers 617, which engage cams on a cam shaft 618, to rock the actuating frame 613 counter-clockwise from home position and then back to home position to raise and lower the rod 612, upon which the actuating levers 611 are pivoted.

The effectiveness of the actuating levers to operate the punches is controlled by a plurality of magnetically controlled punch selecting levers 619, which are pivoted on a rod 620, carried by a bracket 621, and which are urged clockwise by springs 622.

The selecting levers 619 are normally retained in their retracted or non-effective position, as shown in FIG. 44, by notches in the armatures 623 of punch-selecting magnets PS1 to PS8. When the lever is in its retracted position, it is out of engagement with the left end of the actuating lever 611, and this end is free to rise when the frame 613 raises the rod 612, causing the actuating lever 611 to pivot about its right end, the right end of the actuating lever being loaded by the spring 615. In this operation, the punch 610 will not be operated to punch the tape.

When a punch-selecting magnet PS1 to PS8 inclusive is energized, it moves its armature 623 away from the punch-selecting lever 619, freeing the lever 619 for clockwise movement by the spring 622 until the end of the selecting lever engages over the left end of the actuating lever 611 to prevent the left end from rising when the actuating frame 613 raises the rod 612. Since the left end of the actuating lever is positively held by the punch-selecting lever against upward movement, the spring 615 will yield when the frame 613 is rocked, and the right end of the actuating lever 611 and the punch 610 will be forced upwardly to perforate the tape. One or more punch-selecting magnets may be energized in each punching operation, according to the encoding of the symbol or numeral being punched.

Each of the selecting levers 619 has a forwardly-extending portion 625, with which a locking plate 626 can engage. The plate 626 is carried by a lever 627, which is pivoted on a rod 628 and is operated by a cam on the shaft 618 to lock the levers from 45 degrees to 185 degrees of the operation of the cam shaft 618, the actual punching portion of the operation of the punching mechanism. When operated, the plate 626 engages the forwardly-extending portions 625 of the selecting levers to lock those levers in normal position which have not been released by the punch selector magnets, and to lock those levers in moved position which have been released to select their related punches for operation.

The forwardly-extending portions 625 of those levers which have been released and have rocked downwardly will engage a restoring plate 629. The plate 629 is pivoted on the rod 620 and is rocked counter-clockwise by a cam-actuated arm 630 near the end of the punch operation. In order to insure that the selecting levers will be properly restored to the control of the punch-selecting magnets PS1 to PS8 inclusive, the restoring plate 629 provides a slight overthrow movement to the levers, and one of the levers engages a flange 631 on one arm of a bail 632 to rock the bail clockwise, which bail forces all the armatures away from the magnets and into engaging relation with the selecting levers.

Since a feed hole is punched during each operation of the machine, regardless of the selection of punches by the magnets, the punch-activating lever for the feed hole punch has its left end blocked against upward movement at all times. An arm 633, which is secured to the bracket 621, extends over the end of the actuating lever to cause the lever to force the punch upwardly during each operation of the punching apparatus.

The driving means for the punching mechanism is shown in FIG. 43. The motor 601, which is constantly rotating whenever the recorder is operable, is connected by gears 635 and 636 to the input of the clutch 602, which, when tripped, will connect the drive to the cam shaft 618 of the punching mechanism to cause the cam shaft to make one revolution. Punch clutch trip magnets L9A, L9B are provided and, when energized, will remove a block 637 from a projection 638 on the clutch to allow the clutch to operate to drive the punching mechanism.

The punch clutch trip magnets L9A and L9B are energized each time one or more of the punch-selecting levers 619 is released. A bail 639 (FIG. 44) extends across the selecting levers 619 and is carried by a pair of arms 640, pivoted on the rod 620. One of the arms is formed with an extension 641, which is connected by a link 642 to operate contacts SC3a1. When any one of the punch-selecting levers 619 is rocked, upon its release by its related armature 623, it will rock the bail clockwise to close the contacts SC3a1. This will energize the clutch trip magnets L9A and L9B to render the clutch effective to connect the motor to the cam shaft 618 to drive it through one revolution.

The tape-feeding pin wheel 643 (FIG. 43) is mounted on a shaft 644 (FIG. 44) and has, in its periphery, pins which engage the feed holes in the tape to advance the tape after it is punched, the pin wheel being driven by a pawl-and-ratchet drive from a lever 645 (FIG. 44), which is rocked by a cam on the cam shaft 618. A detent wheel 646, also mounted on the shaft 644, cooperates with a roller 647 on a lever 648 to accurately position the pin wheel 643.

An extension 650 on the locking plate actuating lever 627 is connected by a link 651 to the contacts SC2b1. At ninety degrees in the operation of the punching mechanism, when the locking plate 626 is rocked to lock the selecting levers 619 in position, the contacts SC2b1 will be opened. These contacts will remain in this condition until 185 degrees of the operation of the punching mechanism, when the lever 627 is rocked to unlock the punch-selecting levers, at which time the contacts SC2b1 will be closed. The controls exerted by the contacts SC2b1 will be explained fully when the circuit diagram of FIGS. 73A to 73F inclusive is explained.

The particles of tape which are removed from the tape as perforations are made are guided by a chute 652 to a drawer (not shown), which can readily be removed from the recorder.

*Tape-handling means*

The various means for handling the tape in the recorder are shown in FIGS. 43, 44, and 46.

The tape-supporting arbor 603 is rotatably mounted on a shaft 654, secured in the side frame 655 of the recorder, and is approximately the same size as the inside diameter of the core 656 of a roll of tape 657. Spurs 658 are provided on the arbor 603 to retain the core 656 in fixed relation thereto.

A lever 659 (FIG. 46), fixed on a stud 660 pivotally mounted in the recorder side frame 655, is urged counter-clockwise by a spring 661 to maintain a roller 662, on the end of the lever 659, in contact with the roll of tape 657 on the arbor 603. The roller 662 comprises a plurality of sections 663 (FIG. 43) of different lengths, and a retaining member 664 at the end. Use of desired ones of the different sections enables the effective length of the roller 662 to be changed, so that the roller and its retaining member 664 will serve to coact with tape rolls of different thicknesses to retain the tape rolls in proper position. The roller 662, under influence of the spring 661, also provides a frictional drag on the tape roll 657 to maintain the proper tension thereon as tape is supplied from said tape roll to the punching mechanism. The roller 662 will descend as the diameter of the roll of tape on the core 656 decreases, allowing the lever 659 to rock counter-clockwise until, when the roller 662 reaches the position shown in dot-and-dash lines in FIG. 46, the end surface of an adjusting screw 665, mounted in a bracket 666, fixed to the stud 660 on the other side of the frame 655 from the lever 659, closes the contacts SC5bc1 of a snap-action switch 667, mounted by means of a bracket 668 on the side frame 655. Provision of the adjusting screw 665 enables a fine adjustment to be made of the exact point at which the contacts SC5bc1 will be closed. The contacts SC5bc1 close a circuit to a signal light 674 (FIG. 73B) on the cash register, to provide a warning signal to the operator to indicate that the tape supply is low.

Means are provided for automatically lifting the roller 662 on the lever 659 off of the tape supply roll 657 whenever the cover 669 (FIG. 1) of the recorder 100 is lifted, to facilitate replacement of the tape supply roll 657. Attached to the cover of the recorder is a two-part pivoted brace 670, the lower part of which is pivotally mounted on the recorder side frame 655 by a stud 671. A camming surface 672 on the lower part of the brace 670 is arranged to coact with a roller 673 on the lever 659 in such a manner that, whenever the cover of the recorder is raised, the consequent counter-clockwise movement of the lower part of the brace 670, as viewed in FIG. 46, will cause the camming surface 672 to coact with the roller 673 to rock the lever 659 clockwise, thereby lifting the roller 662 up from the surface of the tape supply roll 657. The roller 662 will be held in its elevated position so long as the recorder cover 669 remains in its raised position, thus facilitating replacement of the tape supply roll 657.

The tape is guided from the bottom of the supply roll 657, under a guide plate 676 (FIG. 43), over a roller 677 (FIGS. 43 and 44) on a tension control lever 678, under a tape feeler 679, through the punching section of the punching mechanism, over the pin wheel 643, under a cooperating pressure plate 680, and around a guide 681, to the take-up reel 604.

The tension control lever 678, the tape feeler 679, and the pressure plate 680 cooperate to open contacts SC1b1 in the circuit to the punch clutch trip magnets L9A and L9B to prevent an operation of the punching mechanism under the following conditions, which would contribute to an improper punching of the tape.

The tape feeler 679 is carried by an arm 682, which is pivoted on a stud 683. With a supply of tape in the punching mechanism, the feeler 679 will be supported by the tape; but as soon as the tape breaks, or the end of the tape passes the feeler, the feeler will drop down and rock the arm 682 counter-clockwise (FIG. 44) about the stud 683. The link 684 connects the arm 682 to an arm 685 of a yoke pivoted on a stud 686, the other arm 687 of which yoke is connected by a link 688 to the contacts SC1b1. A spring 689 normally urges the yoke counter-clockwise to maintain the contacts SC1b1 closed. When the arm 682 rocks counter-clockwise, it will pull the link 684 to the right (FIG. 44) and will rock the yoke clockwise to open the contacts SC1b1.

The contacts SC1b1 are also opened when the pressure plate 680 is moved away from the pin wheel 643. The pressure plate 680 is mounted on a lever 690, pivoted on a stud 691. A link 692 is connected to the lever 690 and has a pin-and-slot connection with the arm 682, so that, whenever the lever 690 is rocked to move the pressure plate away from the pin wheel, the link 692 will rock the arm 682 clockwise to raise the feeler 679 above the tape. The clockwise rocking of the arm 682 will pull the link 684 to the right and rock the yoke to open the contacts SC1b1.

A further control of the contacts SC1b1 prevents punching if there is too much tension on the tape, and improper punching might therefore result. The roller 677 is supported in the upper end of the lever 678, which is pivoted on the stud 686 and is formed at its lower end with a yoke 693, which straddles the arm 685. If the feeding of the tape from the storage reel becomes blocked and the feeding of the tape by the pin wheel 643 continues, the tension on the tape will be increased and will shift the roller 677 to the right (FIGS. 43 and 44), rocking the lever 678 clockwise. The yoke 693 will rock the arm 685 and its connecting arm 687 clockwise to open the contacts SC1b1. As soon as the tension has been relieved, the spring 689 will return the arms 687 and 685 and the lever 678 to their normal positions and will allow contacts SC1b1 to reclose.

After the tape has been punched, it passes around the guide plate 681 and around the under side of the take-up reel 604, which reel is slotted at 694 to receive the end of the tape. The take-up reel is mounted on a shaft 695, journaled in the recorder side frame 696, and is yieldably driven by a belt 697, which runs over a pulley 698 on the shaft 695, over a pair of guide pulleys 699, and over a driving pulley 700 on the punching mechanism cam shaft 618, and gives the reel an increment of movement each time the punching mechanism operates. Power is transmitted from the pulley 698 to the shaft 695 by means of a friction drive, so that the take-up reel will be driven with enough force to take up the tape as it is punched, but will slip before applying sufficient force to the tape to pull the tape improperly through the punching mechanism.

The tape, therefore, will be pulled from the supply roll, as needed, by the punching mechanism and will be wound on the reel 604 as it is punched.

Attached to the lever 645 by a rivet 705 and pivoted to rotate about the same center as said lever for movement therewith is an arm 706 having a bent-over ear 707 on its end. Said ear is positioned to coact with a snap-action switch, comprising the contacts SC4a1, as the lever 645 and the arm 706 are rocked during each punching operation. The snap-action switch is mounted on a bracket 709, which is in turn mounted by a pivot (not shown) on the punching mechanism framework. The bracket 709 rests on the flat upper surface of a threaded adjusting rod 710, which extends downwardly from said bracket and is threadedly engaged in a hole in a second bracket 711, fixed to the punching mechanism framework. A lock nut 712 secures the threaded engagement between the rod 710 and the bracket 711, while a tension spring 713, connected between the two brackets 709 and 711, urges the bracket 709 against the flat upper surface of the rod 710. It will be seen that, by adjusting the position of the rod 710 with respect to the bracket 711, it is possible to change the position of the bracket 709 and the snap-action switch mounted thereon, for adjustment of the point of contact of the ear 707 with the switch.

Parity check

Means shown in FIGS. 44 and 72 are provided for checking the operation of the punching mechanism.

Connected to the lower portion of each of the nine punches 610 (FIG. 44) is an operating member 716, slidably mounted in the vertical portion of an L-shaped supporting member 717, which is secured by means of an integral bracket 718 to the punch mechanism framework. On the horizontal portion of the supporting member 717, both above and below said member, are mounted a plurality of stacks 719 of switch blades, one stack for each of the punches 610. The stacks are arranged to provide sets of normally-open and normally-closed contacts.

Each set of contacts includes an elongated blade member 720, the free end of which has an insulated mounting in a slot in an enlarged lower portion 721 of one of the operating members 716. Whenever a punch 610 is shifted upwardly by its actuating lever 611, the corresponding operating member 716 causes the free ends of the elongated blade members 720 connected thereto to be moved upwardly, thereby closing the normally-opened contacts, and opening the normally-closed contacts, of the corresponding stack 719.

Provision of these contacts which are responsive to upward movement of the punches 610 enables checking of the operation of the punching mechanism by means of the circuitry shown in FIG. 72, as will be subsequently explained in the description of the circuit diagrams, FIGS. 73A to 73F inclusive.

Control relay section

The control relay section 605 (FIG. 43) houses the relay rack 723, which supports the control relays K1 and K2, which are shown in the circuit diagram, FIGS. 73A to 73F inclusive. A shielding dust cover 724 surrounds the relays of the relay section.

The relay K3, which interlocks the cash register, the media reader, and the recorder to prevent the cash register from being operated while the media reader and the recorder are operable, is mounted on the recorder base adjacent the capacitor 599.

The D.C. operating power for the control circuits, including the relays K1, K2, and K3, is obtained from the rectifier 598, which is mounted on a supporting platform 725 above the motor 601.

Programming means

The programming means 606 is shown particularly in FIGS. 43 and 45 and includes a stepping switch 726, mounted on a supporting bracket 727, secured to the base of the recorder, and a recorder program unit, made up of a lower program board 733 and an upper program board 734 (FIGS. 43 and 73E), mounted one above the other on a bracket 728, secured to the recorder base.

The stepping switch 726 is an eight-level, twenty-position switch, having a stepping magnet SS1 and the usual wiper driving means, which is operated by the magnet armature 729 and is conditioned when the magnet is energized, and is operated and causes the wipers to be advanced when the magnet is deenergized. A pair of cams 730 (FIG. 45), which are secured to the wipers to rotate therewith, cooperate with contacts SS1ac21 and SS1bc21, so that contacts SS1ac21 are closed in all positions of the stepping switch except the home position, and contacts SS1bc21 are opened in all positions of the stepping switch except the home position. The armature 729 also operates two banks of contacts, including contacts SS1a3, which are closed when the magnet SS1 is energized; and contacts SS1b1 and SS1b11, which are opened when the magnet is energized (FIGS. 43 and 45). The manner in which these contacts exert their control will be explained when the circuit diagram (FIGS. 73A to 73F inclusive) is described.

A single level of the switch is required for each program, the level SSI being used for program I, level SSII being used for program II, etc. The eight levels of contacts of the stepping switch may be used to obtain the necessary control for eight programs, each program being capable of providing up to eighteen steps in a punching sequence. In order to avoid needless duplication, only four levels are shown in the circuit diagram, FIG. 73E.

The first nineteen contacts of level SSI are individually connected to corresponding terminals in the upper program board 734 to enable the circuit to be completed to the various terminals in sequence as the stepping switch wiper is advanced over its related bank of contacts, the wiper being connected to a corresponding terminal on the selection board 748 (FIG. 48A) of the cash register, as will be subsequently described in detail. Similarly, the contacts of levels SSII, SSIII, and SSIV are individually connected to corresponding terminals in the upper program board 734. The twentieth contacts of the several levels are connected together to a conductor 1348, which is used to control a circuit to initiate the stepping of the stepping switch 726 from its home position, as will be explained when the circuit diagram of FIGS. 73A to 73F inclusive is described.

The lower program board 733 has a section 735, containing groups of terminals which are connected to the wipers of the selector switches SR42a1 to SR48a1 inclusive (FIGS. 48A and 48B) related to rows 2 to 8 inclusive of the cash register. By suitable connection of terminals in the upper program board 734 to terminals in section 735 by plugboard connectors, any desired number of the selector switches of the cash register can be made effective to control the recorder in any desired sequence, as the stepping switch is stepped through its various positions, as will be fully explained when the circuit diagram of FIGS. 73A to 73F inclusive is explained.

A reference number section 736 of the lower program board 733 contains a plurality of terminals, which are connected to the wipers of the reference number switches SR57a1 to SR60a1 inclusive of the cash register. By suitable connection of terminals in the upper program board 734 to terminals in section 736 by plugboard connectors, the reference number switches of the cash register can be made effective to control the recorder, as the stepping switch is stepped through its various positions.

Special symbol section 737 of the lower program board 733 contains a plurality of terminals which are connected to corresponding input lines on the diode symbol encoding board 1311. This arrangement enables the direct recording of special symbols in certain program sequences by suitably connecting terminals in the upper program board 734 to terminals in section 737 by plugboard connectors.

A digit section 738 of the lower program board 733 contains a plurality of terminals which are connected to the corresponding input lines of the diode digit encoding board 1315. This arrangement enables the direct recording of digits by suitably connecting terminals in the upper program board 734 to terminals in section 738 by plugboard connectors.

The upper program board 734 contains a plurality of sets or sections of terminals, each set or section corresponding to a level of the stepping switch 726. In each set or section, each terminal is connected to one of the first nineteen contacts of each level of the stepping switch. The upper program board 734 also contains a plurality of reset terminals 739, one for each level of the stepping switch, which are connected together and to a circuit for causing the stepping switch to be reset to home position at the end of any of the programs.

The remaining terminals of the program boards 733 and 734 are connected together in groups to supply buses which may be used to expand the capacity of the other sections, as desired.

The manner in which the various sections of the upper and lower program boards are interconnected and exert their controls in building up programs will be expalined fully when the circuit diagram is described.

Diode encoding unit

The diode encoding unit 689 of the present invention is shown in FIGS. 43 and 73F and comprises a diode symbol encoding board 1311, a diode digit encoding board 1315, an insulating plate 731 positioned between the two boards, and a bracket 732 for detachably securing the unit in operative position on the recorder base.

This unit is fully disclosed in the application for United States Letters Patent Serial No. 550,728, now Patent No. 2,896,713, of Elmer A. Gerdemann, inventor, filed December 2, 1955, to which reference may be had for a complete description thereof.

CASH REGISTER

The cash register which forms part of the recording system disclosed herein is illustrated in FIGS. 1 and 47 to 71 inclusive and is of the type shown and described in the United States patent to John B. Geers et al., No. 2,209,771, issued on July 30, 1940, and in the Mayo A. Goodbar et al. application for United States Letters Patent Serial No. 411,809, filed February 23, 1954, now Patent No. 2,853,232, issued September 23, 1958. In addition, some portions of the mechanism described hereinafter are disclosed in other United States patents and applications, which will be cited where appropriate. The present description will be restricted to such mechanism of the cash register as is pertinent to the present invention, and reference may be had to the above-cited patents for a detailed description of mechanism not specifically described herein.

The cash register 102 (FIG. 1) is provided with a keyboard 750, such as that shown in FIG. 47, having a transaction row 1 comprising eight keys 751; amount rows 2 to 6 inclusive, each row comprising nine keys 752; department or classification rows 7 and 8, each row comprising nine keys 753; and a transaction row 9 comprising five keys 754. Adjacent row 1 of the keyboard is a total lever 755, which may be set in any one of seven different positions, to cause the machine to perform different types of operations. Also provided are an operating bar 756, for initiating certain operations of the machine, and a manual release key 757, which is used to trip the machine in the event that there has been a power failure and the machine can therefore not otherwise be tripped. A "Mail-Phone" key 758 and a "Send" key 759 are positioned near row 9 of the keyboard, and a reset counter 760, having a lock 761, is located on the keyboard near the total lever 755. In addition, a manual release lever 761A (FIG. 1), located above the keyboard 750, is provided for releasing certain of the keys on the keyboard when said keys have been erroneously depressed prior to the commencement of a cycle of machine operation.

An amount differential mechanism is associated with each bank of amount and classification keys and is positioned during a machine cycle according to the number indexed by the depressed key in each bank. When no key is depressed in a bank, the differential mechanism is positioned at zero. Similarly, a differential mechanism is provided for each transaction bank and is controlled by the depressed key in such bank. The amount and transaction differential mechanisms are not shown herein but are fully disclosed in the previously-mentioned patent to John B. Geers et al. and control the operation of the machine in the same manner as described in said patent. In addition, the amount and transaction differential mechanisms control the setting of certain switches used in the machine of the present invention, as will be described subsequently.

*Power control switches and register selection board*

Manually-operable switching means are provided to control the power supply to the recording system as a whole and also to the individual media reader and recorder components.

As has been previously stated, the main power switch 125 (FIG. 1) is located on the indicator cover of the cash register 102 and is closed to supply operating power to the recording system. It is contemplated that this switch will be key-controlled, so that it may be operated only by a person in authority who has been provided with a key. Normally, this switch will be turned on at the beginning of a business day and will remain on for the entire day.

Manually-operated switches 762 and 763 (FIG. 48A) to control the supply of power to the media reader and the recorder, respectively, are provided on the back plate 764 of the cash register. The cash register selection board 748 also is mounted on the back plate 764 by means of four studs 747 immediately beneath the switches 762 and 763 and is utilized to set up various types of recording programs, as will be subsequently disclosed in the description of the circuit diagram, FIGS. 73A to 73F inclusive. Access to the switches 762 and 763, and to the cash register selection board 748, is gained through a door (not shown) in the back of the cash register housing. This door is provided with a key control lock, so that the switches 762 and 763 and the selection board 748 will be available only to a person possessing a key for said lock.

*Control keys row 1*

Depression of any key 751 in row 1 causes a set of contacts associated with said key to close. The stem 765 of each of the keys 751 is mounted for vertical sliding movement in the key frame 766 (FIGS. 50 and 52) and is provided with a pin 767, adapted to move up and down in a slot 768 of a guide member 769, secured to the key frame 766. Each key 751 is urged to undepressed position by a compression spring 770, extending between the pins 767 and the key frame 766.

A cam surface 771 on the end of each pin 767 is arranged to coact with a button 772 on a contact blade 773. The blade 773 for each key cooperates with an input common 774 to form electrical contacts SC52a1 to SC59a1 inclusive for keys 2 to 9 inclusive, respectively, of row 1. An output terminal 775 is connected to each of the blades 773 for connecting the contacts SC52a1 to SC59a1 inclusive into the electrical circuit of the recording system.

An additional set of electrical contacts SC50a1 are provided and are closed by depression of any of the row 1 keys. The means for operating said contacts will now be described. As shown in FIG. 50, a detent 776 is mounted in the row 1 key frame 766 by means of two arms 777 and 778, pivoted to the frame 766 and to either end of the detent 776. Said detent is urged to the right (FIG. 50) by a spring 779, secured to the frame 766, and is provided with hook portions 780 for coacting with the pins 767 of the keys 751. Slidably mounted on the detent 776 is a second detent 781, urged to the right by a spring 782, connected between the detents. The detent 781 has cam surfaces 783 positioned to cooperate with the pins 767 fixed in the stems of the row 1 keys 751.

A surface 784 on the detent 781 coacts with a stud 785 on an arm 786 pivoted to the frame 766 by the same pivot as the arm 777 and urged clockwise, as viewed in FIG. 50, by a spring 787, connected between the arm 786 and the frame 766. A hook 788 at the end of the arm 786 normally engages a square stud 789, fixed in the detent 776 to retain said detent against movement to the right under influence of the spring 779.

The arm 778 (FIG. 50) is provided with an extension 790 adapted to coact with a roller 791 fixed in a bell crank 792 free on the register key lock line 793. At its other end, the bell crank 792 is slotted to receive a roller 794 on one arm of a second bell crank 795 mounted in the machine framework and pivotally connected to a link 796 (FIGS. 50 and 51) supported for shifting movement by a slot therein engaging a stud 797 fixed to a bracket 798 mounted in the machine framework. The free end of the link 796 extends through the back plate 764 and is notched to engage a stud 800 of an arm 801 pivotally mounted on a bracket 806 fixed to the back plate 764. The arm 801 comprises two parts, which are adjustable relatively to each other, and serves as an operating means for the contacts SC50a1, mounted on the machine back plate 764. The adjustability of the arm 801 enables a fine adjustment to be made of the extent to which the arm 801 flexes the blades of the contacts SC50a1.

Depression of any one of the row 1 keys 751, in addition to closing the associated one of the contacts SC52a1 to SC59a1 inclusive, causes the detent 781 to be shifted downwardly and to the left (FIG. 50) through contact of the pin 767 of the depressed key 751 with its corresponding cam surface 783 on said detent. The arm 786 is thereby shifted to the left through coaction of the surface 784 with the stud 785, causing the hook 788 to be moved out of blocking relation to the square stud 789. This frees the detent 776 for movement upwardly and to the right under the influence of the spring 779. The hook portions 780 on said detent are moved into coacting relation with the key pins 767, so that they lock the depressed key 751 in its depressed position, and prevent the depression of any other row 1 key. Also, upward and rightward movement of the detent 776 causes the arm 778 to be rocked counter-clockwise, so that the extension 790 coacts with the roller 791 to rock the bell crank 792 clockwise about the key lock line 793. This movement is effective, through the bell crank 795, the link 796, and the arm 801, to cause the contacts SC50a1 to be closed.

Near the end of each cycle of machine operation, the key lock line 793 is rotated counter-clockwise, as fully disclosed in the previously-mentioned patent to John B. Geers et al. Fixed to the key lock line 793 for movement therewith is an arm 802, having a surface 803, which is positioned to engage a stud 804 on the bell crank 792 when the key lock line 793 is rotated counter-clockwise in the manner previously described. Coaction of the surface 803 and the stud 804 causes the bell crank 792 to be picked up and rocked counter-clockwise with the arm 802. This is effective to shift the link 796 to the left, as viewed in FIGS. 50 and 51, thereby permitting the spring 805, extending between the arm 801 and the bracket on which said arm is mounted, to shift said arm clockwise and open the contacts SC50a1. In addition, the counter-clockwise movement of the bell crank 792 is transmitted through the roller 791 and the extension 790 to the detent 776, causing said detent to be shifted downwardly and to the left, as viewed in FIG. 50, thereby removing the hook portion 780 on said detent from over the pin 767 of the depressed key in row 1, to permit the spring 770 of said key to shift it to undepressed position, and also moving the square stud 789 to a position where it will be once more engaged by the hook 788 of the arm 786. Movement of the depressed key 751 to an undepressed position will permit the detent 781 to be shifted to the right, as viewed in FIG. 50, under the influence of the spring 782, thus permitting the arm 786 to return to the position in which it is shown in FIG. 50, under the influence of its spring 787, in which position the hook 788 on said arm will engage the square stud 789 to retain the detent 776 against movement upwardly and to the right until another row 1 key is depressed.

It may be noted that the arrangement of parts of the row 1 key bank is such that the selected one of the contacts SC52a1 to SC59a1 inclusive for the individual keys 751 will be closed before the contacts SC59a1 are closed upon depression of a key, and also that at the conclusion of a cycle the contacts SC59a1 will be opened before the selected one of the individual contacts for the keys 751 is reopened. This is done in order that the contacts SC50a1 rather than the individual contacts SC52a1 to SC59a1 inclusive will actually make and break the circuit through these contacts, for reasons of construction and easy serviceability.

Rows 7 and 8 control means

Means operated by depression of a key in either or both of rows 7 and 8 are provided to control a plurality of electrical contacts.

Each of the two rows 7 and 8 of the cash register keyboard is provided with a control detent 810 (FIGS. 53 and 55) mounted in the key frame of rows 7 and 8 by means of two arms 811 and 812 pivoted to the frame and to either end of the detent 810. Cam surfaces 813 on the detent 810 are provided opposite pins 814 mounted in the key stem of each of the keys 753 for rows 7 and 8. Spring means, not shown herein, but fully disclosed in the previously-mentioned patent to John B. Geers et al., cooperate with the arm 811 to urge the detent 810 into the position in which it is shown in FIG. 53.

An extension 815 on the arm 812 has fixed thereto a stud 816, which is adapted to cooperate with a finger 817 on a member 818 free on the upper reset shaft 819 of the cash register. A second finger 820 on the member 818 is arranged to cooperate with a stud 821 fixed in an arm 822 free on the key lock line 793. As shown in FIG. 55, one member 818 and one arm 822 are provided for each of the rows 7 and 8.

Each of the arms 822 is cut out to receive the bail 823 of a yoke 824 having arms 825 and 826 mounted free on the key lock line 793. The yoke 824 is urged counter-clockwise about the key lock line 793 by a spring 827, connected to said arm and to the left side frame 828. Fixed to the bail 823 of the yoke 824 is an arm 829 having pivotally connected thereto a link 830 (FIGS. 53 and 54) slidably mounted in the machine framework, extending through an opening in the machine back plate 764, and having at its end an adjustably-mounted stud 831 adapted to coact with a blade member 832 of a set of contacts SC48ac1 and SC48bc1 mounted on the machine back plate 764.

Depression of a key 753 (FIG. 47) in either or both of the rows 7 and 8 of the machine keyboard causes the corresponding detent 810 to be shifted downwardly and to the left, as viewed in FIG. 53. This movement is transmitted through the arm 812, the member 818, and the arm 822 to the yoke 824 and the arm 829, fixed thereto, to shift the link 830 to the right (FIGS. 53 and 54). The stud 831 on the link 830 coacts with the blade 832 to close the contacts SC48ac1 and to open the contacts SC48bc1.

Near the end of each cycle of machine operation, the usual key release mechanism (not shown herein) releases any depressed keys in rows 7 and 8 and permits the detents 810 for these rows to return to their normal position. This moves the stud 816 out of blocking relation to the finger 817 on the member 818 and permits the spring 827 to return the members 818, the arms 822, the yoke 824, the arm 829, and the link 830 to the position in which they are shown in FIG. 53, thereby opening the contacts SC48ac1 and closing the contacts SC48bc1.

Row 9 control means

Means operated by depression of a key in row 9 are provided for setting electrical contacts to control operation of the recording system.

Row 9 of the cash register keyboard 750 is provided with two detents 838 and 839 (FIGS. 57 and 56, respectively) having cam surfaces 840 and 841, which cooperate with pins 842 in the stems 843 of the row 9 keys 754 (FIG. 47). The detent 839 (FIG. 56) has only one cam surface 841, which is positioned opposite the pin 842 for the "Charge" key 754, while the detent 838 has four cam surfaces 840, positioned opposite the pins 842 for the "Cash," "Charge," "COD," and "Layaway" keys 754. The detents 838 and 839 are slotted to receive studs 844, fixed in the row 9 key frame (not shown) for slidably mounting said detents in said key frame.

A stud 845 is fixed on the detent 838 and cooperates with a finger 846 on a link 847 slidably mounted in the machine framework, extending through an opening in the machine back plate 764, and having a roller 848 fixed on its other end to coact with a blade 849 of a set of contacts SC61a1, mounted on the back plate 764.

A stud 850 is fixed on the detent 839 and extends through one of the slots in the detent 838 to cooperate with a notched finger 851 on a link 852, slidably mounted on the same mounting means as are employed for the link 847, extending through an opening in the back plate 764, and having a roller 853 fixed on its other end to coact with a blade 854 of a set of contacts SC47ac1 and SC47bc1, stacked with the previously-mentioned contacts SC61a1 and mounted on the back plate 764.

The two links 847 and 852 are normally urged to the right by a spring 855, which is connected between one of the studs mounting said links and a stud 856, fixed on the link 847 and extending through a slot in the link 852.

Depression of any one of the keys 754 except the "Void" key will cause the pin 842 of such key to coact with the surface 840 to shift the detent 838 to the left. This movement will be transmitted by the stud 845 and the finger 846 to the link 847 and the roller 848 thereon, which will cause the contacts SC61a1 to be closed.

In the event that the "Charge" key 754 is depressed, its pin 842, in addition to shifting the detent 838, will also coact with the cam surface 841 to shift the detent 839 to the left. This movement will be transmitted by the stud 850 and the finger 851 to the link 852 and the roller 853 thereon to cause the contacts SC47ac1 to be closed and the contacts SC47bc1 to be opened.

Near the end of each total-making cycle of machine operation, the usual key release mechanism (not shown herein) releases any depressed keys in row 9 and permits the detents 838 and 839 to return to their normal positions. This is effective, through the linkage above described, to permit the contacts SC61a1 and SC47ac1 to open, and the contacts SC47bc1 to close.

Selector switches

The control, classification, and amount differential mechanisms actuate selector switches, certain of which control the selection of punches in the recorder to punch the data set up on the keys according to a predetermined code, others of which select a punching program according to the significance of the data, and still others of which perform other functions in the operation of the recording system.

Referring to FIGS. 48A and 48B, it will be seen that each of the differentials of the control rows 1 and 9 has three selector switches associated therewith, and that each differential of rows 2 to 8 inclusive has one selector switch associated therewith.

The selector switches designated by the reference characters SR41a1, SR41a2, and SR41a3 are set by the control row 1 of the keyboard; the switches designated by the reference characters SR49a1, SR49a2, and SR49a3 are set by the control row 9 of the keyboard; and the switches designated by the reference characters SR42a1 to SR48a1 inclusive are set by the amount and classification differentials, rows 2 to 8 inclusive.

Three shafts 861, 862, and 863 (FIGS. 48A, 48B, and 49), form the main support for the selector switches. These shafts are mounted at each end in a bracket 864, which is secured to the back plate 764 by screws 865.

The construction of the selector switches is fully disclosed in the John H. Burns et al. application for United States Letters Patent, Serial No. 488,636, filed February 16, 1955, now Patent No. 2,878,872, issued March 24, 1959, and therefore will not be described in detail here.

Each selector switch includes a common having a terminal 867, ten contacts 868, one for each differential position of the differential mechanism, and a rotatable wiper to engage the common with the contact 868 corresponding to the position of the related differential mechanism. The wiper is connected to a gear 869 for unitary movement therewith, said gear meshing with a gear 870, rotatable on a shaft 871, supported by the brackets 864. The gear 870 meshes with the rack 872, one rack being riveted to the side of each indicator-setting segment 873 of rows 1 to 9 inclusive.

As previously indicated, each differential mechanism of rows 1 and 9 sets three selector switches. Therefore, three switch assemblies, each comprising a set of ten contacts 868, a common, and a wiper, are provided for each of these rows, and the three wipers are interconnected to operate simultaneously. In each of the rows 2 to 8 inclusive, the differential mechanism sets only one selector switch. Therefore, only one switch assembly, comprising a set of ten contacts 868, a common, and a wiper, is provided for each of these rows. The switch assemblies are held on the shafts 861 and 862, and on the center shaft 863, in the proper lateral alinement by set screws 875 in the hubs 874.

After being set differentially by the differential mechanisms of rows 1 to 9 inclusive, the wipers are alined and held in set position by aliner pawls 876, which are rocked into engagement with the gears 869 when the aliner shaft 877 is rocked to aline the indicator-setting segments 873 in a well-known manner. The aliner pawls 876 are pivoted on levers 878 by a stud 879, carried thereby, and each is flexibly connected to the lever 878 by a spring 880. The spring 880 is connected to a stud 881 on the pawl 876 and a stud 882 on the lever 878 and holds the stud 882 in contact with a shoulder 883 on the pawl 876. The lever 878 is pivoted on a stud 884, carried by a plate 885, and is bifurcated to engage a rod 886, carried between a plurality of arms 887, secured to the rock shaft 877.

When the rock shaft 877 is operated at the beginning of a machine operation, the arms 887 and the rod 886 rock all of the levers 878 counter-clockwise (FIG. 49) to disengage the aliner pawls 876 from the gears 869. Thereafter, the differential mechanisms of rows 1 to 9 inclusive adjust the wipers, through the racks 872 and the gears 870 and 869, in accordance with the key depressed in each of these rows of the keyboard. After being differentially moved into their new positions, the gears 869 are alined and locked in position by the reverse movement of the shaft 877 to engage the aliner pawls 876 with the respective gears 869.

Corresponding digit contacts 868 of the selector switches SR42a1 to SR48a1 inclusive are connected to corresponding wires of a set of bus wires 888 (FIG. 73D); that is, all the contacts in the "zero" position are connected to the same bus wire, all the contacts in the "1" position are connected together to the same bus wire, etc. The bus wires 888 are connected to the terminals in a section 889 of the register selection board 748.

The contacts 868 of the selector switches SR41a1, SR41a2, and SR49a1 are also connected to terminals of the register selection board 748. The several contacts of the switch SR41a1 are individually connected to terminals of a section 890 (FIG. 73D) of the selection board 748, the several contacts of the program selector switch SR41a2 are individually connected to terminals of a section 891 of the register selection board 748, and the several contacts of the selector switch SR49a1 are individually connected to terminals of a section 892 of the register selection board 748.

The remaining sections of the register program board will be described in detail when the circuit diagram of FIGS. 73A to 73F inclusive is described, as will the manner in which the selector switches and the register selection board 748 function in control and operation of the recording system.

Reference number switches

Switch means, operating in conjunction with the reference number type wheels, are provided for causing an identifying number to be punched on the recording tape in connection with each separate transaction, the identifying number being increased by one unit for each consecutive transaction.

Mounted on the machine back plate 764 by means of shafts 900, 901, and 902 (FIGS. 58 and 62) and two frames 904 and 905, in which said shafts are mounted, are four rotary switches SR57a1 to SR60a1 inclusive, of the same type as the previously-described differentially-controlled selector switches. Each of the four switches SR57a1 to SR60a1 inclusive is provided with ten contacts 906, a wiper 907, and a common having a terminal 908. Corresponding digit contacts 906 of the switches SR57a1 to SR60a1 inclusive are connected to corresponding wires of a set of bus wires 893 (FIG. 73D); that is, all the contacts in the "zero" position are connected to the same bus wires, all the contacts in the "1" position are connected together to the same bus wires, etc. The bus wires 893 are connected to terminals in the section 889 of the register selection board 748.

The wiper 907 (FIG. 58) for each of the switches SR57a1 to SR60a1 inclusive is connected through a hub 911 to a gear 912, which meshes with a gear 913, fixed to a ratchet 914, both the gear 913 and the ratchet 914 being fixed on one end of one of a series of nested tubes 909, which are graduated in length and free on a shaft 915, mounted in the frames 904 and 905, and being retained against retrograde movement by a back-up pawl 916, pivotally mounted on a rod extending between the frames 904 and 905, and normally urged into engagement with the ratchet 914 by a spring 917. An aliner 918, urged clockwise (FIG. 58) by a spring 919, is provided for each of the gears 912, to retain said gear and the wiper to which it is connected properly in any one of the plurality of positions in which they may be set.

A pawl 920, having four teeth of varying lengths, cooperates with the four ratchets 914 for advancing said ratchets in the usual well-known manner. The pawl 920 is pivotally mounted in a yoke 921 and is urged into contact with the ratchets 914 by means of a spring 922. The yoke 921 is free on the shaft 915 and is normally held in one of two positions by an arm 923, free on a stud 924 in the frame 905 and having two retaining surfaces, 925 and 926, for engagement with a stud 927 on the yoke 921. A spring 928 urges the arm 923 clockwise (FIG. 58), so that one of the two surfaces 925 and 926 is normally positioned against the stud 927 to yieldingly restrain movement of the yoke 921.

Fixed on an arm 929 of the yoke 921 is a stud 930, which is received in a notch 931 of an adjustable extension 932 on a link 933, which extends through the machine back plate 764 and is mounted for sliding movement in the machine framework by means of a plurality of studs 934.

In order for the ratchets 914 to be advanced, the pawl 920 must be first moved clockwise in a cocking movement with respect to the ratchets a distance of one ratchet tooth space, and must then be moved counter-clockwise with respect to the ratchets to pick up the ratchet tooth on one or more of the ratchets and carry it counter-clockwise to advance the ratchet.

The link 933, the yoke 921, and the pawl 920 are shown in their cocked position in FIG. 58, said link having been shifted to the right to the full extent of its permitted movement. The mechanism for shifting the link 933 to the right will now be described.

A lever 935 (FIG. 59) is controlled by the total lever 755 (FIG. 47) through a shaft 936 (FIG. 61), an arm 937, a slide 938, a roller 939, an arm 940, a shaft 941 (FIGS. 59 and 61), and a scissors 942. The manner in which this control is effected is fully described in the United States Patent No. 2,154,381, issued April 11, 1939, to John H. Gruver. A half-round stud 943, on an upwardly-extending arm of the lever 935, projects into an opening formed in a segment 944, loosely mounted on type wheel sleeves 945 and urged clockwise by a spring 946.

When the total lever 755 is in "add" or "sub-total" position, the segment 944 is retained against clockwise movement by coaction of the stud 943 with the edge of the opening in said segment. However, when the total lever 755 is in "total" position, the stud 943 is positioned out of blocking relation to the edge of said opening.

Fixed on the segment 944, for coaction with a horizontally-movable slide 947, is a stud 948. A regularly excursioned movement during each cycle of machine operation is imparted to the slide 947 by means which are disclosed in the previously-mentioned patent to John H. Gruver.

It will be seen that, as the slide 947 moves to the right (FIG. 59) during each cycle of machine operation, the segment 944 will be urged by the spring 946 to follow said slide. When the control lever 755 is in "add" or "sub-total" position, the stud 943 will prevent the segment 944 from following the slide 947, but, when the control lever 755 is in "total" position, the stud 943 will be positioned so as not to block movement of the segment 944, which will then follow the slide 947 clockwise to the right. An extension 949 of the segment 944 has fixed thereto a stud 950 for coaction with the surface 951 of a lever 952, free on a stud 953 in the machine framework. At its other end, the lever 952 has fixed a stud 954 arranged to coact with an end surface 955 of the link 933. Clockwise movement of the segment 944 is effective to rock the lever 952 counter-clockwise to shift the link 933 to the right, from the position in which it is shown in FIG. 60 to the position in which it is shown in FIGS. 58 and 59. This movement of the link 933 advances the pawl 920 with respect to the ratchets 914, so that said ratchets and their corresponding switches will be advanced by one unit on the next movement to the left (FIG. 58) of the link 933.

Movement to the left is imparted to the link 933 by coaction of a surface 956 (FIG. 58) on said link with a roller 957 on a lever 958 pivoted on a shaft 959 in the machine framework. Regularly excursioned movement is imparted to the lever 958 by a cam 960, mounted on a stud 969 in the machine framework and having a raceway 961, in which rides a roller 962, fixed to an arm 963 of the lever 958. The cam 960 is integral with a gear 964, which is driven through a complete revolution each cycle of machine operation by means of a gear 965 on the printer cam line 966, operating through an intermediate gear 967 on a stud 968.

The lever 958, therefore, rocks counter-clockwise from the position in which it is shown in FIG. 58 and returns during each cycle of machine operation. When the link 933 has been shifted to the right in a cocking movement by the segment 944 (FIG. 59) acting through the lever 952, the succeeding excursional movement of the lever 958 will shift the link 933 to the left, thereby rocking the yoke 921 counter-clockwise, and causing the pawl 920 to advance one or more of the ratchets 914, and their corresponding switches SR57a1 to SR60a1, inclusive, one unit.

Since the segment 944 is free to move clockwise only when the total lever 755 is in "total" position, it will be seen that the ratchet-advancing mechanism will be cocked only once during each complete transaction, and, therefore, only one unit will be added to the identifying number during each complete transaction. The lever 958 will, of course, be rocked by the cam 960 during each cycle of machine operation, but this will be merely an idle movement, except when the link 933 has previously been shifted to the right by the segment 944.

Manually-operable means are provided for changing the settings of the wipers 907 of the switches SR57a1 to SR60a1 inclusive, when desired. As has been stated, each ratchet 914 (FIGS. 58 and 62), with its companion gear 913, is fixed on one end of one of a series of nested tubes 909, which are graduated in length and free on the shaft 915. At the other end of each of the tubes 909 is fixed a gear 971, which meshes with a second gear 972 free on a shaft 973. Fixed to each of the gears 972 for unitary movement therewith is an adjusting wheel 974, bearing visible numbers on its periphery. It will be seen that, in order to set the wiper 907 of any one of the switches SR57a1 to SR60a1, inclusive, to any desired position, it is merely necessary to turn the related adjusting wheel 974 clockwise, as viewed in FIG. 58, until the number on said wheel corresponding to the desired setting of the wiper 907 is alined with a predetermined reference mark.

The same mechanism which advances the wipers 907 of the switches SR57a1 to SR60a1 inclusive in a step-by-step manner simultaneously advances the reference number type wheels 977 (FIGS. 58 and 59) in the same manner. It will be recalled that, in a cocking movement to the right of the link 933, the lever 952 is shifted counter-clockwise from the position in which it is shown in FIG. 60 to the position in which it is shown in FIGS. 58 and 59. Conversely, when the link 933 is shifted to the left (FIGS. 58, 59, and 60) by the lever 958 in a ratchet-advancing movement, the surface 955 on said link coacts with the stud 954 on the lever 952 to shift said lever clockwise back to the position in which it is shown in FIG. 60.

Integral with the lever 952 is an arm 978, having adjustably secured thereto a second arm 979, free on the stud 953 and notched at its end to receive a stud 980, fixed to a yoke 981, free on one of the sleeves 945. One edge of the bail of the yoke is bent over to cooperate with a stop stud 982, fixed in the machine framework, to limit upward counter-clockwise movement (FIGS. 59 and 60) of the yoke 981. Pivotally mounted on said yoke is a pawl 983, similar to the pawl 920 and adapted to coact with ratchets 984, fixed to each of the reference number type wheels 977.

It will be seen that, as the lever 952 is shifted counter-clockwise by the segment 944 to impart a cocking movement to the link 933, the arm 979 will carry the yoke 981 and the pawl 983 thereon clockwise to cause one or more of the teeth on the pawl 983 to pass over a tooth on one or more of the corresponding ratchets 984. Then, when the link 933 is next driven to the left (FIGS. 59 and 60) by the lever 958, the arm 979 will be rocked counter-clockwise to cause the pawl 983 to advance one or more of the ratchets 984 and their corresponding type wheels 977 as one unit. The switches SR57a1 to SR60a1 inclusive and the type wheels 977 thus operate simultaneously, so that the settings on the two will correspond.

*Total lever switch*

Switch means controlled by the total lever 755 are provided and are arranged to be closed in "add" and "item total" positions, and to be opened in all other positions.

A segment 988 (FIG. 63) is fixed on a shaft 989, which is controlled by the total lever 755 in a well-known manner. A slot 990 in the segment 988 receives a stud 991, fixed in the end of an arm 992, pivotally mounted on a stud 993, fixed in the machine framework, said slot having a configuration which includes an offset portion such that, when the total lever 755 is in "add" or "item total" position, the stud 991 will be located in said offset portion. A link 994 is pivotally connected to the free end of the arm 992, extends through an opening in the back plate 764, and is pivotally connected at its other end to a crank 995 (FIG. 64) pivotally mounted on a bracket 996 fixed to the back plate 764. An extension 997, adjustably fixed to the crank 995, has mounted thereon a roller 998 cooperating with interconnected blades 999 and 1000 of two sets of contacts SC44b1 and SC44b2 mounted on the back plate 764.

It will be seen that, when the total lever 755 is shifted into "add" or "item total" position from any of its other positions, the offset portion of the slot 990 will cause the stud 991, riding therein, to be shifted upwardly, as viewed in FIG. 63, thereby rocking the arm 992 counter-clockwise. This movement will be transmitted through the link 994 to the crank 995 to rock said crank counter-clockwise, causing the roller 998 to coact with the blades 999 and 1000 to close the contacts SC44b1 and SC44b2. These contacts will remain closed so long as the total lever 755 is in its "add" or "item total" position, and will be restored to open condition when the total lever is shifted to some other position.

*"No change" lamp control means*

Means are provided to control the operation of a "no change" lamp, which lights during a "cash" transaction when the amount tendered by the customer does not exceed the total of the purchases entered on the register.

As will be more fully described in the description of the circuit diagram, the "no change" lamp 1001 (FIG. 73A) is connected in series with a row 1 selector switch SR41a3, a row 9 selector switch SR49a3, and the contacts SC62a1, which are controlled by the total lever to close when the total lever 755 is in "total" position, and to remain closed until another transaction is commenced.

The manner in which the selector switches are positioned by the setting of their corresponding differential mechanism has been described previously. When a transaction occurs in which the amount tendered does not exceed the total of the purchases, the row 1 differential mechanism will be set to its No. 5 position by mechanism of the type disclosed in the co-pending Mayo A. Goodbar et al. United States application Serial No. 442,786, filed July 12, 1954, now Patent No. 2,972,442, and the selector switch SR41a3 will be positioned correspondingly. In a cash transaction such as this, the row 9 differential will be set to its No. 1 position, and the selector switch SR49a3 will be positioned correspondingly.

The circuit for lighting the lamp 1001 is completed by closing of the contacts SC62a1 by means of mechanism best shown in FIG. 63, which will now be described. A blade 1004 of the contacts SC62a1 is adapted to be shifted to close said contacts by coaction of a roller 1005 therewith. Said roller is mounted on an arm adjustably secured to a yoke 1006 pivotally mounted on a bracket 1007 secured to the back plate 764. At its other end, the yoke 1006 is bifurcated to engage a stud 1008 fixed to one arm of a crank 1009 pivotally mounted on the right side frame 1010 by a stud 1011. Adjustably secured to the other arm of the crank 1009 is an extension 1012, having fixed thereto a square stud 1013, adapted to coact with a plurality of shoulders 1014 and 1015 on a retaining member 1016, pivotally mounted on the right side frame 1010 by a stud 1017. Integral with the member 1016 is an arm 1018. A spring 1019 extends between the crank 1009 and the arm 1018 and urges the two toward each other. A stud 1020 on the arm 1018 rides in a slot 1021 in a link 1022, which is secured at its other end to the arm 992.

A bent-over surface 1023 at the end of the link is positioned for coaction at times with a hook 1024 on an arm 1025 pivotally secured by a stud 1026 to an arm 1027 fixed to a shaft 1028 mounted in the machine framework.

A surface 1029 on the hook 1024 of the arm 1025 is arranged to coact at times with a roller 1030 mounted on a stud 1031 in an arm 1032 pivotally mounted at one end on the stud 993, and having a second roller 1033 intermediate its ends. A spring 1034 on the arm 1032 urges the roller 1033 against the periphery of a cam 1035 mounted on the main cam shaft 1036 of the machine. A guide member 1037 is secured adjacent the side of the roller 1030 away from the arm 1032 and retains the arm 1025 in alinement with the roller 1030. A roller 1038 on the stud 1031 on the other side of the member 1037 is arranged to coact at times with a surface 1039 on the crank 1009.

The manner in which the above mechanism functions to close the contacts SC62a1 during a "total" operation will now be described. In machines of the type being described, a total-taking operation requires two complete cycles of the machine. During the latter part of the first cycle of the total-taking operation, the hook 1024 is rocked to the left into the path of the roller 1030. The guide member 1037 and the rear end of the arm 1032 act as a means for guiding the hook 1024 into proper position to be engaged by the roller 1030. When the arm 1032 is lowered by the cam 1035 during the latter part of the operation of the machine, the roller 1030 is lowered and, by its contact with the surface 1029 of the hook 1024, causes said hook to be shifted downwardly to contact the bent-over surface 1023 on the link 1022, which is positioned in the path of movement of the hook 1024 during total-taking operations, causing the retaining member 1016 to pivot clockwise about the stud 1017. The shoulder 1014 is thereby shifted downwardly out of the path of movement of the square stud 1013, thus freeing the crank 1009 to the action of the spring 1019, which is effective to rock said crank clockwise, and the yoke 1006 counter-clockwise, to cause the roller 1005 to bear against the blade 1004 and close the contacts SC62a1. The stud 1013 is brought to bear against the shoulder 1015 by the spring 1019, in which position it remains, holding the contacts SC62a1 closed until a resetting operation takes place at the beginning of the next cycle of machine operation, as will be described subsequently.

During the first cycle of a total-taking operation, the hook 1024 is held in a position in which it is prevented from engaging the roller 1030 by means of a link 1044 slidably mounted on studs 1045 and 1046. The stud 1045 is mounted on the right side frame 1010, and the stud 1046 is carried by a lever 1047, mounted on a stud 1043, fixed in the machine framework. The right-hand end of the link 1044 is provided with a slot 1048, the upper narrow portion of which normally engages a stud 1049, carried by the arm 1025. When the total lever 755 is moved into any of its total-taking positions, the hook 1024 is given a slight movement to the left, but this movement is not enough to engage it with the roller 1030.

This initial movement is given to the hook 1024, upon manual movement of the total lever 755, by means of a mechanism not shown herein but fully disclosed in the United States Patent No. 2,625,322, to Frank B. Moser, issued January 13, 1953, which mechanism rocks a shaft 1050 (FIG. 70) and an arm 1051, affixed thereto, clockwise, this movement being transmitted by a link 1052 to rock the lever 1047 clockwise. The link 1044 (FIG. 63) is provided with a slot 1053, the upper end of which normally engages the stud 1046 and is held in engagement therewith by a spring 1054, stretched between the stud 1046 and a stud 1055 on the link 1044.

Movement of the total lever 755 out of "add" position rocks the lever 1047 clockwise, which, assisted by the spring 1054, moves the link 1044 toward the left, as viewed in FIG. 63.

Near the end of the first cycle of operation, the link 1044 is given an additional movement toward the left by a pitman 1056 (FIG. 70) acting on the lever 1047, said pitman being controlled by a mechanism which is not disclosed herein but which is fully described in the previously-mentioned United States Patent No. 2,625,322, to Frank B. Moser.

Just before the pitman 1056 is moved toward the left, the cam 1035 (FIG. 63) moves the arm 1032 to its lowermost position. After the arm 1032 has thus been lowered, the lever 1047 is rocked clockwise, as just described, which movement is sufficient to permit the link 1044 to be moved to the left to cause the hook 1024 to be moved into the path of the roller 1030 but above said roller.

At the end of the first rotation of the shaft 1036, the spring 1034 raises the arm 1032, and, as the arm is raised, the roller 1030 will cam the hook 1024 and the link 1044 toward the right, against the tension of the spring 1054. After the roller 1030 has passed the hook, the spring 1054 moves the link 1044 and the hook 1024 toward the left, thereby moving said hook beneath the roller 1030.

Near the end of the second rotation of the shaft 1036, the arm 1032 is lowered again, thereby lowering the hook 1024 to cause its end to coact with the surface 1023 on the link 1022 to release the crank 1009 for clockwise movement and thereby close the contacts SC62a1, as has been described previously. At the very end of the second cycle of operation of the shaft 1036, the spring 1034 again raises the arm 1032, thereby moving the roller 1030 upward and away from the hook 1024.

It will be seen in FIG. 63 that, with the machine in "home" position, as shown therein, the cam 1035 is so shaped that, at the beginning of each cycle of machine operation, the arm 1032 will be moved slightly upwardly under the influence of the spring 1034. This movement is utilized following a total-taking operation to reset the crank 1009 and the yoke 1006 to the position in which they are shown in FIG. 63, and thereby open the contacts SC62a1. The roller 1038, which is mounted on the stud 1031, contacts the surface 1039 on the crank 1009 in such upward movement of the arm 1032 and shifts said crank counter-clockwise a sufficient distance to open the contacts SC62a1 and to cause the square stud 1013 to be engaged once more by the shoulder 1014, as shown in FIG. 63. The contacts SC62a1 will then remain in an open condition until another total-taking operation takes place.

*"Mail Phone" and "Send" key switch control means*

Means are provided for operating certain switches in the cash register in conjunction with the depression and the release of the "Mail Phone" key and the "Send" key.

It will be recalled that the "Mail Phone" key 758 and the "Send" key 759 are mounted in the machine keyboard below and approximately in line with the row 9 keys 754. As shown in FIGS. 65 and 66, the stem 1061 for the key 759 and the stem 1062 for the key 758 are secured to two arms 1063 and 1064, pivotally mounted on a shaft 1065, fixed in the printer back plate. The arm 1063 has fixed thereto a crank 1067, to one end of which is pivotally secured a link 1068, connected at its other end to a lever 1069, pivotally mounted on a stud 1070 in the printer back plate. A stud 1071, mounted on the lever 1069, coacts with a bifurcated end of another lever 1072, pivoted on a shaft 1073, extending between the printer back plate and the left side frame 828 (FIG. 55). The lever 1072 (FIG. 66) is connected by means of a link 1074 to an arm 1075, pivoted on a stud in the left side frame and having pivotally secured thereto another arm 1076, slotted at its free end to receive a stud 1077 in the lower end of a pitman 1078. A spring 1079 urges the stud 1077 into engagement with the left end of the slot in the arm 1076. The pitman 1078 is pivotally connected intermediate its ends to a segment 1080, rotatably mounted on a stud 1085 in the frame 905 fixed to the cash register back plate 764. On its lower surface, the segment 1080 is notched at 1081 and 1082, for cooperation with a stud 1083, fixed in an arm 1084, pivoted to the frame 905 and urged counter-clockwise by a spring 1086. The notches 1081 and 1082, in cooperation with the stud 1083, serve to retain the segment 1080 in either one of two positions. Adjustably fixed to the segment 1080 is an arm 1087, having thereon a roller 1088, adapted to engage a common blade 1089 of the contacts SC63ac1 and SC63bc1, said contacts being mounted on the frame 905. Shifting of the segment 1080 from one of its positions to the other causes the blade 1089 to be operated to open one of the two sets of contacts SC63ac1 and SC63bc1, and to close the other.

The upper end of the pitman 1078 is provided with an opening 1090, comprising two offset interconnected slots, including operating surfaces 1091 and 1092. A stud 1093, fixed in an arm 1094, which is in turn integral with the arm 963 (see also FIG. 58), rides in said opening and is arranged to coact with the surfaces 1091 and 1092 at times.

The train of mechanism just described is controllable by the "Mail Phone" key 758, as well as the "Send" key 759. The arm 1064, to which the stem 1062 of the "Mail Phone" key 758 is attached, is provided with a projection 1095, arranged to coact with a stud 1096, fixed on the crank 1067, to shift said crank counter-clockwise when the key 758 is depressed, in the same manner as said crank is shifted by depression of the "Send" key 759.

The "Send" key 759, when depressed, is released just prior to the completion of each cycle of machine operation, while the "Mail Phone" key 758 is of the "stay-down" type and, when depressed, will remain depressed until the next succeeding totalizing operation takes place, at which time it will be released. It will be noted that depression of the "Mail Phone" key also effects depression of the "Send" key, due to the coaction of the projection 1095 with the stud 1096, and that, therefore, so long as the "Mail Phone" key remains depressed, the "Send" key will also remain depressed.

The manner in which the mechanism described above functions to cause opening of the contacts SC63bc1 and closing of the contacts SC63ac1, upon depression of either of the "Mail Phone" key 758 or the "Send" key 759, and the manner in which these contacts are caused to return to their normal conditions subsequently will now be described.

It will be recalled that the cam 960 completes one revolution during each cycle of machine operation, thereby imparting a regularly-excursioned movement to the arm 963. The arm 1094 and the stud 1093, which is fixed thereto, partake of this movement, and the stud 1093 is thereby shifted from the position in which it is shown in solid lines in FIG. 66 to the position in which it is shown in dotted lines, and back again, during each cycle of machine operation.

When neither the "Send" key 759 nor the "Mail Phone" key 758 is depressed, the pitman 1078 will remain in the position in which it is shown in FIG. 66, and the stud 1093 will merely oscillate in an idle movement in the opening 1090.

However, if either the key 758 or the key 759 is depressed at the beginning of a machine operation, the arm 1076 will be shifted to the left from the position in which it is shown in FIG. 66, through the linkage connecting said arm and the crank 1067. Since the stud 1093 is positioned in the lower portion of the opening 1090, as shown in FIG. 66, the pitman 1078 is retained against movement, and the stud 1077 can, therefore, not follow the movement of the arm 1076 to the left, but is held in the position shown, against the urging of the spring 1079. As the cam 960 rotates, the stud 1093 will be moved upwardly from the position in which it is shown in solid lines, out of the lower portion of the opening 1090, to the position in which it is shown in dotted lines. This frees the pitman 1078 for clockwise rotation about its pivot on the segment 1080, under the influence of the spring 1079. This movement of the pitman 1078 places the surface 1091 of the opening 1090 in the path of movement of the stud 1093, so that, as the cam 960 completes its revolution and the stud 1093 is urged downwardly in a return movement, the pitman 1078 will be carried downwardly with it. This is effective to rock the segment 1080 counter-clockwise about the point at which it is pivoted to the frame 905, causing the notch 1081 to come into contact with the stud 1083 on the flexible retaining arm 1084 to retain the segment 1080 in the position to which it has been shifted. At the same time, the roller 1088 on the arm 1087, which is fixed to the segment 1080, will coact with the blade 1089 to cause the contacts SC63bc1 to open and to cause the contacts SC63ac1 to close.

It will be recalled that during a total-taking operation the machine goes through two cycles of operation and that the cam 960 will, therefore, complete two full revolutions of movement. During the second revolution of the cam 960, the stud 1093 will merely oscillate idly in the left-hand portion of the opening 1090 and will not affect the position of the pitman 1078 or of the contacts SC63ac1 and SC63bc1.

Near the end of the second cycle of machine operation in a totalizing operation, the "Mail Phone" key will be released from its depressed position by mechanism which is well known. Similarly, in any other type of machine operation, such as an itemizing operation, in which the "Send" key 758 but not the "Mail Phone" key 759 has been depressed, near the end of such cycle of operation the "Send" key 759 will be released from its depressed position. In either event, the effect of the release of the keys 758 or 759 is that the arm 1076 is shifted to the right, thereby shifting the pitman 1078 counter-clockwise about its pivot point on the segment 1080 and positioning the surface 1092 of the opening 1090 in the path of movement of the stud 1093.

Then, on the next following cycle of machine operation, unless either the key 758 or the key 759 has been again depressed to rock the pitman 1078 clockwise through the action of the spring 1079, the stud 1093, in its regularly excursioned movement, will contact the surface 1092 and cause the pitman 1078 to be shifted upwardly, back to the position in which it is shown in FIG. 66. The segment 1080 will thereby be shifted clockwise back to the position in which it is shown in FIG. 66, the notch 1082 being once more positioned in contact with the stud 1083 of the flexible retaining arm 1084 to retain the segment in position. When the segment is thus shifted clockwise, the blade 1089, through its own resiliency, will shift back to the position in which it is shown in FIG. 66, thereby opening the contacts SC63ac1 and closing the contacts SC63bc1.

*Operating bar switch control means*

Means are provided for operating certain switches in the cash register in conjunction with depression of the operating bar, and for resetting said switches to their normal condition.

The operating bar 756 is mounted upon a slide 1100 (FIG. 67), which is supported by two studs 1101, projecting into slots 1102 in the slide 1100. These studs 1101 are mounted in the right side frame 1010 of the machine. The operating bar 756 is maintained in its normal outer position by a spring 1103. The slide 1100 is connected to an arm 1105, pivoted on a bearing 1104. A stud 1106 on the arm 1105 is arranged to coact with the end surface of the link 1107 (FIGS. 67 and 68), having a retaining finger 1108 thereon. The link 1107 is mounted for sliding movement by means of a stud 1109, on said link, which cooperates with a slot in the right side frame 1010, and by means of a stud 1110, in the right side frame 1010, which rides in a slot 1111 in the link 1107. A spring 1112, fixed to the stud 1109 and to the machine framework, urges the link to the left, as viewed in FIGS. 67 and 68, to maintain the end surface of the link 1107 in engagement with the stud 1106 on the arm 1105.

A stop plate 1113 is fixed to the link 1107, so that its upper edge normally engages the lower edge of a half stud 1114, fixed to a pitman 1115, urged downwardly by a spring 1116 and mounted for sliding movement by means of a slot 1117 at its lower end, which cooperates with the stud 1110, and by means of a slot in its upper end, which surrounds a stud 1118, fixed in the machine framework. An extension 1119, at the upper end of the pitman 1115, has fixed thereto a stud 1120, which rides in a slot 1121 in one arm of a bell crank 1122, pivoted on the stud 1118. Pivotally connected to the other arm of the bell crank 1122 is an operating member 1123, having a slot 1124 for receiving a stud 1125, fixed in the machine framework, to mount said member for sliding movement. An extension 1126 is adjustably fixed to the member 1123 and has at its free end a roller 1127, arranged to coact with the interconnected blades 1128, 1129, and 1130 of the contacts SC45a1, SC45a2, and SC45a3, respectively, which are mounted on the machine back plate 764, to operate said contacts.

Upon depression of the operating bar 756, the stop plate 1113 is shifted, through the arm 1105 and the link 1107, to the right, out of the path of movement of the half stud 1114 on the pitman 1115, thus releasing the pitman for downward movement under the influence of the spring 1116. This rocks the bell crank 1122 counter-clockwise, thereby shifting the member 1123, the extension 1126, and the roller 1127 to the right, causing said roller to coact with the interconnected blades 1128, 1129, and 1130 of the contacts SC45a1, SC45a2, and SC45a3 to close said contacts and retain them in a closed condition until the pitman 1115 is restored to its normal position.

The pitman 1115 is restored to the position in which it is shown in FIG. 68 by means of a restoring lever 1131. An arm 1132 is fixed to the key lock line 793. A stud 1133 in the arm 1132 cooperates with a corresponding notch in the lever 1131, which is also mounted on the key lock line, to cause said lever to move in unison with the arm 132. Near the end of each cycle of machine operation, a counter-clockwise rocking movement is imparted to the key lock line 793 in a well-known manner. This causes the lever 1131 to contact a stud 1134 on the pitman 1115 when the pitman has previously been shifted downwardly, and to carry said pitman upward to the position in which it is shown in FIG. 68. The resiliency of the blades 1128, 1129, and 1130 causes them to resume the positions in which they are shown in FIG. 68, when the roller 1127 is shifted to the left, thereby opening the contacts SC45a1, SC45a2, and SC45a3.

The link 1107, which will have been held in its operated position to the right of the position in which it is shown in FIGS. 67 and 68 by the coaction of the stud 1114 with a vertical surface 1135 of the plate 1113, will then be shifted to the left, to the position in which it is shown in FIGS. 67 and 68, by the action of the spring 1112, to position the horizontal surface of the stop plate 1113 in blocking relation to the half stud 1114, to retain the pitman 115 in the position in which it is shown in FIG. 68.

In the event that the spring 1112 should for any reason fail to return the link 1107 to the left following restoring movement of the pitman 1115, a non-repeat pawl 1136 is provided to prevent the pitman 1115 from moving downward a second time. The pawl 1136 is pivotally mounted on the link 1107, is normally urged clockwise by a spring 1137, and is retained in the proper plane of movement by a guide member 1138. It will be seen that, if the link 1107 is not returned to the position in which it is shown in FIG. 68 following restoring movement of the pitman 1115, the upper horizontal surface of the pawl 1136 will be interposed in the path of movement of the stud 1114 to prevent a second downward excursion of movement of the pitman 1115.

In normal operation of the machine, when the link 1107 is shifted to the right, coaction of the vertical edge of the upper end of the pawl 1136 with the stud 1114 prevents the pawl from slipping under the stud 1114 to block downward movement thereof, and permits the stud 1114 to move downwardly past the pawl, after which the spring 1137 causes the pawl to rock clockwise into engagement with the stop plate 1113. During restoring movement of the pitman 1115, the stud 1114 coacts with the camming surface 1139 on the pawl 1136 to cam said pawl out of the path of the stud against the force of the spring 1137 until the parts have reached the position in which they are shown in FIG. 68.

*Indicator segment switch control means*

Means are provided for operating certain switches in the cash register under control of the row 1 indicator segment.

The indicator-setting segment 873 (FIGS. 49 and 68) for row 1 is controlled by the row 1 differential mechanism in a well-known manner and is positioned according to the position of said differential mechanism. A plate 1144 (FIGS. 68 and 69) has a slot 1145 cut therein for reception of a stud 1146, carried on one end of a lever 1147, pivoted intermediate its ends on a bracket 1148, secured to the machine framework. The slot 1145 is provided with an offset "low" portion at a location corresponding to the Number 4 (or customer number) position of the differential mechanism, and is provided with a "high" portion at a location corresponding to the Number 9 (or clerk number) position of the differential mechanism. A second stud, 1149, is fixed at the other end of the lever 1147 for engagement with the bifurcated end portion of an actuating member 1150, pivotally mounted on a bracket 1151, secured to the back plate 764.

A roller 1152 (FIG. 59), mounted on an extension 1156, adjustably secured to the other end of the member 1150, is arranged to coact with a blade 1153 common to the contacts SC46ac1 and SC46bc1, and with two interconnected blades 1154 and 1155, which form part of the contacts SC43a1 and SC43a2. All of the contacts SC43a1, SC43a2, and SC46ac1 and SC46bc1 are mounted on the register back plate 764.

When the row 1 differential mechanism is positioned anywhere except the Number 4 or Number 9 positions, the stud 1146 is located in the main portion of the slot 1145, the lever 1147 and the actuating member 1150 are in the position shown in FIG. 69, and the contacts operated by this mechanism are in their normal condition. That is, the contacts SC43a1, SC43a2, and SC46ac1 are open, and the contacts SC46bc1 are closed.

When the row 1 differential mechanism is positioned in the Number 4 (or customer number) position, the plate 1144 is shifted, so that the stud 1146 is located in the "low" portion of the slot 1145, which rocks the lever 1147 counter-clockwise and the actuating member 1150 clockwise to cause the roller 1152 to shift the interconnected blades 1154 and 1155 to the right, thus closing the contacts SC43a1 and SC43a2. The contacts SC46ac1 and SC46bc1 are not affected and remain open and closed, respectively, in such a case.

When the row 1 differential mechanism is positioned in the Number 9 (or clerk number) position, the plate 1144 is shifted, so that the stud 1146 is located in the "high" portion of the slot 1145, which rocks the lever 1147 clockwise and the actuating member 1150 counter-clockwise to cause the roller 1152 to shift the blade 1153 to the left, thus opening the contacts SC46bc1 and closing the contacts SC46ac1. The contacts SC43a1 and SC43a2 are not affected and remain in an open condition in such a case.

*"Start Record" switch control means*

Means controlled by the operation of the cash register are provided for operating a set of contacts to initiate operation of the recorder.

A cam 1161 (FIGS. 70 and 71) is fixed to the main cam shaft 1036 of the cash register for cooperation with a roller 1162 on an arm 1163 free on a shaft 1164 mounted on the machine framework. Fixed by means of a sleeve 1165 to the arm 1163 to move therewith is a second arm 1166, having a stud 1167 at the end thereof. A spring 1168, connected to the arm 1166 and to the machine framework, urges the arms 1163 and 1166 clockwise (FIG. 70) to maintain the roller 1162 in contact with the cam 1161.

The stud 1167 is arranged to coact with the lower end of a pitman 1169 to shift said pitman upwardly, as viewed in FIG. 70, against the force of a spring 1170, extending between a stud 1171, at the upper end of the pitman 1169, and a second stud 1172, which is secured to a bell crank 1173 and which rides in a slot 1174 in the pitman 1169. Pivoted to the upper end of the pitman 1169 by the stud 1171 is one arm of a bell crank 1175, pivotally mounted on a bracket 1176, fixed to the back plate 764. The other arm of the bell crank 1175 has adjustably fixed thereon an extension 1177, at the end of which is mounted a roller 1178 for coaction with the blade 1179 of a set of normally open contacts SC42a1.

The cam 1161 is so shaped that at 175 degrees of rotation of a cycle of machine operation it will rock the arms 1163 and 1166 counter-clockwise (FIG. 70), against the force of the spring 1168, to cause the pitman 1169 to be shifted upwardly against the force of the spring 1170. This movement is transmitted through the bell crank 1175, the extension 1177, and the roller 1178 to shift the blade 1179 to the right, as viewed in FIG. 70, thereby closing the contacts SC42a1. Said contacts remain closed until the high portion of the cam 1161 has passed the roller 1162, at which time the spring 1168 returns the arms 1163 and 1166 to the positions in which they are shown in FIG. 70, and the spring 1170 returns the pitman 1169, the bell crank 1175, and the extension 1177 to the positions in which they are shown in FIG. 70. The resiliency of the blade 1179 is then effective to open the contacts SC42a1.

Means are provided to prevent the closing of the contacts SC42a1 during the first machine cycle of a total-taking operation.

Secured to one arm of the lever 1047 is a link 1180 (FIGS. 70 and 71), pivotally connected at its other end to an arm 1181, adjustably fixed to an arm 1182, fixed to one end of a shaft 1183 mounted in the machine framework. Near the other end of the shaft 1183 is fixed a segment 1184, having three operating surfaces 1185, 1186, and 1187 thereon, the surface 1186 being higher than the surfaces 1185 and 1187. These surfaces are arranged to coact with a stud 1188, fixed to the bell crank 1173, which is pivotally mounted on a bracket 1189, fixed to the back plate 764, and which is urged clockwise by a spring 1190, extending between said bell crank and a bracket 1191, fixed to the back plate 764.

As has been stated previously, the lever 1047 is given a slight clockwise movement when the total lever 755 is moved into any of its total-taking positions. This is transmitted through the link 1180, the arm 1181, and the shaft 1183 to position the segment 1184 so that its higher surface 1186 is in contact with the stud 1188 of the bell crank 1173. Such movement rocks the bell crank counter-clockwise and thereby, through the stud 1172 and the slot 1174, shifts the pitman 1169 to the right to the position in which it is partially shown by dotted lines in FIG. 70.

When the pitman 1169 is in its dotted-line position, it is out of the path of movement of the stud 1167 and therefore will not be shifted upwardly to close the contacts SC42a1 during the first machine cycle of a total-taking operation.

It will be recalled that near the end of the first machine cycle in a total-taking operation the lever 1047 is given an additional clockwise movement in a well-known manner. This is effective, through the link 1180, the arm 1181, and the shaft 1183, to position the segment 1184 so that the surface 1187 is in contact with the stud 1188 on the bell crank 1173. This permits the bell crank to be rocked clockwise by the spring 1190 to return the pitman 1169 to its full-line position, as shown in FIG. 70. Then, during the second machine cycle in a total-taking operation, the cam 1161 will rock the arms 1163 and 1166 counter-clockwise to cause the contacts SC42a1 to be closed for a time.

Near the end of the second machine cycle of a total-taking operation, the lever 1047 is rocked counter-clockwise in a well-known manner to return said lever to the position in which it is shown in FIG. 70. This rocks the segment 1184 so that the surface 1185 thereon is once more positioned in contact with the stud 1188, thereby leaving the lower end of the pitman 1169 positioned in the path of movement of the stud 1167 at the conclusion of a total-taking operation.

*Media reader disabling switch control means*

Means controlled by the operation of the cash register are provided for operating a set of contacts to disable the media reader at proper times.

The key lock line 793 has fixed thereto an arm 1196 (FIG. 57), to which is pivotally connected one end of a link 1197. The link 1197 is pivotally connected at its other end to a clutch release segment 1198 mounted on a stud 1199 fixed in the machine framework. The clutch release segment 1198 is operated by the clockwise rocking of the key lock line 793 to release the machine clutch mechanism in a well-known manner and thereby to initiate a cycle of machine operation.

Fixed intermediate the ends of the link 1197 is a headed stud 1200 arranged to cooperate with a slot 1201 in one end of a link 1202 mounted for sliding movement by means of two studs 1203 fixed in the machine framework and cooperating with corresponding slots in the link 1202. Pivotally connected to the other end of the link 1202 is a lever 1204 rotatably mounted on a bracket 1205 secured to the back plate 764. An extension 1206, adjustably secured to the lever 1204, has a roller 1207 mounted thereon for cooperation with a blade 1208 of a set of normally closed contacts SC60b1 mounted on the back plate 764.

Clockwise rotation of the key lock line 793 at the beginning of each cycle of machine operation causes the stud 1200 on the link 1197 to coact with the slot 1201 to shift the link 1202 to the right, as viewed in FIG. 57. This rocks the lever 1204 and the extension 1206 counter-clockwise, causing the roller 1207 to coact with the blade 1208 to open the contacts SC60b1 and thereby prevent operation of the media reader when the cash register is operating.

Subsequently in the cycle of machine operation, the key lock line 793 is returned to its original position, thereby returning the arm 1196, the link 1197, the link 1202, the lever 1204, and the extension 1206 to the positions in which they are shown in FIG. 57, and permitting the resiliency of the blade 1208 to reclose the contacts SC60b1.

*Machine release mechanism*

Means are provided for releasing the cash register for operation, said means being operable either manually or electrically.

As has been stated previously, the cash register is released for operation through the clockwise movement of the key lock line 793 (FIGS. 57 and 69), which is transmitted by the link 1197 to the clutch release segment 1198.

The key lock line 793 is spring-urged clockwise in a well-known manner and is retained against clockwise movement by means of the coaction of a flat stud 1215 (FIG. 69), mounted on an arm 1216 fixed to the key lock line 793, with the end surface of a trip pawl 1217 pivoted on a shaft 1218 supported in the machine framework.

A slot 1219 in the pawl 1217 receives a stud 1220 in a link 1221 mounted for sliding movement by means of two studs 1222 fixed in the machine framework and co-operating with corresponding slots in said link. A spring 1223, extending between one of the studs 1222 and a stud 1224 on the link 1221, urges said link to the left. A slot 1225 in the right end of the link 1221 surrounds a stud 1226 fixed on one arm of a bell crank 1227 rotatably mounted on a bracket 1228 fixed to the back plate 764. A stud 1232 in the other arm of the bell crank 1227 rides in a slot 1229 of a link 1230 and is urged toward the lower end of said slot by a spring 1231 connecting the stud 1232 and a stud 1233 on the link 1230. The link 1230 is pivotally connected to an operating member 1234 of a solenoid L40, fixed to the back plate 764. The connection described above between the link 1230 and the bell crank 1227 provides about one-sixteenth-inch free travel for the solenoid-operating member 1234 before it picks up its full load, thereby reducing the force required from the solenoid.

Energization of the solenoid L40, in a manner which will be fully described in the description of the circuit diagram of FIGS. 73A to 73F inclusive, causes the operating member 1234 to be shifted downwardly, as viewed in FIG. 69. This movement is transmitted by the link 1230, the bell crank 1227, and the link 1221 to rock the trip pawl 1217 counter-clockwise and thereby shift the end surface of said pawl out of blocking relation to the stud 1215. When this occurs, the stud 1215 moves beneath the right end of the pawl 1217, permitting the key lock line 793 to be operated by its spring means to initiate operation of the machine.

Near the end of the cycle of operation of the machine, the key lock line 793 moves back to and past its home position. Consequently the stud 1215 moves out from under the trip pawl 1217 and past the end of the non-repeat pawl 1235, which is provided to prevent repeat operations if the manual release key 757 or one of the motorized keys should be held depressed during the entire operation of the machine. A stud 1236 is mounted in the right side frame 1010 to limit the extent of movement of the non-repeat pawl 1235. The non-repeat pawl 1235 is normally held against a shoulder 1237 on the pawl 1217 by a spring 1238, but, when the solenoid L40 is energized, the pawl 1217 is elevated out of contact with the non-repeat pawl 1235, and the stud 1215 prevents the pawl 1235 from following the pawl 1217.

If the solenoid L40 is caused to remain energized during the entire operation of the machine, thus holding the pawl 1217 elevated, then, near the end of the cycle of operation of the machine, when the shaft 793, the arm 1216, and the stud 1215 are moved counter-clockwise back past their home positions and past the end of the non-repeat pawl 1235, the spring 1238 will rock the non-repeat pawl 1235 upwardly until it contacts the shoulder 1237 of the pawl 1217, thus locking the machine against another operation. In this position, the end of the non-repeat pawl 1235 is in the path of the stud 1215, and consequently the machine cannot be released, even though the solenoid L40 remains in an energized condition and the pawl 1217 remains elevated.

To return the machine to operative condition, the manual release lever 761A (FIG. 1) may be pulled. This causes the key lock line 793 to be shifted counter-clockwise, in a well-known manner, to release any depressed keys on the keyboard and to shift the stud 1215 out of contact with the end of the non-repeat pawl 1235. Since the solenoid L40 will in no event remain energized after all depressed keys have been released, the spring 1223 is permitted to shift the link 1221 to the left, as viewed in FIG. 69, returning the trip pawl 1217 and the non-repeat pawl 1235 to the positions in which they are shown in FIG. 69.

Manually-operated machine-releasing means are also provided to enable release of the machine when the power supply has failed and it is desired to operate the machine manually. It is contemplated that this means will be lock-controlled, so that the machine may not be released by the manually-operated means except under the control of a person in authority.

Secured to the manual release key 757 is a stem 1240, which is bitted for cooperation with pin tumblers (not shown) in a plug 1241 mounted for sliding movement in a lock cylinder 1242 secured to a bracket 1243 fixed to the right side frame 1010. An extension of the plug 1241 forms an operating member 1244, which is positioned to coact with a tail 1245 on the trip pawl 1217. The plug 1241 with its operating member 1244 is normally maintained in the position in which it is shown in FIG. 69 by a spring 1246, which is connected between the member 1244 and the bracket 1243.

The key 757 with its attached stem 1240 may be kept in the custody of a person in authority and used only when it is necessary to release the machine manually instead of electrically. The provision of a lock in conjunction with the key 757 insures that no unauthorized person will be able to release the machine manually.

To effect a manual release of the machine, it is merely necessary to insert the stem 1240 of the key 757 into the plug 1241, which alines the pin tumblers in the lock to free the plug 1241 for movement relative to the lock cylinder 1242, and then to depress the key 757, which shifts the plug 1241 and its operating member 1244 downwardly against the force of the spring 1246. The operating member 1244 engages the tail 1245 and rocks the pawl 1217 counter-clockwise, as viewed in FIG. 69, to elevate the right end of said pawl out of blocking relation to the stud 1215. This permits the key lock line 793 to rock clockwise to release the machine for operation.

As soon as the key 757 is released by the operator, said key and the operating member 1244 will be returned by the spring 1246 to the position in which they are shown in FIG. 69, and the pawl 1217 will be permitted to return to its normal position under the influence of the spring 1223 when the key lock line 793, the arm 1216, and the stud 1215 have been returned to the position in which they are shown in FIG. 69 near the end of the cycle of machine operation. In the event that the key 757 is held depressed during the entire cycle of machine operation, the non-repeat pawl 1235 will function in the manner previously described to prevent a repeat operation of the machine.

CIRCUIT DIAGRAM

The circuits involved in coordinating the operation of the cash register, the media reader, and the recorder units of the apparatus are shown in FIGS. 73A to 73F inclusive. In these figures, certain switches which are mere duplicates of others, such as the differentially-controlled register readout switches SR44a1 to SR46a1 inclusive, have been omitted, as their operation is substantially the same as that of the one or ones shown and will be clear from the explanation of the operation of the ones which are shown.

It is believed that the circuits may best be explained by a description of them as they function in preparing the apparatus for operation and in carrying out typical operations of the apparatus. In this explanation, it will be assumed that the cash register, the media reader, and the recorder have previously been operated through a complete transaction and are in home position, ready to receive the entries of a new transaction.

Power is turned on by closure of the main power switch 125 (FIG. 1), which is located on the cash register cabinet. The operation of the switch 125 closes its contacts ST40a1, ST40a2 (FIG. 73A) to close a circuit to make the usual 117 volts, 60-cycle A.C. available to the cash register motor 1300, the media reader motor 333, and the recorder motor 601 and, through the rectifier 598, to supply D.C. operating potential to the control circuits over conductors 1304 and 1305.

Figure 73C:
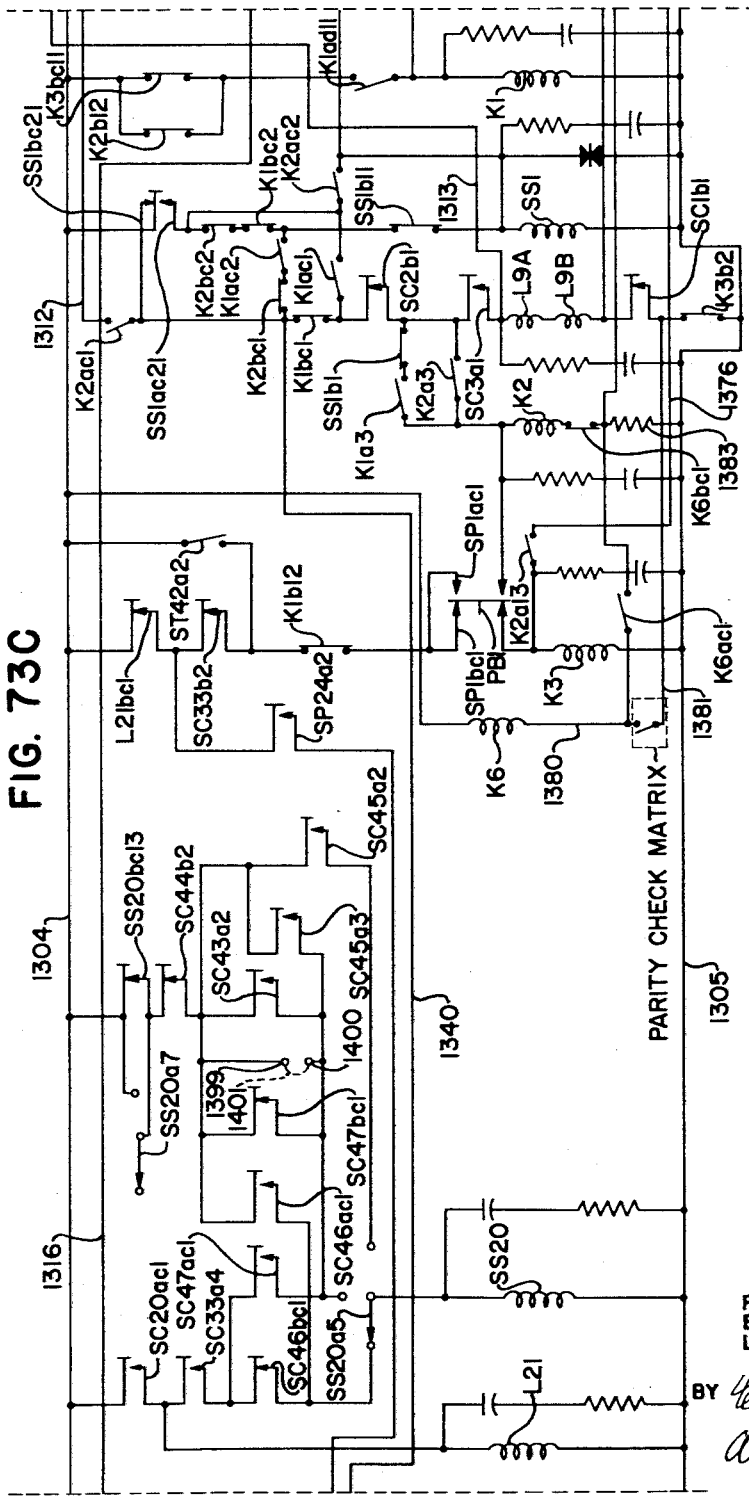

The reader cut-out switch 762 (FIG. 48A), comprising a double-pole double-throw toggle switch located on the back of the register in a compartment which is normally locked to prevent entry of anyone except authorized persons, may be shifted from the position in which its contacts are shown on the circuit diagram to a second position to disconnect, electrically, the media reader from the recording system circuit. This may be done when the media reader has been physically removed from the system, as for servicing, or when it is desired to operate the recording system without using the media reader. The reader cut-out switch 762 has a first set of contacts ST42a1 (FIG. 73A), which are effective, when shifted from the position shown in FIG. 73A to a closed position, to by-pass the electrical sequencing control and interlock means between hte cash register and the media reader to permit operation of the register by the use of any desired control key in any desired sequence independent of the contacts SS20a1 of the sequence selector switch 518 (FIG. 32). A second set of contacts ST42a2 (FIG. 73C), when shifted from the position in which they are shown in FIG. 73C to a closed position, provide a path from the D.C. conductor 1304 to the contacts K1b12 for energization of the relays K2 and K3. This path is normally provided through the media reader contacts L21bc1 and SC33b2, but these contacts would be removed from the circuit by removal of the media reader, and a substitute path is therefore provided.

The recorder cut-out switch 763 (FIG. 48a), comprising a double-pole double-throw toggle switch, is also located in the same locked compartment in the back of the register. Closing of this switch electrically disconnects the recorder from the recording system circuit. This may be done when the recorder has been physically removed from the system, as for servicing, or when it is desired to operate the register without the recorder. The recorder cut-out switch 763 has a first set of contacts ST43ac1 and ST43bc1 (FIG. 73A), which are effective, when moved from the positions in which they are shown in FIG. 73A to their other positions, to cut off the A.C. power line to one side of the rectifier 598 (FIGS. 43 and 73B) and thereby disable the entire D.C. portion of the recording system circuit, so that only the register is still capable of functioning. A second set of contacts ST43a2 (FIG. 73A), when shifted to their alternate position, complete a circuit for lighting a lamp 1384 to provide visible indication that the recorder is not operating as part of the system.

Generally, when the recorder cut-out switch 763 is thrown, it will also be desired to throw the media reader cut-out switch 762, since the media reader will not operate with the recorder cut-out switch thrown, and there is no reason to retain the enforcement of a certain sequence of operations of the cash register.

Assuming now that the contacts ST42a1, ST42a2, ST43ac1, ST43bc1, and ST43a2 are in the positions in which they are shown in the circuit diagram, and that power has been turned on by operation of the main power switch 125 to close contacts ST40a1 and ST40a2, the application of operating potential immediately causes the "recorder on" lamp 674 of the recorder to light and remain lighted to indicate that the operating potential is being applied. The lamp 674 is also controlled so as to flash periodically rather than remain constantly lighted in the event that the tape supply for the recorder is low, since a low tape supply will cause the contacts SC5bc1 (FIGS. 46 and 73B) to open, thus causing the circuit to be completed to the lamp 674 through a flasher 1397, which periodically makes and breaks connection as the metal of which it is made alternately is heated by current passing through it and then cools as the connection is broken due to the metal's movement under the influence of heat.

The application of operating potential to the conductors 1304 and 1305 through the rectifier 598 causes the relay K3 to be energized over the normally-closed contacts L21bc1, the normally-closed contacts SC33b2, the normally-closed relay contacts K1b12, and the normally-closed contacts SP1bc1 of the Leader Advance push button PB1. The energization of the relay K3 opens relay contacts K3b1 (FIG. 73B) to interrupt the circuit to the media reader and recorder motors 333 and 601. Energization of the relay K3 also closes the contacts K3ac11 (FIG. 73D) to prepare the media reader and recorder for operation under the proper circumstances, and opens the contacts K3bc11 (FIG. 73C), which are in the holding circuit for the relay K1 for the purpose of releasing said relay at the end of the recording operation. The contacts K3bc11 have no effect on the circuit at this time. In addition, energization of the relay K3 opens the contacts K3b2 (FIG. 73C) in the circuit for the punch clutch magnets L9A and L9B.

The preparation of the tape for use with most of the computer systems, auxiliary card-punching equipment, or other data-processing apparatus requires that a section, called a "leader," be produced on each end of the tape. These sections are characterized either by multiple punching of a special Leader Advance or run-in code, or by the presence of sprocket feed holes only. In either case, it is necessary to connect a connector between two receptacles located in the recorder circuit to prepare the proper punching circuit. If only sprocket feed holes are to be punched, the connector is connected between receptacles 1308 and 1309 (FIG. 73F). If a special Leader Advance or run-in code is to be punched, the connector connects a receptacle 1310 (FIG. 73F) and the receptacle 1308. In the illustrated embodiment of the invention, these receptacles are located on the upper portion of the diode symbol encoding board 1311 (FIG. 73F).

Depression of the Leader Advance push button PB1 completes a circuit through the contacts SP1ac1 (FIG. 73C), which causes the run-in and step relay K2 to energize. This push button also opens the contacts SP1bc1 to deenergize the register lockup relay K3. The deenergization of relay K3 closes the contacts K3b1 (FIG. 73B) to apply power to the recorder motor 601 and closes the contacts K3b2 (FIG. 73C) to prepare an energizing circuit for the punch clutch magnets L9A and L9B. Deenergization of the relay K3 also opens contacts K3ac11 to interrupt the initiating circuit for media reader operation.

If only sprocket feed holes are to be punched in the Leader Advance or run-in portion of the tape, the energization of the relay K2 and the deenergization of the relay K3 will complete a circuit from the conductor 1304 over contacts SS1bc21 (FIG. 73C), contacts K2ac1, which are closed by energization of the relay K2, a conductor 1312, the receptacle 1308 on the diode symbol encoding board 1311 (FIG. 73F), a connector to the receptacle 1309, a conductor 1313, the punch clutch magnets L9A and L9B (FIG. 73C), the contacts SC1b1, and the contacts K3b2 to the conductor 1305 to energize the magnets L9A and L9B, which trip the clutch and cycle the punching mechanism to punch the sprocket feed holes.

As has been stated, the contacts SC1b1 in this circuit are safety contacts to prevent operation of the punching mechanism if conditions are such that proper punching cannot be obtained. These contacts will open to prevent the energization of the punch clutch magnets L9A and L9B, if a bind in the tape pulls in the tension control lever 678 (FIG. 44), or if there is no paper tape under the tape feeler 679 (FIG. 44), or if the pressure plate lever 690 is not returned to the position in which it is shown in FIG. 44 after the tape is inserted, as explained earlier.

The cycling of the punching mechanism to punch Leader Advance sprocket feed holes will continue so long as the Leader Advance push button is held depressed. Release of this button will open the circuit described and stop the operation.

The relay K2 closes contacts K2a3 (FIG. 73C) in a holding circuit which extends to conductor 1304 over the contacts SC2b1, K1bc1, and SS1bc21 and will maintain the relay energized until the contacts SC2b1 open during a punching operation, thus insuring that at least one Leader Advance punching will take place even if the push button PB1 is momentarily operated or is released before completion of a punching operation.

If a special Leader Advance code is to be punched and receptacle 1308 is connected to receptacle 1310 on the diode symbol encoding board 1311 (FIG. 73F), the energization of the relay K2 and the deenergization of the relay K3 completes a circuit to the punch clutch magnet L9A and L9B in a slightly different manner. The circuit extends from the conductor 1304, over the contacts SS1bc21, K2ac1, conductor 1312, and receptacle 1308, as before, but from here it continues through a connector between the receptacle 1308 and the receptacle 1310 through a conductor 1314 to the Number 9 input conductor of the diode symbol encoding board 1311. Diodes are plugged into this board to connect this input conductor with the punch-selecting magnets that will be used in punching the run-in code in this case, PS1 to PS6. The return circuit for the punch-selecting magnets continues to conductor 1305 over the contacts K2ad11, the safety contacts SC1b1, and the normally-closed contacts K3b2, which are closed, since the relay K3 is deenergized. Contacts SC1b1 in this circuit will prevent the energization of the punch-selecting magnets as well as the punch clutch magnets L9A and L9B if the conditions are such that proper punching cannot be had.

When the punch-selecting magnets are energized, they select their associated punches for perforating the tape and enable the punch-selecting levers to close the contacts SC3a1 (FIG. 73C), which completes a circuit from the conductor 1304 to the punch clutch magnet L9A and L9B through the contacts SS1bc21, K1bc1, SC2b1, SC3a1. As the magnets L9A and L9B energize, they initiate a punching cycle, which causes the code to be punched into the tape. Punching will continue as long as the Leader Advance push button PB1 is depressed. When the push button is released, relay K3 will be reenergized and relay K2 will be deenergized.

When removing punched tape from the machine, some operators could conceivably follow the following procedure: they might tear the tape near the supply roll and then depress the Leader Advance button until the torn end of the tape runs far enough through the punch to cause the tape feeler 679 (FIG. 44) to drop and open the contacts SC1b1 to stop punch operation by deenergizing the punch clutch magnets L9A and L9B. When the punch operation is completed in this manner, it is possible that some of the punch-selecting magnets may remain energized. If left energized over a period of time, the punch-selecting magnets will overheat and burn out; therefore safeguards have been added to prevent this condition. These safeguards are the relay contacts K2ad11 and K2bd11 (FIG. 73D).

During a Leader Advance operation, as has been stated, the run-in and step relay K2 is energized. This relay closes the contacts K2ad11 and connects the punch-selecting magnets to the conductor 1305, through the contacts SC1b1. If the punched tape is removed from the machine as described in the previous paragraph, the opening of contacts SC1b1 not only will stop punch operation but will also deenergize all of the punch-selecting magnets. This, of course, prevents damage due to the overheating of the punch-selecting magnets. Contacts K2bd11, which are closed when the relay K2 is not energized, have been added to provide a path from the punch-selecting magnets to the conductor 1305 when recording is under control of the media reader, which does not require relay K2 to be energized. This is necessary because, if the circuit were completed through contacts SC1b1, information from the apparatus might be lost if these tape interlock contacts were to open during a portion of the operating cycle of the apparatus.

As has been previously described, two diode encoding boards 1311 and 1315 (FIG. 73F), mounted back to back on a bracket assembly 732 (FIG. 43), form the diode encoding unit 609, each diode encoding board being constructed to form a matrix system, eight columns wide and ten rows high, with a socket at each junction suitable for the insertion of a diode. Encoding of digits and symbols is accomplished by the mere insertion of diodes into appropriate sockets on these boards. A diode plugged into one of these sockets completes an electrical circuit between the column and the row associated with the socket. Diodes are used in these circuits because of their characteristic of allowing current to flow in only one direction. Without diodes, back circuits would make it impossible to electrically isolate the different digit lines, symbol lines, and punch-selecting magnets from each other unless, of course, a separate individual circuit were included throughout the recorder for each perforation required during a punching cycle. As has also been described previously, in addition to the matrix system, there is a row of seven taper pin receptacles, such as the receptacles 1308, 1309, and 1310, located in the upper portion of each of the two diode boards. These receptacles may be connected by connectors for special encoding when required.

Charge transaction

After the Leader Advance code has been punched, the recording system is ready to record a transaction. For purposes of illustration, it will be assumed that the transaction to be described is a charge sale; that a single item of merchandise is involved; that tokens will be used for clerk and customer identification; and that a tag will be used for merchandise description; and lastly it will be assumed that the selector switch 518 (FIG. 32), with its sets or levels of contacts SS20a1 to SS20a7 inclusive, is in its first position.

Since this is a charge sale, the Charge key of row 9 of the cash register is depressed, which causes contacts SC61a1 (FIG. 73B) to close, contacts SC47ac1 (FIG. 73C) to close, and contacts SC47bc1 (FIG. 73C) to open.

A clerk identification token is then inserted into the media reader in order that a record of the identity of the clerk handling the transaction will be punched in the tape. Insertion of the token causes contacts SC23a1 (FIG. 73B) to close, which completes an energizing circuit from the conductor 1304 to an alining pin and reset solenoid L20 (FIG. 73B) through the contacts K3ac11 (FIG. 73B), a conductor 1316, the contacts SP24b1 (FIG. 73B), SC21b1, SS20a2 (position 1), SC23a1, SC37b1, the safety contacts 1326, which are adapted to open in the event of likelihood of burning out of the solenoid L20, the solenoid L20, the contacts SC61a1, which have been closed by depression of the Charge key in row 9 of the cash register, and the normally-closed contacts SC60b1. The contacts SC60b1 are opened by the rotation of the key lock line 793 in the cash register to prevent the operation of the media reader during the operation of the cash register; however, at this time they are closed, since the cash register has not been tripped for operation. Energization of the alining pin and reset solenoid L20 causes contacts L20b1 (FIG. 73A) in the circuit for initiating operation of the cash register to open, and also causes the alining pins to move forward and engage corresponding alining holes in the clerk token. If the token has been properly positioned in the media reader, the alining pins will move through the openings in said token and cause the contacts SC20bc1 (FIG. 73B) in a reset energizing circuit to the media reader clutch solenoids L22A and L22B to open, and also cause the contacts SC20ac1 (FIG. 73C) to close, thus applying potential to the clamp and sensing switch solenoid L21 (FIG. 73C), which actuates the clamping block 181 (FIG. 6) to clamp the clerk token to hold it firmly in place. It will be recalled that a linkage comprising the lever 292 (FIG. 31), the link 308, and the lever 416 between said solenoid and the arm 414 also releases said arm upon the energization of solenoid L21 to release the five sensing wires which control the contacts SC25a1, SC26a1, SC27a1, SC28a1, and SC29a1 (FIG. 73B).

Energization of the clamp and sensing switch solenoid L21 causes the contacts L21ac1 (FIG. 73B) to close to complete a circuit over the contacts L21ac1, SP24b1, SC21b1, SS20a2 (position 1), SC23a1, SC37b1, the safety contacts 1326, the solenoid L20, the contacts SC61a1, and the conactts SC60b1 for energizing the solenoid L20, and also causes the contacts L21bc1 (FIG. 73C) to open, thereby deenergizing the relay K3. This causes the contacts K3b1 (FIG. 73B) to close to supply power to the media reader and recorder motors 333 and 601, and also causes the contacts K3ac11 (FIG. 73D) to open to interrupt the original energizing circuit to the solenoid L20, which is now held energized through the contacts L21ac1. In addition, the contacts K3b2 close to prepare an energizing circuit for the punch clutch magnets L9A and L9B.

To initiate operation of the media reader, therefore, the Charge key of the cash register must have been operated, the clerk token must be properly inserted into the reader, and said token must have a hole in the clerk position of its identification section. Movement of the corresponding sensing wire through this hole causes the contacts SC25a1 to close, completing a circuit through the contacts SC25a1, the contacts SS20a3 (position 1), the contacts SC33b1 of the media reader, which are closed in the home and the No. 1 positions of the media reader cam line, and the contacts SC35b2, to energize the media reader clutch solenoids L22A and L22B. The contacts SC35b2 are closed to complete a shunt circuit across a 2000-ohm resistor 1317 and thus provide a high energizing voltage for the solenoids L22A and L22B. Subsequent removal of the shunt from across the resistor 1317 allows the resistor to become effective to reduce the current through the solenoids L22A and L22B to a lesser value required to maintain them in energized condition, thereby minimizing the danger of overheating of the solenoids.

In the event that the wrong token is inserted in the media reader, the sensing wire for the contacts SC25a1 will not be able to come forward, since no hole will be positioned opposite said sensing wire in the identification section of the token. Therefore, the contacts SC25a1 will not close, and the media reader clutch solenoids L22A and L22B will not be energized for initiation of operation of the media reader. Means which will be described subsequently, and which are controlled by the push button 490 (FIG. 1), are provided to enable the release of an erroneously-inserted tag or token.

Assuming, now, that the correct token has been inserted into the media reader, and that the contacts SC25a1 have closed to complete an energizing circuit to the media reader clutch solenoids L22A and L22B, the clutch will be engaged to couple the cam line to the media reader motor. As has been stated, the clutch employed for coupling the media reader cam line to its operating motor 333 is of the single-revolution type, which is tripped by solenoids L22A and L22B to cause the clutch to cycle for a single revolution to couple the cam line to the motor. Upon completion of the single revolution, the clutch is disengaged, to disengage the cam line from the motor, unless the solenoids L22A and L22B have been energized a second time. As has been explained previously, no reading operation of the media reader takes place on the first revolution of the cam line following insertion of a token, since this is simply a delaying revolution to provide time for the various components of the media reader to assume their correct positions for reading of the token.

During the first cycle of operation of the clutch, the media reader cam line is moved from its home position to its No. 1 position. Since the contacts SC33b1 remain closed in both home and No. 1 positions of the media reader cam line, the circuit to the media reader clutch solenoids L22A and L22B remains completed and energizes said solenoids to cause the clutch to cycle again to engage the media reader motor with the media reader cam line for another revolution of said cam line.

During the second clutch cycle, in which the media reader cam line is moved from its No. 1 position to its No. 2 position, a symbol is punched on the recording tape to identify the type of token or tag being read. Punching of this symbol may be accomplished through one or both of two different means, depending upon the type of application in which the recording system is being used. Customarily, only one of these two means will be used for the punching of a tag identification symbol on the recording tape, and the other of the means may then be used for some other purpose. One example of a purpose for which the other of the two means might be adapted is that of punching supplementary special symbols at desired points in the reading of the tag or token. These supplementary symbols could, for example, constitute intermediate reset signals in a tape-to-card converting system. Also, if desired, one of the two means could be used to cause punching of an end-of-frame symbol in the tape, while the other was used for the punching of a tag identification symbol, or for some other purpose if the tag identification symbol were deemed unnecessary.

One of the two available means for causing punching of a tag or token identification symbol in the tape includes the contacts SC34a1 (FIG. 73F), which close at approximately 15 degrees of movement before the end of the first revolution of the media reader clutch. These contacts are effective in cooperation with the actuating contacts SC35a1 (FIG. 73F), which are closed from 5 degrees to 130 degrees of revolution of the media reader clutch, to apply potential to the wiper of the selector switch contacts SS20a6 (FIG. 73F). At this point in the transaction, the wiper is in its No. 1 position, and the circuit therefore extends through a corresponding condutor in a cable 1318 to a terminal 1319 in a section 1320 on the register selection board 748 (FIG. 73D). A jumper wire may then be connected between this terminal and any desired terminal in the digit or symbol sections 889 or 1320, respectively, of the board 748 to complete a circuit to one or more of the punch-selecting magnets PS1 to PS8 for punching an apprporiate identification symbol for the clerk token. For purposes of illustration, a jumper wire 1322 (FIG. 73D) is shown connecting the terminal 1319 to a terminal 1323 in the symbol section 1324 of the board 748. A corresponding condutor in a cable 1325 connects the terminal 1323 with the "2" row of the diode symbol encoding board 1311 (FIG. 73F). A diode is shown connecting this row to a conductor connected in turn to the punch-selecting magnet PS8. Energization of the punch-seelcting magnet PS8 through the circuit described above causes the corresponding punch-selecting lever to close the contacts SC3a1 (FIG. 73C), which completes a circuit from the conductor 1304 to the punch clutch magnets L9A and L9B through the contacts SS1bc21, K1bc1, SC2b1, and SC3a1 to energize said magnets L9A and L9B. The punch clutch is thereby engaged to couple the recorder motor 601 to the punch cam line to initiate a punching cycle for the punching of a hole in channel 8 of the recording tape for identification of the clerk token.

The second of the two available means for causing punching of a tag or token identification symbol in the recording tape includes the media identification contacts SC25a2, SC26a2, SC27a2, SC28a2, and SC29a2 (FIG. 73F). These contacts are under the joint control of the five previously described sensing wires, which control the contacts SC25a1 to SC29a1 inclusive (FIG. 73B), and of the adjustable cam 357 (FIG. 21) on the media reader cam line. As has been described, the cam 357 may be so adjusted on the media reader cam line that the dwell portion of said cam can be changed in relative position to the remainder of the cam line. Therefore, for any of the contacts SC25a2 to SC29a2 inclusive to close, the corresponding sensing wire must be permitted to shift forward by having a hole, in the tag or token which is being read, positioned opposite said sensing wire, and the dwell portion of the cam 357 must be in operative relation to the actuating means for the contacts SC25a2 to SC29a2 inclusive. It will be seen that the cam 357 may be adjusted on the cam line 359 so that this dwell portion will come into operative engagement with the actuating means for the contacts at any desired time in the reading operation. For purposes of illustration, it will be assumed that the cam 357 is so positioned on the media reader cam line that the appropriate one of the contacts SC25a2 to SC29a2 will close to initiate an identification symbol punching operation during the second revolution of the media reader clutch.

In the operation being described, in which a clerk token has been inserted into the media reader, the contacts SC25a2 will, therefore, be closed. These contacts are effective in cooperation with the actuating contacts SC35a1 (FIG. 73F), which, as has been stated, are closed from 5 degrees to 130 degrees of revolution of the media reader clutch, to apply potential through a corresponding conductor in a cable 1327 to a terminal 1328 in a section 1329 on the register selection board 738 (FIG. 73D). A jumper wire may then be connected between this terminal and any desired terminal in the digit or symbol section of the board 748 to complete a circuit to one or more punch-selecting magnets PS1 to PS8 for punching an appropriate identification symbol for the clerk token. For purposes of illustration of this means of causing punching of the clerk token identification symbol, a jumper wire 1330 rather than the jumper wire 1322 is used and is shown connecting the terminal 1328 in the section 1329 to the terminal 1323 in the symbol section 1324 of the board 748. As has been previously described, the terminal 1323 is connected by a corresponding conductor in the cable 1325 to the "2" row of the diode symbol encoding board 1311 (FIG. 73F), and a diode may be used to connect this row to a conductor connected in turn to the punch-selecting magnet PS8. Energization of the punch-selecting magnet PS8 through the circuit described above causes a hole to be punched in channel 8 of the recording tape for identification of the clerk token, as has been previously described.

After the second revolution has been initiated, the contacts SC33bl1 (FIG. 73B) which are closed in the home and No. 1 position of the media reader cam line, will open, and the contacts SC33a3 (FIG. 73B), which are open in the home and No. 1 positions of the media reader cam line, will close. The contacts SC4ac1 (FIG. 73B), which are positioned on the cam line of the recorder, are closed between 215 degrees and 310 degrees of the punching cycle, and are thus closed at the completion of the actual punching operation. A circuit is completed through the contacts SC4ac1 and the now-closed contacts SC33a3 (FIG. 73B) to the media reader clutch solenoids L22A and L22B, to trip the media reader clutch to make a third cycle. The third and following cycles of the media reader clutch effect rotation of the media reader cam line through successive increments, so that successive cams on the cam line release their corresponding sets of five sensing wires for the reading of successive columns on the tag. The holes in each column of the tag permit corresponding sensing wires to come forward and close the corresponding ones of the reader contacts SC36a1 to SC36a5 (FIG. 73F.) As the actuating contacts SC35a1 (FIG. 73F) close at five degrees of revolution of the media reader clutch, a circuit is completed from conductor 1304, over the contacts SC35a1, the conductor 1305, the ones of the contacts SC36a1 to SC36a5 which are closed, and the corresponding conductors in a cable 1335 to terminals in the section 1336 of the diode digit encoding board 1315. Jumper wires are used to connect these terminals to terminals connected to conductors which in turn are connected to the punch-selecting magnets PS1 to PS8. The jumper wire 1337 in FIG. 73F, connecting terminals 1338 and 1339, is shown as an example of such a wire. As has been described previously, the energization of the selected ones of the punch-selecting magnets PS1 to PS8 inclusive, through the circuit described above, causes the corresponding punch-selecting levers to close the contacts SC3a1 (FIG. 73C) to complete a circuit from the conductor 1304 to the punch clutch magnets L9A and L9B, through the contacts SS1bc21, K1bc1, SC2b1, and SC3a1. A punching cycle is thus effected, and at 215 degrees of the operation of the punching mechanism the answer-back contacts SC4ac1 (FIG. 73B) are closed to complete an energizing circuit to energize the media reader clutch solenoids L22A and L22B, to trip the media reader clutch for a further cycle of operation.

The cams on the cam line of the media reader are so designed that the dwell portion of each cam, which causes release of the sensing wires for the digit to be read, comes into sensing-wire-releasing position shortly before the end of the previous revolution of the media reader clutch, so that the reader contacts SC35a1 will close to complete the proper circuits at the beginning of the clutch revolution in which the digit is read. Since each clutch cycle is initiated by completion of the circuit to the media reader clutch solenoids L22A and L22B, through the contacts SC4ac1 (FIG. 73B) on the recorder cam line, each subsequent reading operation must await the proper recording of the preceding reading operation. This reading process continues until all of the information upon the tag has been read by the media reader and recorded by the recorder.

Upon completion of the reading of the tag, a reset operation is employed to rotate the media reader cam line back to its home position, in preparation for the next tag-reading operation. A reset operation is initiated by the opening of the end-of-tag contacts for the tag which has just been read. In this case, it is the clerk token which has just been read, and therefore the clerk token end-of-tag contacts SC21b1 (FIG. 73B) will be opened. The end-of-tag contacts are located on the media reader cam line and are designed to open at a particular time in the reading cycle, depending upon the predetermined length of the tag being read. Opening of the contacts SC21b1 interrupts the circuit to the alining pin and reset solenoid L20, causing said solenoid to be deenergized. This causes the alining pins to be withdrawn from the alining holes in the clerk token, to permit said token to be ejected from the media reader. Withdrawal of the alining pins also causes the contacts SC20ac1 (FIG. 73C) to open and the contacts SC20bc1 (FIG. 73B) to close. Opening of the contacts SC20ac1 interrupts the circuit to the clamp and sensing switch solenoid L21, thus causing said solenoid to deenergize. Deenergization of the solenoid L21 causes the contacts L21ac1 (FIG. 73B) in an energizing circuit for the solenoid L20 to open, and causes the contacts L21bc1 (FIG. 73C) to close.

When the contacts SC4ac1 (FIG. 73B) close near the end of the operation in which the punching of the last digit or symbol to be recorded takes place, an energizing circuit is completed through the normally-closed contacts K6b11; the contacts SC4ac1; the contacts SC33a3, which are closed except in home and No. 1 positions of the media reader cam line; and the contacts SC35b2, to the media reader clutch solenoids L22A and L22B. Energization of these solenoids causes the contacts L22a1 (FIG. 73B) to close. The contacts, together with the now-closed contacts SC20bc1 and the contacts SC33a3, complete a holding circuit through the solenoids L22A and L22B, to retain said solenoids in an energized condition after the answer-back contacts SC4ac1 open, as the punch mechanism of the recorder completes its cycle. The media reader clutch is thereby held in an engaged condition, so that the motor and the cam line of the media reader remain coupled until the cam line has moved sequentially to its thirty-sixth position. During the thirty-sixth revolution of the media reader clutch, the contacts SC33a3, which, it will be recalled, are open in home and No. 1 positions of the media reader cam line, open, to deenergize the solenoids L22A and L22B, and the media reader clutch disengages the media reader cam line from the motor at the end of the thirty-sixth revolution, which positions the media reader cam line in its so-called home position. Deenergization of the solenoids L22A and L22B also causes the contacts L22a1 to open.

In order to enforce a certain sequence of operation in the recorded transaction, it is necessary to move the sequence selector switch 518 (FIG. 32) to its next position following the reading of the clerk token. During the recording of the data from the clerk token, when the contacts SC33a4 (FIG. 73C), which were open only in home and No. 1 positions of the media reader cam line, closed, they completed a circuit through the contacts SC20ac1 (FIG. 73C), which were closed by movement of the alining pins into the alining holes in the clerk token, the contacts SC33a4, the normally-closed contacts SC46bc1, and the contacts SS20a5 (position 1) to energize the selector switch solenoid SS20. When the alining pin and reset solenoid L20 was deenergized upon completion of reading of the clerk token, thus causing the contacts SC20ac1 to open, the circuit to the sequence selector switch solenoid SS20 was interrupted. The sequence selector switch 518 (FIG. 32), comprising the various sets or levels of contacts SS20a1 to SS20a7 inclusive, employed in the present invention, is of the type which is caused to step to its next position upon deenergization of its solenoid. Therefore, deenergization of the solenoid SS20 caused the selector switch to step to its next position, which in this case is position No. 2.

As the next step in the operating sequence being described, a customer identification token is inserted into the media reader in order that a record of the account number of the customer in this transaction will be punched on the tape. Insertion of the customer token causes the contacts SC23a1 (FIG. 73B) to close, which completes an energizing circuit from the conductor 1304 to the alining pin and reset solenoid L20 (FIG. 73B) through the contacts K3ac11 (FIG. 73D), the conductor 1316, the contacts SP24b1 (FIG. 73B), the customer end-of-token contacts SC22b1, which will remain closed until reading of the customer tag has been completed, the contacts SS20a2 (position 2), the contacts SC23a1, the "non-repeat" contacts SC37b1, the safety contacts 1326, the solenoid L20, the contacts SC61a1, which have been closed by depression of the Charge key in row 9 of the cash register, and the normally-closed contacts SC60b1.

As has been previously described in connection with the description of the reading of the clerk token, energization of the alining pin and reset solenoid L20 causes the alining pins to move forward and engage corresponding alining holes in the customer token. The clamp and sensing switch solenoid L21 is then energized to clamp the customer token to hold it firmly in place, and also to release the five identification sensing wires which control the contacts SC25a1 to SC29a1 (FIG. 73B). Also, as has been previously described, power is supplied to the media reader and recorder motors 333 and 601 at this time over contacts K3b1, which are closed when contacts L21bc1 open the circuit to relay K3.

If the correct token—i.e., a customer token—has been inserted into the media reader, a circuit will be completed through the contacts SC26a1 (FIG. 73B), which will close by virtue of the registering of the sensing wire connected thereto with a hole in the customer token which is to be read. This circuit will extend from the conductor 1304 through the contacts SC26a1, SS20a3 (position 2), SC33b1, which, as previously stated, are closed in home and No. 1 positions of the media reader cam line, SC35b2, and the solenoids L22A and L22B of the media reader clutch to energize said solenoids, which trip the clutch to couple the media reader motor with the media reader cam line. Punching of an identification symbol and reading of the customer token will then take place in the same manner as has been described for the reading of the clerk token, and will continue until the reading of a customer token has been completed.

Upon the completion of the reading of all of the information from the customer token and the punching of this information on the tape, a resetting operation takes place, which is initiated by the opening of the customer end-of-token contacts SC22b1 (FIG. 73B). This interrupts the circuit to the alining pin and reset solenoid L20, causing said solenoid to be deenergized. The resetting operation is then carried out in a manner which has been previously described in connection with the reading of the clerk token.

In order to enforce the correct sequence of operation following the reading of the customer token, it is necessary to move the selector switch 518 (FIG. 32) to its next position, which in this case is its third position. During the reading of the customer token, when the contacts SC33a4 (FIG. 73C), which were open only in home and No. 1 positions of the media reader cam line, closed, this completed a circuit through the contacts SC20ac1 (FIG. 73C), which were closed by movement of the alining pins into the alining holes in the customer token, the contacts SC33a4, the contacts SC47ac1, which are closed by depression of the Charge key on the cash register keyboard (it will be recalled that, since this is a charge transaction, the Charge key was initially depressed), and the contacts SS20a5 (position 2), to energize the selector switch solenoid SS20. When the alining pin and reset solenoid L20 was deenergized upon completion of the reading of the customer token, thus causing the contacts SC20ac1 (FIG. 73C) to open, the circuit to the selector switch solenoid SS20 was interrupted. This caused the selector switch 518 (FIG. 32) to step to its next position, which in this case was position 3, in the manner described previously.

As the next step in the operating sequence being described, a merchandise tag is inserted in the media reader in order that a description of the merchandise being sold will be punched on the tape following the clerk and customer data. Insertion of the merchandise tag causes the contacts SC23a1 (FIG. 73B) to close, which completes an energizing circuit from the conductor 1304 to the alining pin and reset solenoid L20 (FIG. 73B) through the contacts K3ac11 (FIG. 73D), the conductor 1316, the contacts SP24b1 (FIG. 73B), the normally closed contacts K20bd1, the contacts SS20a2 (position 3), the contacts SC23a1, the "non-repeat" contacts SC37b1, the safety contacts 1326, the solenoid L20, the contacts SC61a1, which have been closed by depression of the Charge key in row 9 of the cash register, and the normally-closed contacts SC60b1.

As has previously been described in connection with the description of the reading of the clerk and the customer tokens, energization of the alining pin nad reset solenoid L20 causes the alining pins to move forward and engage corresponding alining holes in the merchandise tag and also causes contacts SC20ac1 to be closed. The clamp and sensing switch solenoid L21 is energized over contacts SC20ac1 to clamp the merchandise tag to hold it firmly in place, and also to release the five identification sensing wires which control the contacts SC25a1 to SC29a1 inclusive (FIG. 73B). Also, as has been previously described, relay K3 is deenergized, allowing contacts K3b1 to reclose to supply power to the media reader and recorder motors 333 and 601 at this time.

The merchandise tag may have any one of three different predetermined digit lengths, which shall be designated herein as No. 1, No. 2, or No. 3. Each of the three types of tags is identified by a hole in one of three different places in the identification section of the tag. Therefore, when the five identification sensing wires are released for sensing movement, the wire positioned opposite the hole in an inserted merchandise tag will pass through the hole identifying the particular type of tag and cause its corresponding contacts to close. The contacts SC27a1 are controlled by the sensing wire which will sense an identification hole in the merchandise tag of No. 1 length; the contacts SC28a1 are controlled by the sensing wire which will sense an identification hole in the merchandise tag of No. 2 length; and the contacts SC29a1 are controlled by the sensing wire which will sense an identification hole in the merchandise tag of No. 3 length.

If, for example, a merchandise tag having a No. 1 digit length is inserted into the media reader, upon release of the sensing wires controlling the contacts SC25a1 to SC29a1 inclusive, the contacts SC27a1 will close. A circuit will then be completed through the contacts SC27a1, the merchandise end-of-tag contacts SC30b1, the contacts SS20a3 (position 3),the contacts SC33b1, which are closed in home and No. 1 positions of the media reader cam line, the contacts SC35b2, and the media reader clutch solenoids L22A and L22B to energize said solenoids to trip the clutch for a cycle of operation to effect coupling of the media reader cam line to the media reader motor 333.

At the same time that the clutch solenoids L22A and L22B are energized, a circuit will be completed from the conductor 1304 through the contacts SC27a1 (FIG. 73B), SC30b1, K20bd11, SS20a4 (position 3), and a merchandise interlock relay K20 to energize said relay, which causes the contacts K20ad11 (FIG. 73B) to close, after which the contacts KC20bd11 (FIG. 73B) are caused to open. This completes a holding circuit for the relay K20 from conductor 1304 over the contacts SS1bc21 (FIG. 73C), the conductor 1340, the contacts K20ad11, the contacts SS20a4 (position 3), and the relay K20, to maintain said relay K20 in an energized condition.

It will be recalled that, in the reading of the merchandise tag, the alining pin and reset solenoid L20 was initially energized through the contacts K3ac11 (FIG. 73D), conductor 1316, contacts SP24b1 (FIG. 73B), K20bd1, SS20a2 (position 3), SC23a1, SC37b1, the solenoid L20, the contacts SC61a1, and the contacts SC60b1. Upon the energization of the relay K20, the contacts K20bd1 open, to interrupt the original energizing circuit, as has been previously stated, and the contacts K20ad1 close, thus causing an energizing circuit for the solenoid L20 to be completed through the contacts SC27a1 and SC30b1. The reading and recording operations performed under control of the merchandise tag are completed with solenoid L20 energized through this circuit, and are the same as was previously described for the clerk token and customer token.

With regard to the punching of an identification symbol for the merchandise tag being read, it will be noted that, if the encoding means is employed which includes the contacts SS20a6 (FIG. 73F), the same identification symbol will be used, regardless of which of the three possible digit lengths the merchandise tag being read may be. On the other hand, if the encoding means is employed which includes the media identification encoding contacts SC25a2 through SC29a2 (FIG. 73F), it is possible to punch different identification symbols for different lengths of merchandise tags being read, and thus identify the particular digit length of the tag being read.

Upon completion of the reading of all of the information from the merchandise tag, and the punching of this information on the tape, a resetting operation takes place, which is initiated by the merchandise end-of-tag contacts corresponding to the particular length of the tag being read. As may be seen in FIG. 73B, the merchandise end-of-tag contacts for each digit are in series with the corresponding contacts controlled by the tag identification sensing wires. That is to say, the merchandise end-of-tag contacts SC30b1 for No. 1 digit length tags are in series with the contacts SC27a1, the merchandise end-of-tag contacts SC31b1 for the merchandise tags of No. 2 digit length are in series with the contacts SC28a1, and the merchandise end-of-tag contacts SC32b1 for merchandise tags of No. 3 digit length are in series with the contacts SC29a1. Each of the sets of contacts SC30b1, SC31b1, and SC32b1 is controlled by the position of the media reader cam line and is designed to open at a certain point in the rotation of said cam line, depending upon the predetermined length of each of the three types of merchandise tags. Opening of the merchandise end-of-tag contacts corresponding to the length of the tag being read interrupts the circuit to the alining pin and reset solenoid L20, causing said solenoid to be deenergized. The resetting operation is then carried out in the manner which has previously been described in connection with the reading of the clerk and customer tokens.

The function of the merchandise interlock relay K20 is to enforce use of the cash register component of the recording system following each merchandise tag-reading operation for registering and recording of data, such as sale price, pertaining to the merchandise. Upon completion of a register operation, another merchandise tag may be read, so that a transaction may include any desired number of merchandise items. When all of the desired merchandise tags have been read and their corresponding sale prices have been registered by the cash register, a total may be taken, which will cause the selector switch 518 (FIG. 32) to be reset to its No. 1 position, in a manner to be described subsequently.

The reading of more than one merchandise tag without first performing an operation of the cash register is precluded by the opening of the contacts K20bd1 (FIG. 73B), which are caused to open by energization of the relay K20. When the contacts K20bd1 are open, the alining pin and reset solenoid L20 cannot be reenergized after it has once been deenergized, following completion of the reading of the first merchandise tag. This condition is maintained until such time as the relay K20 is deenergized during the recording of the data which results from a cash register operation.

Energization of the relay K20 also causes opening of the contacts K20bc12 (FIG. 73A) and closing of the contacts K20ac12 (FIG. 73A). It will be seen from an examination of FIG. 73A that opening of the contacts K20bc12 and closing of the contacts K20ac12 conditions the circuit so that the only key on the cash register whose depression will effect the energization of the key lock line trip solenoid L40 is the Merchandise key, which controls closing of the contacts SC58a1.

In a merchandise operation of the cash register, the sale price or other desired data is set up on the amount section of the cash register keyboard, and the Merchandise key is depressed. The closing of the contacts SC58a1 by depression of the Merchandise key completes a circuit from an A.C. conductor 1341 through the contacts L20b1 which are closed when the solenoid L20 is deenergized, the normally closed contacts SS20b14, the contacts SS20a1 (position 3), the contacts K20ac12, the normally closed contacts SC43bc1, which are controlled by the keys of row 7 and row 8 of the cash register, the contacts SC58a1 controlled by the Merchandise key, the contacts SC50a1, which close when any key in row 1 is fully depressed, the solenoid L40, and the contacts K1b13, which are recorder interlock contacts designed to close upon completion of the previous cycle of operation of the recorder, to energize the key lock line trip solenoid L40 (FIG. 73A). Energization of the solenoid L40 causes the locking in their depressed position of the keys which are depressed, and also causes a mechanical closing of the contacts SC41a1 (FIG. 73A) to take place to complete an operating circuit for the cash register motor 1300, through said motor, the speed control contacts SC49b1, and the contacts SC41a1, to cause said cash register to cycle.

At a predetermined point in the cycle of register operation, after all of the selector switches corresponding to the various key banks and other mechanism have been properly positioned, a mechanism in the cash register closes the Start-Record switch contacts SC42a1 (FIG. 73D) to initiate operation of the recorder to record data under control of the cash register. Closing of the contacts SC42a1 completes a circuit from the conductor 1304 through either or both of the parallel contacts K3ac11 (FIG. 73D) and K20a2 (FIG. 73D), both of which are closed at this time, the normally closed contacts SC44b1 controlled by the total lever on the cash register, and the contacts SC42a1 to the wiper of the program selector switch SR41a2 (FIG. 73D) for row 1.

Each of the ten contacts of the program selector switch SR41a2, representing the ten different key positions of row 1, is connected by a conductor in a cable 1342 to a program selection section 891 on the register selection board 748.

In the cash register which is disclosed in the illustrative embodiment of the invention, the key in the No. 8 position in row 1 is the Merchandise key, and for purposes of illustration, let it be assumed that the No. 8 terminal, of the terminals of section 891 of the register selection board 748, has been connected by a plug board connector, such as the connector represented in FIG. 73D by the broken line 1344, to a program I terminal in section 1345 of the board 748, to select the I punching program to punch the Merchandise data. The terminal in section 1345 is in turn connected by a conductor in a cable 1346 to the wiper of switch SSI (FIG. 73E), which is level I of the stepping switch 726. Also let it be assumed that the wiper of the switch SR41a2 (FIG. 73D) has been differentially positioned to engage its No. 8 contact in an operation of the cash register in which the Merchandise key was depressed. Since the wiper of switch SSI is positioned to engage a terminal 1347 at the beginning of a recording operation, the circuit described above to the wiper of level SSI of the stepping switch will continue through the terminal 1347, the conductor 1348, and the normally closed contacts K1bd11 (FIG. 73D) to energize the operate relay K1 (FIG. 73C).

It will be seen that the above illustration is only one example of the possible programming of the recording system. If desired, plug board connections may be made from any of the terminals in the section 891 corresponding to contacts on the switch SR41a2, to a terminal in section 1345 connected to any one of the desired levels SSI, SSII, SSIII, or SSIV of the stepping switch 726.

For a detailed description of the manner in which the recorder of the present system may be programmed, reference may be had to the co-pending Elmer A. Gerdemann United States application Serial No. 550,728, filed December 2, 1955, now Patent No. 2,896,713, issued July 28, 1959.

The previously-mentioned circuit through the operate relay K1 (FIG. 73C) energizes said relay with the following results:

The contacts K1ad11 (FIG. 73C) close to provide a holding circuit for the relay K1, through the contacts K2b12 to the conductor 1304.

The contacts K1b12 (FIG. 73C) open to deenergize the relay K3. This causes the contacts K3b1 (FIG. 73B) to close to complete an energizing circuit to the media reader motor 333 and the recorder motor 601. In addition, the contacts K3ac11 (FIG. 73D) are caused to open by the deenergization of the relay K3.

The opening of contacts K1*b*12 (FIG. 73C) also prevents a Leader Advance operation by interrupting the circuit to the Leader Advance contacts SP1*ac*1.

Contacts K1*bc*2 (FIG. 73C) open to interrupt the circuit over the contacts K2*bc*2, which is used in reset operations but not in this operation.

Contacts K1*bc*1 (FIG. 73C) open to interrupt the holding circuit for the relay K2 (FIG. 73C), which is effective in Leader Advance operations, and also interrupt the circuit to the receptacle 1308 on the diode symbol encoding board 1311 (FIG. 73F) from the contacts SS1*ac*21 (FIG. 73C) when the stepping switch 726 is out of "home" position and the relay K2 energizes. Voltage reaching the receptacle 1308 would cause the punching of unwanted Leader Advance symbols.

Contacts K1*ac*2 (FIG. 73C) close, completing a circuit from the conductor 1304 to the stepping switch magnet SS1 (FIG. 73C) over the contacts SS1*bc*21, K2*bc*1, K1*ac*2, and SS1*b*11. When the magnet SS1 energizes, it cocks a wiper driving spring of the stepping switch 726 and opens the contacts SS1*b*11. As the contacts SS1*b*11 open, they cause the magnet SS1 to deenergize. This action releases the wiper driving spring, advancing the stepping switch wipers to their first position.

Contacts K1*ac*1 and K1*a*3 close in an energizing circuit to the relay K2, which extends from the conductor 1304 through the contacts SS1*ac*21, K1*ac*1, SC2*b*1, SS1*b*1, and K1*a*3. When the stepping switch wiper has moved from home position, the contacts SS1*bc*21 open and the contacts SS1*ac*21 close to apply voltage to the relay K2 through the contacts K1*ac*1, SC2*b*1, SS1*b*1, and K1*a*3. The relay K2 is then held energized by its own holding contacts K2*a*3, which parallel the contacts K1*a*3 and SS1*b*1.

Contacts K2*ac*2 (FIG. 73C) close to complete a circuit from the conductor 1304 through the contacts SS1*ac*21 and K2*ac*2 to the stepping switch magnet SS1 to energize said magnet. The energization of the stepping switch magnet closes the contacts SS1*a*3 (FIG. 73D) to complete a circuit over the contacts SS1*ac*21 (FIG. 73C), K2*ac*2, SS1*a*3, and the program selector switch SR41*a*2, to the wiper of level SSI (FIG. 73E) of the stepping switch, as previously described.

The apparatus is now ready to record data as required by position No. 1 of the punching program I, which data may be fixed data, which is the same in all recording under control of program I, or which may be variable data, which may be set up in the cash register and may vary in different recording operations using program I.

The stepping switch magnet SS1 will remain energized until a punching operation takes place, which opens the contacts SC2*b*1 (FIG. 73C) in the holding circuit for the relay K2.

Accordingly, with the stepping switch magnet energized to apply potential to the wiper of level I, as explained, the circuit will be continued over position No. 1 contact to a punch-selecting magnet.

For purposes of illustration, let it be assumed that level I of the stepping switch 726 is programmed first to record information from the control row 9 of the cash register, then successively from the amount rows 6 to 2 of the cash register, and finally from the control row 1 of the cash register, after which a reset operation will be initiated to return the wiper of the stepping switch 726 to its home position. In a merchandise operation, rows 7 and 8 are classification rows and are not used when a merchandise tag is read, since the tag supplies the information which would otherwise be supplied by rows 7 and 8.

Since the first punching operation of program I will be utilized to record information from the control row 9 of the cash register, position No. 1 terminal for program I in the upper recorder program board 734 (FIG. 73E) would be connected by a plugboard connector, represented in FIG. 73E by a broken line 1356, to a read-out terminal 1357 for row 9 in the read-out section 735 of the lower recorder program board 733. The terminal 1357 is connected to a conductor in a cable 1360, which conductor in turn is connected to the wiper of the register read-out switch SR49*a*1 (FIG. 73D), which is set according to the key depressed in row 9 of the cash register.

Since in this illustration the Charge key, which is in position 8 of row 9, is depressed, then, in an operation of the cash register, the switch SR49*a*1 would have been mechanically positioned with its wiper on the No. 8 contact.

The contacts of the switch SR49*a*1 are connected to corresponding terminals in the section 892 of the register selection board 748 by conductors in a cable 1362. These terminals may be connected by plug board connectors to terminals in a digit section 889 in the board 748, which are connected over corresponding digit conductors in a cable 1364 to input conductors of the diode digit encoding board 1315, or may be connected to terminals in the symbol section 1324 which are connected over conductors in the cable 1325 to input conductors of the diode symbol encoding board 1311.

For purposes of illustration, let it be assumed that in section 892 of the board 748 (FIG. 73D) the No. 8 terminal related to the switch SR49*a*1 is connected by a plug board connector, represented in FIG. 73D by the broken line 1365, to a terminal 1366 in the symbol section 1324 of the board 748. Then, with the wiper of the switch SR49*a*1 positioned to its No. 8 contact, a circuit to the wiper from a stepping switch terminal over a conductor in the cable 1360 is switched by the switch SR49*a*1 to the No. 8 terminal in the section 892, then over the plug board connector 1365, the terminal 1366, a conductor in the cable 1325, input symbol line No. 3 (not shown) on the diode symbol encoding board 1311 (FIG. 73F), and diodes positioned in selected rows of the encoding board 1311, to corresponding punch magnets, for punching in selected channels of the tape. The completion of the circuits to these magnets would initiate a punch cycle, causing a symbol represented by holes in the selected channels to be punched on the tape.

During the punching of the tape, the contacts SC2*b*1 (FIG. 73C) open to deenergize the relay K2, which in turn opens the contacts K2*ac*2 (FIG. 73C) to deenergize the stepping switch magnet SS1 and advance the wipers to position No. 2. The deenergization of the stepping switch magnet SS1 opens contacts SS1*a*3 (FIG. 73D) to interrupt the circuit over the stepping switch wiper as the wiper is advanced from position No. 1 to position No. 2; hence arcing between the wiper and its related contacts during the movement from contact to contact is eliminated.

At 185 degrees in the punching cycle, the contacts SC2*b*1 reclose to reenergize the relay K2 and the stepping switch magnet SS1, which in turn closes the contacts SS1*a*3 to complete the circuit over the stepping switch wiper for level I and position No. 2 of the stepping switch 726.

According to the programming previously set forth for level I, it is next desired to record the information from amount row 6 of the cash register. When program I is being set up in the recorder, a plug board connector, represented in FIG. 73E by the broken line 1367, must be connected between the No. 2 terminal of program I in the program board 734 and a read-out terminal 1368 for row 6 in the read-out section 735 of the program board 733. The terminal 1368 is connected to a conductor in the cable 1360, which conductor in turn is connected to the wiper of the register read-out switch SR46*a*1 (not shown), which is set according to the digit entered in row 6 of the cash register.

Assuming, as an illustration, that the No. 3 key in row 6 was depressed, then, in an operation of the cash register, the read-out switch SR46*a*1 would be mechanically positioned with its wiper on the No. 3 contact.

As shown in FIG. 73D, corresponding digit contacts of each of the read-out switches SR42a1 to SR48a1 corresponding to rows 2 to 8 inclusive of the cash register are connected together by conductors in the cable 1364, which extends to the corresponding digit lines on the diode digit encoding board 1315 (FIG. 73F). With the read-out switch SR46a1 set to the No. 3 position, the wiper arm of said switch will complete a circuit from the No. 2 terminal of program I, over the connector 1367, the terminal 1368, the proper conductor in the cable 1360, the register read-out switch SR46a1, and the "3" conductor in the cable 1364, to the No. 3 input digit line (not shown) of the diode digit encoding board 1315. Diodes would be plugged in to connect the No. 3 input digit line with certain of punch-selecting magnets PS1 to PS8 inclusive (FIG. 73F), according to any desired coding arrangement. The completion of these circuits to these magnets would cause their related punches to be selected and would initiate a cycle causing digit 3 to be punched on the tape by punching holes in tape channels corresponding to the punch-selecting magnets energized.

During the second punching operation of the program, the contacts SC2b1 (FIG. 73C) again open to deenergize the relay K2 and the stepping switch magnet to advance the wipers to position No. 3, and at 185 degrees of the punching cycle contacts SC2b1 reclose to reenergize relay K2 and the stepping switch magnet SS1, which closes the contacts SS1a3 to complete the circuit over the No. 3 terminal for program I in the program board 734 and over a plug board connector to a terminal in the section 735 of the board 733 and a corresponding conductor in the cable 1360 to the wiper of the switch SR45a1 (not shown) for recording of the information from amount row 5 of the cash register. During the punching of the third digit, the wipers move to the No. 4 position.

In a manner similar to that described above, the information is recorded from the various read-out switches SR44a1 to SR42a1 inclusive, corresponding to the amount rows 4 to 2 inclusive of the cash register.

Upon completion of the recording of information from the amount rows 6 through 2 inclusive, it is next desired to record the information from the control row 1 of the cash register. When program I is being set up in the recorder, a plug board connector, represented in FIG. 73E by the broken line 1369, must be connected between the No. 9 terminal of program I in the program board 734 and a read-out terminal 1370 for row 1 in the read-out section 735 of the board 733. The terminal 1370 is connected to a conductor in the cable 1360, which conductor in turn is connected to the wiper of the control row 1 read-out switch SR41a1 (FIG. 73D), which is set, in the present example, in position 8 because the Merchandise key had been set in this row.

With the switch SR41a1 set to the No. 8 position, the wiper arm of said switch completes a circuit from the No. 9 terminal of program I, over connector 1369, terminal 1370, the proper conductor in the cable 1360, the switch SR41a1, and the "8" conductor in a cable 1371, to a corresponding terminal in the digit and symbol section 890 in the board 748 (FIG. 73D). This terminal may be connected by plug board connectors to terminals in the digit section 889 in the board 748, which are connected over corresponding digit conductors in a cable 1364 to input conductors of diode digit encoding board 1315, or may be connected to terminals in the symbol section 1324 which are connected over conductors in the cable 1325 to input conductors of the diode symbol encoding board 1311. These plug board connections would be made in the same manner as the connections were made for the recording of information from the control row 9 of the cash register, previously described. With the wiper of the switch SR41a1 positioned to its No. 8 contact, a circuit would be completed to the selected input conductors of the diode symbol encoding board or the diode digit encoding board and through connecting diodes to selected punch magnets for initiation of the punch cycle, causing a symbol or digit, represented by holes in corresponding channels of the tape, to be recorded.

After all of the information read out of rows 9 and 6 to 1 inclusive of the cash register has been recorded, it is necessary to cause the wipers of the stepping switch 726 to return to their "home" position. The programming necessary to accomplish this requires one plug board connector for each program, which connects the reset terminal 739 for each program to the terminal immediately following the terminal used to control the recording of the last data in each program. An example of one such plug board connector is represented in FIG. 73E by the broken line 1374, which connects a reset terminal 739 to a terminal 1375 in program I, in the program board 734. The terminal 1375 is considered to be the one immediately following the position controlling the recording of the last recorded data in program I. When the wiper of level I of the stepping switch 726 is stepped to a contact connected to the terminal 1375, a circuit is completed through level I of the stepping switch, the terminal 1375, the connector 1374, the reset terminal 739, and a conductor 1376 connecting the reset terminal to the relay K3 over the contacts K2a13 (FIG. 73C). These contacts are closed by energization of the relay K2 and cause the relay K3 to be energized. As the relay K3 energizes, it opens the contacts K3bc11 (FIG. 73C) to deenergize the operate relay K1, since the contacts K2b12 are open at this time. The contacts K1ac1 (FIG. 73C) are thus opened, opening the circuit to the run-in and step relay K2 and the punch clutch magnets L9A and L9B. The contacts K1bc2 (FIG. 73C) close, completing a circuit through the contacts SS1ac21, K2bc2, K1bc2, and SS1b11 to the stepping switch magnet SS1. As the magnet SS1 energizes, self-interrupter contacts SS1b11 open, causing the magnet SS1 to deenergize and advance its wipers one position. As the magnet SS1 deenergizes, the contacts SS1b11 reclose, causing the magnet SS1 to energize again.

This resetting operation continues until the stepping switch wipers reach their "home" position. At this point, the contacts SS1ac21 open the resetting circuit over the contacts K2bc2, K1bc2, and SS1b11 to the stepping switch magnet SS1. In "home" position of the stepping switch, the contacts SS1bc21 close. The apparatus has now recorded all of the information required in program I, and the wiper of the stepping switch 726 has returned to its "home" position.

Deenergization of the reader-register interlock relay K20 takes place following initiation of the operation for recording information entered in the cash register. It will be recalled that the initial operation of the stepping switch 726 causes the contacts SS1bc21 (FIG. 73C) to open. This interrupts the circuit from the conductor 1304 through the contacts SS1bc21, conductor 1340, contacts K20ad11 (FIG. 73B), SS20a4 (position 3), to the relay K20, and causes deenergization of said relay.

The contacts K20bd1 (FIG. 73B) close upon deenergization of the relay K20, and an additional merchandise tag may be read by the media reader, if desired, upon completion of the recording of the information entered into the cash register. Also, the contacts K20bc12 (FIG. 73A) close, and any of the Deposit, Discount, Tax, or Miscellaneous keys of row 1, controlling contacts SC52a1, SC53a1, SC57a1, and SC56a1, respectively, may now be used to initiate operation of the cash register, in the event such an operation is appropriate.

It will be seen that, in a transaction which includes more than one merchandise item, the merchandise tag reading operation and the associated cash register operation will cause hte appropriate information for each subsequent merchandise item to be recorded in the same manner as previously described for the single item of merchandise.

The charge transaction being described is concluded by the taking of a total of the one or more merchandise items of the transaction. The taking of a total in a charge operation also causes the sequence selector switch 518 (FIG. 32) to be moved back to position 1, so that it is properly positioned for the beginning of the next transaction. It may be noted that the mechanical design of the register used in the system being described at present is such that the operating bar 756 is mechanically blocked out when the total control lever 755 is in "add" position. The movement of said total control lever to "total" position unlocks the operating bar 756 for depression. Therefore, in the taking of a total, depression of the operating bar 756 causes the contacts SC45a1 (FIG. 73A) to close, thus completing a circuit from the A.C. conductor 1341 to the key lock line trip solenoid L40. Energization of the solenoid L40 releases the key lock line 793 to allow it be rocked. The rocking of the key lock line in turn causes the contacts SC41a1 (FIG. 73A), which are cam-controlled by the key lock line, to close, thereby initiating a total-taking operation of the cash register.

Depression of the operating bar 756 for the taking of a total in this type of register in a charge transaction causes the row 1 differential mechanism of the machine to break in its No. 5 position, so that the wiper of the program selector switch SR41a2 (FIG. 73D) is positioned to the No. 5 contact, which is connected to the corresponding terminal in section 891 of board 748 (FIG. 73D) by a conductor in the cable 1342. Said terminal may be connected by a plug board connector to a terminal in the program section 1345 of the board 748 to select a desired level of the stepping switch SS1 for the total program.

In a register of the type disclosed herein, a total-taking operation requires two cycles of the machine. The read-out switches SR42a1 to SR48a1 inclusive (FIG. 73D) are set, during a total-taking operation, according to the total computed by the register. The start-record contacts SC42a1 (FIG. 73D) are operated, as has been stated, by the main cam line 1036 of the register and, in a total-taking operation, do not close until the second cycle of the machine. Specifically, the contacts are designed to close at 535 degrees in a total-taking operation and to open again at 585 degrees in said operation. The closing of the start-record contacts SC42a1 initiates a recording cycle in which information relating to the total operation is punched on the tape according to the manner in which the selected level of the stepping switch SS1 is programmed.

For example, it may be desired first to record a series of fixed digits identifying the particular machine used in the transaction. If it is desired to punch four such digits or symbols, the first four terminals on the upper recorder program board 734 corresponding to the first four contacts of the selected level of the stepping switch 726, say level II, may be connected by plug board connectors to terminals in the digit section 738 or the symbol section 737 of the lower recorder program board 733. The terminals in the digit section 738 are connected by conductors in the cable 1364 to corresponding input lines on the diode digit encoding board 1315 (FIG. 73F). Terminals in the symbol section 737 are connected by conductors in the cable 1325 to corresponding input lines in the diode symbol encoding board 1311. In this manner, as the stepping switch 726 steps through its first four positions, the appropriate punch-selecting magnets PS1 to PS8 inclusive will be energized to cause punching in the tape of fixed identifying digits or symbols.

A reference number identifying the transaction may also be recorded during a total-taking operation. The identifying number for the transaction is set up on the reference number read-out switches SR57a1 to SR60a1 inclusive (FIG. 73D). Current is supplied to the wipers of these switches through conductors in a cable 1377, which extends to a reference number section 736 in the recorder program board 733. Terminals in the section 736 may be connected by plug board connectors to terminals of the stepping switch level selected for the total program in the upper recorder program board 734.

Corresponding digit contacts of each of the reference number read-out switches SR57a1 to SR60a1 are connected together by conductors in a cable 1392, which extends to the corresponding digit terminals in the digit section 889 of the register selection board 748. It will be recalled that these digit terminals are connected by corresponding conductors in a cable 1364 to corresponding digit lines on the diode digit encoding board 1315 (FIG. 73F). A circuit will therefore be completed from the stepping switch wiper to the selected ones of the punch-selecting magnets PS1 to PS8 inclusive according to the setting of the reference number read-out switches SR57a1 to SR60a1 inclusive to cause energization of these punch magnets for encoding of the reference number on the tape.

In addition, it may be desired to punch on the tape the total computed by the machine in a total-taking operation, though this will not normally be done in the embodiment of the recording system described herein. This total will be set up on the read-out switches SR42a1 to SR48a1 inclusive. The information set up on these switches may be recorded by connecting appropriate terminals corresponding to the selected level of the stepping switch on the upper recorder program board 734 to terminals in the read-out section 735 of the lower recorder program board 733 by means of plug board connectors. The manner in which the information set up on the read-out switches SR42a1 to SR48a1 inclusive is recorded on the tape is the same manner as has been previously described in connection with the recording of a merchandise sale price set up on the register amount banks.

The programming of a selected level of the stepping switch for a total program will be completed by connection of the appropriate stepping switch terminal with a reset terminal in the manner previously described.

Depression of the operating bar 756 also closes the contacts SC45a2 (FIG. 73C) to complete a circuit from the conductor 1304 through the contacts SS20a7 (position 3), SC44b2, SC45a2, SS20a5 (position 3), and the selector switch solenoid SS20, to energize said solenoid. Subsequent release of the operating bar 756 opens the contacts SC45a2 to interrupt the previously-mentioned circuit, thereby deenergizing the rotary selector switch solenoid SS20, which causes the selector switch 518 to step back to its No. 1 position.

It may be noted in connection with the description of the recording of a charge transaction that a charge transaction may be carried out and recorded by the recording system described above in a case where neither clerk tokens, customer tokens, nor mechandise tags are used.

As was the case before, the transaction is commenced with the selector swtich 518 in its No. 1 position, and the system is prepared for a charge transaction by depression of the Charge key. Since no clerk token is used, the clerk number must be set up on the amount rows 2 to 8 inclusive of the cash register.

The Clerk Number key of row 1 is then depressed to close the contacts SC59a1 (FIG. 73A). This completes a circuit from the A.C. conductor through the contacts L20b1 (FIG. 73A), SS20b14, SS20a1 (position 1), SC59a1, SC50a1, the key lock line trip solenoid L40, and the contacts K1b13 to energize the solenoid L40, which, as previously explained, causes the contacts SC41a1 (FIG. 73A) to close to initiate a cycle of operation of the register.

Depression of the Clerk Number key also causes the wiper of the program selector switch SR41a2 to be positioned to its number 9 position, which may be connected, in the manner described previously, to select a predetermined level of the stepping switch 726 which is programmed for the recording of a clerk number.

The cycling of the cash register causes the start-record contacts SC42a1 (FIG. 73D) to close, and the recording of the clerk number set up on the amount rows of the cash register, in addition to any identifying symbols or other information which may be desired, then takes place according to the programming of the selected level of the stepping switch 726, as described previously.

Operation of the cash register also causes the contacts SC46ac1 (FIG. 73C) to close and the contacts SC46bc1 (FIG. 73C) to open. These contacts are controlled by the position of the row 1 indicator setting segment on the register, which is shifted to its "clerk number" position during the clerk number operation. The closing of the contacts SC46ac1 completes a circuit from the conductor 1304 through the contacts SS20bc13, SC44b2, SC46ac1, SS20a5 (position 1) and the solenoid SS20 to energize the said solenoid. This causes the interrupter contacts SS20bc13 to open, thereby deenergizing the solenoid SS20 and causing the selector switch 518 to step to position 2. The previously-mentioned opening of the contacts SC46bc1 prevents a circuit from being completed through the contacts SC46ac1, SC46bc1, and SC47ac1 to position 2 of the contacts SS20a5 for reenergization of the solenoid SS20 at this time.

In some instances, it may be desired to record a clerk number which has more digits than the register keyboard has amount rows. This may be accomplished by connecting two terminals 1393 and 1394 (FIG. 73A) by means of a plug board connector such as connector 1395. The terminals 1393 and 1394 are normally located on the register selection board 748 of FIG. 73D but are shown in FIG. 73A in order to simplify the circuit diagram. Connection of the terminals 1393 and 1394 by the connector 1395 prepares an energizing circuit for the key lock line trip solenoid L40, which by-passes the contacts SS20a1, and thereby permits successive clerk number operations to enable the recording of clerk numbers of whatever length desired. Use of the connector 1395 in effect eliminates the sequence-enforcing ability of the contacts SS20a1 from the circuit. It will be seen that all of the same key banks must be used in each register operation when more than one register operation is used to record a clerk number, since the same program is used for successive register operations.

The rotary selector switch 518 will not be stepped past position 2 during a clerk number operation, since no circuit will be completed at this time for energization of solenoid SS20 through contacts SS20a5 (position 2). The recording system is therefore in condition for the recording of a customer number at the conclusion of the recording of a clerk number.

To initiate a customer-number-recording operation, the customer number is set up on the amount rows 2 to 8 inclusive of the cash register, and the Customer number key is then depressed to close the contacts SC54a1 (FIG. 73A). This completes a circuit through the contacts L20b1, SS20b14, SS20a1 (position 2), SC54a1, SC50a1, the key lock line trip solenoid L40, and the contacts K1b13 to energize the solenoid L40 and thereby initiate a cycle of operation of the register.

Depression of a customer number key also causes the wiper of the program selector switch SR41a2 (FIG. 73D) to be positioned to its No. 4 position, which may be connected, in the manner previously described, to select a predetermined level of the stepping switch 726 which is programmed for the recording of a customer number.

Cycling of the cash register causes the start-record contacts SC42a1 (FIG. 73D) to close, and the recording of the customer number set up on the amount rows of the cash register, in addition to any identifying symbols or other information which may be desired, then takes place according to the programming of the selected level of the stepping switch 726, as previously described.

Operation of the cash register also causes the contacts SC43a2 (FIG. 73C) to close. These contacts are controlled by the position of the row 1 indicator setting segment on the register, which is shifted to its "customer number" position during a customer number operation. The closing of the contacts SC43a2 completes a circuit from the conductor 1304 through the contacts SS20bc13, SC44b2, SC43a2, SS20a5 (position 2), and solenoid SS20 to energize said solenoid. This in turn causes the interrupter contacts SS20bc13 to open, thereby deenergizing the solenoid SS20 and causing the selector switch 518 to step from position 2 to position 3.

In some instances, it may be desired to record a customer number which has more digits than the register keyboard has amount rows. This may be accomplished by connecting two terminals 1396 and 1397 (FIG. 73A) by means of a plug board connector such as the connector 1398. The terminals 1396 and 1397 are normally located on the register selection board of FIG. 73D but are shown in FIG. 73A in order to simplify the circuit diagram. Connection of the terminals 1396 and 1397 by the connector 1398 prepares an energizing circuit for the key lock line trip solenoid L40, which may pass through either position 2 or position 3 of the contacts SS20a1. This permits successive customer number operations to enable the recording of customer numbers of any desired number of digits. Use of the connector 1398 in effect eliminates the sequence-enforcing ability of the contacts SS20a1 from the circuit. It will be seen that, without the connector 1398, closing of the customer number contacts SC54a1 (FIG. 73A) by depression of the Customer Number key when the contacts SS20a1 are in position 3 will have no effect, since no energizing circuit is thereby completed to energize the key lock line trip solenoid L40. However, with the connector 1398 connecting the terminals 1396 and 1397, when the contacts SS20a1 are in position 3 and the customer number contacts SC54a1 are closed, an energizing circuit for the key lock line trip solenoid L40 is completed over the contacts L20b1, SS20b14, SS20a1 (position 3), K20bc12, the contacts SC43a1, which are closed by the shifting of the indicator setting segment, the connector 1398, the Customer Number key contacts SC54a1, the contacts SC50a1, the key lock line trip solenoid L40, and the contacts K1b13.

A customer number of any desired length can be read by this method. It will be noted that, after the selector switch 518 has been stepped from position 2 to position 3, no further stepping of this switch will take place, regardless of the number of repeated customer operations for entry of a customer number of the desired length on the recording tape. This is true because stepping of the selector switch from position 3 to position 1 can take place only when the contacts SC45a2 (FIG. 73C) are closed by depression of the operating bar 756.

It is possible that, in some applications of the recording system, it would be desired to omit any recording of a customer number, whether by means of a customer token or by means of manual indexing of the customer number on the register keyboard and depression of the Customer Number key. Such an application might, for example, be used in an establishment where customer identification is established by writing or mechanical printing on a sales slip and where the punched tape is used merely for inventory purposes. The enforcement of the recording of a customer number can be eliminated in the present system by connecting two terminals 1399 and 1400 (FIG. 73C) by means of a plug board connector such as the connector 1401. The terminals 1399 and 1400 are normally located on the register selection board of FIG. 73D but are shown in FIG. 73C in order to simplify the circuit diagram. Connection of the terminals 1399 and 1400 by the connector 1401 completes a circuit from the conductor 1304 through the interrupter contacts SS20bc13, the contacts SC44b2, the connector 1401, the contacts SS20a5 (position 2), and the selector switch solenoid SS20, for energization of said solenoid SS20. Therefore it will be seen that, when the selector switch 518 is stepped from position 1 to position 2, said solenoid will be reenergized, causing the interrupter contacts SS20bc13 to open, and causing the selector switch 518 to step immediately to position 3 for a merchandise recording operation. It is therefore seen that a customer number recording operation is eliminated when the connector 1401 is connected between the terminals 1399 and 1400.

With the selector switch in position 3, the recording of the charge transaction is completed in the same manner as has been previously described, by the reading of one or more merchandise tags and entry of the corresponding sale prices for each through the cash register, any necessary deposit, discount, tax, or miscellaneous operations, and a subsequent total-taking operation, which is effective to step the selector switch 518 back to position 1 in preparation for the commencement of the next complete transaction.

It may be noted at this point that, when the selector switch 518 is in No. 3, or merchandise, position, the merchandise tag reading operation may be omitted if desired, and rows 7 and 8, which serve as classification rows in this case, may be used to supply some or all of the information normally supplied by a merchandise tag. The merchandise classification information and the sale price are set up at the same time on the register keyboard, the classification information being set up on rows 7 and 8, and the sale price being set up on rows 2 to 6, inclusive, and initiation of a cycle of operation of the register causes all of this information to be recorded by the punching mechanism in the manner previously described. Depression of a key in one or both of the two rows 7 and 8 of the cash register keyboard causes the contacts SC48ac1 (FIG. 73A) to close and causes the contacts SC48bc1 (FIG. 73A) to open. The energizing circuit for the key lock line trip solenoid L40 is then completed by depression of the Merchandise key in row 1, which closes the contacts SC58a1 (FIG. 73A). Said energizing circuit extends from the A.C. conductor 1341 through the contacts L20b1, SS20b14, SS20a1 (position 3), K20bc12, SC48ac1, SC58a1, SC50a1, the solenoid L40, and the contacts K1b13. Energization of the solenoid L40, as has been previously explained, causes initiation of a cycle of register operation for the recording of the information set up on the register keyboard. Upon completion of the recording of this information, the recording system is conditioned for the reading of a merchandise tag, for a second register operation, in which both the merchandise classification and the sale price are recorded through the register, or for a total-taking or other appropriate operation of the register.

It will be seen that, if a merchandise tag has previously been read, and the register is to be used merely to indicate and record the sale price of the merchandise item, a key in either of the two classification rows 8 or 7 cannot be depressed in such an operation, because the reading of a merchandise tag causes energization of the merchandise interlock relay K20, which in turn causes the contacts K20ac12 to close and the contacts K20bc12 to open. Therefore, if a key in row 7 or row 8 is then depressed and the contacts SC48ac1 thereby opened and the contacts SC48bc1 thereby closed, both of the two parallel paths between the contacts SS20a1 (position 3) and the contacts SC58a1 controlled by the Merchandise key will be open, and energization of the key lock line trip solenoid L40 will therefore be prevented.

*Cash transaction*

A cash transaction utilizes certain components of the recording system which are not used in a charge transaction. Therefore a cash transaction will now be described, with only those portions of such a transaction which differ materially from analogous portions of a charge transaction being explained in detail. For purposes of illustration, it will be assumed that a single item of merchandise is involved; that a token will be used for clerk identification and that a tag will be used for merchandise description; and lastly that the selector switch 518 with its sets or levels of contacts SS20a1 to SS20a7 inclusive is in its first position.

Since this is a cash sale, the Cash key of row 9 is depressed, which causes the wipers of row 9 switches SR49a1 (FIG. 73D), SR49a2, and SR49a3 (FIG. 73A) to be positioned to their No. 9 contacts and causes the contacts SC61a1 (FIG. 73B) to close.

A clerk identification token is then inserted into the media reader, and a reading and recording operation takes place in the same manner as has been previously described for a charge transaction.

It will be recalled that in a charge transaction the selector switch 518 stepped from position 1 to position 2 at the conclusion of the reading of the clerk token. In a cash transaction, such as that at present being described, the contacts SC47bc1 (FIG. 73C), which are opened by depression of the Charge key of row 1 in a charge transaction, remain closed. Therefore, when the wiper of the contacts SS20a5 reaches position 2, a circuit is completed from the conductor 1304 though the interrupter contacts SS20bc13 (FIG. 73C), the contacts SC44b2, SC47bc1, SS20a5 (position 2), and the solenoid SS20, to reenergize said solenoid. This causes the interrupter contacts SS20bc13 to open, to deenergize said solenoid and step the selector switch 518 to position 3. Position 2 is stepped past in this manner in a cash transaction, because in such a transaction there is no need for customer identification.

With the selector switch 518 in position 3, merchandise data is recorded in the same manner as has been described for a charge transaction.

Upon completion of the entry of all merchandise data, any deposit, discount, tax, or miscellaneous entries will be made, after which a sub-total is taken on the register by movement of the total control lever 755 to "subtotal" position and depression of the motor bar, which closes the contacts SC45a1 (FIG. 73A) and completes an energizing circuit for the solenoid L40 to initiate a cycle of register operation in which the total of all merchandise items, plus any other charges, such as tax, etc., is computed and indicated by the register but is not recorded on the recording tape.

Next, the amount tendered by the customer in payment of the total previously computed by the register is entered in the amount rows, and machine operation is initiated by depression of the Amount Tendered key of row 1, the total control lever 755 having automatically been moved back to its "add" position at the conclusion of the previous transaction.

Depression of the Amount Tendered key of row 1 causes the contacts SC55a1 (FIG. 73A) to close, thus completing a circuit from the A.C. conductor 1341 through the contacts L20b1, SS20b14, SS20a1 (position 3), K20bc12, SR49a2 (the wiper of which is positioned to the No. 9 contact due to depression of the Cash key of row 9, SC55a1, SC50a1, the solenoid L40, and the contacts K1b13 to energize the solenoid L40 and thereby initiate a cycle of machine operation in the manner described previously. The amount tendered is entered into the register and is indicated and printed on the appropriate record material but is not punched on the tape.

To complete the cash transaction, a total is taken by shifting the total control lever 755 to "item total" position and depressing the operating bar 756. As has been stated, the mechanical design of the cash register is such that the differential mechanism for row 1 will break in position 1 if change is due to the customer, and will break in position 5 if no change is due to the customer. The amount of change, or the amount remaining due from the customer, as the case may be, will be computed, indicated, and printed on the appropriate record material by the register. In addition, the row 1 differential mechanism will cause the wipers for the row 1 switches SR41a1 (FIG. 73D), SR41a2 (FIG. 73D), and SR41a3 (FIG. 73A) to be positioned in accordance with the position of said differential mechanism. The positioning of the wiper of the switch SR41a2 in either No. 1 or No. 5 position will cause potential to be applied through the program board 748 (FIG. 73D) to a selected level of the stepping switch 726, in a manner described previously, for recording of a total program. In the embodiment of the recording system described herein, the selected level of the stepping switch 726 will customarily be programmed to record a series of fixed digits identifying the machine used in the transaction, and a reference number identifying the transaction. The manner in which this information is programmed and recorded has been fully described in an earlier section of this specification, and therefore a description thereof will not be repeated at this time.

In the contemplated use of the described embodiment of the recording system, the recording program for a total operation in a cash transaction will not include the recording of information from any of the rows 1 to 9 inclusive of the cash register. However, the program could be set up to include the recording of information from one or more of these rows if desired for some particular application.

Means are provided to cause the "no change" indicator lamp 1001 to be lighted during a total-taking operation in the event that the amount tendered by a customer is not greater than the total amount which is due from the customer. As has been stated, when no change is due to a customer, the row 1 differential breaks in its No. 5 position, and the wiper of the switch SR41a3 (FIG. 73A) is correspondingly positioned to its No. 5 contact. This completes a circuit through the switch SR41a3 (position 5), the contacts SC62a1, which are closed by the positioning of the total control lever in "item total" position and which remain closed until the next machine operation, the row 9 switch SR49a3, the wiper of which is positioned to its No. 9 contact, since the No. 9 or Cash key of row 9 has been depressed, and the lamp 1001, thus causing said lamp to light to indicate that no change is due to the customer.

Also, as has been previously described, during a total-taking operation the selector switch 518 is stepped from its No. 3 position to its No. 1 position to prepare the recording system for the next transaction.

*"Send" and "Mail Phone" key control*

In addition to the various types of information previously set forth which may be recorded by the recording system during a charge, cash, or other type of transaction, information relating to the disposition of the merchandise involved may be encoded on the tape. Means including two sets of contacts SC63ac1 and SC63bc1 (FIG. 73D), controlled by the Send key 759 and the Mail Phone key 758, located below row 9 of the cash register keyboard, are provided for causing symbols to be recorded during a transaction to indicate whether each item of merchandise is to be taken by the customer or to be delivered by the store. As previously described, depression of the Send key 759 or the Mail Phone key 758 causes the normally-closed "take" contacts SC63bc1 to open and the normally-open "send" contacts SC63ac1 to close. The movable member of the contacts SC63ac1 and SC63bc1 is connected by a conductor 1403 to a terminal in a section 1404 of the lower recorder program board 733, while the fixed members of the contacts SC63ac1 and SC63bc1 are connected by conductors in a cable 1405 to terminals in a section 1406 of the register program board 748.

It will be seen that the send-take contacts can be connected for recording appropriate symbols in any recording program—for example, a "merchandise" program—by connecting a terminal in section 1404 of the board 733 to a selected terminal of one of the stepping switch levels in the board 734, and by connecting each of the "send" and "take" terminals in section 1406 of the board 748 to a selected digit or symbol terminal in one of the sections 889 or 1324. The recording of this information will then take place in the manner described for the recording of other programmed data.

*Tag release and homing means*

Manually-controlled push button means are provided on the media reader for the release of any tag which has been inserted into the machine, engaged and aligned by the alining pins, and clamped by the clamp and sensing switch solenoid L21, but which has been placed in the media reader in an improper sequence of operation, as, for example, where a merchandise tag is placed in the media reader before a clerk or customer token has been placed therein for reading. In such an event, the closing of one of the identification sensing switches SC25a1 to SC29a1 inclusive will not complete a circuit, and the tag will not be read. Depression of the push button 490 (FIG. 1) causes the contacts SP24b1 (FIG. 73B) to open, thus interrupting the energizing circuit for the alining pin and reset solenoid L20, which circuit passes through the contacts K3ac11 (FIG. 73D), SP24b1 (FIG. 73B), SS20a2, SC23a1, SC37b1, the safety contacts 1326, the solenoid L20, and the contacts SC61a1 and SC60b1. This deenergizes the solenoid L20, which causes the alining pins of the media reader to be withdrawn from the tag. Withdrawal of these alining pins causes the contacts SC20ac1 (FIG. 73C) to open, thereby deenergizing the clamp and sensing switch solenoid L21, which in turn releases the tag, so that it may be removed from the media reader and the correct tag inserted for reading. However, once reading of the tag has been commenced, as it will be automatically when the correct tag is inserted into the media reader, the push button 490, controlling the contacts SP24b1, is ineffective to cause release of the tag, since the energizing circuit for the solenoid L20 by-passes the contacts SP24b1 through the contacts SS20ac13 (FIG. 73B) when the selector switch is in position 1 or 2. The opening of the contacts SP24b1 at such a time, therefore, will not interrupt the circuit to the alining pin and reset solenoid L20, since this circuit will be completed through the contacts SS20ac13, position 1 or 2 of the contacts SS20a2, the media insert contacts SC23a1, the non-repeat contacts SC37b1, the safety contacts 1326, the alining pin and reset solenoid L20, the contacts SC61a1, and the contacts SC60b1. When the selector switch 518 is in position 3, the push-button-controlled contacts SP24b1 will be by-passed through one of the three paths extending through one of the three sets of sensing contacts SC27a1, SC28a1, or SC29a1, and the corresponding end-of-tag contacts SC30b1, SC31b1, or SC32b1, the contacts K20ad1, SS20a2 (position 3), SC23a1, SC37b1, the safety contacts 1326, the solenoid L20, the contacts SC61a1, and the contacts SC60b1.

The same push button 490 which controls the contacts SP24b1 is also used for returning the media reader to home position in the event that the power source for the recording system has failed during a previous tag-reading operation before the reading of the tag in said operation was completed. Depression of the above-mentioned push-button 490 closes the contacts SP24a2 (FIG. 73C), thus completing a circuit to the media reader clutch solenoids L22A and L22B. The circuit is completed from the positive conductor 1304 through the contacts L21bc1 (FIG. 73C), which will be closed, since the tag which the media reader had been reading before the power failure will have been ejected from the media reader upon occurrence of the power failure, thereby deenergizing the clamp and sensing switch solenoid L21;

the contacts SP24a2; the contacts SC33a3 (FIG. 73B), which will be closed, since the media reader cam line in this contingency will not be in either home or No. 1 position; the contacts SC35b2; and the clutch solenoids L22A and L22B. Energization of the clutch solenoids L22A and L22B, through the above circuit, causes the contacts L22a1 (FIG. 73B) to close, thus completing a holding circuit from the conductor 1304 through the contacts SC20bc1 (FIG. 73B), which will be closed due to the fact that no tag will be present in the media reader; the contacts L22a1; the contacts SC33a3; the contacts SC35b2; and solenoids L22A and L22B. The solenoids L22A and L22B will remain energized hrough this circuit, even though the contacts SP24a2 are caused to open once more by release of the push button 490 controlling said contacts. The circuit through the contacts L22a1 to the solenoids L22A and L22B will remain closed until the media reader cam line has been cycled to home position, at which time the contacts SC33a3 will open, thereby deenergizing the solenoids L22A and L22B. The resetting of the media reader cam line to home position may thus be accomplished by depression of the push button 490 after a power failure has interrupted the reading of a tag and has caused the partially-read tag to be ejected from the media reader.

In order for a resetting operation of the media reader cam line to take place, the energizing circuit for the media reader motor 333 (FIG. 73B) must be completed by the closing of the contacts K3b1 (FIG. 73B). These contacts are closed during a media reader cam line resetting operation, due to the fact that the relay K3 is in a deenergized condition, since the contacts SC33b2 (FIG. 73C) in the energizing circuit for the relay K3 are open, except when the media reader cam line is in home or No. 1 position, and therefore will remain open until a resetting operation of the media reader cam line is completed.

*Selector switch homing by total-taking*

In the event that through error or inadvertence of the the operator an erroneous tag reading has been made and the selector switch 518 has been stepped to position 2, said switch may be stepped through position 3 to home position by use of the total-taking means on the cash register component of the recording system. In order to accomplish the stepping of the selector switch 518, the operating bar 756 of the cash register is depressed, thus closing the contacts SC45a3 (FIG. 73C). The closing of the contacts SC45a3 completes a circuit to the selector switch solenoid SS20 through the interrupter contacts SS20bc13 (FIG. 73C), the contacts SS44b2, which are closed only in "add" and "total" positions of the total control lever 755, the contacts SC45a3, the contacts SS20a5 (position 2), and the solenoid SS20. As the solenoid SS20 is energized, it causes the interrupter contacts SS20bc13 to open, thereby deenergizing said solenoid and causing the selector switch to be stepped to position 3. A circuit is then completed through position 3 of the contacts SS20a7, the contacts SC44b2, the contacts SC45a2, which are closed by depression of the operating bar in the same manner as the previously-mentioned contacts SC45a3, the contacts SS20a5 (position 3), and the solenoid SS20, to energize said solenoid. The solenoid SS20 will remain energized until the operator releases the operating bar 756, thus causing the contacts SC45a2 to open, which will interrupt the circuit to the solenoid SS20, to cause deenergization of said solenoid, with the consequent result of the stepping of the selector switch 518 to its No. 1 or home position.

*Parity check*

Means are provided for checking the correctness of punching operations in the recording of data. In certain coding systems, the code is such that an even number of holes will be punched in the tape in representing each digit or symbol used. In other systems, an odd number of holes will be punched in the tape to represent each digit or symbol used. The parity checking means employed in the illustrated embodiment of the recording system may alternatively be connected into the circuit so as to check either an "even" or an "odd" code, and as shown will be connected as it would be when an "even" code is used in the recording of data.

The parity check circuit or matrix is shown in detail in FIG. 72 and is shown symbolically in the position which it would occupy in the recording system circuit in FIG. 73C.

As shown in FIG. 72, the parity check matrix includes sets of normally-open contacts SC10a1 and SC10a2, which are closed during the punching of sprocket holes, and also includes two sets of normally-open contacts SC11ac1 and SC11ac2 to SC18ac1 and SC18ac2 inclusive, and two sets of normally-closed contacts SC11bc1 and SC11bc2 to SC18bc1 and SC18bc2 inclusive, which are controlled by the punches 1 to 8 inclusive. Upon the actuation of any one of the punches, its normally-open contacts will be closed and its normally-closed contacts will be opened.

It will be seen in FIG. 73C that the parity check matrix is connected between the relay K6 and the contacts K3b2 in the recording system circuit. The input line 1380 from the relay K6 is shown at the left in FIG. 72, while the output line 1381 to the contacts K3b2 is shown at the lower right. In the event that an "odd" code rather than an "even" code is desired to be used in the recording system, the output line 1382 at the upper right, shown in phantom, rather than the output line 1381 at the lower right, would be connected to the contacts K3b2.

The various sets of contacts in the parity check matrix are so arranged that a circuit will be completed from the input line 1380 to the lower output line 1381 whenever an odd number of punches are actuated, and a circuit will be completed to the upper output line 1382 whenever an even number of punches are actuated.

For example, suppose that it is desired to encode the digit 1. According to a typical "even" code, the No. 1 and No. 5 holes are punched in channels 1 and 5 of the recording tape by the No. 1 and No. 5 punches, respectively, to represent the digit 1. If the punches 1 and 5 are properly actuated, the contacts SC11bc1 and SC11bc2, controlled by punch No. 1, will be opened; the contacts SC11ac1 and SC11ac2, controlled by punch No. 1, will be closed; the contacts SC15bc1 and SC15bc2, controlled by punch No. 5, will be opened; and the contacts SC15ac1 and SC15ac2, controlled by punch No. 5, will be closed. A circuit will then be completed from the input line 1380 through the contacts SC18bc1, SC16bc1, SC14bc1, SC13bc1, SC11ac1 (closed by actuation of punch No. 1), SC12bc2, SC10a2 (closed by the punching of a sprocket hole), SC15ac2 (closed by actuation of the No. 5 punch), and SC17bc2 to the upper right output line 1382. However, the output line 1381 at the lower right rather than the line 1382 at the upper right is connected to the recording system circuit in the illustrated embodiment of the invention, and no circuit will be completed from the input line 1380 to the output line 1381. Therefore the circuit which includes the relay K6 (FIG. 73C) and the contacts K3b2 will remain in its normally-open state.

On the other hand, if there is a failure and, for example, the No. 1 punch is actuated but the No. 5 punch is not, a circuit will be completed from the input line 1380 through the contacts SC18bc1, SC16bc1, SC14bc1, SC13bc1, SC11ac1 (closed by actuation of the No. 1 punch), SC12bc2, SC10a2 (closed by the punching of a sprocket hole), SC15bc1 (which remains closed, since the No. 5 punch was not actuated), and SC17bc1 to the lower right output line 1381.

This completes an energizing circuit from the positive conductor 1304 through the parity check relay K6 (FIG.

73C), the parity check matrix (shown in FIG. 72 and shown symbolically in FIG. 73C), and the contacts K3b2. Energization of the relay K6 causes contacts K6ac1 (FIG. 73C) to close to complete a holding circuit over the resistor 1383 (FIG. 73C) to retain the relay K6 in energized condition.

Contacts K6a12 (FIG. 73A) are caused to close, thereby completing a circuit to cause the lamp 1384 (FIG. 73A) to light.

Contacts K6bc1 (FIG. 73C) are caused to open, thereby interrupting a circuit through the run-in and step relay K2 to deenergize said relay and prevent further stepping of the stepping switch SS1.

Contacts K6b11 (FIG. 73B) are caused to open, thereby interrupting the energizing circuit for the media reader clutch solenoids L22A and L22B, which circuit is normally controlled by the answer-back contacts SC4ac1, as has been previously described. This prevents further operation of the media reader until such time as the parity check relay K6 is deenergized.

In the recording system circuit as shown, the parity check relay K6 can be deenergized only by opening the power contacts ST40a1, ST40a2 (FIG. 73A) to interrupt all power input to the recording system. This, of course, deenergizes the relay K6 and causes the contacts K6a12 and K6ac1 to open, and the contacts K6bc1 and K6b11 to close.

It will therefore be seen that the parity checking system employed herein provides effective notice of a condition which causes it to be activated. After the erroneous punching has been noted, the power contacts ST40a1, ST40a2 may be closed to cause resumption of operation of the system. All of the contacts in the parity check matrix will have been restored to their normal condition at such time, due to return of all of the punches to their retracted positions.

*Interchangeable sequence selector unit*

As has been described in the section of the specification devoted to the mechanical construction of the media reader, certain components of the media reader, including the selector switch 518 (FIG. 32), the selector switch solenoid SS20, certain contacts controlled by energization of said solenoid, etc., are contained in a plug-in unit which may be removed from the media reader and replaced by another unit having components designed to effect a different sequence of operation of the recording system.

In the embodiment of the recording system shown in the circuit diagram and described in the preceding pages, the plug-in unit contains a three-position selector switch 518, so that any complete transaction will include a clerk number operation, a customer number operation, and a merchandise operation, except that the customer number operation may be omitted, if desired, by connecting the terminals 1399 and 1400 (FIG. 73C) in the manner previously described.

In the event that it is desired to apply the recording system to a particular application in which only two distinct operations, such as, for example, customer number and merchandise, are desired in each transaction, the original plug-in unit may be removed, and a plug-in unit containing a selector switch having only two positions may be substituted. The sequence of operations using such a switch will be from position 1 to position 2 and back to position 1, thereby providing sequence enforcement for two separate operations of whatever character is required in the particular application.

Also, it might be desired to use the recording system in an application, such as inventory, in which only one operation is desired in each transaction. Here again, the original plug-in unit may be removed and replaced by one designed for the contemplated application. In this last case, the selector switch may be altogether dispensed with, and the plug-in unit will serve primarily as means for connecting certain of the various leads thereto.

It will be seen that the provision of interchangeable plug-in units, of which the three described above are merely exemplary, permits great flexibility in the uses of the recording system and enables a single recording system to be adapted to a variety of uses merely by changing plug-in units.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a recording system for recording a plurality of different classes of data, the combination comprising means for recording said data; means for receiving an insertable record card in sensing position, said record card having data perforated in columns thereon; control means actuable by insertion of the card in sensing position; means operable to lock the card in sensing position and operated by said control means; data sensing means for serially sensing the card column by column and controlling the recording means to cause recording of the data which is sensed; identification sensing means associated with the data sensing means for sensing an identification section of said card and rendered effective in response to an operation of the card-operated control means, a perforation being positioned in the identification section of the card according to which of the different classes of data it bears; sequence control means for enforcing a certain sequence of sensing of the different classes of data; means controlled by the identification sensing means and the sequence control means for initiating operation of the data sensing means; reset means to cause the data sensing means to be reset in preparation for the next data sensing operation upon completion of sensing of the record card; and cut-off means operable to cause operation of the reset means and release the card-locking means upon completion of sensing of the record card.

2. In a recording system for recording a plurality of different classes of data, the combination comprising means for recording said data; means for receiving an insertable record card in reading position, said record card having data perforated in columns thereon, the number of columns on said card being related to the class of data which it bears, and being the same on every card bearing the same class of data; control means actuable by insertion of the card in reading position; means operable to lock the card in reading position and operated by said control means; means for reading the card column by column and controlling the recording means to cause recording of the data which is read; sensing means associated with the reading means for sensing an identification section of said card and rendered effective in response to an operation of the card-operated control means, a perforation being positioned in the identification section of the card according to which of the different classes of data it bears; sequence control means for enforcing a certain sequence of reading of the different classes of data; means controlled by the sensing means and the sequence control means for initiating operation of the reading means; reset means to cause the reading means to be reset in preparation for the next reading operation upon completion of reading of the record card; and separate cut-off means for each class of data, operable upon completion of a column-reading operation of the reading means equal to the number of columns on the cards related to said class, to cause operation of the reset means and release the card-locking means.

3. In a recording system for recording a plurality of different classes of data, the combination comprising means for recording said data; data entry means including a plurality of switching means which are settable to represent data; programming means including serially-operable, multiple-level switching means for providing a plurality of different recording programs to control the recording means for recording the different classes of data set up on the data-representing switching means, each level controlling the recarding of a single class of data; first control means to select a desired one of the recording programs according to the class of data set up on the data-representing switching means; multiple-position sequence control means for enforcing the selection of recording programs by the first control means in a certain predetermined sequence, successive positions of said sequence control means relating to different classes of data; and means controlled by the first control means and the sequence control means for initiating a cycle of operation of the data entry means, whereby different classes of data will be entered into and recorded by the recording system in a predetermined sequence.

4. In a recording system utilizing recording means for recording a plurality of different classes of data, the combination comprising data entry means including a plurality of switching means which are settable to represent data; programming means including serially-operable, multiple-level switching means for providing a plurality of different recording programs to control the recording means for recording the different classes of data set up on the data-representing switching means, each level controlling the recording of a single class of data; first manually operable control means associated with the data entry means to select a desired one of the recording programs according to the class of data set up on the data-representing switching means; and multiple-position sequence control means for enforcing the selection of recording programs by the first control means in a certain predetermined sequence, successive positions of said sequence control means relating to different classes of data, whereby different classes of data will be set up and recorded by the recording system in a predetermined sequence, said sequence being changeable by replacement of one sequence control means with another capable of enforcing a different sequence.

5. In a recording system for recording a plurality of different classes of data, the combination comprising means for recording said data; means for receiving an insertable record card in reading position, said record card having data perforated in columns thereon; means for reading the card column by column, and controlling the recording means to cause recording of the data which is read; sensing means associated with the reading means for sensing an identification section of said card, a perforation being positioned in the identification section of the card, according to which of the different classes of data it bears; means associated with the sensing means and controlling the recording means to cause the recording of a symbol corresponding to the class of data on the card, according to a predetermined code; sequence control means for enforcing a certain sequence of reading of the different classes of data; and means controlled by the sensing means and the sequence control means for initiating operation of the reading means, whereby different classes of data will be read and recorded, together with an identification symbol for each different class, by the recording system in a predetermined sequence.

6. In a recording system for recording data, the combination comprising a recording mechanism of the step-by-step type for recording said data; step-by-step means for reading the data and controlling the recording mechanism to cause recording of the data which is read; reset means for causing the data-reading means to be reset to a home position; reset control means operated by completion of a data-reading operation to initiate operation of the reset means; and manually-operable means to initiate operation of the reset means in the event that a data-reading operation is interrupted before completion, so that the reset control means cannot function to initiate a reset operation.

7. In a recording system for recording a plurality of different classes of data, the combination comprising a recording mechanism of the step-by-step type for recording said data; first data entry means including means for reading cards having data thereon and for controlling the recording mechanism to record the data read; second data entry means including a plurality of switching means which are settable to represent data and which can control the recording mechanism to record the data set; programming means including serially-operable, multiple-level switching means for providing a plurality of different programs corresponding to the different classes of data to control the recording mechanism for recording the data set up on the data-representing switching means, each level controlling the recording of a single class of data; first control means for selecting a desired one of the recording programs according to the class of data set up on the data-representing switching means; multiple-position sequence control means for enforcing a certain sequence of recording of the different classes of data, successive positions of said sequence control means relating to different classes of data; first and second interlock means for preventing simultaneous operation of the first data entry means and the second data entry means; means controlled by the sequence control means and the first interlock means for initiating operation of the first data entry means; and means controlled by the first control means, the sequence control means, and the second interlock means for initiating operation of the second data entry means, whereby data may be selectively entered into the recording system by either the first data entry means or the second data entry means, a predetermined sequence of entry of different classes of data being enforced in either case by the sequence control means.

8. In a recording system for recording a plurality of different classes of data, the combination comprising means for recording said data; means for receiving an insertable record card in reading position, said record card having data perforated in columns thereon; data sensing means for each column of the card, said data sensing means being normally maintained out of sensing position; sensing control means for serially releasing the data sensing means to sense the perforations on the record card column by column; means responsive to the data sensing means to control the recording means to cause recording of the data which is sensed; separate identification sensing means associated with the data sensing means and positioned to sense an identification section of said card, a perforation being positioned in the identification section of the card according to which of the different classes of data it bears; sequence control means for enforcing a certain sequence of sensing of different classes of data; and initiating means controlled by the separate identification sensing means and the sequence control means for initiating operation of the sensing control means, whereby different classes of data will be sensed and recorded by the recording system in a predetermined sequence.

9. In a recording system for recording a plurality of different classes of data, the combination comprising data sensing means for sensing a record card having data perforated in columns thereon, said data sensing means being normally maintained out of sensing position; sensing control means for serially releasing the data sensing means to sense the perforations on the record card column by column; means for recording the data sensed; means responsive to the data sensing means to control the recording means to cause recording of the data which is sensed; identification sensing means to identify the different classes of data; sequence control means for enforcing a certain sequence of reading of the different classes of data; and clutch control means controlled by the identification sensing means and the sequence control means for initiating operation of the sensing control means, said sequence control means being readily removable and replaceable by different sequence control means capable of enforcing a different sequence of sensing of the various classes of data, whereby different classes of data will be sensed and recorded by the recording system in a predetermined sequence, said sequence being changeable by replacement of one sequence control means with another capable of enforcing a different sequence.

10. In a recording system for recording a plurality of different classes of data, the combination comprising a recording mechanism of the step-by-step type for recording said data; first data entry means including sensing means for sensing data from a record member and controlling the recording mechanism for the recording of the data which is sensed; means for driving the sensing means to cause column-by-column sensing of the record member; second data entry means including a plurality of switching means which are settable to represent data; serially-operable programming means for providing a plurality of different programs and operable to control the recording mechanism to cause each class of data set up on the switching means of the second data entry means to be recorded in a serial manner; control means to select a desired one of the recording programs according to the class of data set up on the switching means; parity checking means operable in response to the recording operations of the recording mechanism and effective to produce a control condition in the event of an erroneous operation of the recording mechanism; first means actuated in response to the control condition to prevent further operation of the means for driving the first data entry means; and second means actuated in response to the control condition to prevent further operation of the programming means, whereby an erroneous operation of the recording mechanism is effective to prevent further operation of the first data entry means, and to halt further serial operation of the programming means.

References Cited in the file of this patent
UNITED STATES PATENTS

| | | |
|---|---|---|
| 1,834,562 | Watson | Dec. 1, 1931 |
| 1,927,556 | Nelson | Sept. 19, 1933 |
| 2,018,420 | Robinson et al. | Oct. 22, 1935 |
| 2,290,827 | Thomas | July 21, 1942 |
| 2,614,632 | Clos | Oct. 21, 1952 |
| 2,636,672 | Hamilton et al. | Apr. 28, 1953 |
| 2,647,581 | Gardinor et al. | Aug. 4, 1953 |
| 2,652,196 | Sterling | Sept. 15, 1953 |
| 2,684,718 | Luhn | July 27, 1954 |
| 2,728,521 | Benson et al. | Dec. 27, 1955 |
| 2,775,299 | Doury | Dec. 25, 1956 |
| 2,781,847 | Kilheffer et al. | Feb. 19, 1957 |
| 2,846,009 | Barbeau et al. | Aug. 5, 1958 |
| 2,878,872 | Burns et al. | Mar. 24, 1959 |
| 2,896,713 | Gerdemann | July 28, 1959 |
| 2,905,298 | Blodgett et al. | Sept. 22, 1959 |

UNITED STATES PATENT OFFICE
CERTIFICATION OF CORRECTION

Patent No. 3,014,647 December 26, 1961

Richard L. Ditmer et al.

It is hereby certified that error appears in the above numbered patent requiring correction and that the said Letters Patent should read as corrected below.

Column 7, line 52, for "The" read -- This --; column 9, line 20, after "for" insert -- reading and --; column 10, line 28, for "On" read -- An --; column 12, line 2, for "cavtiy" read -- cavity --; column 25, line 4, for "dods" read -- rods --; line 20, for "rids" read -- rods --; column 35, line 31, for "punch-activating" read -- punch-actuating --; column 40, line 19, for "expalined" read -- explained --; column 44, line 52, for "total-making" read -- total-taking --; column 50, line 15, for "1935" read 1035 --; column 54, line 49, for "132" read -- 1132 --; line 68, for "115" read -- 1115 --; column 55, line 44, for "(FIG. 59)" read -- (FIG. 69) --; column 56, line 68, for "higher" read -- high --; column 60, line 22, for "hte" read -- the --; column 62, line 41, after "SC2b1," insert -- and --; column 64, line 17, for "conactts" read -- contacts --; column 65, line 52, for "apprporiate" read -- appropriate --; line 56, for "condutor" read -- conductor --; same column 65, line 61, for "punch-seelcting" read -- punch-selecting --; column 66, line 57, for "SC33b11" read -- SC33b1 --; column 69, line 69, for "nad" read -- and --; column 70, line 41, for "KC20bd11" read -- K20bd11 --; column 76, line 71, for "hte" read -- the --; column 85, line 13, for "wil remain energized hrough" read -- will remain energized through --; column 89, line 5, for "recarding" read -- recording --.

Signed and sealed this 8th day of May 1962.

(SEAL)
Attest:

ERNEST W. SWIDER
Attesting Officer

DAVID L. LADD
Commissioner of Patents